(12) United States Patent
Khakpour et al.

(10) Patent No.: US 12,533,218 B2
(45) Date of Patent: Jan. 27, 2026

(54) APPARATUS AND METHODS FOR TREATING TEETH

(71) Applicant: SONENDO, INC., Laguna Hills, CA (US)

(72) Inventors: Mehrzad Khakpour, Laguna Hills, CA (US); Bjarne Bergheim, Mission Viejo, CA (US); Ryan Evans, Irvine, CA (US)

(73) Assignee: SONENDO, INC., Laguna Hills, CA (US)

( * ) Notice: Subject to any disclaimer, the term of this patent is extended or adjusted under 35 U.S.C. 154(b) by 0 days.

(21) Appl. No.: 18/131,317

(22) Filed: Apr. 5, 2023

(65) Prior Publication Data
US 2023/0310132 A1 Oct. 5, 2023

Related U.S. Application Data

(60) Continuation of application No. 16/938,713, filed on Jul. 24, 2020, now abandoned, which is a division of
(Continued)

(51) Int. Cl.
*A61C 17/02* (2006.01)
*A61C 1/00* (2006.01)
(Continued)

(52) U.S. Cl.
CPC ............ *A61C 17/02* (2013.01); *A61C 1/0046* (2013.01); *A61C 1/082* (2013.01); *A61C 3/02* (2013.01);
(Continued)

(58) Field of Classification Search
CPC .. A61C 17/02; A61C 5/42; A61C 5/40; A61C 1/0046; A61C 1/082; A61C 3/02;
(Continued)

(56) References Cited

U.S. PATENT DOCUMENTS 1,500,107 A 7/1924 Chandler
2,108,558 A 2/1938 Jackman
(Continued)

FOREIGN PATENT DOCUMENTS

CA 2031739 6/1991
CA 2771397 2/2011
(Continued)

OTHER PUBLICATIONS

US 11,612,435 B2, 03/2023, DiVito et al. (withdrawn)
(Continued)

*Primary Examiner* — Nicholas D Lucchesi
(74) *Attorney, Agent, or Firm* — Knobbe Martens Olson & Bear LLP

(57) ABSTRACT

An apparatus for treating a tooth or gum tissue is disclosed. The apparatus can include a tooth cap for supporting a treatment device during a treatment procedure. The tooth cap can comprise a platform to support the treatment device. The platform can include an access port to provide a portion of the treatment device with access to a treatment region of the tooth or gum tissue. The tooth cap can also include a wall coupled with and angled relative to the platform, the wall configured to be attached to the tooth or gum tissue during treatment.

7 Claims, 42 Drawing Sheets

Related U.S. Application Data application No. 14/267,794, filed on May 1, 2014, now Pat. No. 10,722,325.

(60) Provisional application No. 61/874,337, filed on Sep. 5, 2013, provisional application No. 61/818,383, filed on May 1, 2013.

(51) Int. Cl.
*A61C 1/08* (2006.01)
*A61C 3/02* (2006.01)
*A61C 5/40* (2017.01)
*A61C 5/42* (2017.01)
*A61C 17/028* (2006.01)
*A61C 17/20* (2006.01)

(52) U.S. Cl.
CPC ............ *A61C 5/40* (2017.02); *A61C 5/42* (2017.02); *A61C 17/0202* (2013.01); *A61C 17/028* (2013.01); *A61C 17/20* (2013.01)

(58) Field of Classification Search
CPC .... A61C 17/0202; A61C 17/028; A61C 17/20
See application file for complete search history.

(56) References Cited

U.S. PATENT DOCUMENTS

| | | |
|---|---|---|
| 3,023,306 A | 2/1962 | Kester |
| 3,225,759 A | 12/1965 | Drapen et al. |
| 3,401,690 A | 9/1968 | Martin |
| 3,460,255 A | 8/1969 | Hutson |
| 3,514,328 A | 5/1970 | Malin |
| 3,521,359 A | 7/1970 | Harris |
| 3,522,801 A | 8/1970 | Seymour |
| 3,547,110 A | 12/1970 | Balamuth |
| 3,561,433 A | 2/1971 | Kovach |
| 3,590,813 A | 7/1971 | Roszyk |
| 3,593,423 A | 7/1971 | Jones et al. |
| 3,624,907 A | 12/1971 | Brass et al. |
| 3,703,170 A | 11/1972 | Ryckman, Jr. |
| 3,731,675 A | 5/1973 | Kelly |
| 3,739,983 A | 6/1973 | Jousson |
| 3,745,655 A | 7/1973 | Malmin |
| 3,747,216 A | 7/1973 | Bassi et al. |
| 3,756,225 A | 9/1973 | Moret et al. |
| 3,828,770 A | 8/1974 | Kuris et al. |
| 3,871,099 A | 3/1975 | Kahn |
| 3,921,296 A | 11/1975 | Harris |
| 3,930,505 A | 1/1976 | Wallach |
| 3,962,790 A | 6/1976 | Riitano et al. |
| 4,021,921 A | 5/1977 | Detaille |
| 4,060,600 A | 11/1977 | Vit |
| 4,071,956 A | 2/1978 | Andress |
| 4,215,476 A | 8/1980 | Armstrong |
| 4,247,288 A | 1/1981 | Yoshii et al. |
| 4,274,555 A | 6/1981 | Sneider |
| 4,276,880 A | 7/1981 | Malmin |
| 4,293,188 A | 10/1981 | McMahon |
| 4,308,603 A | 12/1981 | Overby, III |
| 4,330,278 A | 5/1982 | Martin |
| 4,376,835 A | 3/1983 | Schmitt et al. |
| 4,386,911 A | 6/1983 | Maloney et al. |
| 4,424,036 A | 1/1984 | Lokken |
| 4,462,803 A | 7/1984 | Landgraf et al. |
| 4,474,251 A | 10/1984 | Johnson, Jr. |
| 4,492,575 A | 1/1985 | Mabille |
| 4,522,597 A | 6/1985 | Gallant |
| 4,534,542 A | 8/1985 | Russo |
| 4,539,987 A | 9/1985 | Nath et al. |
| 4,554,088 A | 11/1985 | Whitehead et al. |
| 4,595,365 A | 6/1986 | Edel et al. |
| 4,608,017 A | 8/1986 | Sadohara |
| 4,659,218 A | 4/1987 | de Lasa et al. |
| 4,661,070 A | 4/1987 | Friedman |
| 4,671,259 A | 6/1987 | Kirchner |
| 4,676,586 A | 6/1987 | Jones et al. |
| 4,676,749 A | 6/1987 | Mabille |
| 4,684,781 A | 8/1987 | Frish et al. |
| 4,732,193 A | 3/1988 | Gibbs |
| 4,789,335 A | 12/1988 | Geller et al. |
| 4,818,230 A | 4/1989 | Myers et al. |
| 4,872,837 A | 10/1989 | Issalene et al. |
| 4,917,603 A | 4/1990 | Haack |
| 4,935,635 A | 6/1990 | O'Harra |
| 4,941,459 A | 7/1990 | Mathur |
| 4,957,436 A | 9/1990 | Ryder |
| 4,973,246 A | 11/1990 | Black et al. |
| 4,985,027 A | 1/1991 | Dressel |
| 4,992,048 A | 2/1991 | Goof |
| 4,993,947 A | 2/1991 | Grosrey |
| 5,013,241 A | 5/1991 | Gutfeld et al. |
| 5,013,300 A | 5/1991 | Williams |
| 5,020,995 A | 6/1991 | Levy |
| 5,029,576 A | 7/1991 | Evans, Sr. |
| 5,037,431 A | 8/1991 | Summers et al. |
| 5,046,950 A | 9/1991 | Favonio |
| 5,055,048 A | 10/1991 | Vassiliadis et al. |
| 5,066,232 A | 11/1991 | Negri et al. |
| 5,094,256 A | 3/1992 | Barth |
| 5,112,224 A | 5/1992 | Shirota |
| 5,116,227 A | 5/1992 | Levy |
| 5,118,293 A | 6/1992 | Levy |
| 5,122,060 A | 6/1992 | Vassiliadis et al. |
| 5,123,845 A | 6/1992 | Vassiliadis et al. |
| 5,151,029 A | 9/1992 | Levy |
| 5,151,031 A | 9/1992 | Levy |
| 5,169,318 A | 12/1992 | Levy |
| 5,171,150 A | 12/1992 | Levy |
| 5,173,049 A | 12/1992 | Levy |
| 5,173,050 A | 12/1992 | Dillon |
| 5,180,304 A | 1/1993 | Vassiliadis et al. |
| 5,188,532 A | 2/1993 | Levy |
| 5,188,634 A | 2/1993 | Hussein et al. |
| 5,194,005 A | 3/1993 | Levy |
| 5,194,723 A | 3/1993 | Cates et al. |
| 5,195,952 A | 3/1993 | Solnit et al. |
| 5,224,942 A | 7/1993 | Beuchat et al. |
| 5,228,852 A | 7/1993 | Goldsmith et al. |
| 5,232,366 A | 8/1993 | Levy |
| 5,232,367 A | 8/1993 | Vassiliadis et al. |
| 5,236,360 A | 8/1993 | Levy |
| 5,249,964 A | 10/1993 | Levy |
| 5,257,935 A | 11/1993 | Vassiliadis et al. |
| 5,267,856 A | 12/1993 | Wolbarsht et al. |
| 5,267,995 A | 12/1993 | Doiron et al. |
| 5,269,777 A | 12/1993 | Doiron et al. |
| 5,273,713 A | 12/1993 | Levy |
| 5,275,564 A | 1/1994 | Vassiliadis et al. |
| 5,281,141 A | 1/1994 | Kowalyk |
| 5,290,274 A | 3/1994 | Levy et al. |
| 5,292,253 A | 3/1994 | Levy |
| 5,295,828 A | 3/1994 | Grosrey |
| 5,304,167 A | 4/1994 | Freiberg |
| 5,306,143 A | 4/1994 | Levy |
| 5,307,839 A | 5/1994 | Loebker et al. |
| 5,310,344 A | 5/1994 | Vassiliadis et al. |
| 5,318,562 A | 6/1994 | Levy et al. |
| 5,322,504 A | 6/1994 | Doherty et al. |
| 5,324,200 A | 6/1994 | Vassiliadis et al. |
| 5,326,263 A | 7/1994 | Weissman |
| 5,326,264 A | 7/1994 | Al Kasem |
| 5,334,016 A | 8/1994 | Goldsmith et al. |
| 5,334,019 A | 8/1994 | Goldsmith et al. |
| 5,342,196 A | 8/1994 | Van Hale |
| 5,342,198 A | 8/1994 | Vassiliadis et al. |
| 5,365,624 A | 11/1994 | Berns |
| 5,374,266 A | 12/1994 | Kataoka et al. |
| 5,380,201 A | 1/1995 | Kawata |
| 5,387,376 A | 2/1995 | Gasser |
| 5,390,204 A | 2/1995 | Yessik et al. |
| D356,866 S | 3/1995 | Meller |
| 5,399,089 A | 3/1995 | Eichman et al. |
| 5,409,376 A | 4/1995 | Murphy |

(56) References Cited

U.S. PATENT DOCUMENTS

| | | |
|---|---|---|
| 5,415,652 A | 5/1995 | Mueller et al. |
| 5,422,899 A | 6/1995 | Freiberg et al. |
| 5,428,699 A | 6/1995 | Pon |
| 5,435,724 A | 7/1995 | Goodman et al. |
| 5,474,451 A | 12/1995 | Dalrymple et al. |
| 5,484,283 A | 1/1996 | Franetzki |
| 5,490,779 A | 2/1996 | Malmin |
| 5,503,559 A | 4/1996 | Vari |
| 5,507,739 A | 4/1996 | Vassiliadis et al. |
| 5,540,587 A | 7/1996 | Malmin |
| 5,545,039 A | 8/1996 | Mushabac |
| 5,547,376 A | 8/1996 | Harrel |
| 5,554,896 A | 9/1996 | Hogan |
| 5,562,692 A | 10/1996 | Bair |
| 5,564,929 A | 10/1996 | Alpert |
| 5,570,182 A | 10/1996 | Nathel et al. |
| 5,591,184 A | 1/1997 | McDonnell et al. |
| 5,601,430 A | 2/1997 | Kutsch et al. |
| 5,611,797 A | 3/1997 | George |
| 5,620,414 A | 4/1997 | Campbell, Jr. |
| 5,621,745 A | 4/1997 | Yessik et al. |
| 5,622,501 A | 4/1997 | Levy |
| 5,639,239 A | 6/1997 | Earle |
| 5,642,997 A | 7/1997 | Gregg et al. |
| 5,643,299 A | 7/1997 | Bair |
| 5,660,817 A | 8/1997 | Masterman et al. |
| 5,662,501 A | 9/1997 | Levy |
| 5,674,226 A | 10/1997 | Doherty et al. |
| 5,688,486 A | 11/1997 | Watson et al. |
| 5,720,894 A | 2/1998 | Neev et al. |
| 5,730,727 A | 3/1998 | Russo |
| 5,735,815 A | 4/1998 | Bair |
| 5,740,291 A | 4/1998 | De Lasa et al. |
| 5,741,247 A | 4/1998 | Rizoiu et al. |
| 5,748,655 A | 5/1998 | Yessik et al. |
| 5,755,752 A | 5/1998 | Segal |
| 5,759,031 A | 6/1998 | Goldsmith et al. |
| 5,759,159 A | 6/1998 | Masreliez |
| 5,762,501 A | 6/1998 | Levy |
| 5,785,521 A | 7/1998 | Rizoiu et al. |
| 5,795,153 A | 8/1998 | Rechmann |
| 5,797,745 A | 8/1998 | Ruddle |
| 5,810,037 A | 9/1998 | Sasaki et al. |
| 5,816,807 A | 10/1998 | Matsutani et al. |
| 5,820,373 A | 10/1998 | Okano et al. |
| 5,825,958 A | 10/1998 | Gollihar et al. |
| 5,832,013 A | 11/1998 | Yessik et al. |
| 5,839,896 A | 11/1998 | Hickok et al. |
| 5,842,863 A | 12/1998 | Bruns et al. |
| 5,846,080 A | 12/1998 | Schneider |
| 5,853,384 A | 12/1998 | Bair |
| 5,865,790 A | 2/1999 | Bair |
| 5,868,570 A | 2/1999 | Hickok et al. |
| 5,874,677 A | 2/1999 | Bab et al. |
| 5,879,160 A | 3/1999 | Ruddle |
| 5,885,082 A | 3/1999 | Levy |
| 5,897,314 A | 4/1999 | Hack et al. |
| 5,911,711 A | 6/1999 | Pelkey |
| 5,915,965 A | 6/1999 | Ohlsson et al. |
| 5,921,775 A | 7/1999 | Buchanan |
| 5,968,037 A | 10/1999 | Rizoiu et al. |
| 5,968,039 A | 10/1999 | Deutsch |
| 5,971,755 A | 10/1999 | Liebermann et al. |
| 5,975,897 A | 11/1999 | Propp et al. |
| 5,989,023 A | 11/1999 | Summer et al. |
| 6,004,319 A | 12/1999 | Goble et al. |
| 6,019,605 A | 2/2000 | Myers |
| 6,022,309 A | 2/2000 | Celliers et al. |
| 6,030,221 A | 2/2000 | Jones et al. |
| 6,033,431 A | 3/2000 | Segal |
| 6,045,516 A | 4/2000 | Phelan |
| 6,053,735 A | 4/2000 | Buchanan |
| 6,079,979 A | 6/2000 | Riitano |
| 6,086,367 A | 7/2000 | Levy |
| 6,096,029 A | 8/2000 | O'Donnell, Jr. |
| 6,104,853 A | 8/2000 | Miyagi et al. |
| 6,106,514 A | 8/2000 | O'Donnell, Jr. |
| 6,122,300 A | 9/2000 | Frieberg et al. |
| 6,129,721 A | 10/2000 | Kataoka et al. |
| 6,139,319 A | 10/2000 | Sauer et al. |
| 6,139,320 A | 10/2000 | Hahn |
| 6,143,011 A | 11/2000 | Hood et al. |
| D435,651 S | 12/2000 | Hartwein |
| 6,159,006 A | 12/2000 | Cook et al. |
| 6,162,052 A | 12/2000 | Kokubu |
| 6,162,177 A | 12/2000 | Bab et al. |
| 6,162,202 A | 12/2000 | Sicurelli et al. |
| 6,164,966 A | 12/2000 | Turdiu et al. |
| 6,179,617 B1 | 1/2001 | Ruddle |
| 6,190,318 B1 | 2/2001 | Bab et al. |
| 6,197,020 B1 | 3/2001 | O'Donnell, Jr. |
| 6,213,972 B1 | 4/2001 | Butterfield et al. |
| 6,221,031 B1 | 4/2001 | Heraud |
| 6,224,378 B1 | 5/2001 | Valdes et al. |
| 6,227,855 B1 | 5/2001 | Hickok et al. |
| 6,231,567 B1 | 5/2001 | Rizoiu et al. |
| 6,245,032 B1 | 6/2001 | Sauer et al. |
| 6,254,597 B1 | 7/2001 | Rizoiu et al. |
| 6,270,342 B1 | 8/2001 | Neuberger et al. |
| 6,282,013 B1 | 8/2001 | Ostler et al. |
| 6,288,499 B1 | 9/2001 | Rizoiu et al. |
| 6,290,502 B1 | 9/2001 | Hugo |
| 6,309,340 B1 | 10/2001 | Nakagawa |
| 6,312,440 B1 | 11/2001 | Hood et al. |
| 6,315,557 B1 | 11/2001 | Messick |
| 6,315,565 B1 | 11/2001 | Slotke et al. |
| 6,319,002 B1 | 11/2001 | Pond |
| 6,343,929 B1 | 2/2002 | Fischer |
| 6,350,123 B1 | 2/2002 | Rizoiu et al. |
| 6,354,660 B1 | 3/2002 | Friedrich |
| 6,386,871 B1 | 5/2002 | Rossell |
| 6,389,193 B1 | 5/2002 | Kimmel et al. |
| 6,390,815 B1 | 5/2002 | Pond |
| 6,428,319 B1 | 8/2002 | Lopez et al. |
| 6,440,103 B1 | 8/2002 | Hood et al. |
| D463,556 S | 9/2002 | Bareth et al. |
| 6,454,566 B1 | 9/2002 | Lynch et al. |
| 6,464,498 B2 | 10/2002 | Pond |
| 6,485,304 B2 | 11/2002 | Beerstecher et al. |
| 6,497,572 B2 | 12/2002 | Hood et al. |
| 6,511,493 B1 | 1/2003 | Moutafis et al. |
| 6,514,077 B1 | 2/2003 | Wilk |
| 6,527,766 B1 | 3/2003 | Bair |
| 6,533,775 B1 | 3/2003 | Rizoiu |
| 6,538,739 B1 | 3/2003 | Visuri et al. |
| 6,544,256 B1 | 4/2003 | Rizoiu et al. |
| 6,561,803 B1 | 5/2003 | Rizoiu et al. |
| 6,562,050 B1 | 5/2003 | Owen |
| 6,567,582 B1 | 5/2003 | Rizoiu et al. |
| 6,572,709 B1 | 6/2003 | Kaneda et al. |
| 6,592,371 B2 | 7/2003 | Durbin et al. |
| 6,602,074 B1 | 8/2003 | Suh et al. |
| 6,610,053 B1 | 8/2003 | Rizoiu et al. |
| 6,616,447 B1 | 9/2003 | Rizoiu et al. |
| 6,616,451 B1 | 9/2003 | Rizolu et al. |
| 6,638,219 B1 | 10/2003 | Asch et al. |
| 6,641,394 B2 | 11/2003 | Garman |
| 6,644,972 B1 | 11/2003 | Mays |
| 6,663,386 B1 | 12/2003 | Moelsgaard |
| 6,669,685 B1 | 12/2003 | Rizoiu et al. |
| 6,676,409 B2 | 1/2004 | Grant |
| 6,679,837 B2 | 1/2004 | Daikuzono |
| 6,695,686 B1 | 2/2004 | Frohlich et al. |
| 6,744,790 B1 | 6/2004 | Tilleman et al. |
| 6,783,364 B1 | 8/2004 | Juan |
| 6,817,862 B2 | 11/2004 | Hickok |
| 6,821,272 B2 | 11/2004 | Rizoiu et al. |
| D499,486 S | 12/2004 | Kuhn et al. |
| 6,827,766 B2 | 12/2004 | Carnes et al. |
| 6,829,427 B1 | 12/2004 | Becker |
| 6,881,061 B2 | 4/2005 | Fisher |
| 6,886,371 B2 | 5/2005 | Arai et al. |
| 6,893,259 B1 | 5/2005 | Reizenson |
| 6,910,887 B2 | 6/2005 | Van Den Houdt |

(56) References Cited

U.S. PATENT DOCUMENTS

| | | |
|---|---|---|
| 6,942,658 B1 | 9/2005 | Rizoiu et al. |
| 6,948,935 B2 | 9/2005 | Nusstein |
| 6,971,878 B2 | 12/2005 | Pond |
| 6,976,844 B2 | 12/2005 | Hickok et al. |
| 6,981,869 B2 | 1/2006 | Ruddle |
| 6,997,714 B1 | 2/2006 | Schoeffel |
| 7,008,224 B1 | 3/2006 | Browning et al. |
| 7,011,521 B2 | 3/2006 | Sierro et al. |
| 7,011,644 B1 | 3/2006 | Andrew et al. |
| 7,014,465 B1 | 3/2006 | Marais |
| 7,029,278 B2 | 4/2006 | Pond |
| 7,044,737 B2 | 5/2006 | Fu |
| 7,068,912 B1 | 6/2006 | Becker |
| 7,090,497 B1 | 8/2006 | Harris |
| 7,108,693 B2 | 9/2006 | Rizoiu et al. |
| 7,115,100 B2 | 10/2006 | McRury et al. |
| 7,144,249 B2 | 12/2006 | Rizoiu et al. |
| 7,147,468 B2 | 12/2006 | Snyder et al. |
| 7,163,400 B2 | 1/2007 | Cozean et al. |
| 7,187,822 B2 | 3/2007 | Rizoiu et al. |
| 7,194,180 B2 | 3/2007 | Becker |
| 7,226,288 B2 | 6/2007 | Schoeffel |
| 7,234,937 B2 | 6/2007 | Sachdeva et al. |
| 7,238,342 B2 | 7/2007 | Torabinejad et al. |
| 7,261,558 B2 | 8/2007 | Rizoiu et al. |
| 7,261,561 B2 | 8/2007 | Ruddle et al. |
| D550,358 S | 9/2007 | Nakanishi |
| 7,269,306 B1 | 9/2007 | Koeneman et al. |
| 7,270,544 B2 | 9/2007 | Schemmer et al. |
| 7,270,657 B2 | 9/2007 | Rizoiu et al. |
| 7,288,086 B1 | 10/2007 | Andriasyan |
| 7,290,940 B2 | 11/2007 | Boutoussov |
| 7,292,759 B2 | 11/2007 | Boutoussov et al. |
| 7,296,318 B2 | 11/2007 | Mourad et al. |
| 7,303,397 B2 | 12/2007 | Boutoussov |
| 7,306,459 B1 | 12/2007 | Williams et al. |
| 7,306,577 B2 | 12/2007 | Lemoine et al. |
| 7,320,594 B1 | 1/2008 | Rizoiu et al. |
| 7,326,054 B2 | 2/2008 | Todd et al. |
| 7,356,208 B2 | 4/2008 | Becker |
| 7,356,225 B2 | 4/2008 | Loebel |
| 7,384,419 B2 | 6/2008 | Jones et al. |
| 7,415,050 B2 | 8/2008 | Rizoiu et al. |
| 7,421,186 B2 | 9/2008 | Boutoussov et al. |
| 7,424,199 B2 | 9/2008 | Rizoiu et al. |
| 7,445,618 B2 | 11/2008 | Eggers et al. |
| 7,448,867 B2 | 11/2008 | Aloise et al. |
| 7,458,380 B2 | 12/2008 | Jones et al. |
| 7,461,658 B2 | 12/2008 | Jones et al. |
| 7,461,982 B2 | 12/2008 | Boutoussov et al. |
| 7,467,946 B2 | 12/2008 | Rizoiu et al. |
| 7,470,124 B2 | 12/2008 | Bornstein |
| 7,485,116 B2 | 2/2009 | Cao |
| 7,549,861 B2 | 6/2009 | Ruddle et al. |
| 7,563,226 B2 | 7/2009 | Boutoussov |
| 7,575,381 B2 | 8/2009 | Boutoussov |
| 7,578,622 B2 | 8/2009 | Boutoussov |
| 7,620,290 B2 | 11/2009 | Rizoiu et al. |
| 7,621,745 B2 | 11/2009 | Bornstein |
| 7,630,420 B2 | 12/2009 | Boutoussov |
| 7,641,668 B2 | 1/2010 | Perry et al. |
| 7,665,467 B2 | 2/2010 | Jones et al. |
| 7,670,141 B2 | 3/2010 | Thomas et al. |
| 7,695,469 B2 | 4/2010 | Boutoussov et al. |
| 7,696,466 B2 | 4/2010 | Rizoiu et al. |
| 7,697,814 B2 | 4/2010 | Rizoiu et al. |
| 7,702,196 B2 | 4/2010 | Boutoussov et al. |
| 7,748,979 B2 | 7/2010 | Nahlieli |
| 7,751,895 B2 | 7/2010 | Jones et al. |
| 7,766,656 B1 | 8/2010 | Feine |
| 7,778,306 B2 | 8/2010 | Marincek et al. |
| 7,815,630 B2 | 10/2010 | Rizoiu et al. |
| 7,817,687 B2 | 10/2010 | Rizoiu et al. |
| 7,833,016 B2 | 11/2010 | Gharib et al. |
| 7,833,017 B2 | 11/2010 | Hof et al. |
| 7,845,944 B2 | 12/2010 | DiGasbarro |
| 7,867,223 B2 | 1/2011 | Van Valen |
| 7,867,224 B2 | 1/2011 | Lukac et al. |
| 7,878,204 B2 | 2/2011 | Van Valen |
| 7,891,363 B2 | 2/2011 | Jones et al. |
| 7,891,977 B2 | 2/2011 | Riva |
| 7,901,373 B2 | 3/2011 | Tavger |
| 7,909,040 B2 | 3/2011 | Jones et al. |
| 7,909,817 B2 | 3/2011 | Griffin et al. |
| 7,916,282 B2 | 3/2011 | Duineveld et al. |
| 7,942,667 B2 | 5/2011 | Rizoiu et al. |
| 7,957,440 B2 | 6/2011 | Boutoussov |
| 7,959,441 B2 | 6/2011 | Glover et al. |
| 7,967,017 B2 | 6/2011 | Jones et al. |
| 7,970,027 B2 | 6/2011 | Rizoiu et al. |
| 7,970,030 B2 | 6/2011 | Rizoiu et al. |
| 7,980,854 B2 | 7/2011 | Glover et al. |
| 7,980,923 B2 | 7/2011 | Olmo et al. |
| 7,997,279 B2 | 8/2011 | Jones et al. |
| 7,998,136 B2 | 8/2011 | Jones et al. |
| 8,002,544 B2 | 8/2011 | Rizoiu et al. |
| 8,011,923 B2 | 9/2011 | Lukac et al. |
| 8,023,795 B2 | 9/2011 | Rizoiu et al. |
| 8,033,825 B2 | 10/2011 | Rizoiu et al. |
| 8,037,566 B2 | 10/2011 | Grez |
| 8,047,841 B2 | 11/2011 | Jefferies |
| 8,052,627 B2 | 11/2011 | Gromer et al. |
| 8,056,564 B2 | 11/2011 | Jones et al. |
| 8,062,673 B2 | 11/2011 | Figuly et al. |
| 8,100,482 B2 | 1/2012 | Kito et al. |
| 8,128,401 B2 | 3/2012 | Ruddle et al. |
| 8,152,797 B2 | 4/2012 | Boutoussov et al. |
| 8,204,612 B2 | 6/2012 | Feine et al. |
| 8,221,117 B2 | 7/2012 | Rizoiu et al. |
| 8,235,719 B2 | 8/2012 | Ruddle et al. |
| 8,241,035 B2 | 8/2012 | Jones et al. |
| 8,256,431 B2 | 9/2012 | Van Valen |
| D669,180 S | 10/2012 | Takashi et al. |
| D669,583 S | 10/2012 | Kagawa |
| 8,276,593 B2 | 10/2012 | Jones et al. |
| 8,295,025 B2 | 10/2012 | Edel et al. |
| 8,297,540 B1 | 10/2012 | Vijay |
| 8,298,215 B2 | 10/2012 | Zinn |
| 8,317,514 B2 | 11/2012 | Weill |
| 8,322,910 B2 | 12/2012 | Gansmuller et al. |
| 8,328,552 B2 | 12/2012 | Ruddle |
| 8,366,702 B2 | 2/2013 | Van Valen |
| 8,371,848 B2 | 2/2013 | Okawa et al. |
| 8,388,345 B2 | 3/2013 | Ruddle |
| 8,403,922 B2 | 3/2013 | Boutoussov et al. |
| 8,419,719 B2 | 4/2013 | Rizoiu et al. |
| 8,439,676 B2 | 5/2013 | Florman |
| 8,439,904 B2 | 5/2013 | Jones et al. |
| 8,448,645 B2 | 5/2013 | Jones et al. |
| 8,470,035 B2 | 6/2013 | Cruise et al. |
| 8,474,635 B2 | 7/2013 | Johnson |
| 8,479,745 B2 | 7/2013 | Rizoiu |
| 8,485,818 B2 | 7/2013 | Boutoussov et al. |
| 8,506,293 B2 | 8/2013 | Pond |
| 8,525,059 B2 | 9/2013 | Berger et al. |
| 8,544,473 B2 | 10/2013 | Rizoiu et al. |
| 8,568,392 B2 | 10/2013 | Jones et al. |
| 8,588,268 B2 | 11/2013 | Boutoussov et al. |
| 8,602,033 B2 | 12/2013 | Jones et al. |
| 8,603,079 B2 | 12/2013 | Van Valen |
| 8,617,090 B2 | 12/2013 | Fougere et al. |
| 8,653,392 B2 | 2/2014 | Berger et al. |
| 8,672,678 B2 | 3/2014 | Gramann et al. |
| D701,971 S | 4/2014 | Van Valen et al. |
| 8,684,956 B2 | 4/2014 | McDonough et al. |
| 8,709,057 B2 | 4/2014 | Tettamanti et al. |
| RE44,917 E | 5/2014 | Tuttle |
| 8,740,957 B2 | 6/2014 | Masotti |
| 8,747,005 B2 | 6/2014 | Kemp et al. |
| 8,753,121 B2 | 6/2014 | Gharib et al. |
| 8,758,010 B2 | 6/2014 | Yamanaka et al. |
| 8,764,739 B2 | 7/2014 | Boutoussov et al. |
| 8,792,251 B2 | 7/2014 | Shih |
| 8,801,316 B1 | 8/2014 | Abedini |

(56) References Cited

U.S. PATENT DOCUMENTS

| | | |
|---|---|---|
| D713,538 S | 9/2014 | Van Valen et al. |
| 8,821,483 B2 | 9/2014 | Boutoussov et al. |
| 8,827,990 B2 | 9/2014 | Van Valen et al. |
| 8,834,450 B1 | 9/2014 | Mccrary et al. |
| 8,834,457 B2 | 9/2014 | Cao |
| 8,926,323 B2 | 1/2015 | Mossle |
| 8,944,814 B2 | 2/2015 | Mossle |
| 8,977,085 B2 | 3/2015 | Walsh et al. |
| 8,978,930 B2 | 3/2015 | Bublewitz et al. |
| D726,324 S | 4/2015 | Duncan et al. |
| 9,022,959 B2 | 5/2015 | Fusi, II et al. |
| 9,022,961 B2 | 5/2015 | Fougere et al. |
| 9,025,625 B2 | 5/2015 | Skrabelj et al. |
| 9,050,157 B2 | 6/2015 | Boyd et al. |
| 9,052,805 B2 | 6/2015 | Boutoussov et al. |
| 9,060,845 B2 | 6/2015 | Van Valen et al. |
| 9,084,651 B2 | 7/2015 | Laufer |
| 9,101,377 B2 | 8/2015 | Boutoussov et al. |
| 9,186,222 B2 | 11/2015 | Marincek et al. |
| D745,966 S | 12/2015 | Piorek et al. |
| 9,204,946 B2 | 12/2015 | Kotlarchik et al. |
| 9,216,073 B2 | 12/2015 | McDonough et al. |
| 9,308,326 B2 | 4/2016 | Hunter et al. |
| 9,333,060 B2 | 5/2016 | Hunter |
| 9,341,184 B2 | 5/2016 | Dion et al. |
| 9,408,781 B2 | 8/2016 | Qian et al. |
| 9,492,244 B2 | 11/2016 | Bergheim et al. |
| 9,504,536 B2 | 11/2016 | Bergheim et al. |
| 9,545,295 B2 | 1/2017 | Sung et al. |
| 9,566,129 B2 | 2/2017 | Browning et al. |
| 9,572,632 B2 | 2/2017 | Lukac et al. |
| 9,579,174 B2 | 2/2017 | Yamamoto et al. |
| 9,597,168 B2 | 3/2017 | Black et al. |
| 9,603,676 B1 | 3/2017 | Bochi |
| 9,610,125 B2 | 4/2017 | Kazic et al. |
| 9,675,426 B2 | 6/2017 | Bergheim et al. |
| 9,696,893 B2 | 7/2017 | Boutoussov et al. |
| 9,700,382 B2 | 7/2017 | Pond et al. |
| 9,700,384 B2 | 7/2017 | Yamamoto et al. |
| 9,700,394 B2 | 7/2017 | Yamamoto et al. |
| 9,713,511 B2 | 7/2017 | Lifshitz |
| 9,730,773 B2 | 8/2017 | Uchitel et al. |
| 9,743,999 B2 | 8/2017 | Policicchio |
| 9,788,899 B2 | 10/2017 | Sivriver et al. |
| 9,820,827 B2 | 11/2017 | Feine et al. |
| 9,820,834 B2 | 11/2017 | Maxwell et al. |
| 9,864,485 B2 | 1/2018 | Patton et al. |
| 9,867,997 B2 | 1/2018 | Boutoussov et al. |
| 9,872,748 B2 | 1/2018 | Schoeffel |
| 9,877,801 B2 | 1/2018 | Khakpour et al. |
| D812,231 S | 3/2018 | Duncan et al. |
| D813,391 S | 3/2018 | Duncan et al. |
| 9,931,187 B2 | 4/2018 | Fregoso et al. |
| 9,956,039 B2 | 5/2018 | Boutoussov et al. |
| 9,987,200 B2 | 6/2018 | Kishen |
| 10,010,388 B2 | 7/2018 | Gharib et al. |
| 10,016,263 B2 | 7/2018 | Gharib et al. |
| D824,935 S | 8/2018 | Boutoussov et al. |
| 10,039,625 B2 | 8/2018 | Gharib et al. |
| 10,039,932 B2 | 8/2018 | Van Valen |
| 10,098,708 B2 | 10/2018 | Pond |
| 10,098,717 B2 | 10/2018 | Bergheim et al. |
| 10,105,289 B2 | 10/2018 | Guzman |
| 10,130,424 B2 | 11/2018 | Boutoussov et al. |
| 10,314,671 B2 | 6/2019 | Lifshitz et al. |
| 10,321,957 B2 | 6/2019 | Boutoussov et al. |
| 10,327,866 B2 | 6/2019 | Lifshitz et al. |
| 10,335,249 B2 | 7/2019 | Hiemer et al. |
| 10,363,120 B2 | 7/2019 | Khakpour et al. |
| 10,420,629 B2 | 9/2019 | Buchanan |
| 10,420,630 B2 | 9/2019 | Bergheim et al. |
| 10,430,061 B2 | 10/2019 | Boutoussov et al. |
| 10,450,656 B2 | 10/2019 | Sivriver et al. |
| 10,518,299 B2 | 12/2019 | Lukac et al. |
| 10,561,560 B2 | 2/2020 | Boutoussov et al. |
| D881,394 S | 4/2020 | Classen et al. |
| 10,617,498 B2 | 4/2020 | Gharib et al. |
| 10,631,962 B2 | 4/2020 | Bergheim et al. |
| 10,702,355 B2 | 7/2020 | Bergheim et al. |
| 10,722,325 B2 | 7/2020 | Khakpour et al. |
| 10,729,514 B2 | 8/2020 | Buchanan |
| D896,827 S | 9/2020 | Boutoussov et al. |
| 10,779,908 B2 | 9/2020 | Dresser et al. |
| 10,779,920 B2 | 9/2020 | Buchanan |
| 10,806,543 B2 | 10/2020 | Bergheim et al. |
| 10,806,544 B2 | 10/2020 | Khakpour et al. |
| 10,835,355 B2 | 11/2020 | Gharib et al. |
| D903,868 S | 12/2020 | Goisser et al. |
| 10,877,630 B2 | 12/2020 | Patton et al. |
| D923,038 S | 6/2021 | Boutoussov et al. |
| 11,103,309 B2 | 8/2021 | Boutoussov et al. |
| 11,103,333 B2 | 8/2021 | Khakpour et al. |
| 11,141,249 B2 | 10/2021 | Evans et al. |
| 11,160,455 B2 | 11/2021 | Islam |
| 11,160,645 B2 | 11/2021 | Bergheim et al. |
| 11,173,010 B2 | 11/2021 | Boutoussov et al. |
| 11,173,019 B2 | 11/2021 | Bergheim et al. |
| 11,193,209 B2 | 12/2021 | Sivriver et al. |
| 11,202,687 B2 | 12/2021 | Boutoussov et al. |
| 11,213,375 B2 | 1/2022 | Khakpour et al. |
| 11,250,941 B2 | 2/2022 | Patton et al. |
| 11,284,978 B2 | 3/2022 | Bergheim et al. |
| 11,350,993 B2 | 6/2022 | DiVito et al. |
| 11,426,239 B2 | 8/2022 | DiVito et al. |
| 11,547,538 B2 | 1/2023 | Ertl et al. |
| 11,680,141 B2 | 6/2023 | Gomurashvili et al. |
| 11,684,421 B2 | 6/2023 | DiVito et al. |
| 11,701,202 B2 | 7/2023 | Khakpour et al. |
| D997,355 S | 8/2023 | Schultz et al. |
| 11,801,119 B2 | 10/2023 | Al Shehadat |
| 11,918,432 B2 | 3/2024 | Gharib et al. |
| 12,114,924 B2 | 10/2024 | DiVito et al. |
| 12,186,151 B2 | 1/2025 | Bergheim et al. |
| 12,213,731 B2 | 2/2025 | DiVito et al. |
| 12,268,565 B2 | 4/2025 | Bergheim et al. |
| 2001/0041324 A1 | 11/2001 | Riitano |
| 2001/0055752 A1 | 12/2001 | Ennis |
| 2002/0012897 A1 | 1/2002 | Tingley et al. |
| 2002/0014855 A1 | 2/2002 | Rizoiu et al. |
| 2002/0072032 A1 | 6/2002 | Senn et al. |
| 2002/0086264 A1 | 7/2002 | Okawa et al. |
| 2002/0090594 A1 | 7/2002 | Riitano et al. |
| 2002/0108614 A1 | 8/2002 | Schultz |
| 2002/0142260 A1 | 10/2002 | Pond |
| 2002/0168610 A1 | 11/2002 | Papanek et al. |
| 2002/0183728 A1 | 12/2002 | Rosenberg et al. |
| 2003/0013063 A1 | 1/2003 | Goldman |
| 2003/0013064 A1 | 1/2003 | Zirkel |
| 2003/0022126 A1 | 1/2003 | Buchalla et al. |
| 2003/0023234 A1 | 1/2003 | Daikuzono |
| 2003/0027100 A1 | 2/2003 | Grant |
| 2003/0096213 A1 | 5/2003 | Hickok et al. |
| 2003/0121532 A1 | 7/2003 | Coughlin et al. |
| 2003/0124485 A1 | 7/2003 | Teraushi |
| 2003/0129560 A1 | 7/2003 | Atkin |
| 2003/0158544 A1 | 8/2003 | Slatkine |
| 2003/0191429 A1 | 10/2003 | Andrew et al. |
| 2003/0207231 A1 | 11/2003 | Nance |
| 2003/0207232 A1 | 11/2003 | Todd et al. |
| 2003/0211083 A1 | 11/2003 | Vogel et al. |
| 2003/0215768 A1 | 11/2003 | Aumuller et al. |
| 2003/0236517 A1 | 12/2003 | Appling |
| 2004/0038170 A1 | 2/2004 | Hiszowicz et al. |
| 2004/0048226 A1 | 3/2004 | Garman |
| 2004/0063073 A1 | 4/2004 | Kajimoto et al. |
| 2004/0063074 A1 | 4/2004 | Fisher |
| 2004/0068256 A1 | 4/2004 | Rizoiu et al. |
| 2004/0072122 A1 | 4/2004 | Hegemann |
| 2004/0073374 A1 | 4/2004 | Lockhart et al. |
| 2004/0092925 A1 | 5/2004 | Rizoiu et al. |
| 2004/0101809 A1 | 5/2004 | Weiss et al. |
| 2004/0102782 A1 | 5/2004 | Vercellotti et al. |
| 2004/0126732 A1 | 7/2004 | Nusstein |
| 2004/0127892 A1 | 7/2004 | Harris |

(56) References Cited

U.S. PATENT DOCUMENTS

| | | |
|---|---|---|
| 2004/0166473 A1 | 8/2004 | Cohen |
| 2004/0193236 A1 | 9/2004 | Altshuler |
| 2004/0210276 A1 | 10/2004 | Altshuler et al. |
| 2004/0224288 A1 | 11/2004 | Bornstein |
| 2004/0259053 A1 | 12/2004 | Bekov et al. |
| 2005/0026106 A1 | 2/2005 | Jefferies |
| 2005/0064371 A1 | 3/2005 | Soukos et al. |
| 2005/0065497 A1 | 3/2005 | Levatino |
| 2005/0096529 A1 | 5/2005 | Cooper et al. |
| 2005/0112525 A1 | 5/2005 | McPherson et al. |
| 2005/0136375 A1 | 6/2005 | Sicurelli, Jr. et al. |
| 2005/0142517 A1 | 6/2005 | Frysh et al. |
| 2005/0155622 A1 | 7/2005 | Leis |
| 2005/0170312 A1 | 8/2005 | Pond |
| 2005/0175960 A1 | 8/2005 | Wiek et al. |
| 2005/0186530 A1 | 8/2005 | Eagle |
| 2005/0199261 A1 | 9/2005 | Vanhauwemeiren et al. |
| 2005/0256517 A1 | 11/2005 | Boutoussov |
| 2005/0271531 A1 | 12/2005 | Brown, Jr. et al. |
| 2005/0272001 A1 | 12/2005 | Blain et al. |
| 2005/0277898 A1 | 12/2005 | Dimalanta et al. |
| 2005/0281530 A1 | 12/2005 | Rizoiu et al. |
| 2005/0281887 A1 | 12/2005 | Rizoiu |
| 2005/0283143 A1 | 12/2005 | Rizoiu |
| 2006/0019220 A1 | 1/2006 | Loebel et al. |
| 2006/0021642 A1 | 2/2006 | Sliwa et al. |
| 2006/0036172 A1 | 2/2006 | Abe |
| 2006/0064037 A1 | 3/2006 | Shalon et al. |
| 2006/0110710 A1 | 5/2006 | Schemmer et al. |
| 2006/0142743 A1 | 6/2006 | Rizoiu et al. |
| 2006/0142744 A1 | 6/2006 | Boutoussov |
| 2006/0142745 A1 | 6/2006 | Boutoussov |
| 2006/0184071 A1 | 8/2006 | Klopotek |
| 2006/0189965 A1 | 8/2006 | Litvak et al. |
| 2006/0227653 A1 | 10/2006 | Keller |
| 2006/0234182 A1 | 10/2006 | Ruddle et al. |
| 2006/0234183 A1 | 10/2006 | Ruddle et al. |
| 2006/0240381 A1 | 10/2006 | Rizoiu et al. |
| 2006/0240386 A1 | 10/2006 | Yaniv et al. |
| 2006/0241574 A1 | 10/2006 | Rizoiu |
| 2006/0246395 A1 | 11/2006 | Pond |
| 2006/0257819 A1 | 11/2006 | Johnson |
| 2006/0264808 A1 | 11/2006 | Staid et al. |
| 2007/0003604 A1 | 1/2007 | Jones |
| 2007/0009449 A1 | 1/2007 | Kanca |
| 2007/0014517 A1 | 1/2007 | Rizoiu et al. |
| 2007/0016176 A1 | 1/2007 | Boutoussov et al. |
| 2007/0016177 A1 | 1/2007 | Vaynberg et al. |
| 2007/0016178 A1 | 1/2007 | Vaynberg et al. |
| 2007/0020576 A1 | 1/2007 | Osborn et al. |
| 2007/0042315 A1 | 2/2007 | Boutoussov et al. |
| 2007/0042316 A1 | 2/2007 | Pichat et al. |
| 2007/0049911 A1 | 3/2007 | Brown |
| 2007/0054233 A1 | 3/2007 | Rizoiu et al. |
| 2007/0054235 A1 | 3/2007 | Rizoiu et al. |
| 2007/0054236 A1 | 3/2007 | Rizoiu et al. |
| 2007/0059660 A1 | 3/2007 | Rizoiu et al. |
| 2007/0060917 A1 | 3/2007 | Andriasyan |
| 2007/0072153 A1 | 3/2007 | Gross et al. |
| 2007/0083120 A1 | 4/2007 | Cain et al. |
| 2007/0087303 A1 | 4/2007 | Papanek et al. |
| 2007/0088295 A1 | 4/2007 | Bankiewicz |
| 2007/0099149 A1 | 5/2007 | Levy et al. |
| 2007/0104419 A1 | 5/2007 | Rizoiu et al. |
| 2007/0128576 A1 | 6/2007 | Boutoussov |
| 2007/0135797 A1 | 6/2007 | Hood et al. |
| 2007/0148615 A1 | 6/2007 | Pond |
| 2007/0175502 A1 | 8/2007 | Sliwa |
| 2007/0179486 A1 | 8/2007 | Welch et al. |
| 2007/0184402 A1 | 8/2007 | Boutoussov et al. |
| 2007/0190482 A1 | 8/2007 | Rizoiu |
| 2007/0208328 A1 | 9/2007 | Boutoussov et al. |
| 2007/0224575 A1 | 9/2007 | Dieras et al. |
| 2007/0248932 A1* | 10/2007 | Gharib ............... A61C 17/0202 433/81 |
| 2007/0265605 A1 | 11/2007 | Vaynberg et al. |
| 2007/0276290 A1 | 11/2007 | Boecker et al. |
| 2007/0287125 A1 | 12/2007 | Weill |
| 2007/0298369 A1 | 12/2007 | Rizoiu et al. |
| 2008/0014545 A1 | 1/2008 | Schippers |
| 2008/0032259 A1 | 2/2008 | Schoeffel |
| 2008/0033411 A1 | 2/2008 | Manvel Artyom et al. |
| 2008/0044789 A1 | 2/2008 | Johnson |
| 2008/0065057 A1 | 3/2008 | Andriasyan |
| 2008/0070185 A1 | 3/2008 | Rizoiu et al. |
| 2008/0070195 A1 | 3/2008 | DiVito et al. |
| 2008/0085490 A1 | 4/2008 | Jabri |
| 2008/0097417 A1 | 4/2008 | Jones et al. |
| 2008/0102416 A1 | 5/2008 | Karazivan et al. |
| 2008/0125677 A1 | 5/2008 | Van Valen |
| 2008/0138761 A1 | 6/2008 | Pond |
| 2008/0138764 A1 | 6/2008 | Rizoiu |
| 2008/0138772 A1 | 6/2008 | Bornstein |
| 2008/0151953 A1 | 6/2008 | Rizoiu et al. |
| 2008/0155770 A1 | 7/2008 | Grez |
| 2008/0157690 A1 | 7/2008 | Rizoiu et al. |
| 2008/0159345 A1 | 7/2008 | Bornstein |
| 2008/0160479 A1 | 7/2008 | Ruddle et al. |
| 2008/0160480 A1 | 7/2008 | Ruddle et al. |
| 2008/0160481 A1 | 7/2008 | Schoeffel |
| 2008/0188848 A1 | 8/2008 | Deutmeyer et al. |
| 2008/0199831 A1 | 8/2008 | Teichert et al. |
| 2008/0209650 A1 | 9/2008 | Brewer et al. |
| 2008/0219629 A1 | 9/2008 | Rizoiu et al. |
| 2008/0221558 A1 | 9/2008 | Becker |
| 2008/0255498 A1 | 10/2008 | Houle |
| 2008/0274438 A1 | 11/2008 | Schemmer |
| 2008/0276192 A1 | 11/2008 | Jones et al. |
| 2008/0285600 A1 | 11/2008 | Marincek et al. |
| 2008/0311045 A1 | 12/2008 | Hardy |
| 2008/0311540 A1 | 12/2008 | Gottenbos et al. |
| 2008/0314199 A1 | 12/2008 | Niemi et al. |
| 2008/0319453 A1 | 12/2008 | Tavger |
| 2009/0004621 A1 | 1/2009 | Quan et al. |
| 2009/0011380 A1 | 1/2009 | Wang |
| 2009/0031515 A1 | 2/2009 | Rizoiu et al. |
| 2009/0035717 A1 | 2/2009 | Rizoiu et al. |
| 2009/0042171 A1 | 2/2009 | Rizoiu et al. |
| 2009/0047624 A1 | 2/2009 | Tsai |
| 2009/0047634 A1 | 2/2009 | Calvert |
| 2009/0054881 A1 | 2/2009 | Krespi |
| 2009/0059994 A1 | 3/2009 | Nemes et al. |
| 2009/0067189 A1 | 3/2009 | Boutoussov et al. |
| 2009/0092947 A1 | 4/2009 | Cao et al. |
| 2009/0105597 A1 | 4/2009 | Abraham |
| 2009/0105707 A1 | 4/2009 | Rizoiu et al. |
| 2009/0111068 A1 | 4/2009 | Martinez |
| 2009/0111069 A1 | 4/2009 | Wagner |
| 2009/0130622 A1 | 5/2009 | Bollinger et al. |
| 2009/0143775 A1 | 6/2009 | Rizoiu et al. |
| 2009/0170052 A1 | 7/2009 | Borczyk |
| 2009/0208898 A1 | 8/2009 | Kaplan |
| 2009/0211042 A1 | 8/2009 | Bock |
| 2009/0225060 A1 | 9/2009 | Rizoiu et al. |
| 2009/0227185 A1 | 9/2009 | Summers et al. |
| 2009/0263759 A1 | 10/2009 | Van Herpern |
| 2009/0275935 A1 | 11/2009 | McKee |
| 2009/0281531 A1 | 11/2009 | Rizoiu et al. |
| 2009/0298004 A1 | 12/2009 | Rizoiu |
| 2010/0015576 A1 | 1/2010 | Altshuler et al. |
| 2010/0042040 A1 | 2/2010 | Arentz |
| 2010/0047734 A1 | 2/2010 | Harris et al. |
| 2010/0068679 A1 | 3/2010 | Zappini |
| 2010/0086892 A1 | 4/2010 | Riozoui et al. |
| 2010/0092922 A1 | 4/2010 | Ruddle |
| 2010/0125291 A1 | 5/2010 | Rizoiu et al. |
| 2010/0143861 A1 | 6/2010 | Gharib |
| 2010/0151406 A1 | 6/2010 | Boutoussov et al. |
| 2010/0151407 A1 | 6/2010 | Rizoiu et al. |
| 2010/0152634 A1 | 6/2010 | Dove |
| 2010/0160838 A1 | 6/2010 | Krespi |
| 2010/0160904 A1 | 6/2010 | McMillan et al. |
| 2010/0167226 A1 | 7/2010 | Altshuler et al. |
| 2010/0167228 A1 | 7/2010 | Rizoiu et al. |

(56) References Cited

U.S. PATENT DOCUMENTS

| | | |
|---|---|---|
| 2010/0185188 A1 | 7/2010 | Boutoussov et al. |
| 2010/0190133 A1 | 7/2010 | Martinez |
| 2010/0206324 A1 | 8/2010 | Paschke |
| 2010/0209867 A1 | 8/2010 | Becker et al. |
| 2010/0229316 A1 | 9/2010 | Hohlbein et al. |
| 2010/0233645 A1 | 9/2010 | Rizoiu |
| 2010/0233649 A1 | 9/2010 | McPeek et al. |
| 2010/0261136 A1 | 10/2010 | Schulte et al. |
| 2010/0272764 A1 | 10/2010 | Latta et al. |
| 2010/0273125 A1 | 10/2010 | Janssen et al. |
| 2010/0279250 A1 | 11/2010 | Pond et al. |
| 2010/0279251 A1 | 11/2010 | Pond |
| 2010/0330539 A1 | 12/2010 | Glover et al. |
| 2011/0020765 A1 | 1/2011 | Maxwell et al. |
| 2011/0027746 A1 | 2/2011 | McDonough et al. |
| 2011/0027747 A1 | 2/2011 | Fougere et al. |
| 2011/0046262 A1 | 2/2011 | Bublewitz et al. |
| 2011/0070552 A1 | 3/2011 | Bornstein |
| 2011/0072605 A1 | 3/2011 | Steur |
| 2011/0076638 A1 | 3/2011 | Gottenbos et al. |
| 2011/0087605 A1 | 4/2011 | Pond |
| 2011/0096549 A1 | 4/2011 | Boutoussov et al. |
| 2011/0111365 A1 | 5/2011 | Gharib et al. |
| 2011/0129789 A1 | 6/2011 | Rizoiu et al. |
| 2011/0136935 A1 | 6/2011 | Khor et al. |
| 2011/0143310 A1 | 6/2011 | Hunter |
| 2011/0151394 A1 | 6/2011 | Rizoiu et al. |
| 2011/0183284 A1 | 7/2011 | Yamanaka et al. |
| 2011/0189627 A1 | 8/2011 | Gharib et al. |
| 2011/0189630 A1 | 8/2011 | Koubi |
| 2011/0198370 A1 | 8/2011 | Ho |
| 2011/0200959 A1 | 8/2011 | Rizoiu et al. |
| 2011/0217665 A1 | 9/2011 | Walsh et al. |
| 2011/0229845 A1 | 9/2011 | Chen |
| 2011/0256503 A1 | 10/2011 | Fraser |
| 2011/0269099 A1 | 11/2011 | Glover et al. |
| 2011/0270241 A1 | 11/2011 | Boutoussov |
| 2011/0281230 A1 | 11/2011 | Rizoiu et al. |
| 2011/0281231 A1 | 11/2011 | Rizoiu et al. |
| 2012/0021375 A1 | 1/2012 | Binner et al. |
| 2012/0065711 A1 | 3/2012 | Netchitailo et al. |
| 2012/0077144 A1 | 3/2012 | Fougere et al. |
| 2012/0094251 A1 | 4/2012 | Mössle |
| 2012/0099815 A1 | 4/2012 | Boutoussov et al. |
| 2012/0135368 A1 | 5/2012 | Rizoiu et al. |
| 2012/0135373 A1 | 5/2012 | Cheng et al. |
| 2012/0141953 A1 | 6/2012 | Mueller |
| 2012/0148979 A1 | 6/2012 | Ruddle |
| 2012/0237893 A1* | 9/2012 | Bergheim ............ A61C 5/40 433/81 |
| 2012/0240647 A1 | 9/2012 | Montemurro |
| 2012/0276497 A1 | 11/2012 | Gharib |
| 2012/0282566 A1 | 11/2012 | Rizoiu et al. |
| 2012/0282570 A1 | 11/2012 | Mueller |
| 2013/0040267 A1 | 2/2013 | Bergheim |
| 2013/0066324 A1 | 3/2013 | Engqvist et al. |
| 2013/0084544 A1 | 4/2013 | Boutoussov et al. |
| 2013/0084545 A1 | 4/2013 | Netchitailo et al. |
| 2013/0085485 A1 | 4/2013 | Van Valen et al. |
| 2013/0085486 A1 | 4/2013 | Boutoussov et al. |
| 2013/0086758 A1 | 4/2013 | Boutoussov et al. |
| 2013/0089829 A1 | 4/2013 | Boutoussov et al. |
| 2013/0110101 A1 | 5/2013 | Van Valen et al. |
| 2013/0115568 A1 | 5/2013 | Jelovac et al. |
| 2013/0131656 A1 | 5/2013 | Marincek et al. |
| 2013/0143180 A1 | 6/2013 | Glover et al. |
| 2013/0177865 A1 | 7/2013 | Ostler |
| 2013/0178847 A1 | 7/2013 | Rizoiu et al. |
| 2013/0190738 A1 | 7/2013 | Lukac et al. |
| 2013/0190743 A1 | 7/2013 | Boutoussov et al. |
| 2013/0216980 A1 | 8/2013 | Boronkay et al. |
| 2013/0236857 A1 | 9/2013 | Boutoussov et al. |
| 2013/0273494 A1 | 10/2013 | Boutoussov et al. |
| 2013/0274724 A1 | 10/2013 | Rizoiu |
| 2013/0288195 A1 | 10/2013 | Mueller |
| 2013/0296910 A1 | 11/2013 | Deng |
| 2013/0330684 A1 | 12/2013 | Dillon et al. |
| 2013/0337404 A1 | 12/2013 | Feine |
| 2014/0032183 A1 | 1/2014 | Fisker et al. |
| 2014/0072931 A1 | 3/2014 | Fougere et al. |
| 2014/0080090 A1 | 3/2014 | Laufer |
| 2014/0087333 A1 | 3/2014 | DiVito et al. |
| 2014/0113243 A1 | 4/2014 | Boutoussov et al. |
| 2014/0124969 A1 | 5/2014 | Blaisdell et al. |
| 2014/0127641 A1 | 5/2014 | Hilscher et al. |
| 2014/0134965 A1 | 5/2014 | Karmi et al. |
| 2014/0147804 A1 | 5/2014 | Yamamoto et al. |
| 2014/0170588 A1 | 6/2014 | Miller et al. |
| 2014/0205965 A1 | 7/2014 | Boutoussov et al. |
| 2014/0220511 A1 | 8/2014 | DiVito et al. |
| 2014/0242551 A1 | 8/2014 | Downs |
| 2014/0257254 A1 | 9/2014 | Boutoussov et al. |
| 2014/0261534 A1 | 9/2014 | Schepis |
| 2014/0272782 A1 | 9/2014 | Luettgen et al. |
| 2014/0303692 A1 | 10/2014 | Pignatelli et al. |
| 2014/0342303 A1 | 11/2014 | Altshuler et al. |
| 2014/0349246 A1 | 11/2014 | Johnson et al. |
| 2015/0010878 A1 | 1/2015 | Seibel et al. |
| 2015/0017599 A1 | 1/2015 | Marincek et al. |
| 2015/0017607 A1 | 1/2015 | Nelson et al. |
| 2015/0030991 A1 | 1/2015 | Sung et al. |
| 2015/0044630 A1 | 2/2015 | Gharib et al. |
| 2015/0056567 A1 | 2/2015 | Fregoso et al. |
| 2015/0056570 A1 | 2/2015 | Kansal |
| 2015/0126984 A1 | 5/2015 | Boutoussov et al. |
| 2015/0147715 A1 | 5/2015 | Breysse |
| 2015/0147717 A1 | 5/2015 | Taylor et al. |
| 2015/0150650 A1 | 6/2015 | Netchitailo et al. |
| 2015/0173850 A1 | 6/2015 | Garrigues et al. |
| 2015/0182283 A1 | 7/2015 | Boutoussov et al. |
| 2015/0190597 A1 | 7/2015 | Zachar et al. |
| 2015/0216398 A1 | 8/2015 | Yang et al. |
| 2015/0216597 A1 | 8/2015 | Boutoussov et al. |
| 2015/0216622 A1 | 8/2015 | Vartanian et al. |
| 2015/0230865 A1 | 8/2015 | Sivriver et al. |
| 2015/0268803 A1 | 9/2015 | Patton et al. |
| 2015/0277738 A1 | 10/2015 | Boutoussov et al. |
| 2015/0283277 A1 | 10/2015 | Schafer et al. |
| 2015/0327964 A1 | 11/2015 | Bock |
| 2015/0335410 A1 | 11/2015 | Zhao |
| 2015/0342679 A1 | 12/2015 | Boutoussov et al. |
| 2015/0359672 A1 | 12/2015 | Van Valen et al. |
| 2015/0367142 A1 | 12/2015 | Kazic et al. |
| 2015/0374471 A1 | 12/2015 | Stangel et al. |
| 2016/0022392 A1 | 1/2016 | Chang et al. |
| 2016/0067149 A1 | 3/2016 | Kishen |
| 2016/0100921 A1 | 4/2016 | Ungar |
| 2016/0113733 A1 | 4/2016 | Pond et al. |
| 2016/0113745 A1 | 4/2016 | Golub et al. |
| 2016/0128815 A1 | 5/2016 | Birdee et al. |
| 2016/0135581 A1 | 5/2016 | Pai |
| 2016/0149370 A1 | 5/2016 | Marincek et al. |
| 2016/0149372 A1 | 5/2016 | Marincek et al. |
| 2016/0220200 A1 | 8/2016 | Sandholm et al. |
| 2016/0270889 A1 | 9/2016 | Casabonne et al. |
| 2016/0334283 A1 | 11/2016 | Scurtescu et al. |
| 2017/0027646 A1 | 2/2017 | DivVito et al. |
| 2017/0027647 A1 | 2/2017 | DiVito et al. |
| 2017/0036253 A1 | 2/2017 | Lukac et al. |
| 2017/0056143 A1 | 3/2017 | Hyun |
| 2017/0189149 A1 | 7/2017 | Golub et al. |
| 2017/0196658 A1 | 7/2017 | Schoeffel |
| 2017/0197071 A1 | 7/2017 | Gottenbos |
| 2017/0216579 A1 | 8/2017 | Becker et al. |
| 2017/0265965 A1 | 9/2017 | Chow et al. |
| 2017/0274220 A1 | 9/2017 | Ertl et al. |
| 2017/0281305 A1 | 10/2017 | Bergheim |
| 2017/0300220 A1 | 10/2017 | Boutoussov et al. |
| 2017/0325889 A1 | 11/2017 | DiVito et al. |
| 2017/0340523 A1 | 11/2017 | Guzman |
| 2018/0008347 A9 | 1/2018 | DeVito et al. |
| 2018/0021104 A1 | 1/2018 | Duncan et al. |
| 2018/0104020 A1 | 4/2018 | Boutoussov et al. |
| 2018/0125608 A1 | 5/2018 | Gottenbos et al. |

(56) References Cited

U.S. PATENT DOCUMENTS

| | | | |
|---|---|---|---|
| 2018/0140865 A1 | 5/2018 | Boutoussov et al. |
| 2018/0214247 A1 | 8/2018 | Sharma et al. |
| 2018/0228581 A1 | 8/2018 | Ouyang |
| 2018/0228582 A1 | 8/2018 | Shin |
| 2018/0257962 A1 | 9/2018 | Montemurro |
| 2018/0360563 A1 | 12/2018 | Khakpour |
| 2019/0059996 A1 | 2/2019 | Duncan et al. |
| 2019/0117078 A1 | 4/2019 | Sharma et al. |
| 2019/0142516 A1 | 5/2019 | Boutoussov et al. |
| 2019/0175401 A1 | 6/2019 | Van Valen et al. |
| 2019/0282332 A1 | 9/2019 | Lifshitz et al. |
| 2019/0282347 A1 | 9/2019 | Gharib et al. |
| 2019/0336219 A9 | 11/2019 | DiVito |
| 2020/0069402 A1 | 3/2020 | Gharib |
| 2020/0085534 A1 | 3/2020 | Kim et al. |
| 2020/0139146 A1 | 5/2020 | Khakpour |
| 2020/0179209 A1 | 6/2020 | Boutoussov et al. |
| 2020/0197143 A1 | 6/2020 | Snyder et al. |
| 2020/0205934 A1 | 7/2020 | Groves, Jr. et al. |
| 2020/0253369 A1 | 8/2020 | De Gentile et al. |
| 2020/0253702 A1 | 8/2020 | De Gentile et al. |
| 2020/0254586 A1 | 8/2020 | Sanders et al. |
| 2020/0268491 A1 | 8/2020 | Shotton et al. |
| 2020/0281688 A1 | 9/2020 | Lares et al. |
| 2020/0297455 A1 | 9/2020 | Bergheim |
| 2020/0330184 A1 | 10/2020 | Boutoussov et al. |
| 2020/0360108 A1 | 11/2020 | Gomurashvili et al. |
| 2021/0038344 A1 | 2/2021 | Khakpour |
| 2021/0068921 A1 | 3/2021 | Bergheim |
| 2021/0069756 A1 | 3/2021 | Lukac et al. |
| 2021/0077234 A1 | 3/2021 | Gharib et al. |
| 2021/0082562 A1 | 3/2021 | Patton et al. |
| 2021/0085435 A1 | 3/2021 | Bergheim |
| 2021/0106402 A1 | 4/2021 | Khakpour et al. |
| 2021/0121275 A1 | 4/2021 | Parham et al. |
| 2021/0145538 A1 | 5/2021 | Boutoussov et al. |
| 2021/0153937 A1 | 5/2021 | Duncan et al. |
| 2021/0186824 A1 | 6/2021 | Gomurashvili et al. |
| 2021/0386510 A1 | 12/2021 | Li et al. |
| 2021/0386532 A1 | 12/2021 | Khakpour et al. |
| 2022/0015829 A1 | 1/2022 | Boutoussov et al. |
| 2022/0022961 A1 | 1/2022 | Boutoussov et al. |
| 2022/0031548 A1 | 2/2022 | Boutoussov et al. |
| 2022/0054230 A1 | 2/2022 | Lifshitz et al. |
| 2022/0071735 A1 | 3/2022 | Boutoussov et al. |
| 2022/0186376 A1 | 6/2022 | Sivriver et al. |
| 2022/0202525 A1 | 6/2022 | Boutoussov et al. |
| 2022/0208334 A1 | 6/2022 | Patton et al. |
| 2022/0233291 A1 | 7/2022 | DeZan et al. |
| 2022/0296346 A1 | 9/2022 | Bergheim et al. |
| 2022/0313405 A1 | 10/2022 | Bergheim et al. |
| 2022/0370177 A1 | 11/2022 | Khakpour et al. |
| 2023/0022589 A1 | 1/2023 | Bergheim et al. |
| 2023/0028923 A1 | 1/2023 | Gharib et al. |
| 2024/0016706 A1 | 1/2024 | Gomurashvili et al. |
| 2024/0207017 A1 | 6/2024 | Khakpour et al. |
| 2024/0335252 A1 | 10/2024 | Bergheim et al. |
| 2025/0160956 A1 | 5/2025 | DiVito et al. |
| 2025/0177086 A1 | 6/2025 | Bergheim et al. |

FOREIGN PATENT DOCUMENTS

| | | | |
|---|---|---|---|
| CN | 2189448 Y | 2/1995 |
| CN | 1127982 | 7/1996 |
| CN | 2693189 Y | 4/2005 |
| CN | 2936192 Y | 8/2007 |
| CN | 200953143 | 10/2007 |
| CN | 201070397 Y | 6/2008 |
| CN | 201370644 Y | 12/2009 |
| CN | 101632849 A | 1/2010 |
| CN | 103027762 A | 4/2013 |
| CN | 107080697 A | 8/2017 |
| CN | 107411976 | 12/2017 |
| DE | 3708801 | 9/1988 |
| DE | 4404983 | 9/1994 |
| DE | 10248336 | 5/2004 |
| DE | 102005028925 | 1/2007 |
| EP | 0261466 | 3/1988 |
| EP | 0436316 | 7/1991 |
| EP | 0685454 | 12/1995 |
| EP | 0830852 | 3/1998 |
| EP | 0902654 | 8/2004 |
| EP | 1886659 | 2/2008 |
| EP | 4534039 | 4/2025 |
| FR | 1225547 | 7/1960 |
| FR | 2831050 | 4/2003 |
| GB | 917633 | 2/1963 |
| GB | 2011305 | 7/1979 |
| JP | 51-064791 A | 4/1976 |
| JP | S60195008 U | 12/1985 |
| JP | H01-313048 | 12/1989 |
| JP | 05-169039 A | 9/1993 |
| JP | H07-155335 | 6/1995 |
| JP | H08-117335 A | 5/1996 |
| JP | H08-1118 A | 9/1996 |
| JP | 09-84809 A | 3/1997 |
| JP | 09-276292 | 10/1997 |
| JP | 10-33548 | 2/1998 |
| JP | H11-28219 A | 2/1999 |
| JP | 11-113927 A | 4/1999 |
| JP | H11-504843 | 5/1999 |
| JP | 11-244303 A | 9/1999 |
| JP | 2000-254153 A | 9/2000 |
| JP | 2002-209911 | 7/2002 |
| JP | 2004-313659 | 11/2003 |
| JP | 3535685 B2 | 6/2004 |
| JP | 2004-261288 | 9/2004 |
| JP | 2005-052754 | 3/2005 |
| JP | 2005-080802 | 3/2005 |
| JP | 2005-095374 | 4/2005 |
| JP | 2006-247619 | 9/2006 |
| JP | 2008-93080 | 4/2008 |
| JP | 2008-132099 | 6/2008 |
| JP | 2009-114953 | 5/2009 |
| JP | 2010-247133 | 11/2010 |
| JP | 2016-534786 | 11/2016 |
| KR | 10-2008-0105713 A | 12/2008 |
| KR | 10-2012-0084897 A | 7/2012 |
| KR | 10-2013-0022553 A | 3/2013 |
| KR | 10-2013-0141103 A | 12/2013 |
| KR | 2004-72508 Y1 | 5/2014 |
| RU | 2326611 C1 | 12/2011 |
| TW | M 336 027 U | 7/2008 |
| WO | WO 1992/004871 | 4/1992 |
| WO | WO 1992/012685 | 8/1992 |
| WO | WO 1995/035069 | 12/1995 |
| WO | WO 1997/021420 | 6/1997 |
| WO | WO 1998/023219 | 6/1998 |
| WO | WO 1998/025536 | 6/1998 |
| WO | WO 1999/63904 | 12/1999 |
| WO | WO 2000/045731 | 8/2000 |
| WO | WO 2000/074587 | 12/2000 |
| WO | WO 2001/026577 | 4/2001 |
| WO | WO 2001/26735 | 4/2001 |
| WO | WO 2001/036117 | 5/2001 |
| WO | WO 2001/93773 | 12/2001 |
| WO | WO 2002/078644 | 10/2002 |
| WO | WO 2003/086223 | 10/2003 |
| WO | WO 2004/032881 | 4/2004 |
| WO | WO 2006/082101 | 8/2006 |
| WO | WO 2008/120018 | 10/2008 |
| WO | WO 2009/151983 | 12/2009 |
| WO | WO 2011/114718 | 9/2011 |
| WO | WO 2012/074918 | 6/2012 |
| WO | WO 2013/15700 | 1/2013 |
| WO | WO 2013/057519 | 4/2013 |
| WO | WO 2013/061251 | 5/2013 |
| WO | WO 2013/160888 | 10/2013 |
| WO | WO 2022/099258 | 5/2022 |
| WO | WO 2024/211619 | 10/2024 |

(56) References Cited

OTHER PUBLICATIONS

ADA American Dental Association, "Glossary of Dental Clinical and Administrative Terms," http://www.ada.org/en/publications/cdt/glossary-of-dental-clinical-and-administrative-ter, downloaded May 4, 2017, in 46 pages.

Adachi et al; Jet Structure Analyses on High-Speed Submerged Water Jets through Cavitation 110 Noises; pp. 568-574; The Japan Society of Mechanical Engineers International Journal—Series B, vol. 39, No. 3; Nov. 1996.

Ahmad et al., "Ultrasonic Debridement of Root Canals: Acoustic Cavitation and Its Relevance," Journal of Endontics, vol. 14, No. 10, pp. 486-493, Oct. 1988.

Al-Jadaa et al; Acoustic Hypochlorite Activation in Simulated Curved Canals; pp. 1408-1411; Journal of Endodontics, vol. 35, No. 10; Oct. 2009.

Alomairy, Evaluating two techniques on removal of fractured rotary nickel-titanium endodontic instruments from root canals: an in vitro study. J Endod 2009;35:559-62.

Anand et al; Prevention of Nozzle Wear in High-Speed Slurry Jets Using Porous Lubricated Nozzles; pp. 1-13; Department of Mechanical Engineering, The Johns Hopkins University, Oct. 2000.

Anantharamaiah et al; A simple expression for predicting the inlet roundness of micro-nozzles; pp. N31-N39; Journal of Micromechanics and Microengineering, vol. 17; Mar. 21, 2007.

Anantharamaiah et al; A study on flow through hydroentangling nozzles and their degradation; pp. 4582-4594; Chemical Engineering Science, vol. 61; May 2006.

Anantharamaiah et al; Numerical Simulation of the Formation of Constricted Waterjets inHydroentangling Nozzles Effects of Nozzle Geometry; pp. 31-238; Chemical Engineering Research and Design, vol. 84; Mar. 2006.

Attin et al; Clinical evaluation of the cleansing properties of the nonistrumental technique for cleaning root canals; pp. 929-933; International Endodontic Journal, vol. 35, Issue 11; Nov. 2002.

Aydin, et al., "Fracture resistance of root-filled teeth after cavity preparation with conventional burs, Er:YAG and Er,Cr:YSGG Lasers," Eur Oral Res 2018; 52: 59-63.

Bader et al., "Indications and limitations of Er:YAG laser applications in dentistry," archive ouverte Unige, http://archive-ouverte.unige.ch. American Journal of Denistry, 2006, vol. 19, No. 3, p. 178-186.

Bahia, et al.: Physical and mechanical characterization and the influence of cyclic loading on thebehaviour of nickel-titanium wires employed in the manufacture of rotary endodontic instruments. Int Endod. J. 2005;38:795-801.

Batchelor et al; Analysis of the stability of axisymmetric jets; pp. 529-551; Journal of Fluid Mechanics, vol. 14; Dec. 1962.

Begenir et al; Effect of Nozzle Geometry on Hydroentangling Water Jets: Experimental Observations; pp. 178-184; Textile Research Journal, vol. 74; Feb. 2004.

Begenir, Asli; The Role of Orifice Design in Hydroentanglement; Thesis submitted to North Carolina State University; dated Dec. 2002, in 107 pages.

Biolase Study, Efficacy of the Er,Cr:YSGG laser in the Laser Assisted Endodontic Treatment, Blind Randomized Clinical Trial, in 332 pages, Apr. 11, 2014. URL: https://repositorio-aberto.up.pt/handle/10216/82757.

Borkent et al; Is there gas entrapped on submerged silicon wafers? Visualizing nano-scale bubbles with cavitation; pp. 225-228; Solid State Phenomena, vol. 134 (2008); available online Nov. 2007.

Bornstein, Eric. "Proper use of Er: YAG lasers and contact sapphire tips when cutting teeth and bone: scientific principles and clinical application." Dentistry today 23.8 (2004): 84-89.

Bremond et al; Cavitation on surfaces; pp. S3603-S3608; Journal of Physics: Condensed Matter, vol. 17; Oct. 28, 2005.

Brennen, Christopher E.; Fission of collapsing cavitation bubbles; pp. 153-166; Journal of Fluid Mechanics, vol. 472; Dec. 2002.

Buchanan, "Closed-System Negative Pressure Irrigation: A Serious Inflection Point in Root Canal Cleaning," Apr. 1, 2020. https://www.dentistrytoday.com/articles/10666.

Chang et al; Effects of Inlet Surface Roughness, Texture, and Nozzle Material on Cavitation; pp. 299-317; Atomization and Sprays, vol. 16 (2006).

Charara, et al.: "Assessment of apical extrusion during root canal procedure with the novel GentleWave system in a simulated apical environment," J Endod 2015. In Press.

Christo, Jonathan Dr., "Efficacy of Sodium Hypochlorite and Er,Cr:YSGG Laser Energised Irrigation Against an Enterococcus faecalis Biofilm", Sep. 2012.

Crump et al., "Relationship of broken root canal instruments to endodontic case prognosis: a clinical investigation," J Am Dent Assoc 1970;80:1341-7.

Culjat et al., "B-Scan Imaging of Human Teeth Using Ultrasound," Apr. 2003, in 4 pages.

D'Arcangelo, et al.: "Broken instrument removal—two cases," J Endod 2000;26:368-70.

De Groot, et al., "Laser-activated irrigation within root canals: cleaning efficacy and flow visualization," Int Endod J. 2009;42:1077-83.

Didenkulov et al; Nonlinear Acoustic Diagnostics of Scatterer Spatial Distribution in a Cavitation Jet; Nov. 19-23, 2001, pp. 276-278, XI Session of the Russion Acoustical Society.

Divito et al.: "Cleaning and debriding efficacy of new radial and stripped tips using an Erbium laser on human root canal dentin walls—an in vitro study: SEM observations," undated.

Divito et al., "The Photoacoustic Efficacy of an Er:YAG Laser with Radial and Stripped Tips on Root Canal Dentin Walls: An SEM Evaluation," J Laser Dent 2011;19(1):156-161.

Dumouchel, Christophe; On the experimental investigation on primary atomization of liquid streams; pp. 371-422; Experimental Fluids, vol. 45; Jun. 22, 2008.

Ebihara et al.: "Er:YAG laser modification of root canal dentine: Influence of pulse duration, repetitive irradiation and water spray," Lasers in Medical Science, 17(3), 198-207, Aug. 2002.

Eddingfield et al; Mathematical Modeling of High Velocity Water Jets; pp. 25-39; Proceedings of 1st U.S. Water Jet Conference; 1981.

El-Din, et al., "Antibacterial Effect of Er,Cr:YSGG Laser Under Various Irradiation Conditions in RootCanals Contaminated With Enterococcus Faecalis," Alexandria Dental Journal. (2017) vol. 42 pp. 108-112.

EMS Electro Medical Systems, "Cleaning", in 2 pages, dated 2005, downloaded from http://www.ems-dent.com/en/endodontics cleaning. htm.

Esen, et al.: "Apical microleakage of root-end cavities prepared by CO2 laser," J Endod 2004;30:662-4.

ESI Endo Soft Instruments, EMS Electro Medical Systems, Brochure in 2 pages, downloaded from www.emsdent.com, dated Jan. 2004.

Feldman, et al.: "Retrieving broken endodontic instruments," J Am Dent Assoc. 1974:88:588-91.

Feng et al; Enhancement of ultrasonic cavitation yield by multi-frequency sonication; pp. 231-236; Ultrasonics Sonochemistry, vol. 9; Oct. 2002.

Flint, E. B., et al., "The Temperature of Cavitation", Science, vol. 253, Sep. 20, 1991, pp. 1397-1399.

Foldyna et al; Acoustic wave propagation in high-pressure system; pp. e1457-e1460; Ultrasonics vol. 44 (Supplement 1); Jun. 8, 2006.

Fors, et al.: "A method for the removal of broken endodontic instruments from root canals," J Endod 1983;9:156-9.

Fuchs, "Ultrasonic Cleaning: Fundamental Theory and Application," Blackstone-Ney Ultrasonics, Jamestown, NY, May 2002.

G.E. Reisman and C.E. Brennen, "Pressure Pulses Generated by Cloud Cavitation", FED—vol. 236, 1996 Fluids Engineering Division Conference, vol. 1, pp. 319-328, ASME 1996.

G.E. Reisman, Y.-C. Wang and C.E. Brennen, "Observations of shock waves in cloud cavitation", J. Fluid Mech. (1998), vol. 355, pp. 255-283.

Gencoglu, et al.: Comparison of the different techniques to remove fractured endodontic instruments from root canal systems. Eur J Dent 2009;3:90-5.

George, M.D.Sc., Ph.D, et al., "Thermal Effects from Modified Endodontic Laser Tips Used in the Apical Third of Root Canals with Erbium-Doped Yttrium Aluminium Garnet and Erbium, Chromium-

(56) References Cited

OTHER PUBLICATIONS

Doped Yttrium Scandium Gallium Garnet Lasers," Photomedicine and Laser Surgery vol. 28, No. 2, 2010, *Mary Ann Liebert, Inc., pp. 161-165.

Ghassemieh et al; Effect of Nozzle Geometry on the Flow Characteristics of Hydroentangling Jets; pp. 444-450; Textile Research Journal, vol. 73; May 2003.

Ghassemieh et al; The effect of nozzle geometry on the flow characteristics of small water jets; pp. 1739-1753; Proceedings of the Institute of Mechanical Engineers, Part C: Mechanical Engineering Science, vol. 12, Sep. 2006.

Gordon, DMD, et al., "The antimicrobial efficacy of the erbium, chromium:yttrium-scandium-gallium-garnet laser with radial emitting tips on root canal dentin walls infected with Enterococcus faecalis," Research—Advances in Dental Products, JADA, vol. 138, Jul. 2007. RFT endolase, Root Calan Therapy System for the Waterlase MD YSGG Laser, Peer-Reviewed Clincal Articles.

Gregorcic et al., "Optodynamic energy-conversion efficiency during an Er: YAG-laser-pulse delivery into a liquid through different fiber-tip geometries." Journal of biomedical optics 17.7 (2012): 075006.

Guidotti R, et al, "Er:YAG 2,940-nm laser fiber in endodontic treatment: a help in removing smear layer," Lasers Med Sci. 2014;29:69-75.

Haapasalo, et al.: "Tissue dissolution by a novel multisonic ultra-cleaning system and sodium hypochlorite," J Endod 2014;40:1178-81.

Hahn et al; Acoustic resonances in the bubble plume formed by a plunging water jet; pp. 1751-1782; Proceedings of the Royal Society of London A, vol. 459; May 16, 2003.

Haikel, et al.: Dynamic and cyclic fatigue of engine-driven rotary nickel-titanium endodontic instruments. J Endod 1999;25:434-40.

Haikel, et al.: Dynamic fracture of hybrid endodontic hand instruments compared with traditional files. J Endod 1991;17:217-20.

Hashish, Mohamed; Experimental Studies of Cutting with Abrasive Waterjets; pp. 402-416; Proceedings of 2nd American Water Jet Conference; 1983.

Herbert et al; Cavitation pressure in water; pp. 041603-1 to 041603-22; Physical Review E, vol. 74; Oct. 2006.

Hiroyasu, Hiro; Spray Breakup Mechanism from the Hole-Type Nozzle and its Applications; pp. 511-527; Atomization and Sprays, vol. 10 (2000).

Hmud R. et al. "Cavitational Effects in Aqueous Endodontic Irrigants Generated by Near-InfraredLasers", Journal of Endodontics, vol. 36, Issue 2, Feb. 2010, available online Dec. 4, 2009, in 4 pages.

Hoque et al; Air entrainment and associated energy dissipation in steady and unsteady plunging jets at free surface; pp. 37-45; Applied Ocean Research, vol. 30; May 2008.

Hulsmann, et al.: Influence of several factors on the success or failure of removal of fractured instruments from the root canal. Endod Dent Traumatol 199;15:252-8.

Hulsmann: "Methods for removing metal obstructions from the root canal," Endod Dent Traumatol 1993;9:223-37.

Hydrocision Products: SpineJet Hydrosurgery; system webpage in 2 pages, copyright 2010, downloaded from http://www.hydrocision.com on Apr. 22, 2010.

Hydrocision SpineJet XL HydroSurgery System; Brochure in 2 pages, copyright 2004-2006, downloaded from http://www.hydrocision.com on Apr. 22, 2010.

Iqbal, et al.: "A comparison of three methods for preparing centered platforms around separated instruments in curved canals," J Endod 2006; 32:48-51.

Jlad, Fall 2015, Issue 3.

Jackson et al; Nozzle Design for Coherent Water Jet Production; pp. 53-89; Proceeding of the 2nd US Water Jet Conference; May 1983.

Jiang, et al., "Evaluation of a Sonic Device Designed to Activate Irrigant in the Root Canal," Journal of endodontics, 36(1): 143-146, Jan. 2010.

Jonathan, et al., "Comparative Evaluation of the Antibacterial Efficacy of Four Different DisinfectionTechniques in Minimally Instrumented Experimentally Infected Root Canals: An in vitro Study," International Journal of Laser Densitry, May-Aug. 2013; 3(2): 49-54.

Junge et al; Cell Detachment Method Using Shock-Wave-Induced Cavitation; pp. 1769-1776; Ultrasound in Medicine & Biology, vol. 29, No. 12; Dec. 2003.

Kalumuck et al; Development of High Erosivity Well Scale Cleaning Tools; pp. 1-36; Dynaflow, Inc.; Report 98012 conducted under Contract No. DE-FG07-981013684 for the US Dept. of Energy; Jul. 1999, in 36 pages.

Karasawa et al; Effect of Nozzle Configuration on the Atomization of a Steady Spray; pp. 411-426; Atomization and Sprays, vol. 2 (1992).

Kato, Hiroharu; Utilization of Cavitation for Environmental Protection—Killing Planktons andDispersing Spilled Oil; pp. 1-8; In CAV2001: Fourth International Symposium on Caviation; California Institute of Technology, Pasadena, CA; dated Jun. 2001.

Kimura et al., "Lasers in endodontics: a review," International Endodontic Journal, 33, 173-185, 2000.

Koch et al., "Irrigant flow during photon-induced photoacoustic streaming (PIPS) using Particle Image Velocimetry (PIV)", Clin. Oral Invest. vol. 20:381-386 (2016).

Kolnick, Justin. "Managing Refractory Endodontic Disease With Radial Apical Cleansing (Report of Two Clinical Cases)." (Sep. 2018).

Kourti, E. et al., "Smear Layer Removal by Means of Erbium, Chromium: Yttrium Scandium GalliumGarnet (er,Cr:YSGG) Laser Irradiatin From Apical Third of Mesial Root Canals," International Journal of Recent Scientific Research, vol. 12, Issue, 05, pp. 41804-41808, May 2021.

Lee et al; The efficacy of ultrasonic irrigation to remove artificially placed dentine debris from different-sized simulated plastic root canals; pp. 607-612; International Endodontic Journal, vol. 37; May 2004.

Li et al; Cavitation Resonance; pp. 031302-1 to 031302-7; Journal of Fluids Engineering, vol. 130; Mar. 2008.

Lienhard V et al; Velocity Coefficients for Free Jets From Sharp-Edged Orifices; pp. 13-17; Reprinted from Mar. 1984, vol. 106, Journal of Fluids Engineering.

Lin et al; Drop and Spray Formation from a Liquid Jet; pp. 85-105; Jan. 1998: vol. 30; Annual Review of Fluid Mechanics.

Linfield, Kevin William; A Study of the Discharge Coefficient of Jets From Angled Slots and Conical Orifices; Thesis submitted to Dept. of Aerospace Science and Engineering; University of Toronto; dated 2000; in 148 pages.

Lukac et al.: "Photoacoustic Endodontics Using the Novel Sweeps Er:YAG Laser Modality," Journal of the Laser and Health Academy, vol. 2017, No. 1; www.laserlaserandhealth.com.

Lukac, et al., "Modeling Photoacoustic Efficiency during Erbium Laser Endodontics," Journal of the Laser and Health Academy, vol. 2013, No. 2.

Lukac, et al., "Wavelength dependence of photoinduced photoacoustic streaming technique for root canal irrigation," Journal of Biomedical Optics 21(7), 075007 (Jul. 2016).

Lumkes, Jr., Control Strategies for Dynamic Systems: Design and Implementation, 2002, pp. 117-118.

Lussi et al; A new non-instrumental technique for cleaning and filling root canals; pp. 1-6; International Endodontic Journal, vol. 28; Jan. 1995.

Lussi et al; A Novel Noninstrumented Technique for Cleansing the Root Canal System; pp. 549-553; Journal of Endodontics, vol. 19, No. 11; Nov. 1993.

Lussi et al; In vivo performance of the new non-instrumentation technology (NIT) for root canal obturation; pp. 352-358; International Endodontic Journal, vol. 35; Apr. 2002.

Ma, et al.: "In vitro study of calcium hydroxide removal from mandibular molar root canals," J Endod 2015;41:553-8.

Madarati, et al.: "Efficiency of a newly designed ultrasonic unit and tips in reducing temperature rise on root surface during the removal of fractured files," J Endod 2009;35:896-9.

Madarati, et al.: "Management of intracanal separated instruments," J Endod 2013;39:569-81.

(56) References Cited

OTHER PUBLICATIONS

Madarati, et al.: "Qualtrough AJ. Factors contributing to the separation of endodontic files," Br Dent J 2008;204:241-5.

Matsumoto, et al. "Visualization of irrigant flow and cavitation induced by Er: YAG laser within a root canal model." Journal of endodontics 37.6 (2011): 839-843.

Maximum Dental Inc., "Canal Clean Max", "Intra Canal Irrigation and Aspiration Device", and "SonicMax, Endo-Perio Sonic Handpiece", in 3 pages, downloaded from www.dentalmaximum.com on May 8, 2008.

Merigo, et al., "Bactericidal effect of Er,Cr:YSGG laser irradiation on endodontic biofilm: An ex vivo study," Journal of Photochemistry & Photobiology, B: Biology 218 (2021) 112185.

Molina, et al.: "Histological evaluation of root canal debridement of human molars using the GentleWaveTM system," J Endod 2015;41:1702-5.

Montero-Miralles, et al., "Comparative study of debris and smear layer removal with EDTA and Er,Cr:YSGG laser," J Clin Exp Dent. 2018;10(6):e598-602.

Mrochen, et al. "Erbium: yttrium-aluminum-garnet laser induced vapor bubbles as a function of thequartz fiber tip geometry Erbium: yttrium-aluminum-garnet laser induced vapor bubbles as a function of the quartz fiber tip geometry." Journal of biomedical optics 6.3 (2001): 344-350.

Nagahashi et al., "Er:YAG laser-induced cavitation can activate irrigation for the removal of intraradicular biofilm", Scientific Reports, https://doi.org/10.1038/s41598-022-08963-x, pp. 1-11 (2022).

Nammour et al.: "External temperature during KTP-nd:YAG laser irradiation in root canals: An in vitro study," Lasers in Medical Science, 19(1), 27-32, Jul. 2004.

Nevares, et al.: "Success rates for removing or bypassing fractured instruments: a prospective clinical study," J Endod 2012;38:442-4.

Ohrn et al; Geometric Effects on Spray Cone Angle for Plain-Orifice Atomizers; pp. 253-268; Atomization and Sprays, vol. 1 (1991).

Ohrn et al; Geometrical Effects on Discharge Coefficients for Plain-Orifice Atomizers; pp. 137-153; Atomization and Sprays, vol. 1, No. 2 (1991).

Olivi, et al., "Lasers in Endodontics," Scientific Background and Clinical Applications, 2016.

Oral Health, Special Issue, Laser Dentistry, Photo-Acoustic, Root Canal, Decontamination, in 52 pages.

Peeters, et al., "Measurement of temperature changes during cavitation generated by an erbium, chromium: Yttrium, scandium, gallium garnet laser," OJST. 2012;2:286-91.

Phinney, Ralph E.; The breakup of a turbulent liquid jet in a gaseous atmosphere; pp. 689-701; J. Fluid Mechanics, vol. 60, Part 4; Oct. 1973.

Piezon Master 600 Ultrasound a la carte, EMS Electro Medical Systems, EMS SA FA-319.EN ed. Mar. 2009; Brochure dated Mar. 2009, in 2 pages.

Prasad, et al., Introduction to biophotonics. John Wiley & Sons, 2003.

Quinn, W. R.; Experimental study of the near field and transition region of a free jet issuing from asharp-edged elliptic orifice plate; pp. 583-614; European Journal of Mechanics—B/Fluids, vol. 26; Jul.-Aug. 2007; available online Dec. 2006.

Ramamurthi et al; Disintegration of Liquid Jets from Sharp-Edged Nozzles; pp. 551-564; Atomization and Sprays, vol. 4 (1994).

Reitz et al; Mechanism of atomization of a liquid jet; pp. 1730-1742; Physics Fluids, vol. 25, No. 10; Oct. 1982.

Roots—international magazine of endodontics, Issn 2193-4673, vol. 15, Issue Apr. 2019.

Roth, et al.: "A study of the strength of endodonitc files: potential for torsional breakage and relative flexibility," J Endod 1983; 9:228-32.

Ruddle, "Nonsurgical retreatment," J Endod 2004;30:827-45.

Sabeti, "Healing of apical periodontitis after endodontic treatment with and without obturation in dogs," Journal of Endodontics, Jul. 2006, pp. 628-633.

Sallam et al; Liquid breakup at the surface of turbulent round liquid jets in still gases; pp. 427-449; International Journal of Multiphase Flow, vol. 28; Mar. 2002.

Sawant et al; Effect of hydrodynamic cavitation on zooplankton: A tool for disinfection; pp. 320-328; Biochemical Engineering Journal, vol. 42, Issue 3; Dec. 2008.

Schoop et al., "The impact of an erbium, chromium: yttrium-scandium-gallium-garnet laser withradial-firing tips on endodontic treatment," Lasers in Medical Science, vol. 24(1):59-65, published online Nov. 20, 2007.

Schoop et al., "The use of the erbium, chromium:yttrium-scandium-gallium-garnet laser in endodontic treatment", JADA, vol. 138(7):949-955 (2007).

Schneider, et al.: "A comparison of canal preparations in straight and curved root canals," Oral Surg Oral Med Oral Pathol 1971;32:271-5.

Schneider, et al.: "NIH Image to ImageJ: 25 years of image analysis," Nat Methods 2012;9:671-5.

Seet, et al., An in-vitro Evaluation of the Effectiveness of Endodontic Irrigants, with and without Sonic and Laser Activation, in the Eradication of Enterococcus faecalis Biofilm.

Shaheed, et al., "Healing of Apical Periodontitis after Minimally Invasive Endodontics therapy using Er, Dr:YSGG laser: A Prospective Clinical Study," Sys Rev Pharm 2020; 11(2): 135-140.

Shen, et al.: "Factors associated with the removal of fractured NiTi instruments from root canal systems," Oral Surg Oral Med Oral Pathol Oral Radiol Endod 2004;98:605-10.

Shi et al; Comparison-speed liquid jets; Experiments in Fluids, vol. 35; pp. 486-492; Oct. 7, 2003.

Sigma-Aldrich, Product Specification, 2-propanol SDS, Product No. 190764.

Silva, et al., "Analysis of Permeability and Morphology of Root Canal Dentin After ER,Cr:YSGG Laser Irradiation," Photomedicine and Laser Surgery vol. 28, No. 1, pp. 103-108, 2010.

Skyttner, "Endodontic instrument separations: evaluation of a patient cases series with separatedendodontic instruments and factors related to the treatment regarding separated instruments [thesis]," Stockholm: Karolinska Institutet; 2007.

Sou et al; Effects of cavitation in a nozzle on liquid jet atomization; pp. 3575-3582; International Journal of Heat and Mass Transfer, vol. 50; Mar. 2007.

Souter, et al.: "Complications associated with fractured file removal using an ultrasonic technique," J Endod 2005;31:450-2.

Soyama et al; High-Speed Observation of Ultrahigh-Speed Submerged Water Jets; pp. 411-416; Experimental Thermal and Fluid Science, vol. 12 1996).

Soyama, Hitoshi; High-Speed Observation of a Cavitating Jet in Air; Journal of Fluids Engineering, vol. 127; pp. 1095-1101; Nov. 2005.

Stamos et al., "Retreatodontics and ultrasonics", Journal of Endodontics, vol. 14., No. 1, pp. 39-42, Jan. 1, 1988.

Stamos et al., "Use of ultrasonics in single-visit endodontic therapy," Journal of Endodontics, vol. 13, No. 5, pp. 246-249, May 1, 1987.

Summers, David A; Considerations in the Comparison of Cavitating and Plain Water Jets; pp. 178-184; Rock Mechanics and Explosive Research Center, Rolla, Missouri, 1983.

Summers, David A; The Volume Factor in Cavitation Erosion; Proceedings of 6th International Conference on Erosion by Liquid and Solid Impact; University of Missouri-Rolla; Rolla, Missouri, 1983, in 12 pages.

Suslick, K. S., et al., "The Sonochemical Hot Spot", Journal of the American Chemical Society, vol. 108, No. 18, Sep. 3, 1986, pp. 5641-5642.

Suslick, K. S., et al., "Heterogeneous Sonocatalysis with Nickel Powder", Journal of the American Chemical Society, vol. 109, No. 11, May 27, 1987, pp. 3459-3461.

Suter, et al.: "Probability of removing fractured instruments from root canals," Int Endod J 2005;38:112-23.

Tafreshi et al; Simulating Cavitation and Hydraulic Flip Inside Hydroentangling Nozzles; pp. 359-364; Textile Research Journal, vol. 74, Apr. 2004.

(56) References Cited

OTHER PUBLICATIONS

Tafreshi et al; Simulating the Flow Dynamics in Hydroentangling Nozzles: Effect of Cone Angle and Nozzle Aspect Ratio; pp. 700-704; Textile Research Journal, vol. 73; Aug. 2003.
Tafreshi et al; The effects of nozzle geometry on waterjet breakup at high Reynolds numbers; pp. 364-371; Experiments in Fluids, vol. 35; Sep. 2, 2003.
Takeda et al., "A comparative study of the removal smear layer by three endodontic irrigants and two types of laser," International Endodontic Journal, 32, 32 39, 1999.
Takeda et al., "Comparative Study about the Removal of Smear Layer by Three Types of Laser Devices," Journal of Clinical Laser Medicine & Surgery, vol. 16, No. 2, 1998 Mary Ann Liebert, Inc. pp 117-122.
Terauchi, et al.: "Evaluation of the efficiency of a new file removal system in comparison with two conventional systems," J. Endod 2007;33:585-8.
Ward Jr.: "The use of an ultrasonic technique to remove a fractured rotary nickel-titanium instrument from the apical third of a curved root canal," Aust Endod J 2003;29:25-30.
Wohlemuth et al.: "Effectiveness of GentleWave System in Removing Separated Instruments," JOE, vol. 41, No. 11, Nov. 2015.
Yoldas, et al.: "Perforation risks associated with the use of Masserann endodontic kit drills in mandibular molars," Oral Surg Oral Med Oral Pathol Oral Radiol Endod 2004;97:513-7.
Yu et al.: "Study on removal effects of filling materials and broken files from root canals using pulsed Nd:YAG laser," J Clin Laser Med Surg 2000;18:23-8.
Zehnder, "Root Canal Irrigants", Journal of Endodontics, vol. 32, No. 5, pp. 389-398, May 2006.
Zuo et al; An Attribution of Cavitation Resonance: Volumetric Oscillations of Cloud; pp. 152-158; Journal of Hydrodynamics, vol. 21; Apr. 2009.
European Extended Search Report, dated Mar. 8, 2018, for EP Application No. 17201637.0.
European Extended Search Report re EP Application No. 09743801.4, dated Jun. 4, 2012.
European Extended Search Report re EP Application No. 14187012.1, dated Mar. 3, 2015, in 10 pages.
European Extended Search Report, dated Sep. 22, 2011, for EP Application No. 07755777.5, in 7 pages.
European Extended Search Report, re EP Application No. 08728345.3, dated Mar. 3, 2014.
European Extended Search Report, re EP Application No. 10830829.7, dated Oct. 21, 2015.
European Extended Search Report, re EP Application No. 11835265.7, dated Mar. 30, 2016, in 9 pages.
European Extended Search Report, re EP Application No. 13763534.8, dated Jan. 15, 2016.
European Search Report, re EP Application No. 13763534.8, dated Jun. 20, 2022.
European Extended Search Report, re EP Application No. 13775073.3, dated Nov. 3, 2015.
European Exam Report, re EP Application No. 14733409.8, dated May 3, 2018.
European Exam Report, re EP Application No. 14742409.7, dated Aug. 21, 2018.
International Search Report and Written Opinion dated Apr. 11, 2008, for International Appl. No. PCT/US07/09633, in 8 pages.
International Preliminary Report on Patentability dated Oct. 30, 2008, for International Appl. No. PCT/US07/09633, in 5 pages.
International Search Report and Written Opinion dated Aug. 8, 2008, for International Appl. No. PCT/US08/52122, in 18 pages.
International Preliminary Report on Patentability dated Aug. 6, 2009, for International Appl. No. PCT/US08/52122, in 13 pages.
International Search Report and Written Opinion dated Jul. 29, 2009, for International Appl. No. PCT/US09/43386, in 8 pages.
International Preliminary Report and Written Opinion dated Nov. 9, 2010 for International Appl. No. PCT/US09/43386, in 6 pages.
International Search Report and Written Opinion re App. No. PCT/US2010/056620, dated Jan. 12, 2011, in 17 pages.
International Preliminary Report on Patentability re App. No. PCT/US2010/056620, issued May 15, 2012, in 10 pages.
International Preliminary Report on Patentability, re PCT Application No. PCT/US11/57401, mailed Jan. 25, 2013 in 13 pages.
International Search Report and Written Opinion from International Application No. PCT/US2011/057401, Jan. 30, 2012, in 20 pages.
International Search Report and Written Opinion, re PCT Application No. PCT/US 13/32635, mailed Jun. 17, 2013 in 14 pages.
International Search Report and Written Opinion mailed Jun. 28, 2013, re PCT Application No. PCT/US2013/036493, in 21 pages.
International Preliminary Report on Patentability and Written Opinion, mailed Oct. 14, 2014, re PCT Application No. PCT/US2013/036493, in 14 pages.
International Search Report and Written Opinion, re PCT Application No. PCT/US2013/077286, mailed May 27, 2014.
International Preliminary Report on Patentability, re PCT Application No. PCT/US2013/077286, issued Jun. 23, 2015, in 8 pages.
International Search Report and Written Opinion re App. No. PCT/US2014/014732, mailed Jul. 18, 2014.
International Preliminary Report on Patentability re PCT Application No. PCT/US2014/014732, issued Aug. 4, 2015.
International Search Report and Written Opinion, re PCT Application No. PCT/US2014/044186, mailed Jan. 21, 2015, in 19 pages.
International Preliminary Report on Patentability, re PCT Application No. PCT/US2014/044186, mailed Dec. 29, 2015, in 19 pages.
International Preliminary Report on Patentability, re PCT Application No. PCT/US2014/036451, issued Nov. 3, 2015, 2015, in 11 pages.
International Search Report and Written Opinion, re PCT Application No. PCT/US2015/028360, mailed Sep. 28, 2015, in 25 pages.
International Preliminary Report on Patentability, re PCT Application No. PCT/US2015/028360, Issued Nov. 10, 2016, in 14 pages.
European Extended Search Report, re EP Application No. 18159618.0, dated Jul. 2, 2018.
European Extended Search Report, re EP Application No. 18195055.1, dated Mar. 13, 2019.
International Search Report and Written Opinion for PCT/US2021/072194, mailed on Jan. 27, 2022, in 15 pages.
European Extended Search Report, re EP Application No. 14765398.4, dated May 31, 2017.
European Supplemental Search Report, re EP Application No. 07837261.2, dated May 3, 2012.
European Supplemental Search Report, re EP Application No. 10746978.5, dated Dec. 10, 2015.
European Extended Search Report, EP Application No. 20176387.7, dated Oct. 29, 2020.
International Search Report and Written Opinion, re PCT Application No. PCT/US2014/036451, mailed Jan. 21, 2015, in 20 pages.
International Search Report and Written Opinion, re PCT Application No. PCT/US2017/057206, mailed Jan. 25, 2018, in 18 pages.
International Preliminary Report on Patentability, re PCT Application No. PCT/US2018/050753, issued Mar. 17, 2020, in 10 pages.
International Search Report and Written Opinion, re PCT Application No. PCT/US2019/035884, mailed Sep. 12, 2019, in 18 pages.
International Preliminary Report on Patentability, re PCT Application No. PCT/US2019/035884, issued Dec. 8, 2020, in 1 pages.
International Invitation to Pay Additional Fees, re PCT Application No. PCT/US2020/033837, mailed Sep. 3, 2020.
International Search Report and Written Opinion, re PCT Application No. PCT/US2020/033837, mailed Oct. 28, 2020.
International Search Report and Written Opinion, re PCT Application No. PCT/US2020/031189, mailed Jul. 31, 2020, in 17 pages.
International Search Report and Written Opinion, re PCT Application No. PCT/US2020/033157, mailed Aug. 26, 2020, in 17 pages.
International Invitation to Pay Additional Fees, re PCT Application No. PCT/US2020/036491, mailed Sep. 18, 2020.
International Search Report and Written Opinion, re PCT Application No. PCT/US2020/036491, mailed Nov. 9, 2020.
International Preliminary Report on Patentability, re PCT Application No. PCT/IL2013/050330, dated Oct. 30, 2014.

(56) References Cited

OTHER PUBLICATIONS

International Preliminary Report on Patentability, re PCT Application No. PCT/IL2014/050924, dated May 6, 2016.
International Search Report and Written Opinion, re PCT Application No. PCT/IL2013/050330, mailed Jul. 30, 2013.
International Search Report and Written Opinion, re PCT Application No. PCT/IL2014/050924, mailed Mar. 19, 2015.
International Search Report and Written Opinion for PCT/US2021/053844, dated Mar. 11, 2022, in 22 pages.
Hungarian Written Opinion and Search Report via/re Singapore Application No. 189554, mailed Oct. 13, 2013.
Extended European Search Report and Written Opinion for European Application No. 21175783.6, dated Dec. 13, 2021, in 8 pages.
Extended European Search Report for European Application No. 22167511.9, dated Aug. 11, 2022, in 8 pages.
Abad-Gallegos et al, "In vitro evaluation of the temperature increment at the external root surfaceafter Er,Cr:YSGG laser irradiation of the root canal", Med Oral Patol Oral Cir Bucal, vol. 14(12):658-662 (2009).
Abdelkarim-Elafifi et al., "Aerosols generation using Er,Cr:YSGG laser compared to rotary instruments in conservative dentistry: A preliminary study", J Clin Exp Dent, vol. 13(1):e30-6 (2021).
Altundasar et al., "Ultramorphological and histochemical changes after ER,CR:YSGG laser irradiation and two different irrigation regimes", Basic Research-Technology, vol. 32(5):465-468 (2006).
Arnabat et al., "Bactericidal activity of erbium, chromium: yttrium-scandium-gallium-garnet laser in root canals", Lasers Med Sci vol. 25:805-810 (2010).
Aydin et al., "Efficacy of erbium, chromium-doped yttrium, scandium, gallium and garnet laser-activated irrigation compared with passive ultrasonic irrigation, conventional irrigation, andphotodynamic therapy against enterococcus faecalis", ResearchGate, https://www.researchgate.net/publication/338906248, Article in The Journal of Contemporary Dental Practice, Jan. 2020.
Beader et al., "Efficacy of three different lasers on eradication of enterococcus faecalis and candida albicans biofilms in root canal system", ResearchGate, https://www.researchgate.net/publication/316287465, Article in Photomedicine and Laser Surgery, Apr. 2017.
Betancourt et al., "Er,Cr:YSGG laser-activated irrigation and passive ultrasonic irrigation:comparison of two strategies for root canal disinfection", Photobiomodulation, Photomedicine, and Laser Surgery, vol. 383(2):91-97 (2020).
Betancourt et al., "ER/Cr:YSGG laser-activation enhances antimicrobial and antibiofilm action of low concentrations of sodium hypochlorite in root canals", Antibiotics, vol. 8(232):1-10 (2019).
Bolhari et al., "Efficacy of Er,Cr:YSGG laser in removing smear layer and debris with two different output powers", Photomedicine and Laser Surgery, vol. 32(10):527-532 (2014).
Cheng et al., "Evaluation of the bactericidal effect of Nd:YAG, Er:YAG, Er,Cr:YSGG laser radiation,and antimicrobial photodynamic therapy (aPDT) in experimentally infected root canals", Lasers in Surgery and Medicine, vol. 44:824-831 (2012).
Christo et al., "Efficacy of low concentrations of sodium hypochlorite and low-powered Er,Cr:YSGG laser activated irrigation against an *Enterococcus faecalis* biofilm", International Endodontic Journal, vol. 49:279-286 (2016).
De Moor et al., "Laser induced explosive vapor and cavitation resulting in effective irrigation of the root canal. Part 2: Evaluation of the efficacy", Lasers in Surgery and Medicine, vol. 41:520-523 (2009).
De Moor et al., "Efficacy of ultrasonic versus laser-activated irrigation to remove artificially placed dentin debris plugs", Basic Research Technology, JOE vol. 36(9):1580-1583 (2010).
Dewsnup et al., "Comparison of bacterial reduction in straight and curved canals using erbium,chromium:Yttrium-Scandium-Gallium-Garnet laser treatment versus a traditional irrigation technique with sodium hypochlorite", Basich Research—Technology, JOE, vol. 36(4): 725-728 (2010).
Erken, "Evaluation of apically extruded debris using two niti systems associated with two irrigationtechniques in primary teeth", ResearchGate, https://www.researchgate.net/publication/310465261, The Journal of Clinical Pediatric Dentistry, Nov. 2016.
Acharya Letter Re: *PIPStek, LLC v. Biolase, Inc.* (D. Del. Case No. 1:23-cv-00011-MN), dated Mar. 3, 2023, in 3 pages.
Acharya Letter, Exhibit A, in 34 pages, dated Mar. 3, 2023.
Acharya Letter, Exhibit B: in 15 pages, dated Mar. 3, 2023.
Acharya Letter, Exhibit C, Waterlase User Manual, in 50 pages. For purposes of examination, consider dated 2003.
Acharya Letter, Exhibit D, Waterlase User Manual, in 79 pages. For purposes of examination, consider dated 2004.
Acharya Letter, Exhibit E, Endolase Instructions for Use, in 2 pages. For purposes of examination, consider dated 2002.
Acharya Letter, Exhibit F, Fax Boutoussov to De Vito [sic], in 2 pages. For purposes of examination, consider dated May 26, 2004.
Acharya Letter, Exhibit G, Fax Boutoussov to DiVito, in 1 page. For purposes of examination, consider dated Jun. 8, 2004.
Acharya Letter, Exhibit H, Biolase Accessories Overview, in 39 pages. For purposes of examination, consider dated Jan. 2004.
Acharya Letter, Exhibit I, Rocky Mountain Symposium, in 1 page. For purposes of examination, consider dated 2004.
Correspondence DiVito to Boutoussov, in 3 pages. For purposes of examination, consider dated May 28, 2004.
Fax Boutoussov to De Vito [sic], in 1 page. For purposes of examination, consider dated Nov. 24, 2004.
Fogarty, "What is an acoustic wave?", https://www.allthescience.org/what-is-an-acoustic-wave.htm, 7 pages (2022).
George et al., "Laser activation of endodontic irrigants with improved conical laser fiber tips forremoving smear layer in the apical third of the root canal", Basic Research—Technology, JOE, vol. 34(12):1524-1521 (2008).
George et al., Apical extrusion of root canal irrigants when using Er:YAG and ER,Cr:YSGG lasers with optical fibers: An in vitro dye study, Basic Research—Technology, JOE, vol. 34(6):706-708 (2008).
Ishizaki et al., "Thermographical and morphological studies of Er,Cr:YSFF laser irradiation on root canal walls", Photomedicine and Laser Surgery, vol. 22(4):291-297 (2004).
Kustarci et al., "Efficacy of laser activated irrigation on apically extruded debris with different preparation systems", Photomedicine and Laser Surgery, vol. 33(7):384-389 (2015).
Licata et al., "Effectiveness of a new method of disinfecting the root canal, using Er,Cr:YSGG laser to kill Enterococcus faecaslis in an infected tooth model", ResearchGate, https://www.researchgate.net/publication/255688995, Article in Lasers in Medical Science, Aug. 2013.
Lopes et al., "Evaluation of chemical and morphological changes in radicular dentin after different final surface treatments", Micros. Res. Tech. vol. 81:973-979 (2018).
Martins et al., "Outcome of Er,Cr:YSGG laser-assisted treatment of teeth with apical periodontitis: A blind randomized clinical trial", Photomedicine and Laser Surgery, vol. 32(1):3-9, (2014).
Martins et al., "Efficacy of Er,Cr:YSGG laser with endodontical radial firing tips on the outcome ofendodontic treatment: blind randomized controlled clinical trial with six-month evaluation", Lasers Med Sci vol. 28:1049-1055 (2013).
Matsuoka et al., "Morphological study of the Er,Cr:YSGG laser for root canal preparation inmandibular incisors with curved root canals", Photomedicine and Laser Surgery, vol. 23(5):480-484 (2005).
Minas et al., "In vitro investigation of intra-canal dentine-laser beam interaction aspects: II. Evaluation of ablation zone extent and morphology", Lasers Med Sci vol. 25:867-872 (2010).
Nasher et al., "Debris and smear layer removal in curved root canals using the dual wavelength Er,Cr:YSGG/Diode 940 nm laser and the XP_Endoshaper and finisher technique", ResearchGate, https://www.researchgate.net/publication/338755431, Article in Photobiomodulation Photomedicine and Laser Surgery, Jan. 2020.
Nowazesh et al., "Efficacy of root canal preparation by Er,Cr:YSGG laser irradiation with crown-down technique in Vitro", Photomedicine and Laser Surgery, vol. 23(2):196-201 (2005).
Peeters et al., "Efficacy of smear layer removal at the root tip by using ethylenediaminetetraaceticacid and erbium, chromium: Yttrium, candium, and gallium garnet laser", Basic Research—Technology, JOE, vol. 37(11):1585-1589 (2011).

(56) References Cited

OTHER PUBLICATIONS

Peeters et al., "Extrusion of irrigant in open apex teeth with periapical lesions following laser-activated irrigation and passive ultrasonic irrigation", Iranian Endodontic Journal, vol. 13(2):169-175 (2018).
Peeters et al., "Measurement of pressure changes during laser-activated irrigant by an erbium,chromium: yttrium, scandium, gallium, garnet laser", Lasers in Medical Science, DOI 10.1007/s10103-014-1605-5, Received Jan. 23, 2014, Springer-Verlag London.
Peeters et al., "Radiographic examination of apical extrusion of root canal irrigants during cavitation induced by Er,Cr:YSGG laser irradiation: an in vivo study", Clin Oral Invest vol. 17:2105-2112 (2013).
Race et al., "Efficacy of laser and ultrasonic-activated irrigation on eradicating a mixed-species biofilm in human mesial roots", Australian Endodontic Journal, vol. 45:317-324 (2019).
Rahimi et al., "Comparison of the effect of Er,Cr-YSGG laser ultrasonic retrograde root-end cavity preparation on the integrity of root apices", Journal of Oral Science, vol. 52(1):77-81 (2010).
Sen et al., "Comparative safety of needle, EndoActivator, and laser-activated irrigation in overinstrumented root canals", Photomedicine and Laser Surgery, vol. 36(4):198-202 (2018).
Soares et al., "Impact of Er,Cr:YSGG laser therapy on the cleanliness of the root canal walls of primary teeth", Basic Research—Technology, JOE, vol. 34(4):474-477 (2008).
Tokuc et al., "The bactericidal effect of 2780 nm Er,Cr:YSGG laser combined with 940 nm diode laserin *Enterococcus faecalis* elimination: A comparative study", Photobiomodulation, hotomedicine, and Laser Surgery, vol. XX(XX):1-6 (2019).
Wang et al., "Evaluation of the bactericidal effect of Er,Cr:YSGG, and Nd:YAG lasers in experimentallyl infected root canals", Basic Research—Biology, JOE, vol. 33(7):830-832 (2007).
Yamazaki et al., "Effects of erbium, chromium:YSGG laser irradiation on root canal walls: A scanning electron microscopic and thermographic study", Journal of Endodontics, vol. 27(1):9-12 (2001).
International Preliminary Report on Patentability and Written Opinion for PCT/US2021/072194, dated May 8, 2023, in 12 pages.
European Search Report in application No. EP 21160099.4, dated Sep. 26, 2022.
European Search Report in application No. EP 201902210.0, dated Jan. 5, 2023.
Thoms, "Detection of intraoral lesions using a fluorescence camera", Proceedings of SPIE, vol. 6137:1-8 (2006).
Vibration definition & meaning, Merriam-Webster, https://www.merriam-webster.com/dictionary/vibration (2023).
Merriam Webster definition of transversal, https://www.merriam-webster.com/dictionary/transversal , (2024).
Examination Communication in European application No. 17201637.0, dated Apr. 2, 2019, in 5 pages.
European Search Report in application No. EP 22216260.4, dated Jul. 12, 2023, in 8 pages.
Extended European Search Report in application No. EP 23178563.5, dated Dec. 6, 2023, in 7 pages.
European Search Report in application No. EP 18789278.1, dated Jan. 24, 2024, in 7 pages.
European Search Report in application No. EP 23214493.1, dated Jun. 11, 2024, in 8 pages.
Biolase's Opening Brief in Support of Its Motion for Leave to File Early Motion for Summary Judgment and for Limited Stay Pending Resolution of Early Motin for Summary Judgment, *Pipstek, LLC* v. *Biolase, Inc.*, Civil Action No. 23-011-JPM, filed Feb. 2, 2024.
Macedo et al., "Cavitation measurement during sonic and ultrasonic activated irrigation", Journal of Endodontics, vol. 40(4):580-583 (2014).
Extended European Search Report in application No. EP 24164011.9, dated Aug. 21, 2024, in 8 pages.
International Search Report and Written Opinion in application No. PCT/US2024/023144, mailed on Sep. 12, 2024, in 22 pages.
Examination Report in Australian application No. 2020277399, dated Oct. 19, 2024, in 3 pages.
Extended European Search Report in application No. EP 24181269, dated Dec. 11, 2024, in 10 pages.
Search Report and Written Opinion in Brazilian application No. BR 112021023338-5, dated Jul. 6, 2025, in 4 pages.

* cited by examiner

APPARATUS AND METHODS FOR TREATING TEETH

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

The present disclosure relates generally to dentistry and endodontics and to apparatus, methods, and compositions for treating a tooth and for monitoring a treatment procedure.

Description of the Related Art

In conventional dental and endodontic procedures, mechanical instruments such as drills, files, brushes, etc. are used to clean unhealthy material from a tooth. For example, dentists often use drills to mechanically break up carious regions (e.g., cavities) in a surface of the tooth. Such procedures are often painful for the patient and frequently do not remove all the diseased material. Furthermore, in conventional root canal treatments, an opening is drilled through the crown or side of a diseased tooth, and endodontic files are inserted into the root canal system to open the canal spaces and remove organic material therein. The root canal is then filled with solid matter such as gutta percha or a flowable obturation material, and the tooth is restored. However, this procedure typically does not remove all organic material from the canal spaces, which can lead to post-procedure complications such as infection. In addition, it can be challenging to support the treatment device throughout the treatment procedure, particularly when large portions of the tooth are diseased or weakened. Accordingly, there is a continuing need for improved dental and endodontic treatments.

SUMMARY

Various non-limiting aspects of the present disclosure will now be provided to illustrate features of the disclosed apparatus, methods, and compositions. Examples of apparatus, methods, and compositions for endodontic treatments are provided.

In one embodiment, an apparatus for treating a tooth or gum tissue is disclosed. The apparatus can include a tooth cap for supporting a treatment device during a treatment procedure. The tooth cap can comprise a platform to support the treatment device. The platform can include an access port to provide a portion of the treatment device with access to a treatment region of the tooth or gum tissue. The tooth cap can also include a wall coupled with and angled relative to the platform, the wall configured to be attached to the tooth or gum tissue during treatment.

In another embodiment, a system for treating a tooth or gum tissue is disclosed. The system can include a treatment device and a tooth cap for supporting the treatment device during a treatment procedure. The tooth cap can include a platform to support the treatment device. The platform can comprise an access port to provide a portion of the treatment device with access to a treatment region of the tooth or gum tissue. A wall can be coupled with and angled relative to the platform. A coupling material can be placed between the wall and the tooth or gum tissue to attach the tooth cap to the tooth, gum tissue, or both during treatment.

In yet another embodiment, a method of treating a tooth or gum tissue is disclosed. The method can include positioning a tooth cap on a tooth with a wall of the tooth cap extending along a side surface of the tooth. The method can further include attaching at least the wall of the tooth cap to a portion of the side surface of the tooth or to gum tissue. The tooth cap can comprise a platform and an access port through the platform. A treatment device can be positioned on the platform. The treatment device can be activated to treat a treatment region of the tooth or gum tissue through the access port.

In another embodiment, a method for cleaning a tooth or gum tissue is disclosed. The method can comprise disposing a treatment device near a treatment region of the tooth or gum tissue such that a portion of the treatment device is in fluid communication with a root canal of the tooth and an outer side surface of the tooth. The treatment device can be activated to substantially clean diseased regions of the root canal and at least one of undesirable dental deposits and a carious region from the outer side surface of the tooth.

In yet another embodiment, a system for monitoring a dental treatment procedure is disclosed. The system can comprise a hardware control unit configured to electrically communicate with one or more sensing elements to be disposed at or near a treatment region of a tooth or gum tissue. The hardware control unit can be configured to receive a signal from the one or more sensing elements, the signal indicative of pressure waves propagating through the tooth or gum tissue. The hardware control unit can be configured to process the signal. The hardware control unit can be configured to match a signature of the processed signal with a signature of a material or object stored in a predetermined library of materials or objects. The hardware control unit can be configured to construct an image of the treatment region based at least in part on the matched signature.

In some embodiments, the system can include a receiver configured to receive pressure waves propagating through the treatment region and to convert the received pressure waves to the signal. The system can also include a transmitter configured to transmit pressure waves through the treatment region. The transmitter and the receiver can be coupled to or formed with a tooth cap. The tooth cap can be configured to attach to the tooth during the treatment procedure.

In another embodiment, a method of monitoring a treatment procedure is disclosed. The method can include receiving a signal from one or more sensing elements, the signal indicative of pressure waves propagating through a tooth or gum tissue. The method can include processing the signal. A signature of the processed signal can be matched with a signature of a material or object stored in a predetermined library of materials or objects. The method can include constructing an image of the treatment region based at least in part on the matched signature.

In yet another embodiment, a method of monitoring a treatment procedure is disclosed. The method can include propagating acoustic energy through a tooth or gum tissue. The method can include receiving a portion of the acoustic energy. The received portion can be converted into a signal. The signal can be processed to determine if the treatment region includes each of healthy dentin, diseased dentin, healthy pulp, and diseased pulp. The method can include creating an image of the tooth or gum tissue based on the processed signal.

For purposes of this summary, certain aspects, advantages, and novel features of certain disclosed inventions are summarized. It is to be understood that not necessarily all such advantages may be achieved in accordance with any particular embodiment of the invention. Thus, for example, those skilled in the art will recognize that the inventions disclosed herein may be embodied or carried out in a manner that achieves one advantage or group of advantages as taught herein without necessarily achieving other advantages as may be taught or suggested herein. Further, the foregoing is intended to summarize certain disclosed inventions and is not intended to limit the scope of the inventions disclosed herein.

BRIEF DESCRIPTION OF THE DRAWINGS

The foregoing and other features, aspects, and advantages of the embodiments of the apparatus and methods of cleaning teeth are described in detail below with reference to the drawings of various embodiments, which are intended to illustrate and not to limit the embodiments of the invention. The drawings comprise the following figures in which.

Figure 1:
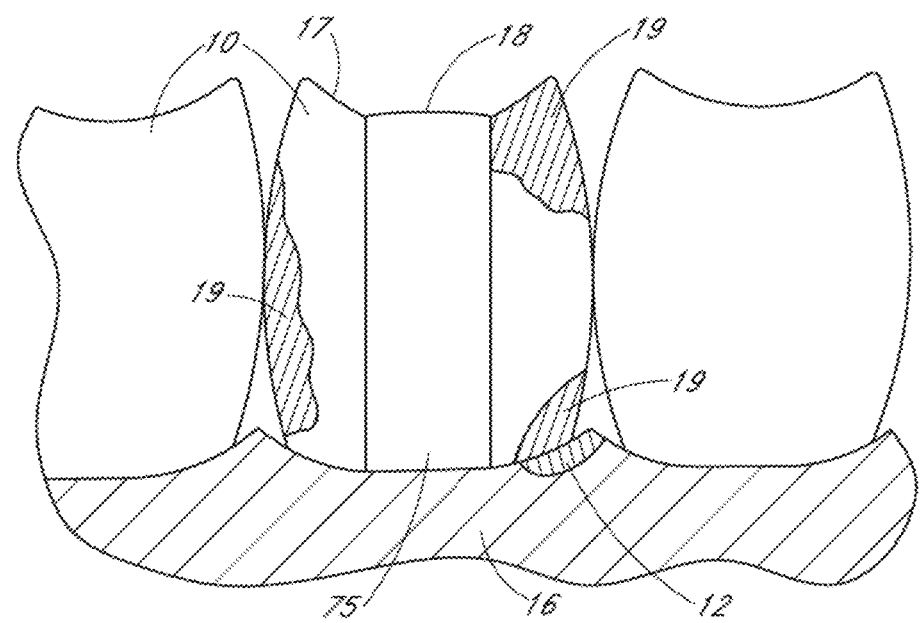
FIG. 1 is a schematic side sectional view of one or more teeth and gum tissue having diseased areas to be treated, according to various embodiments disclosed herein.

Throughout the drawings, reference numbers may be re-used to indicate a general correspondence between referenced elements. The drawings are provided to illustrate example embodiments described herein and are not intended to limit the scope of the disclosure.

DETAILED DESCRIPTION

The present disclosure describes apparatus, methods, and compositions for performing dental and/or endodontic procedures. For example, suitable treatment procedures may be performed with a suitable treatment device at a treatment region in the mouth of a patient, such as at a particular treatment tooth and/or surrounding gum tissue. To support the treatment device, a tooth cap can be applied or attached to the treatment region. The tooth cap can support the tooth and/or the treatment device through the treatment to prevent the tooth from collapsing (e.g., due to decayed or weakened portions of the tooth) and to help position the treatment device relative to the treatment region. As explained herein, the tooth cap can also act to provide a substantially fluid-sealed region about the treatment region.

Various embodiments disclosed herein can utilize a treatment device to effectively and safely remove unhealthy material from a treatment region of a tooth, e.g., from within the tooth and/or from outside surfaces of the tooth. In particular, the embodiments disclosed herein can remove unhealthy materials, such as unhealthy organic matter, inorganic matter, pulp tissue, caries, stains, calculus, plaque, biofilm, bacteria, pus, decayed tooth matter, and food remnants from the treatment region without substantially damaging healthy dentin or enamel. For example, the disclosed apparatus, methods, and compositions advantageously may be used with root canal cleaning treatments, e.g., to efficiently remove unhealthy or undesirable materials such as organic and/or inorganic matter from a root canal system and/or to disinfect the root canal system. Organic material (or organic matter) includes organic substances typically found in healthy or diseased teeth or root canal systems such as, for example, soft tissue, pulp, blood vessels, nerves, connective tissue, cellular matter, pus, and microorganisms, whether living, inflamed, infected, diseased, necrotic, or decomposed. Inorganic matter includes calcified tissue and calcified structures, which are frequently present in the root canal system. In some embodiments, the root canal can be filled with an obturation material (e.g., a flowable obturation material that can be hardened into a solid or semi-solid state, gutta percha or other solid or semi-solid materials) after treatment of the root canal. A restoration procedure may be reformed to restore the tooth, such as by applying a coronal seal or other restoration material to the tooth.

In some embodiments, a monitoring system can be used to track the progress of the treatment procedure. For example, the monitoring system can identify various types of material in the tooth and can notify the clinician as material is removed. The monitoring system can also monitor the obturation and restoration procedures to ensure that the tooth is properly obturated and/or restored. In some arrangements, the monitoring system can also identify dental instruments or tools that are disposed in the treatment region.

FIG. 1 is a schematic side sectional view of one or more teeth 10 and gum tissue 16 having diseased areas to be treated, according to various embodiments disclosed herein. Teeth and gum tissue can be diseased or damaged at various portions and surfaces. For example, the tooth 10 may have regions of decay 19 on outer surfaces of the tooth 10 and/or in the interior of the tooth 10. For example, decay 19 (such as caries) may form on an occlusal surface 17 or on side surfaces of the tooth. Undesirable dental deposits such as plaque may also form on exterior surfaces of the tooth 10. A clinician can use a suitable treatment device to clean decay (e.g., carious regions) or undesirable deposits (such as plaque, calculus, biofilms, etc.) from outside surfaces and/or the interior of the tooth 17. The root canals of the tooth 10 may also include decayed material and/or diseased regions. A clinician can form an endodontic access opening 18 to access a pulp chamber or tooth chamber 75 and root canals of the tooth 10 to clean the canal spaces. Moreover, the gum tissue 16 may comprise diseased gum regions 12. The clinician can clean the diseased gum regions 12 using a suitable treatment device. Thus, the clinician can clean decayed regions 19 from a tooth 10, undesirable dental deposits from a tooth 10, and/or diseased gum regions 12 by activating a suitable treatment device at a treatment region of the tooth 10 or gums 16.

When the clinician positions the treatment device near the treatment region on the tooth or gums, it can be important to provide a stable platform for the treatment device that aligns and/or supports the treatment device at a suitable position relative to the treatment region. For example, for a root canal treatment, it can be desirable to provide a relatively stable platform for the treatment device that helps to align the treatment device with the endodontic access opening 18 of the tooth 10. For treating carious regions or dental deposits on outer surfaces of the tooth, or for treating diseased gum tissue, it can be desirable to accurately maintain the treatment device near the treatment region at an orientation desired by the clinician. Thus, various embodiments disclosed herein can support and/or align the treatment device during a dental procedure.

Furthermore, it can be important to substantially prevent the exchange of undesirable fluids (e.g., air, water, saliva, various treatment fluids, etc.) between the treatment region and the remainder of the patient's mouth. For example, it can be important to prevent saliva or other liquids from entering the treatment region during the procedure. Saliva contains bacteria and other potentially undesirable substances that may cause infection in the treatment region. Furthermore, various embodiments disclosed herein can prevent treatment fluids or device components from moving from the treatment region into the mouth, which can damage the patient or otherwise cause discomfort to the patient. The embodiments of the tooth cap disclosed herein can also enable effective evacuation of waste treatment fluid by providing a substantially sealed treatment region.

Moreover, some teeth may have serious decay such that decayed or otherwise structurally weak regions may collapse or break when the clinician applies pressure to the tooth 10 or contacts the tooth 10 with the treatment device. If the decayed or weak region collapses, the treatment device may become misaligned and/or the treatment procedure may be disrupted. Furthermore, when decayed regions collapse or break away, fluids may pass from the mouth to the treatment region, or vice versa. For example, saliva or other liquids may pass through the collapsed decay and into the treatment region, increasing the risk of infection, as explained above. Fluids may similarly exit the treatment region through the collapsed decay, causing discomfort and/or harm to the patient.

Accordingly, it can be advantageous to provide a tooth cap that maintains a stable support surface or platform for a treatment device during a treatment procedure. The tooth cap can advantageously support and/or align the treatment device with the treatment region even when the tooth to be treated is seriously decayed. The tooth cap can provide a suitable platform for any appropriate treatment device. For example, the tooth caps disclosed herein can support and/or provide access to the treatment region for a variety of treatment devices, including pressure wave generators and fluid platforms that support pressure wave generators. Example of pressure wave generators (which may comprise a liquid jet device) and fluid platforms that may be used in conjunction with the tooth caps disclosed herein may be found in U.S. Patent Publication No. 2007/0248932 A1, U.S. Patent Publication No. 2011/0117517, U.S. Patent Publication No. 2012/0237893, U.S. Patent Publication No. 2014/0099597 A1, International Patent Application No. PCT/US2013/032635 (filed Mar. 15, 2013 and published as WO 2013/142385), U.S. patent application Ser. No. 14/137,937 (filed Dec. 20, 2013), and U.S. patent application Ser. No. 14/172,809 (filed Feb. 4, 2014), each of which is hereby incorporated by reference herein in its entirety and for all purposes. Other types of treatment devices may also be used with the tooth caps disclosed herein. For example, dental drills, files, burrs, lasers, fluid jets, needles, syringes, irrigation systems, ultrasonic devices, sonic devices, and other suitable treatment devices may be used with the tooth caps disclosed herein.

I. Overview of Various Disclosed Systems

Figure 2A:
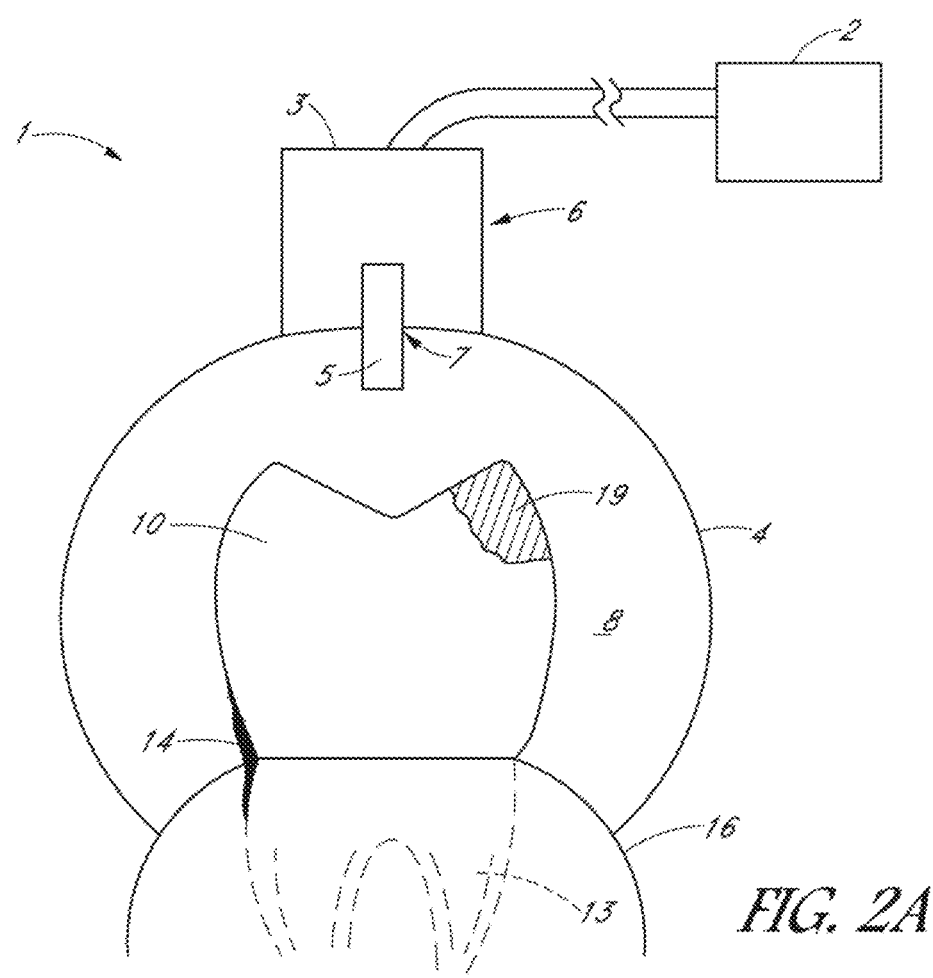
FIGS. 2A-2F are schematic side views of a treatment system in accordance with various embodiments.

FIG. 2A is a schematic side view of a treatment system 1 in accordance with some embodiments. The treatment system 1 can include a console 2 and a treatment device 6 in fluid and/or electrical communication with the console 2. The console 2 can include a user interface, a control system, and various fluid and/or electrical systems configured to control the operation of the treatment device 6 during a treatment procedure. The control system can include any suitably type of processor and non-transitory computer readable memory having instructions stored thereon that are encoded to control the operation of the system 1. For example, the clinician can activate the treatment device 6 using the console 2 and can adjust various treatment parameters during treatment (such as the supply of treatment fluid, amount of power supplied to the treatment device, etc.).

As explained herein, the treatment device 6 can be any suitable treatment device. For example, the treatment device 6 can include a tooth coupler 3 configured to couple to or contact a tooth 10 or treatment region and a pressure wave generator 5 configured to treat the tooth 10. The pressure wave generator 5 can be any suitable pressure wave generator, such as a liquid jet device, a laser, a mechanical stirrer, an ultrasonic transducer, etc. The tooth coupler 3 disclosed herein can be any suitable structure or housing configured to couple to the treatment region for a treatment procedure. As used herein, "couple" or "tooth coupler" is meant to include arrangements in which there is a connection with the tooth 10 or tooth cap, as well as arrangements in which the coupler 3 is placed against or in the tooth or tooth cap and is held by the clinician in that position. The pressure wave generator 5 can be coupled to and/or disposed in or on the tooth coupler 3. The tooth coupler 3 can comprise a distal portion of a handpiece in some arrangements. The clinician can manipulate the handpiece relative to the treatment region. In other arrangements, the tooth coupler 3 can comprise a sealing cap configured to contact or connect to a treatment region of the tooth or gums. Although the treatment device 6 disclosed herein is described in some embodiments as comprising a pressure wave generator, in other embodiments, the treatment device 6 can comprise any suitable dental apparatus, such as a file, drill, needle, syringe, burr, etc. Additional details of the console 2, tooth coupler 3, and other components may be found in U.S. patent application Ser. No. 14/172,809 (filed Feb. 4, 2014), which is incorporated by reference herein.

The tooth 10 and gum tissue 16 shown in FIG. 2A can have diseased regions at various portions. For example, dental deposits 14 (such as biofilm, plaque, calculus, etc.) may be formed on surfaces of the tooth 10 and/or gum tissue 16. The tooth 10 may also have regions of decay 19 (e.g., carious regions) on outer and/or inner portions of the tooth 10. The root canal 13 may also comprise diseased tissue or decay. It can be advantageous to clean each of these diseased regions (e.g., dental deposits 14, carious regions 19, and/or diseased regions of the root canals) quickly, effectively and without harming the patient. Furthermore, as explained herein, it can be advantageous to provide a stable platform for the treatment device 6 and to prevent fluid from entering and/or leaving the treatment region.

Accordingly, as shown in FIG. 2A, the system 1 can include a tooth cap 4 configured to attach to the treatment region (e.g., the tooth 10 and/or gums 16). The treatment region of FIG. 2A may include the entire tooth 10 and surrounding gum tissue 16. Accordingly, the tooth cap 4 may enclose substantially the entire tooth 10 and portions of the surrounding gum tissue 16. Furthermore, as used in each embodiment disclosed herein, a tooth cap 4 can be used to cap or cover one or more teeth, e.g., a portion of a tooth, an entire tooth, all or part of adjacent teeth, and/or a plurality of teeth. In some embodiments, a coupling material can be used to attach the ends of the tooth cap 4 to the gums 16 to enclose the tooth 10 and portions of the gum tissue 16. When the tooth cap 4 is coupled to or attached to the tooth 10, a space 8 or chamber can be formed between the tooth cap 4 and the tooth 10 and/or gums 16. In some embodiments, the space 8 can be filled with a coupling material to provide support to the tooth 10 and/or gums 16. Indeed, the coupling material can be used in conjunction with any of the tooth cap embodiments disclosed herein. In other embodiments, the space 8 can comprise an air gap between the tooth cap 4 and tooth 10 and/or gums 16. In still other embodiments, the space 8 can be substantially filled with a liquid. In other embodiments, the tooth cap 4 can be coupled closely about or next to the tooth 10 such that there is little to no space between the tooth cap 4 and tooth 10 and/or gums 16. The tooth cap 4 can accordingly help to at least partially define a treatment region of the tooth 10 and/or gum tissue 16 that is to be treated during a procedure. For example, the tooth cap 4 shown in FIG. 2A can help to define a treatment region that includes the tooth 10 and portions of the surrounding gum tissue 16.

The tooth cap 4 can comprise an access port 7 configured to provide a portion of the treatment device 6 with access to the treatment region of the tooth 10 and/or gum tissue 16. For example, the access port 7 can comprise a hole or opening in the tooth cap 4 sized and shaped to receive the pressure wave generator 5. For other types of treatment devices (such as files, drills, etc.), the access port 7 can receive a portion of that treatment device. In some embodiments, the portion of the treatment device 6 extending through the access port 7 can be activated to treat the treatment region (e.g., clean the tooth 10 and/or gums 16). For example, for treatment devices that comprise a pressure wave generator 5, the pressure wave generator 5 can be activated to generate pressure waves through the space 8 (which may comprise a fluid or other coupling material) to clean the diseased regions of the tooth 10 and/or gums 16. Advantageously, the pressure wave generator 5 may clean any diseased regions that are in suitable fluid communication with the pressure wave generator 5. For example, if the space 8 is substantially filled with a suitable medium (such as a treatment fluid), the pressure waves can propagate through the space 8 and can clean the decayed carious region 18, the undesirable deposits 14 and diseased material in the root canal 13 in a single treatment procedure. Indeed, the pressure waves generated by the pressure wave generator 5 may clean diseased regions that are not detected by the clinician beforehand. Further, if the clinician suspects, but does not verify, that portions of a tooth are diseased or decayed, the clinician can apply the tooth cap 4 over the suspected diseased regions, and the pressure wave generator 5 can clean or treat diseased regions while maintaining healthy portions of the tooth or gums. The embodiments disclosed herein can effectively clean the diseased regions (e.g., diseased portions of the root canals, carious regions on outer surfaces of the tooth, dental deposits on outer surfaces of the tooth, diseased gum tissue, etc.) from the treatment region simultaneously, e.g., during a period of time when the treatment device 6 (e.g., pressure wave generator 5) is activated. "Simultaneously" does not necessarily mean that the cleaning is done at the same moment in time; rather, simultaneously cleaning the diseased regions means that the cleaning is performed during the treatment procedure, e.g., when the treatment device is activated to clean the treatment region by way of the access port 7. Although various figures disclosed herein illustrate a portion of the treatment device 6 passing through the access port 7, it should be appreciated that in other embodiments, the treatment device 6 is disposed entirely outside the access port 7 and tooth cap 4. In such arrangements, for example, the access port 7 may provide fluid communication between the treatment device (which may include a pressure wave generator 5) and the treatment region in the tooth cap 4.

The tooth cap 4 shown in FIG. 2A can provide support and can help to align the treatment device 6 with the treatment region. For example, the treatment device 6 (e.g., the tooth coupler 3) can contact and/or rest against the tooth cap 4, and the access port 7 can be positioned to align the pressure wave generator 5 at a desired location relative to the treatment region (which may include the tooth 10 and/or gums 16). The tooth cap 4 can also be configured such that, if the diseased regions (such as the carious region 19) breaks away or collapses during treatment, the treatment device 6 remains suitably supported relative to the treatment region and fluid is prevented from entering and/or leaving the treatment region. The tooth cap 4 described throughout this Application can be a separate component from the treatment device 6 and can act to prepare a treatment region of the tooth 10 and/or gums 16 for a treatment procedure. After the procedure, the tooth cap 4 can be easily removed from the tooth 10 by pulling the tooth cap 4 away from the tooth 10 and/or gums 16.

Figure 2B:
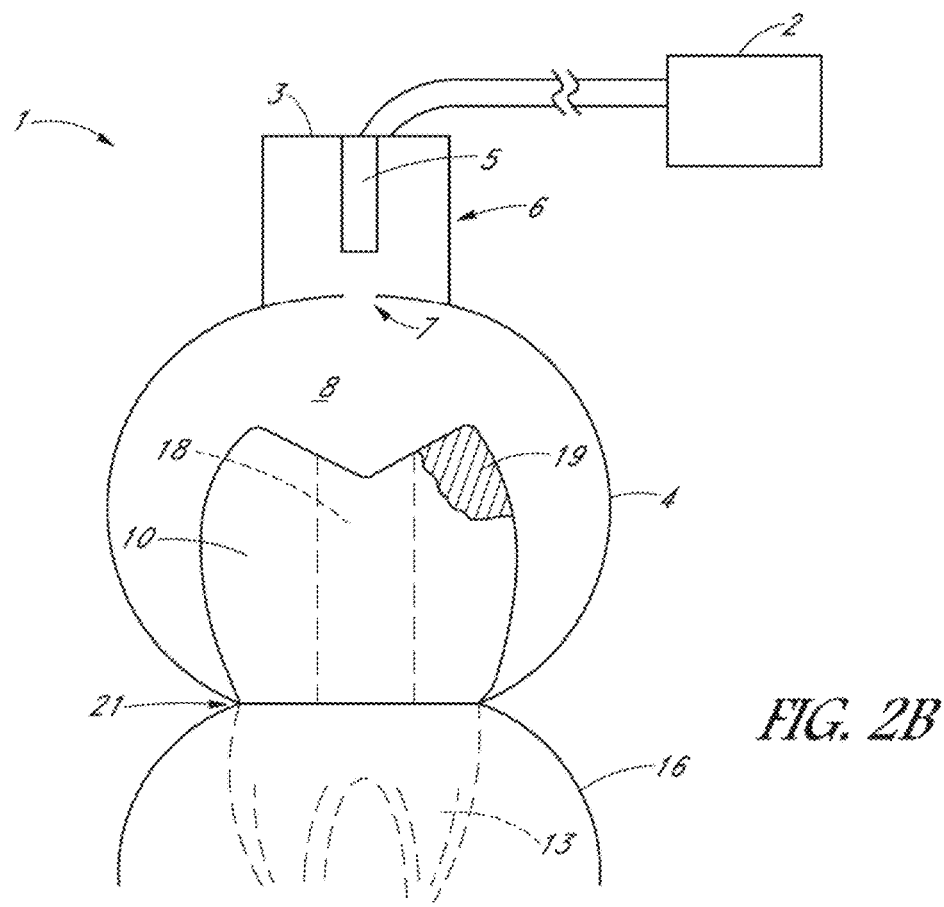

FIGS. 2B-2F are schematic side views of the system 1 configured for use with different treatment regions defined at least in part by the tooth cap 4. For example, FIG. 2B illustrates the system configured to treat substantially only diseased regions of the tooth 10. As with FIG. 2A, the system 1 can include a console 2 and a treatment device 6 coupled to the console 2. The treatment device 6 can be any suitable treatment device, as explained above. In the illustrated embodiment, the treatment device 6 can include a tooth coupler 3 and a pressure wave generator 5. The tooth cap 4 can be positioned about the tooth 10 and a distal end 21 of the tooth cap 4 can couple at or near the junction between the tooth 10 and gums 16. As shown in FIG. 2B, the pressure wave generator 5 can be disposed outside the access port 7 and the tooth cap 4 in some embodiments. In such embodiments, the pressure wave generator 5 can generate pressure waves that propagate through the access port 7 and into the treatment region in the tooth cap 4.

As shown in FIG. 2B, the tooth cap 4 can be attached to the tooth 10 such that substantially only the tooth 10 to be treated is within the tooth cap 4. The space 8 may be filled with a coupling material or a treatment fluid. The pressure wave generator 5 can be activated to clean diseased regions within the treatment region defined at least in part by the tooth cap 4. For example, the treatment device 6 can be activated to clean the carious regions 19 on or in the tooth 10, as well as diseased regions in the root canals 13. Indeed, as shown in FIG. 2B, the pressure wave generator can be in fluid communication with the carious region 19 on an outer surface of the tooth 10 as well as diseased regions of the root canal 13 by way of the access port 7. When activated, the pressure wave generator 5 can generate sufficient energy to remove diseased regions from the root canal 13 and the outer and inner surfaces of the tooth 10. As explained above, the pressure wave generator 5 can clean diseased regions that the clinician does not previously discover. For example, diseased regions or deposits in the interior of the tooth that fluidly communicate with the access opening 18 may be cleaned during the treatment procedure, as well as diseased regions or deposits on outer surfaces of the tooth. The system 1 can be configured to protect healthy tissue while removing diseased portions of the tooth 10 and/or gums 16.

Figure 2C:
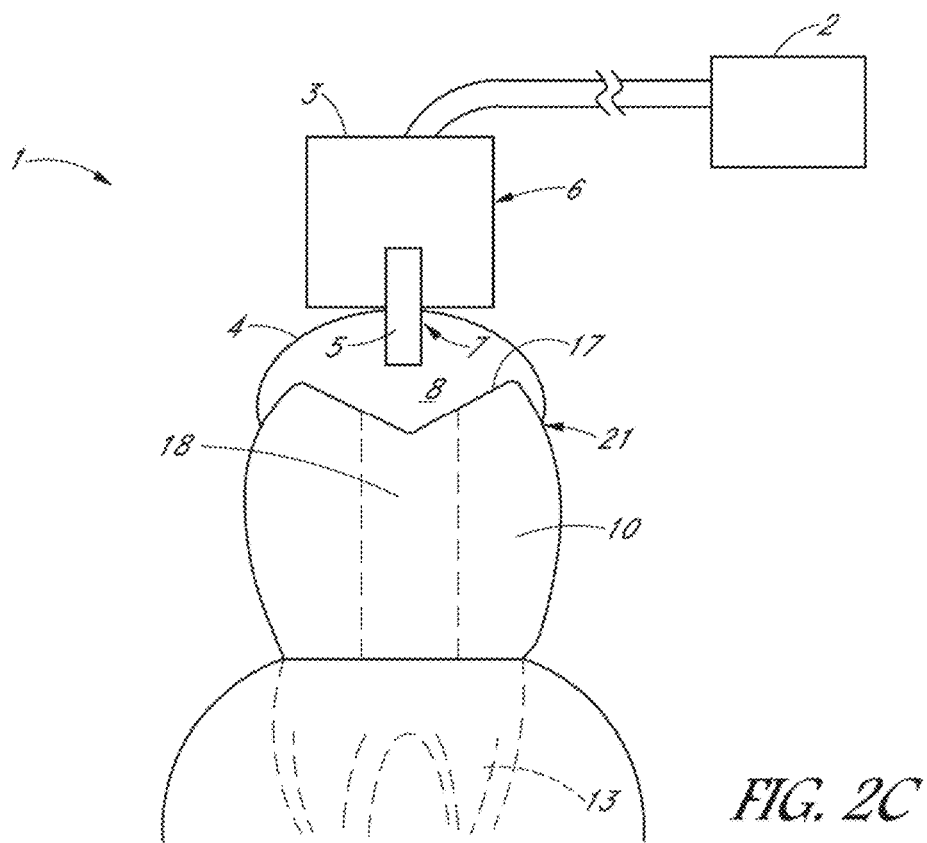

FIG. 2C illustrates the system 1 configured to treat substantially only a portion of the tooth 10, e.g., the occlusal surface 17 and/or the root canal 13 of the tooth 10. As with the embodiment of FIGS. 2A-2B, the system 1 can include the console 2 and the treatment device 6 in communication with the console 2. The treatment device 6 can comprise any suitable treatment device, such as a pressure wave generator 5 coupled with a tooth coupler 3. In the arrangement of FIG. 2C, the tooth cap 4 can be disposed only over a portion of the tooth 10. Indeed, a distal end 21 of the tooth cap may be coupled or attached to an outer surface of the tooth 10, e.g., on a side surface of the tooth 10 below the occlusal surface 17, as shown in the example of FIG. 2C. As explained above, the tooth cap 4 can support the treatment device 6 and can prevent fluid from entering and/or leaving the treatment region. The pressure wave generator 5 can extend through the access port 7. Alternatively, the pressure wave generator 5 can be disposed in the tooth coupler 3 outside the access port 7. When activated, the pressure wave generator 5 can generate pressure waves having sufficient energy to clean diseased regions from the root canal 13, interior regions of the tooth 10 in communication with the endodontic access opening 18, and/or the occlusal surface 17 of the tooth 10.

Figure 2D:
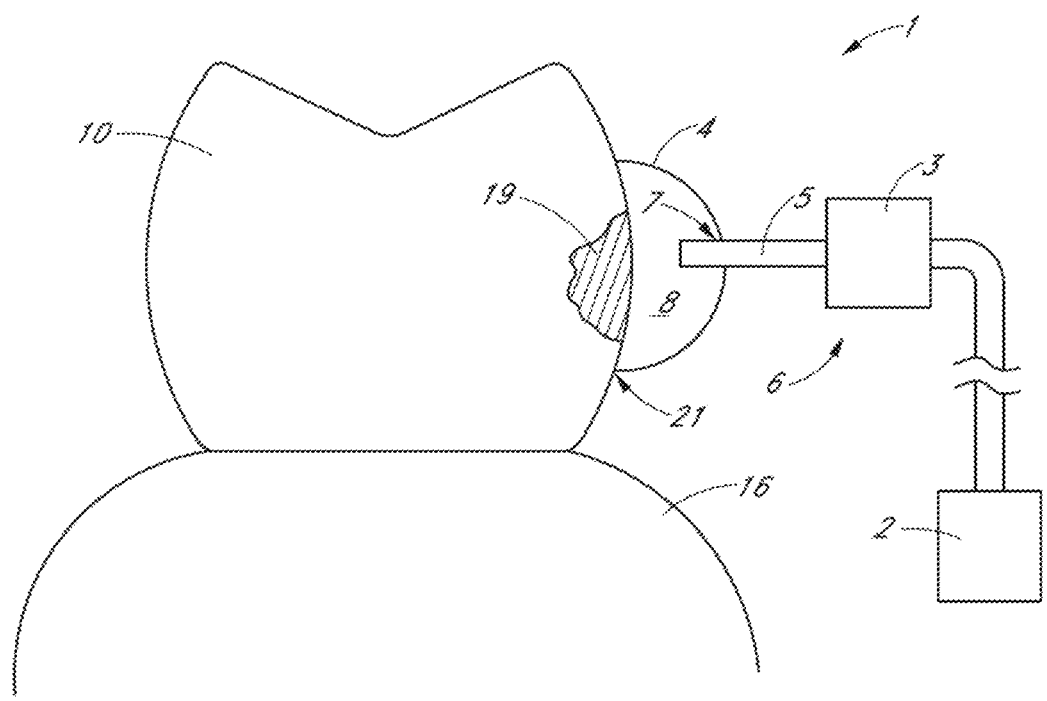

FIG. 2D illustrates the system 1 configured to treat a diseased or carious region 19 on a side surface of the tooth 10. As with the embodiments disclosed above, the system 1 can include a console 2 and a treatment device 6 coupled with the console 2. The treatment device 6 can comprise any suitable treatment device, such as a pressure wave generator 5 coupled with a tooth coupler 3. In the arrangement of FIG. 2D, the tooth cap 4 can be disposed over the carious region 19 on the side surface of the tooth 10. For example, the distal end 21 of the tooth cap 4 can be attached or coupled to the side surface such that the tooth cap 4 encloses a portion of the tooth 10 that includes the carious region 19. The pressure wave generator 5 can be disposed through the access port 7 and can be activated to clean the carious region 19. In other embodiments, the pressure wave generator 5 can be disposed outside the access port 7 and tooth cap 4.

Figure 2E:
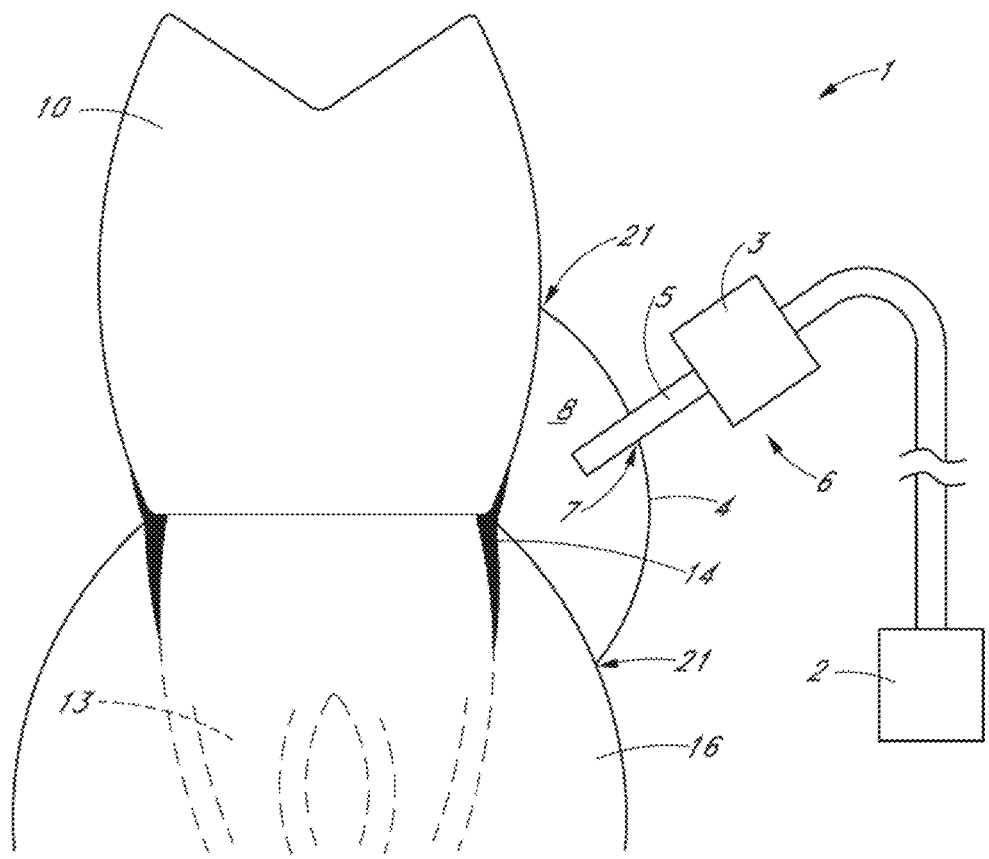

FIG. 2E is a schematic side sectional view of the system 1 configured to treat a portion of the tooth 10 and surrounding gum tissue 16. The system 1 can include a console 2 and a treatment device 6 coupled with the console 2. The treatment device 6 can comprise any suitable treatment device, such as a pressure wave generator 5 coupled with a tooth coupler 3. The pressure wave generator 5 can be disposed through the access port 7; alternatively, the pressure wave generator can be disposed outside the access port 7 and tooth cap 4. The tooth cap 4 can be attached to a portion of the tooth 10 and a portion of the gum tissue 16. For example, a distal end 21 of the tooth cap 4 can be attached or coupled to a side surface of the tooth 10 as well as the gum tissue 16. The tooth cap 4 can therefore enclose portions of the tooth 10 and gums 16 to be treated. For example, the side surface of the tooth 10 may include carious regions or undesirable deposits, and the gum tissue 16 may also comprise diseased regions. As shown in FIG. 2E, for example, undesirable deposits 14 may be formed on outer surfaces of the tooth 10 and the gum tissue 16. The tooth cap 10 can be positioned to enclose the undesirable deposits 14. The treatment device 6 can be activated to clean the deposits 14 from the tooth 10 and gum tissue 16. As with the above embodiments, the tooth cap 4 can provide a stable platform for the treatment device 6 and can prevent fluid from entering and/or leaving the treatment region defined at least in part by the tooth cap 4. Furthermore, if decayed portions of the tooth 10 collapse, the tooth cap 4 can maintain the desired alignment of the treatment device 6 relative to the treatment region.

Figure 2F:
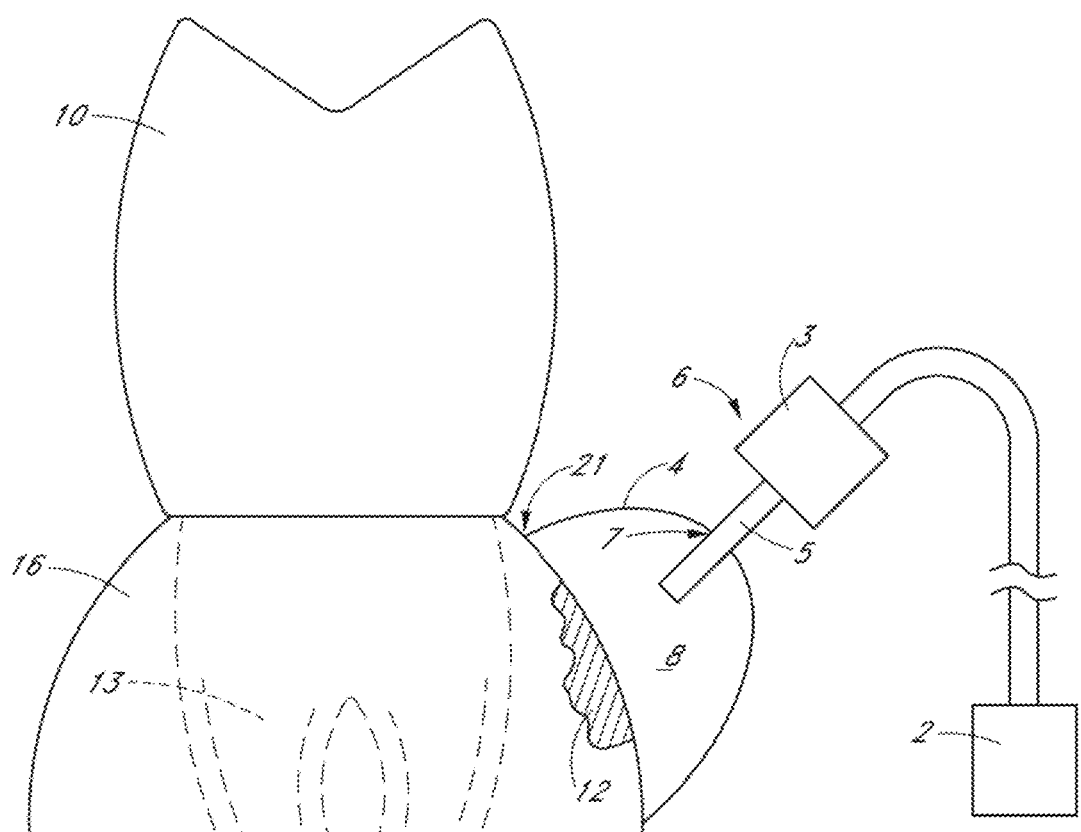

FIG. 2F is a schematic side sectional view of the system 1 configured to treat gum tissue 16. The system 1 can include a console 2 and a treatment device 6 coupled with the console 2. The treatment device 6 can comprise any suitable treatment device, such as a pressure wave generator 5 coupled with a tooth coupler 3. As shown in FIG. 2F, the pressure wave generator 5 can be disposed through the access port 7; alternatively, the pressure wave generator can be disposed outside the access port 7 and tooth cap 4. The tooth cap 4 can be attached to only the gum tissue 16 in FIG. 2F to enclose diseased gum regions 12. For example, the distal end 21 of the tooth cap 4 can be attached or couple to the gum tissue 16 surrounding the diseased gum regions 12. The treatment device 6 can be activated to clean or treat the diseased gum regions 12. As with the embodiments of FIGS. 2A-2E, the tooth cap 4 can provide a stable platform for the treatment device 6 and can substantially prevent fluid from entering and/or leaving the treatment region.

II. Examples of Tooth Caps

Figure 3A:
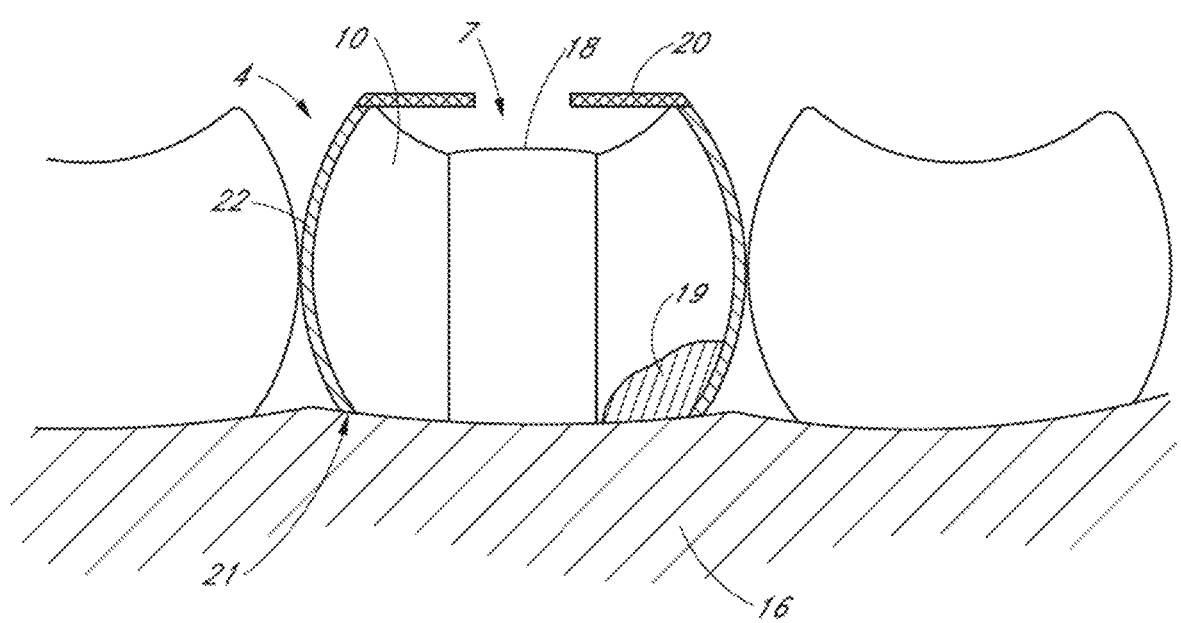
FIG. 3A is a schematic side sectional view of a tooth cap in accordance with one embodiment.

FIG. 3A is a schematic side sectional view of a tooth cap 4 in accordance with one embodiment. The tooth cap 4 cap be coupled or attached to a tooth 10 such that the tooth cap 4 is disposed about much of the outer surface of the tooth 10, as shown in FIG. 3A. As used herein, a tooth cap 4 can be used to cap or cover one or more teeth, e.g., a portion of a tooth, an entire tooth, all or part of adjacent teeth, and/or a plurality of teeth. The tooth cap 4 can include a platform 20 and a wall 22 coupled with and/or extending from the platform 20. The wall 22 can be angled relative to the platform 20 at a suitable angle. For example, the wall 22 can be transverse or at a different direction than the platform 20. The platform 20 can be configured to support a treatment device, such as the treatment device 6 described above. For example, in some treatments (e.g., root canal cleaning procedures), the platform 20 can comprise a substantially planar surface upon which the treatment device can be positioned by the clinician. In other embodiments, the platform 20 can comprise an angled wall (e.g., angled inwardly into a chamber of the tooth 10). In some embodiments, the clinician can contact the treatment device with the platform 20 such that the clinician presses the treatment device against the platform 20 during treatment. In such embodiments, the clinician can manipulate the treatment device during the procedure to orient or move the device as desired. In other embodiments, the clinician can attach the treatment device to the platform 20, e.g., by way of an adhesive. The wall 22 can extend along a side surface of the tooth 10, e.g., along a proximal surface, a facial surface (e.g., a buccal surface or a labial surface) and/or a lingual surface of the tooth. In some embodiments, the wall 22 can extend over a substantial height of the side surface, e.g., at least 30% of the height, at least 50% of the height, at least 90% of the height, etc. Accordingly, the tooth cap 4 can be configured to attach to the tooth 10 or gum tissue 16. For example, the wall 22 can be configured to attach to the tooth or gums using a coupling material or a sealant. The wall 22 and platform 20 can be angled relative to one another and can be sized and shaped such that the wall extends along a side surface of the tooth (e.g., a facial surface, a lingual surface, a proximal surface, etc.). When coupled to the tooth, the wall 22 can be positioned adjacent the tooth 10 or gums 16 along a side surface of the tooth. The platform 20 can be positioned adjacent an occlusal surface of the tooth 10.

The access port 7 may be formed through the platform 20 to provide access to the treatment region. As explained herein, in some embodiments, a portion of the treatment device (such as a pressure wave generator 5) may be inserted through the access port 7 formed through the platform 20 (see FIG. 2A). In other embodiments, the entire treatment device (e.g., which may include a pressure wave generator 5) may remain outside the access port 7, and the access port 7 may provide fluid communication between the treatment device 6 and the treatment region of the tooth 10 and/or gums 16 (see FIG. 2B).

The wall 22 can comprise any suitable material. For example, as shown in FIG. 3A, the wall 22 can comprise an elastic and/or plastic material, such as a biocompatible rubber or polymer. The wall 22 can be stretched about the tooth 10 and may conform to the tooth 10 to provide support during treatment. For example, prior to a procedure, the clinician may stretch the distal end 21 of the tooth cap 4 about the tooth 4 and may advance the tooth cap 4 over the tooth 10 until the distal end 21 reaches the gum tissue 16, e.g., at or near the cementoenamel junction or CEJ. The wall 22 of the tooth cap 4 may relax to conform to the shape of the tooth 10.

The clinician can position a treatment device (such as the treatment device 6 disclosed above) on the platform 20 of the tooth cap 4. The treatment device can be activated to treat (e.g., clean) the treatment region in the tooth cap 4 by communicating with the treatment region through the access port 7. For example, in some embodiments, a portion of the treatment device (such as a pressure wave generator) may be disposed through the access port 7 and activated to treat the treatment region. In other embodiments, the treatment device may be disposed outside the access port 7 and tooth cap 4, and can be activated to treat the treatment region through the access port 7. For example, a pressure wave generator can be activated, and pressure waves can propagate through the access port 7 to clean diseased regions in the treatment region (e.g., on outer or inner portions of the tooth and/or in the root canal spaces).

The tooth cap 4 shown in FIG. 3A can advantageously provide a stable support surface for a suitable treatment device during a treatment procedure. In particular, the platform 20 can be shaped for the desired treatment device to position the treatment device at a desired position relative to the treatment region. Further, the tooth cap 4 can substantially seal the treatment region within the tooth cap 4 such that fluid is substantially prevented from entering and/or leaving the treatment region during a procedure. For example, the wall 22 may tightly conform or attach to the tooth 10 to prevent fluids from entering the tooth cap 4. Furthermore, if the carious region 19 of the tooth 10 were to break or collapse during the procedure, the wall 22 of the tooth cap 4 can act to support the tooth and decayed region such that the tooth does not collapse and/or cause the treatment device to be misaligned or moved during treatment. In addition, if the carious region 19 breaks or collapses, the tooth cap 4 can prevent the exchange of fluid between the treatment region in the tooth cap 4 and the rest of the patient's mouth through the collapsed decayed region 19.

Figure 3B:
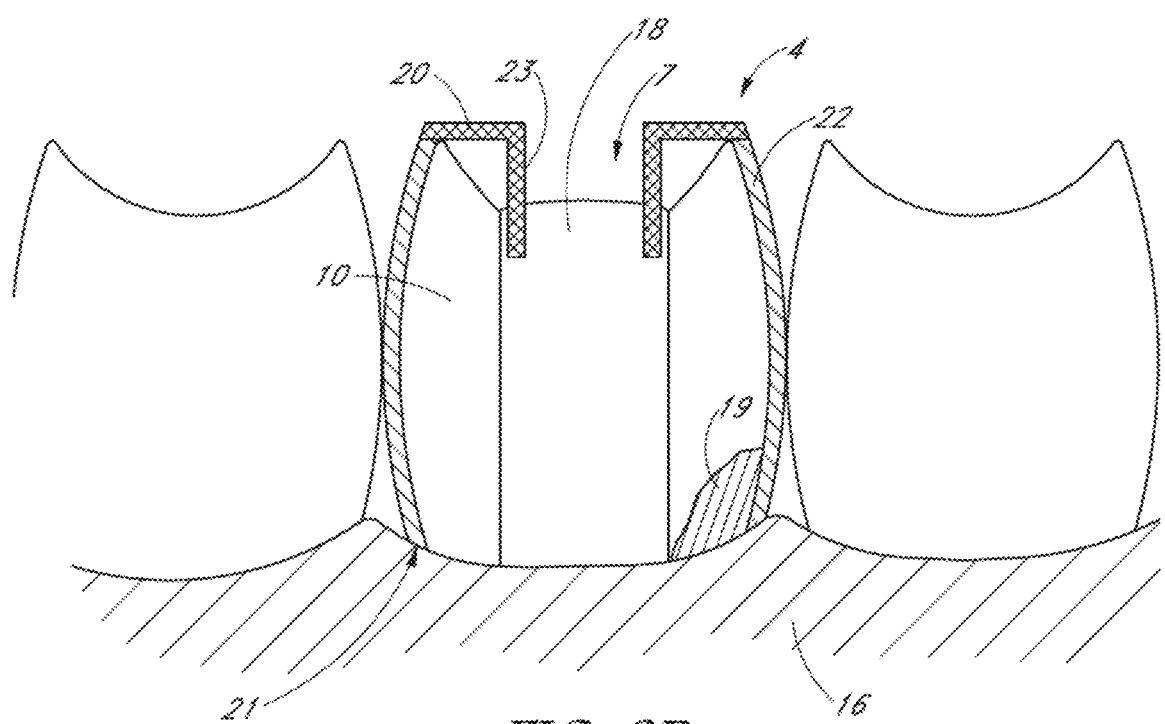
FIG. 3B is a schematic side sectional view of a tooth cap coupled to a tooth, in accordance with another embodiment.

FIG. 3B is a schematic side sectional view of a tooth cap 4 coupled to a tooth 10, in accordance with another embodiment. The tooth cap 4 may be similar to the tooth cap 4 shown in FIG. 3A. For example, the tooth cap 4 can comprise a platform 20, an access port 7 through the platform 20, and a wall 22 extending from the platform 20. The wall 22 can comprise an elastic or plastic material (such as rubber), and can conform to the shape of the tooth 10. In addition, the tooth cap 4 can include an alignment stud 23 coupled to or formed with the platform 20. In some embodiments, the alignment stud 23 can be formed about and/or can at least partially define the access port 7. The alignment stud 23 can be shaped to extend into the endodontic access opening 18 to substantially align the platform 20, and therefore the treatment device 6, relative to the treatment region (e.g., including the root canals 13). Thus, the clinician can stretch the wall 22 about the tooth 10 and can advance the distal end 21 of the wall 22 to near the gums 16. The clinician can move the platform 20 and alignment stud 23 such that the stud is disposed in the access opening 18 of the tooth 10. The clinician can position a treatment device (see FIGS. 2A-2F) on the platform 20 to conduct a treatment procedure.

Figure 4:
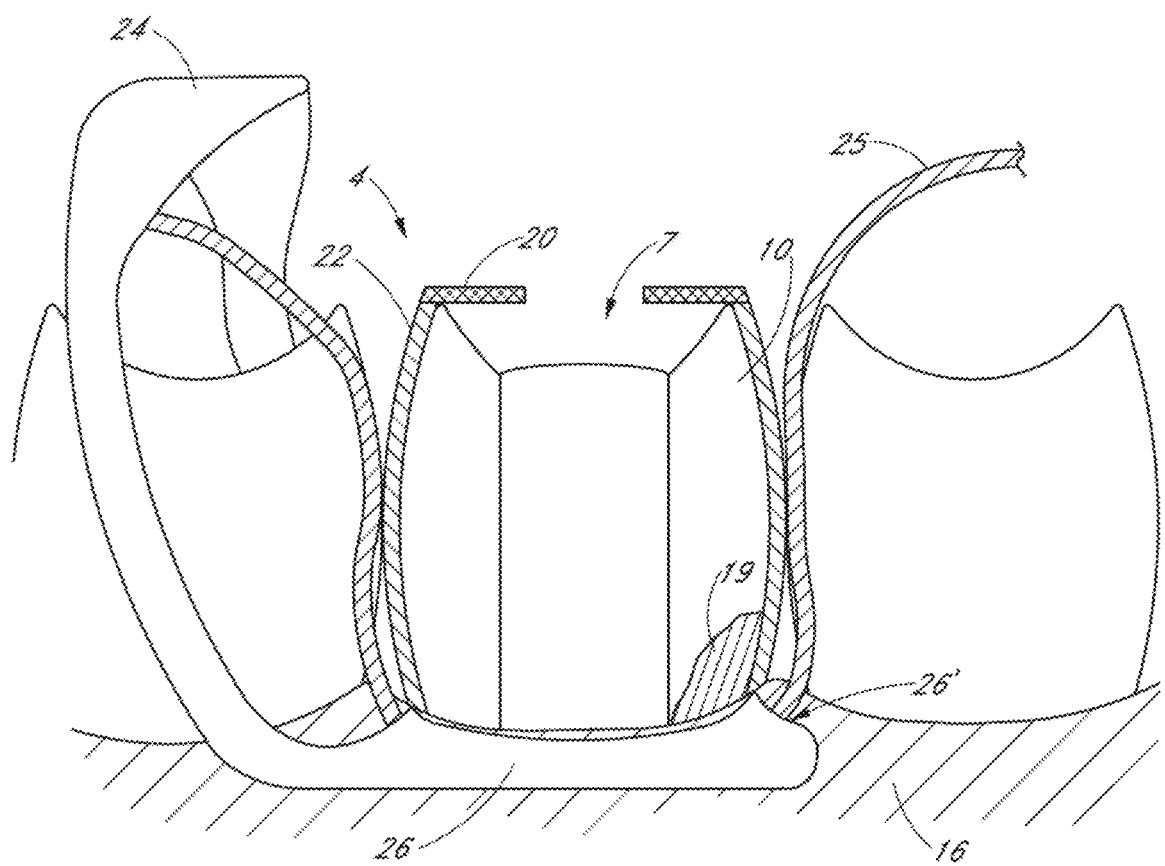
FIG. 4 is a schematic side sectional view of a tooth cap comprising a dam configured to protect the treatment region.

FIG. 4 is a schematic side sectional view of a tooth cap 4 comprising a dam 25 configured to protect the treatment region. The tooth cap 4 can be similar to the tooth cap 4 disclosed in FIG. 3A above. For example, the tooth cap 4 can include a platform 20, an access port 7, and a wall 22. In the embodiment of FIG. 4, however, the wall 22 can be integrally formed with or coupled to the dam 25. For example, in some embodiments, the wall 22 can be part of a rubber dam material or other suitable dam composition. A clamp 24 can bear against the dam 25 to secure the dam 25 to the tooth and/or gum tissue 16. The wall portion 22 of the dam 25 can extend from the platform 20 along the side of the tooth 10 and couple to a clamping portion 26' of a clamp arm 26. The dam 25 can extend from the clamping portion 26' and can be stretched over one or more adjacent teeth 10. In some embodiments, the wall 22 can be a part of, or integrally formed with, the dam 25. In other embodiments, the wall 22 can be separate from the dam 25. The dam 25 can be configured to separate or isolate the treatment region (e.g., the tooth 10 within the tooth cap 4) from other portions of the patient's mouth. For example, the dam 25 and clamp 24 can act to substantially prevent saliva or other fluids from entering the treatment region (e.g., the tooth 10). The dam 25 can also act to retain any tools or instruments that the clinician drops or places against the dam 25, which can prevent the tools or instruments from being swallowed or otherwise damaging the patient.

Figure 5:
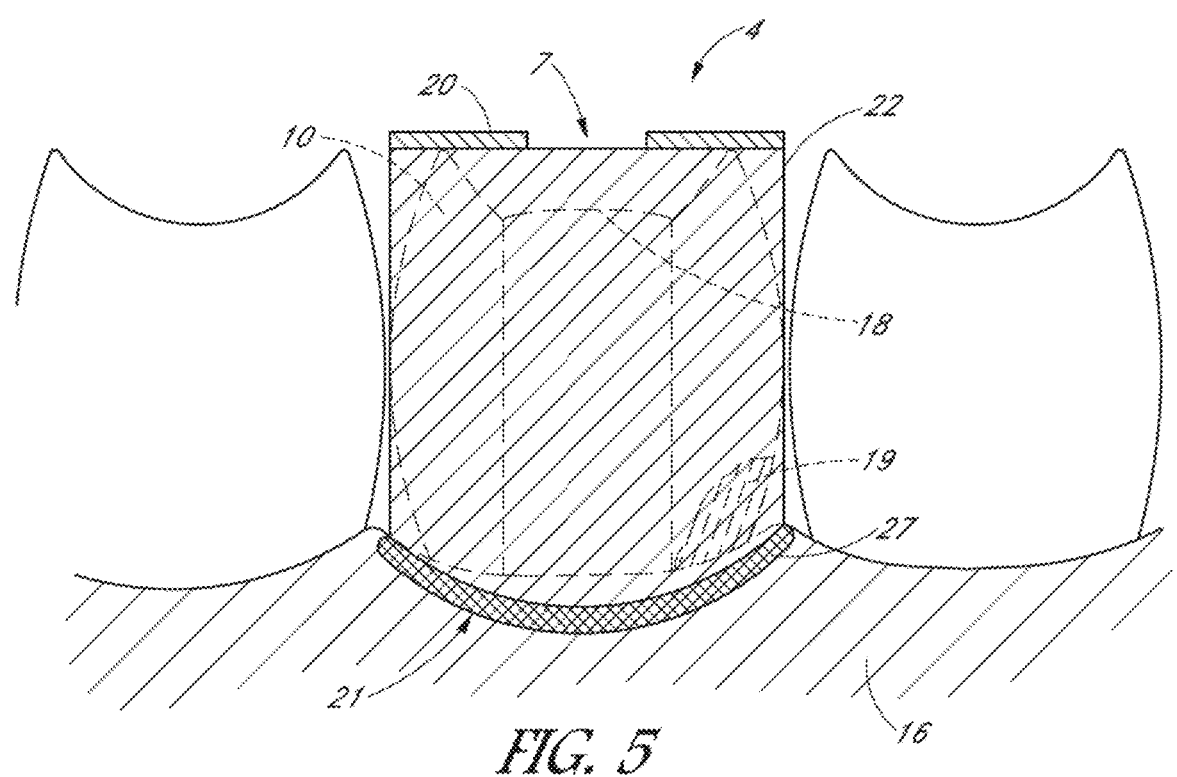
FIG. 5 is a schematic side view of a tooth cap having a distal end sealed to the tooth and/or gum tissue.

FIG. 5 is a schematic side view of a tooth cap 4 having a distal end 21 sealed to the tooth 10 and/or gum tissue 16. The tooth cap 4 can comprise a platform 20, and access port 7, and a wall 20 extending from the platform 20. The platform 20 can cover substantially the entire top or occlusal surface of the tooth 10. As shown in FIG. 5, a carious or decayed region 19 can be formed near the bottom of the tooth 10 near the gum tissue 16. During a root canal procedure, it can be desirable to protect the decayed region 19 to prevent the decayed region 19 from collapsing. As explained above, the collapse or breaking away of the decayed region 19 can cause the platform 20 (and hence the treatment device 6) to become misaligned or to otherwise disrupt the procedure. Furthermore, the collapse or breaking away of the decayed region may permit fluid to enter or leave the treatment region. Accordingly, as shown in FIG. 5, the wall 22 can extend substantially across a full height of the tooth 10 to cover the decayed region 19.

A sealant 27 can be applied to the distal end 21 of the wall 22 to substantially seal the wall 22 to the tooth 10 and/or gum tissue 16. The sealant 27 can provide a fluid seal to prevent fluid from entering and/or leaving the treatment region and tooth cap 4. The tooth seal 27 can also attach the wall 22 to the tooth 10 and/or gum 16. The sealant 27 can be any suitable sealant or adhesive, such as an epoxy. In the embodiment of FIG. 5, the platform 20 can be substantially rigid to provide a support surface for the treatment device 6. The wall 22 can be any suitable material. For example, the wall 22 can comprise an elastic or plastic material that is flexible. Alternatively, the wall 22 of FIG. 5 may exhibit little flexibility or elasticity. In some embodiments, the platform 20 and/or wall 22 can comprise a polymer or plastic material. In other embodiments, the platform 20 and/or wall 22 can comprise a metal.

When the treatment device 6 (see FIGS. 2A-2F) is positioned on the platform 20 and activated, the treatment device 6 can clean or otherwise treat the root canal spaces and interior regions of the tooth 10 exposed by the endodontic access opening 18. For example, if the carious region 19 is exposed to fluid communication with the treatment device 6

(such as a pressure wave generator 5), then the treatment device 6 can remove the carious region 19 when activated. For example, in such arrangements, the endodontic access opening 18 may expose the carious region 19. If the carious region 19 is not removed (e.g., the access opening 18 and/or tooth cap 4 are arranged such that the carious region is not cleaned), then the tooth cap 4 can nevertheless support the tooth 10 and carious region 19 to prevent the carious region from breaking. If the carious region 19 does break or collapse, then the tooth cap 4 can create a fluid seal to prevent the exchange of fluid between the treatment region and the remainder of the patient's mouth.

Figure 6:
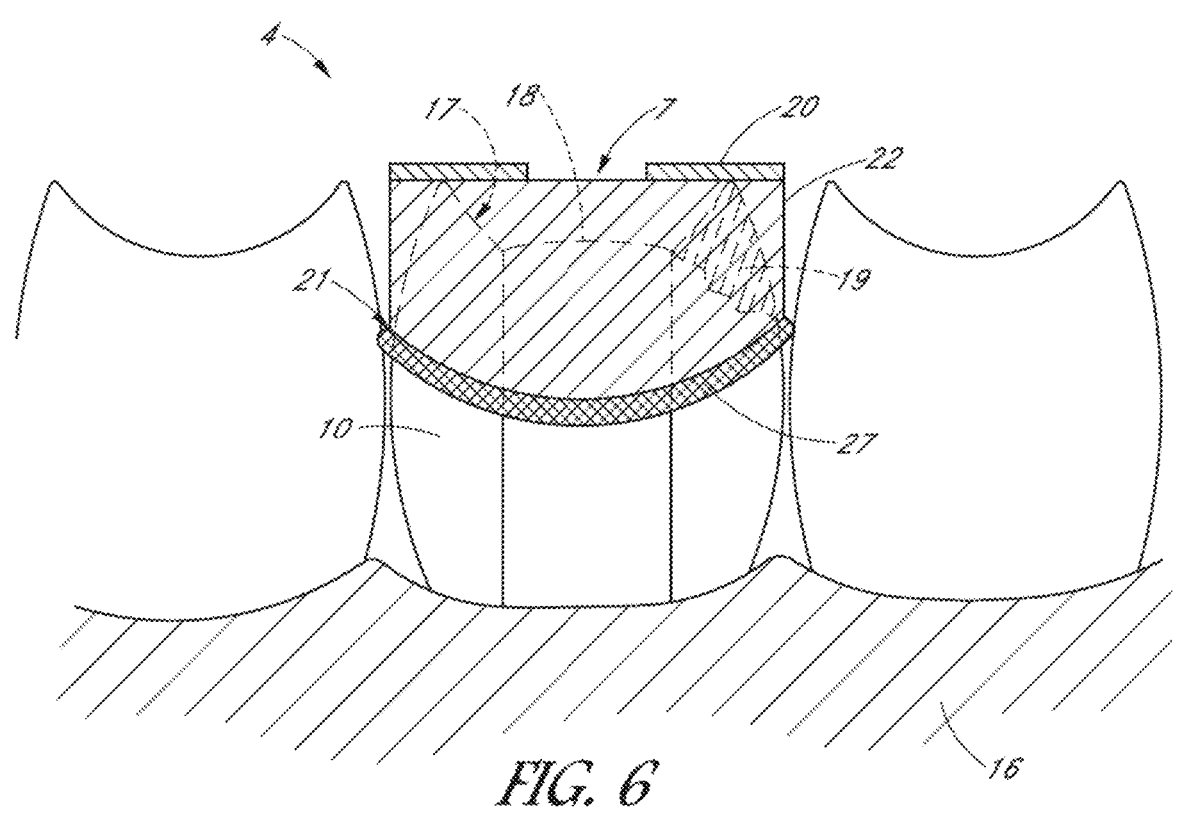
FIG. 6 is a schematic side view of a tooth cap having a wall that extends only partially along a height of the tooth.

FIG. 6 is a schematic side view of a tooth cap 4 having a wall 22 that extends only partially along a height of the tooth 10. For example, as with the embodiments disclosed herein, the tooth cap 4 can include a platform 20, an access port 7, and a wall 22 extending from the platform 20. As shown in FIG. 6, a decayed or carious region 19 can be formed near a top or occlusal surface 17 of the tooth 10. The wall 22 can extend partially down the height of the tooth 10 such that the distal end 21 of the wall 22 is disposed between the gum tissue 16 and the occlusal surface 17 of the tooth 10. A sealant 27 can be applied to attach the distal end 21 of the wall 22 to a side surface of the tooth 10. The sealant 27 can substantially seal the treatment region from fluids. When the treatment device 6 is positioned on the platform 20 and activated, the treatment device 6 can clean or otherwise treat the occlusal surface 17, which may include the carious region 19. In addition, the treatment device 6 can also clean the root canal spaces of the tooth by way of the endodontic access opening 18. As explained above, in treatment devices that include a pressure wave generator 5, diseased regions that are in fluid communication with the pressure wave generator 5 may be treated even when the pressure wave generator 5 is remote from the diseased region.

Figure 7:
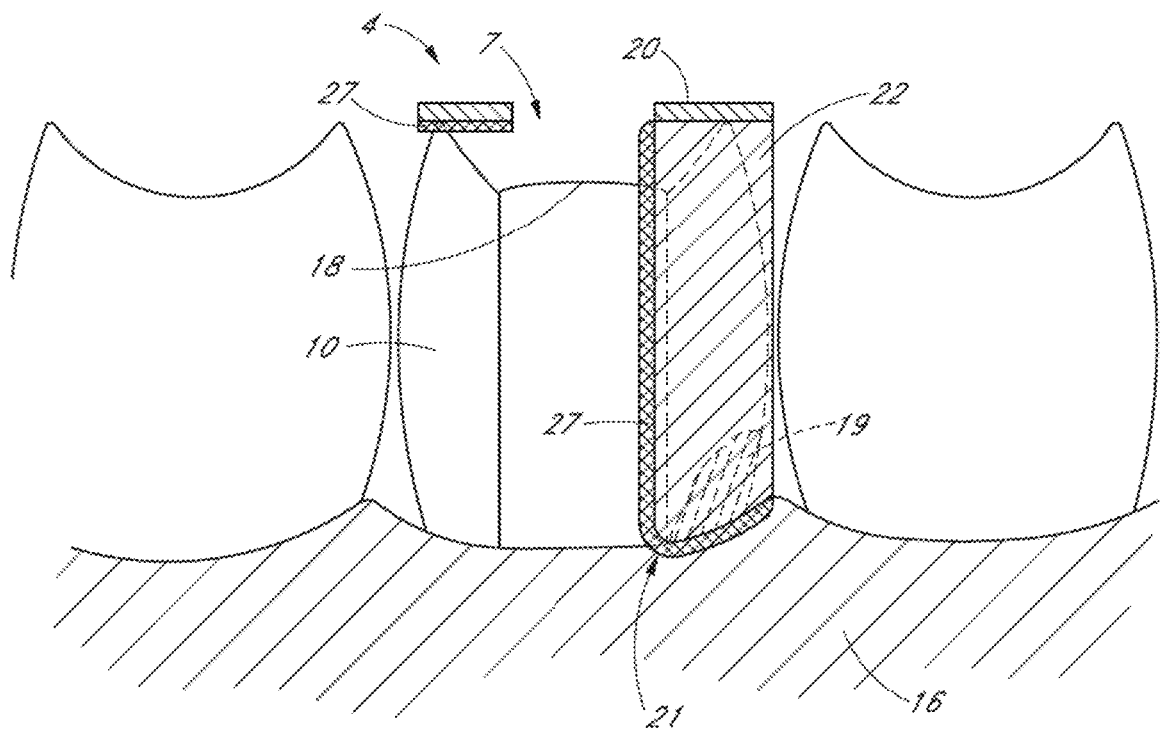
FIG. 7 is a schematic side view of a tooth cap having a platform and a wall covering only a portion of a circumference or perimeter of the platform.

FIG. 7 is a schematic side view of a tooth cap 4 having a platform 20 and a wall 22 covering only a portion of a circumference or perimeter of the platform 20. As with the above embodiments, the tooth cap 4 can include an access port 7 through the platform 20. A carious or decayed region 19 can be formed at a portion of the tooth 10. The wall 22 can extend from a portion of the platform 20 to the gum tissue 16 along only a portion of the side surfaces of the tooth 10. For example, the wall 22 can extend over the carious region 19 to support the carious region 19 and surrounding material during a treatment procedure (e.g., to prevent collapse of the carious region 19 or to seal the carious region 19 in the event of collapse). However, other side portions of the tooth 10 may remain uncovered by the wall 22. In the embodiment of FIG. 7, therefore, only portions of the side surface of the tooth 10 may be covered by the wall 22. A sealant 27 can attach the distal end 21 of the wall 22 to the tooth 10 and/or gum tissue 16.

Figure 8:
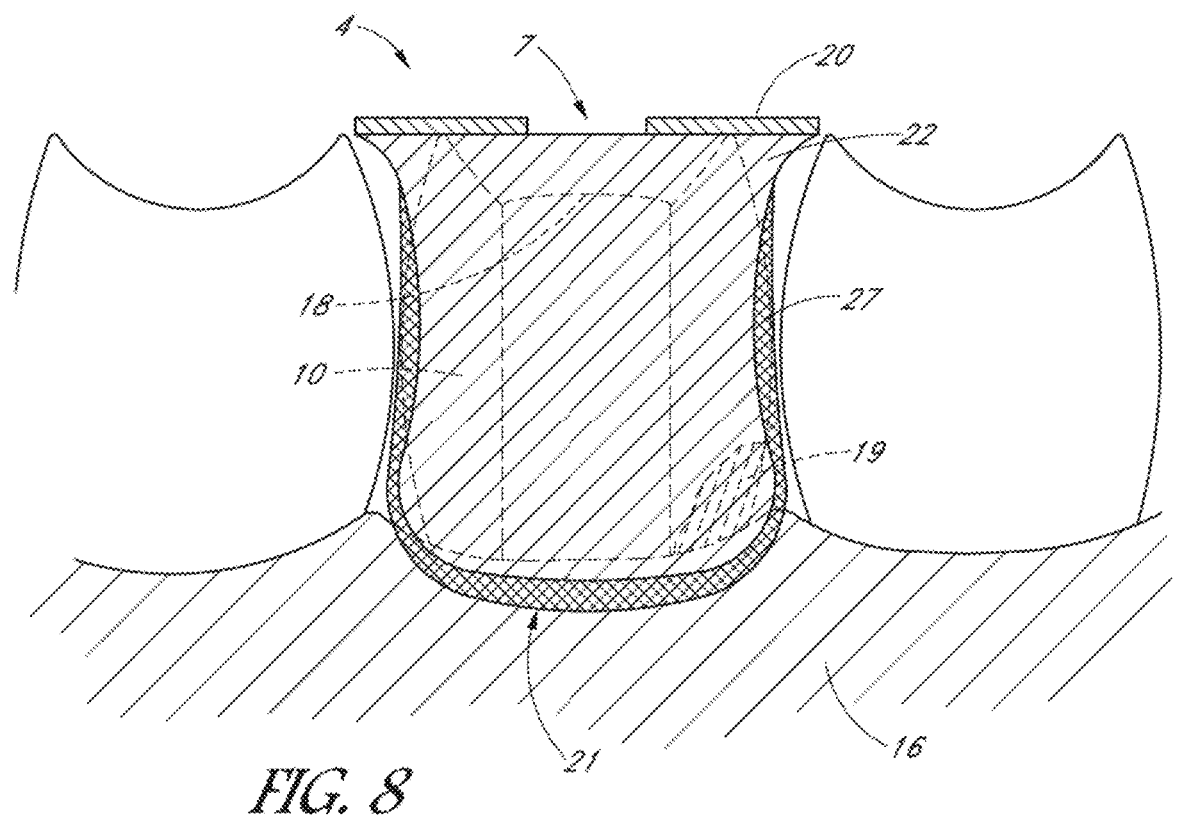
FIG. 8 is a schematic side view of a saddle-shaped tooth cap.

FIG. 8 is a schematic side view of a saddle-shaped tooth cap 4. The tooth cap 4 can include a platform 20, an access port 7, and a wall 22 extending from the platform 20. In various embodiments, the wall 22 can extend between adjacent teeth 10. However, it may be difficult for the clinician to insert the wall 22 in the small gap between adjacent teeth 10. Accordingly, in the embodiment of FIG. 8, the tooth cap 4 can be saddle-shaped, such that the wall 22 straddles adjacent teeth 10. Because the wall 22 can straddle the gap between adjacent teeth, the clinician may avoid problems associated with inserting the wall 22 between teeth. In other embodiments, however (e.g., FIG. 3A-3B), the wall 22 may be disposed between adjacent teeth 10. A sealant 27 can be applied to the distal end 21 of the wall 22 to seal the wall 22 to the tooth 10 and/or gum tissue 16. As explained above, the tooth cap 4 of FIG. 8 can provide a stable support surface for the treatment device, prevent or inhibit the exchange of fluid between the treatment region and the remainder of the mouth, and support decayed regions of the tooth during treatment.

Figure 9A:
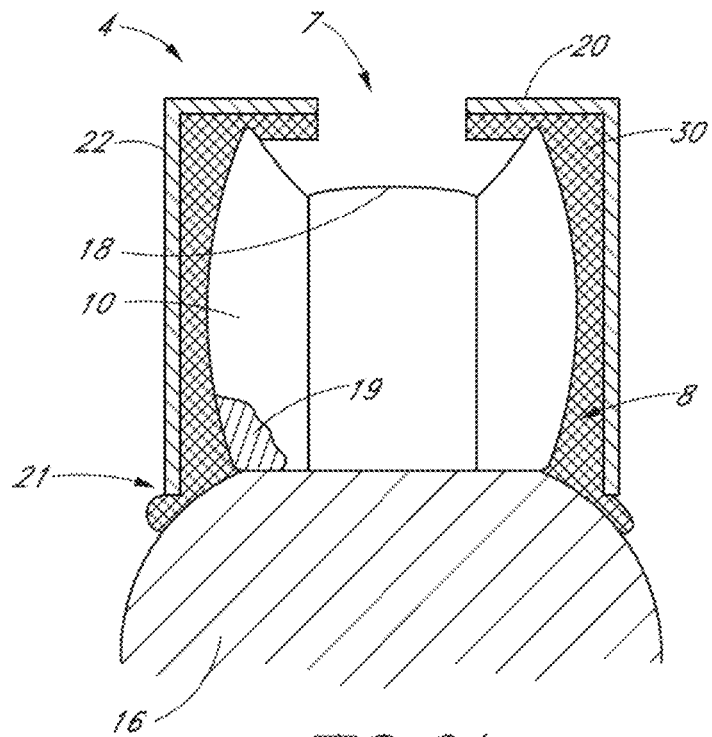
FIG. 9A is a schematic mesiodistal sectional view of a tooth cap in which a coupling material is disposed in a space between the tooth cap and the tooth and/or gums.

FIG. 9A is a schematic mesiodistal sectional view of a tooth cap 4 in which a coupling material 30 is disposed in a space 8 between the tooth cap 4 and the tooth 10 and/or gums 16. The tooth cap 4 can include a platform 20, an access port 7, and a wall 22 extending from the platform 20. As shown in FIG. 9A, a distal end 21 of the wall 22 can be urged over the tooth 10 such that the distal end 21 contacts or is proximate the gums 16. The wall 22 can cover and support a carious or decayed region 19 formed in a portion of the tooth 10 and/or gums 16. As above, a treatment device 6 (see FIGS. 2A-2F) can be positioned on the platform 20 and activated to clean or otherwise treat portions of the tooth 10 and/or gums 16 by way of the access port 7.

In the embodiment illustrated in FIG. 9A, the tooth cap 4 can be positioned around the tooth 10 and gums 16 such that a gap or space 8 is formed between the tooth 10 (and/or gums 16) and the tooth cap 4 (e.g., the wall 22 and/or the platform 20). The wall 22 and/or the platform 20 can accordingly be spaced from the tooth 10 and/or gums 16. In some embodiments, a coupling material 30 can be disposed in the space 8 between the tooth cap 4 and the tooth 10 or gums 16. In some embodiments, the coupling material 30 can be coupled with or attached to (e.g., pre-molded with) the tooth cap 4 before the tooth cap 4 is attached to the tooth 10. In other embodiments, the tooth cap 4 is positioned on the tooth 10 and/or gums 16, and the coupling material 30 is flowed or injected into the space 8 to fill gaps between the tooth cap 4 and the tooth 10 or gums 16. Advantageously, the coupling material 30 can be soft and/or flowable such that the coupling material 30 fills small gaps, cracks, and spaces in the tooth 10 and/or gums 16. By filling small gaps, cracks, and spaces, the coupling material 30 can provide improved support to the platform 20 and tooth 10 during treatment and a substantially fluid-sealed treatment region to prevent or inhibit the exchange of fluid between the treatment region and the remainder of the patient's mouth. It should be appreciated that the shape or conformity of the coupling material 30 about a periphery of the access port 7 may vary in the embodiments disclosed throughout the Application. For example, if the coupling material 30 is pre-applied to the tooth cap 4, the coupling material 30 may conform to the portions of the tooth 10 and/or gums 16 that contact the coupling material (e.g., similar to that shown in FIG. 9A). In other arrangements in which the coupling material 30 is injected or flowed into the space between the tooth cap 4 and tooth 10, the coupling material can spill onto outer surfaces of the tooth and/or the tooth cap 4.

The coupling material 30 can be any suitable material, e.g., a sealing material to substantially seal the treatment region. For example, the coupling material 30 can be a soft and/or flowable material that has a flowable state and a solid (or substantially solid) state. In some embodiments, the coupling material 30 can be flowed into the space 8 between the tooth cap 4 and the tooth 10 and/or gums 16 in the flowable state. The coupling material 30 can be hardened into the solid state by natural hardening over time, thermal curing, ultraviolet (UV) curing, chemical hardening, or any other suitable manner. The coupling material 30 can comprise any suitable material, including, e.g., an impression material, a bite registration material, or other type of flowable and curable material. The coupling material 30 can be flowed into the space 8 using any suitable technique. For example, the coupling material 30 can be injected using a syringe or plunger. In some embodiments, a pressure wave generator 5 can be used to flow the coupling material 30 in the space 8 between the tooth cap 4 and the tooth 10 or gums 16.

Figure 9B:
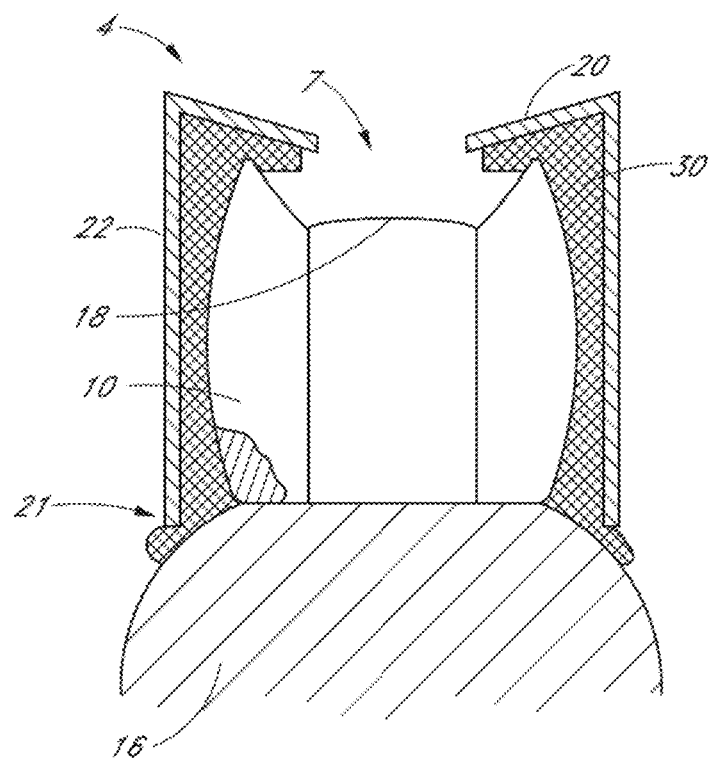
FIG. 9B is a schematic view of a tooth cap in which the platform is angled downwardly relative to the wall.

FIG. 9B is a schematic view of a tooth cap 4 in which the platform 20 is angled downwardly relative to the wall 22. In the embodiment of FIG. 9A, the platform 20 is disposed relative to the wall 22 such that the platform 20 forms a substantially level surface that is substantially perpendicular to the endodontic access opening 18. During some procedures (such as root canal cleaning of molar teeth), it can be desirable to position the platform 20 to be perpendicular to the access opening 18. Such an arrangement can be used to ensure that the treatment device 6 is positioned flat against the platform 20 during treatment to align a pressure wave generator 5 relative to the access opening 18. For example, the treatment device 6 may include a tooth coupler 3 having a complementary flat surface. In the embodiment of FIG. 9B, however, the platform 20 is angled inwardly or downwardly to provide an angled surface for the treatment device 6. The platform 20 can be shaped in other manners relative to the wall 22. For example, the platform 20 can comprise a rounded, conical, or frustoconical shape to accommodate a particular treatment device 6. Accordingly, in various embodiments, the platform 20 of the tooth cap 4 can be shaped to accommodate the surface features or contours of the treatment device 6. The tooth cap 4 can therefore be configured for use with any suitable treatment device 6 by shaping the platform 20 to complement or substantially match the corresponding contact surface of the treatment device 6. Furthermore, although the angled platform 20 is illustrated in FIG. 9B, it should be appreciated that any of the platforms 20 disclosed herein may also be angled, or may comprise any other shape suitable or complementary to the surface contours of a desired treatment device 6.

Figure 10:
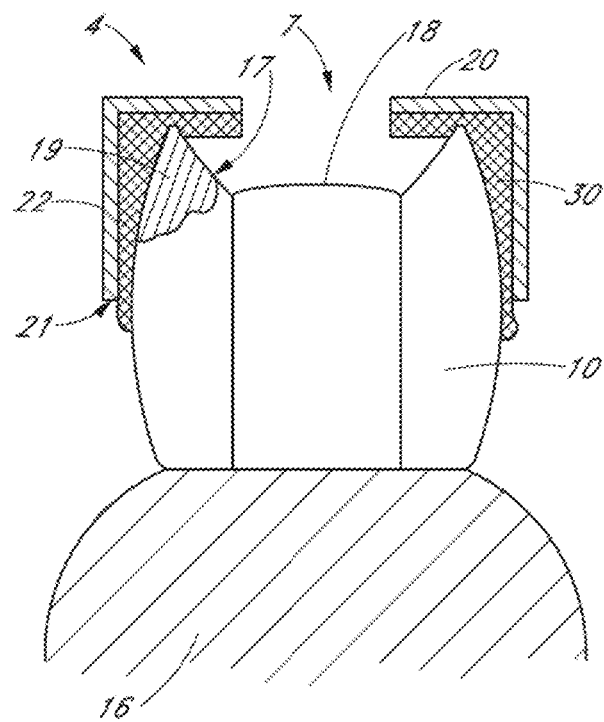
FIG. 10 is a schematic mesiodistal sectional view of a tooth cap in which a coupling material is disposed in a space between the tooth cap and the tooth and/or gums, and in which a wall of the tooth cap extends only partially along a height of the tooth.

FIG. 10 is a schematic mesiodistal sectional view of a tooth cap 4 in which a coupling material 30 is disposed in a space 8 between the tooth cap 4 and the tooth 10 and/or gums 16, and in which a wall 22 of the tooth cap 4 extends only partially along a height of the tooth 10. As with the embodiment of FIGS. 9A-9B, the tooth cap 4 can include a platform 20, the wall 22, and an access port 7. A coupling material 30 can be disposed between the tooth cap 4 and the tooth 10. A decayed or carious region 19 can be formed on a portion of the tooth 10, e.g., near an occlusal surface 17. The wall 22 of the tooth cap 4 can extend only partially along the height of the tooth 10 such that a distal end 21 of the wall 22 is positioned between the occlusal surface 17 and the gums 16. Thus, the wall 22 and coupling material 30 can cover the decayed or carious region 19 to support the carious region 19 during treatment and/or to prevent fluid exchange through the carious region 19 during treatment.

Figure 11:
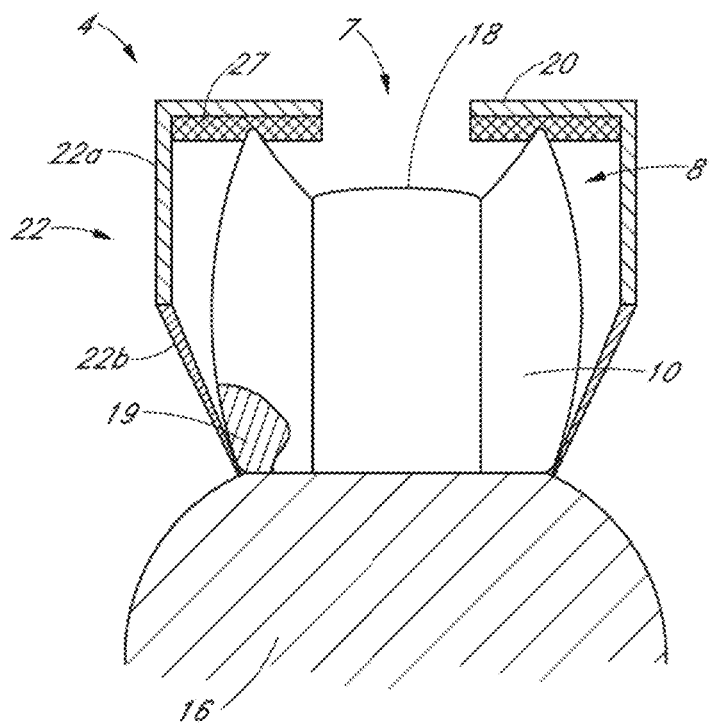
FIG. 11 is a schematic side sectional view of a tooth cap having a wall that comprises a relatively rigid portion and a relatively flexible portion, in accordance with various embodiments.

FIG. 11 is a schematic side sectional view of a tooth cap 4 having a wall 22 that comprises a relatively rigid portion 22a and a relatively flexible portion 22b, in accordance with various embodiments. The tooth cap 4 can include a platform 20, an access port 7, and a wall 22. The wall 22 can be spaced from the tooth 10 to define a gap 8 between the tooth 10 and the tooth cap 4. The gap 8 can comprise air or other fluid in some arrangements; in other arrangements, as explained herein, a coupling material can be flowed into the gap 8 between the tooth cap 4 and tooth 10. The wall 22 can include a relatively rigid portion 22a that resists typical compressive and bending forces and a relatively flexible portion 22b that can be easily stretched and/or bent. The flexible portion 22b can comprise a distal end 21 of the wall 22 and can couple to the tooth 10. For example, the flexible portion 22b can comprise an elastic material (e.g., rubber) that can conform to the bottom of the tooth 10, for example, at the cementoenamel junction (CEJ). The platform 20 can attach to the tooth 10 using a sealant 27 to further couple the tooth cap 4 to the tooth 10.

Figure 12:
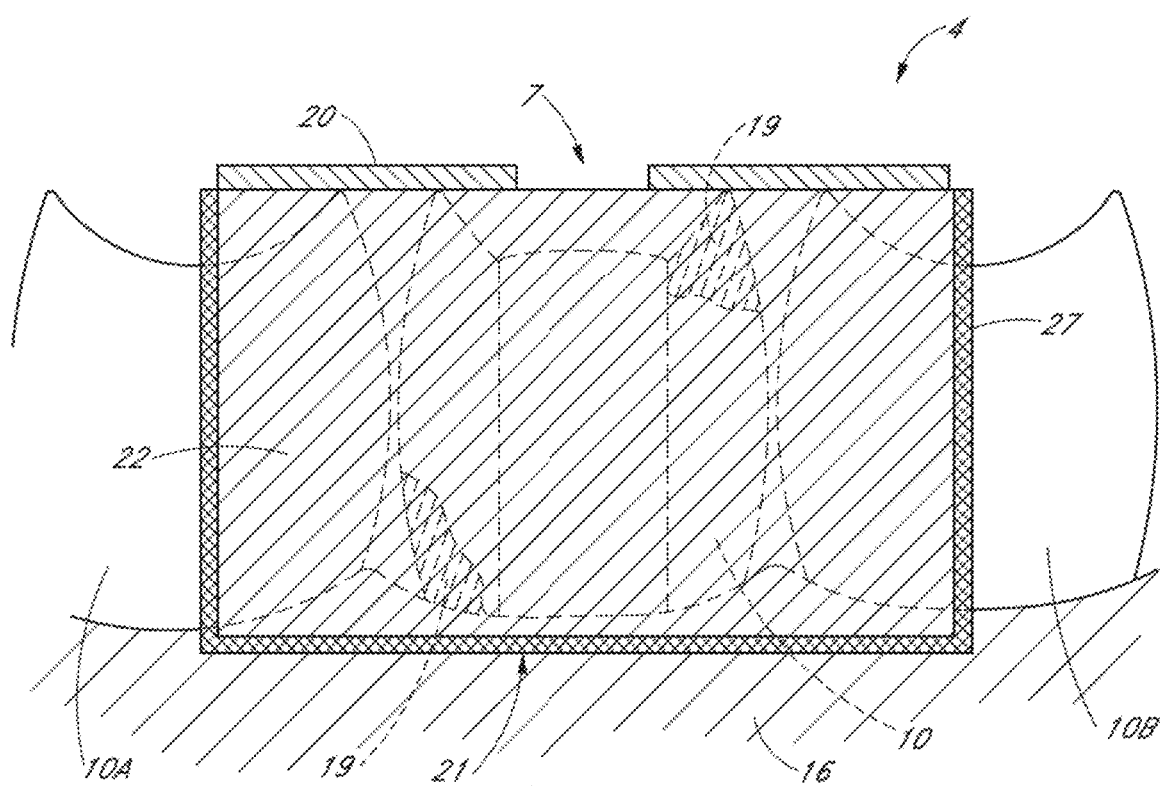
FIG. 12 is a schematic side view of a tooth cap configured to cover a treatment tooth and portions of adjacent teeth.

FIG. 12 is a schematic side view of a tooth cap 4 configured to cover a treatment tooth 10 and portions of adjacent teeth. The tooth cap 4 includes a platform 20, an access port 7, and a wall 22 extending from the platform 20. In some embodiments, a coupling material (not shown) can be disposed in a space between the tooth cap 4 and tooth 10; in other embodiments, there may not be a coupling material. As shown in FIG. 12, the tooth cap 4 can be sized to cover the treatment tooth 10, as well as at least portions of adjacent teeth. For example, the wall 22 can comprise a saddle shape and can extend over portions of a first adjacent tooth 10A and a second adjacent tooth 10B. A sealant 27 can attach a distal end 21 of the wall 22 to the tooth 10, the adjacent teeth 10A and 10B, and portions of the gums 16 to attach the tooth cap 4 to the tooth 10. Advantageously, providing a large tooth cap 4 that covers portions of multiple teeth, the tooth cap 4 can improve the fluid sealing that in interproximal areas of the teeth. As explained above, the tooth cap 4 can provide a stable support surface for the treatment device, prevent or inhibit the exchange of fluid between the treatment region and the remainder of the mouth, and support decayed regions of the tooth during treatment.

Figure 13:
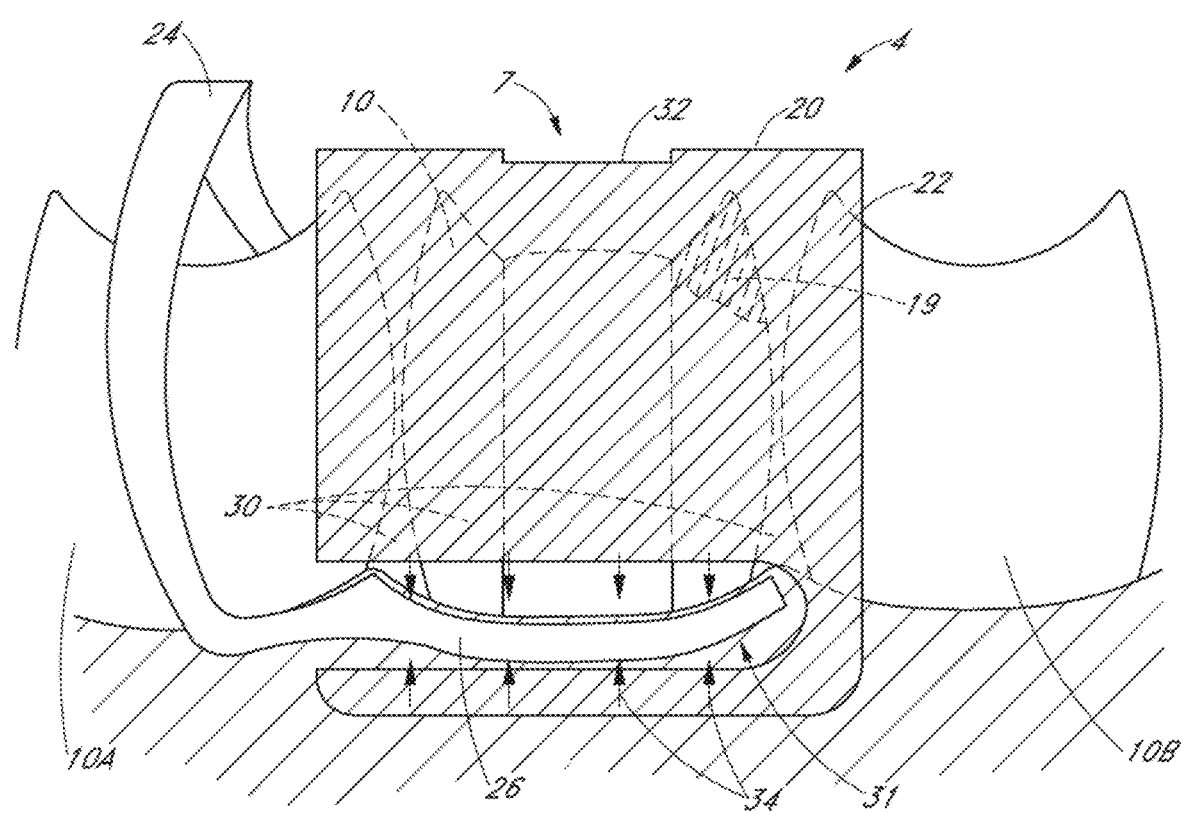
FIG. 13 is a schematic side view of a tooth cap comprising one or more injection ports to inject coupling material in a space between the tooth cap and the tooth or gums.
Figure 14:
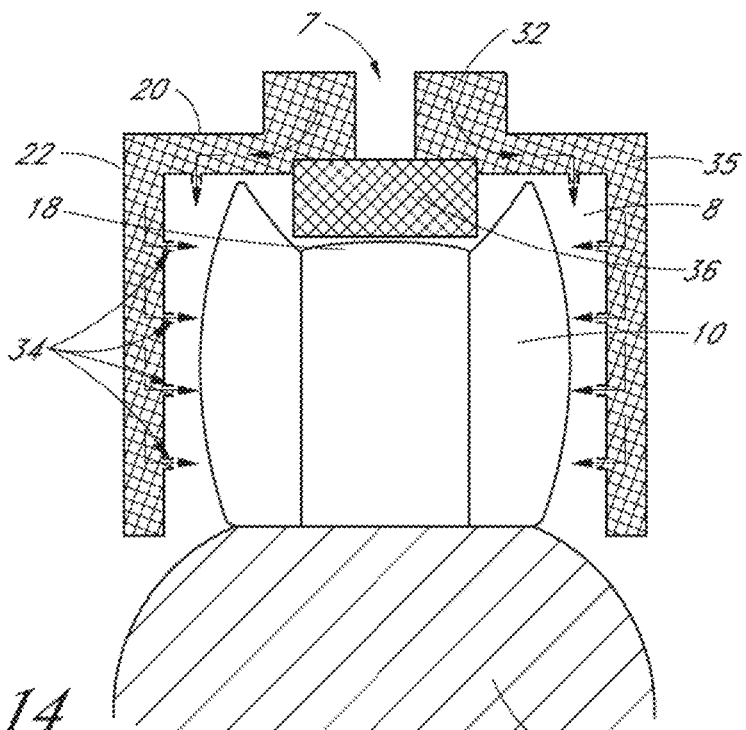
FIG. 14 is a schematic mesiodistal view of the tooth cap of FIG. 13.

FIG. 13 is a schematic side view of a tooth cap 4 comprising one or more injection ports 34 to inject coupling material 30 in a space 8 between the tooth cap 4 and the tooth 10 or gums 16. FIG. 14 is a schematic mesiodistal view of the tooth cap 4 of FIG. 13. The tooth cap 4 can include a platform 20, an access port 7, and a wall 22 extending from the platform 20. As with the embodiment of FIG. 12, the tooth cap 4 can cover the treatment tooth 10 and portions of adjacent teeth 10A and 10B. The wall 22 can include a recess 31 sized and shaped to receive a clamp arm 26 of a clamp 24. For example, the clamp 24 can couple the tooth cap 4 to the treatment region by sliding in the recess 31 to at least partially secure the wall 22 to the tooth 10 and/or gums 16. A dam (such as a rubber dam) can also be coupled to the treatment region using the clamp 24 to further seal the treatment region.

As explained above, it can be advantageous to provide a coupling material 30 in the space 8 between the tooth cap 4 and the tooth 10 and/or gums 16. Accordingly, the tooth cap 4 can include a supply port 32 through which the coupling material 30 can be supplied to the tooth cap 4. A chamber 35 can be disposed in the wall 22 of the tooth cap 4 between the supply port 32 and the injection ports 34 to convey the coupling material 30 from the supply port 32 to the injection ports 34. The coupling material 30 can be introduced through the supply port 32 and injection ports 34 in a flowable state and can flow within the space 8 between the tooth cap 4 and the tooth 10. The coupling material 30 can enter into small gaps, cracks, and spaces in the tooth 10 and/or gums 16. For example, the coupling material 30 can enter the space 8 between the tooth cap 4 and tooth 10 by way of the one or more injection ports 34 in fluid communication with the supply port 32. When the coupling material 30 has sufficiently filled the space 8 between the tooth cap 4 and the tooth 10 and/or gums 16, the coupling material 30 can be cured or hardened using any suitable technique. Thus, the supply and injection ports 32, 34 can enable efficient and effective filling of the tooth cap 4 with the coupling material 30.

As shown in FIG. 14, a plug 36 can be temporarily disposed through the access port 7 of the tooth cap 4. The plug 36 can be inserted into the endodontic access opening 18 to prevent the coupling material 30 from filling the access opening 18 while the coupling material 30 flows between the tooth cap 4 and the tooth 10. The plug 36 can be disposed below the supply port 32 in some arrangements to block the passage of coupling material 30 into the interior of the tooth 10.

Figure 15:
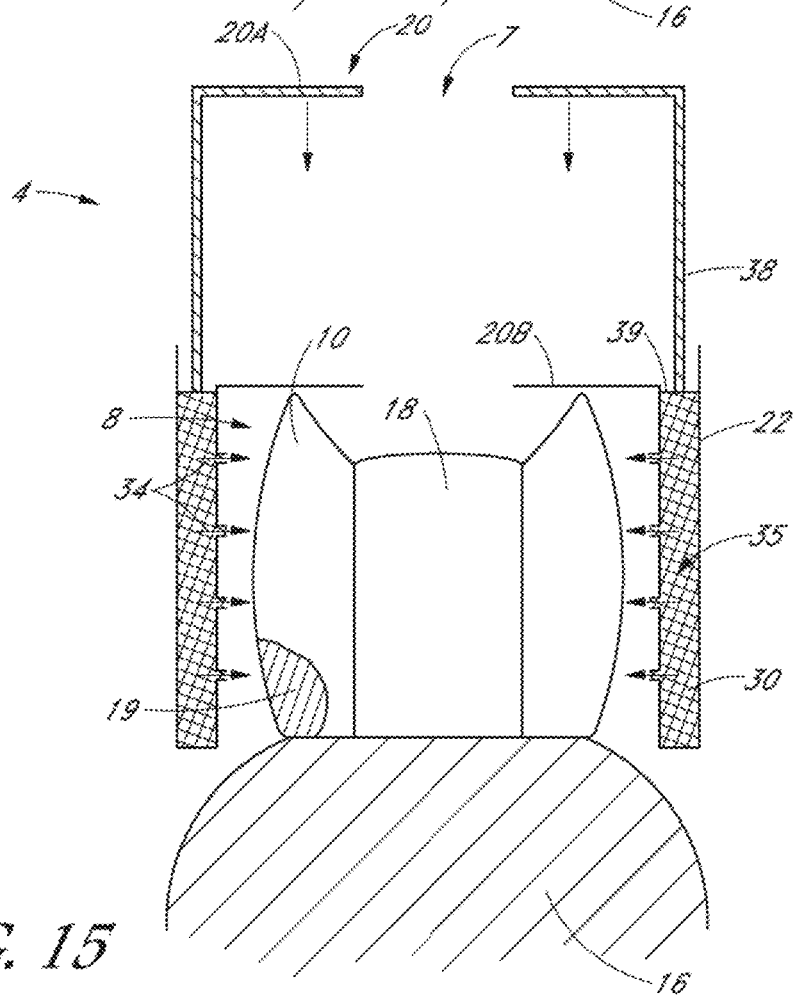
FIG. 15 is a schematic mesiodistal view of a tooth cap pre-filled with a coupling material and a plunger configured to inject the coupling material into a space between the tooth cap and the tooth.
Figure 16:
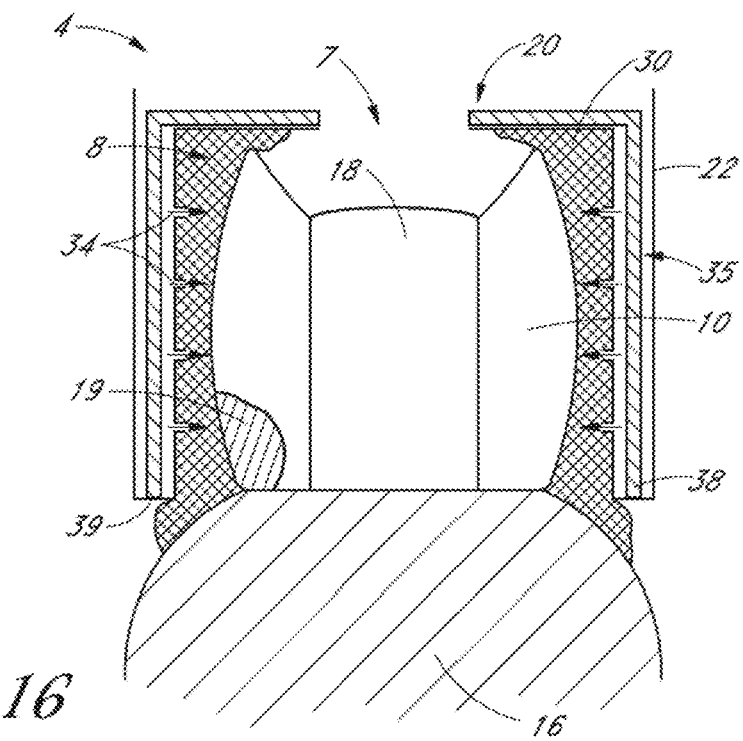
FIG. 16 illustrates the tooth cap of FIG. 15 after the coupling material fills the space between the tooth cap and the tooth.

FIG. 15 is a schematic mesiodistal view of a tooth cap 4 pre-filled with a coupling material 30 and a plunger 38 configured to inject the coupling material 30 into a space 8 between the tooth cap 4 and the tooth 10. In particular, FIG. 15 illustrates the tooth cap 4 before the plunger 38 is engaged to fill the space 8. FIG. 16 illustrates the tooth cap 4 after the coupling material 30 fills the space 8 between the tooth cap 4 and the tooth 10. In FIGS. 15 and 16, the tooth cap 4 can include a platform 20, an access port 7, and a wall 22 extending from the platform 20. The platform 20 can comprise a sliding portion 20A and a stationary portion 20B.

Furthermore, as with the embodiment of FIGS. 13 and 14, the wall 22 can include a chamber 35 and one or more injection ports 34 configured to inject coupling material into a space 8 between the tooth cap 4 and the tooth 10. In the embodiment of FIGS. 15 and 16, the chamber 35 of the wall 22 can be pre-filled with coupling material 30. The tooth cap 4 can comprise a plunger 38 extending from the sliding portion 20A of the platform 20. The plunger 38 can have a distal portion 39 sized and shaped to be inserted into the chamber 35 of the wall 22. The distal portion 39 of the plunger 38 can be snugly fit within the chamber 35.

With reference to FIG. 15, the wall 22 of the tooth cap 4 can be positioned about the treatment tooth 10. The sliding portion 20A of the platform 20 can be moved downward to push the distal portion 39 of the plunger 38 through the chamber 35 of the wall 22. As the distal portion 39 is advanced downward through the chamber 35, the coupling material 30 can be urged outward through the injection ports 34 and into the space 8 between the tooth cap 4 and the tooth 10 or gums 16. As shown in FIG. 16, once the distal portion 39 of the plunger 39 reaches the distal or bottom end of the chamber 35, the coupling material 30 can substantially fill the tooth cap 4 and can enter cracks, gaps, and spaces in the tooth 10 and/or gums 16. The tooth cap 4 shown in FIGS. 15 and 16 can provide support to the treatment device, inhibit fluid exchange between the treatment region and the mouth, and support fragile decayed or carious regions 19 of the tooth 10.

Figure 17:
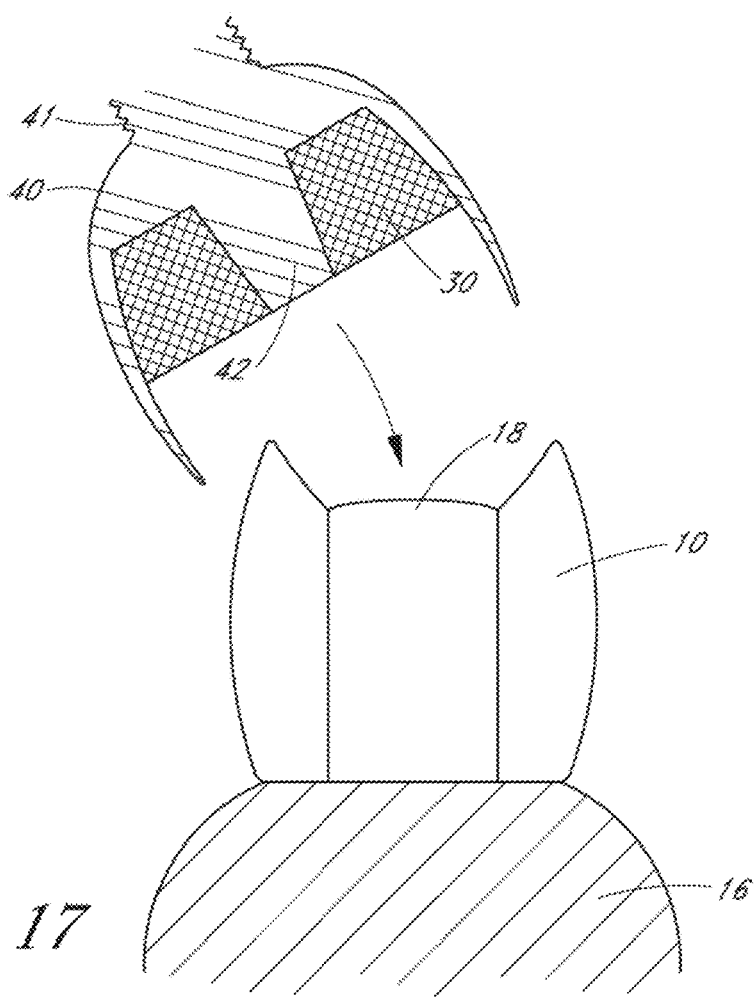
FIG. 17 is a side cross-sectional view of an applicator configured to attach a tooth cap comprising a coupling material to a tooth, in accordance with another embodiment.
Figure 18:
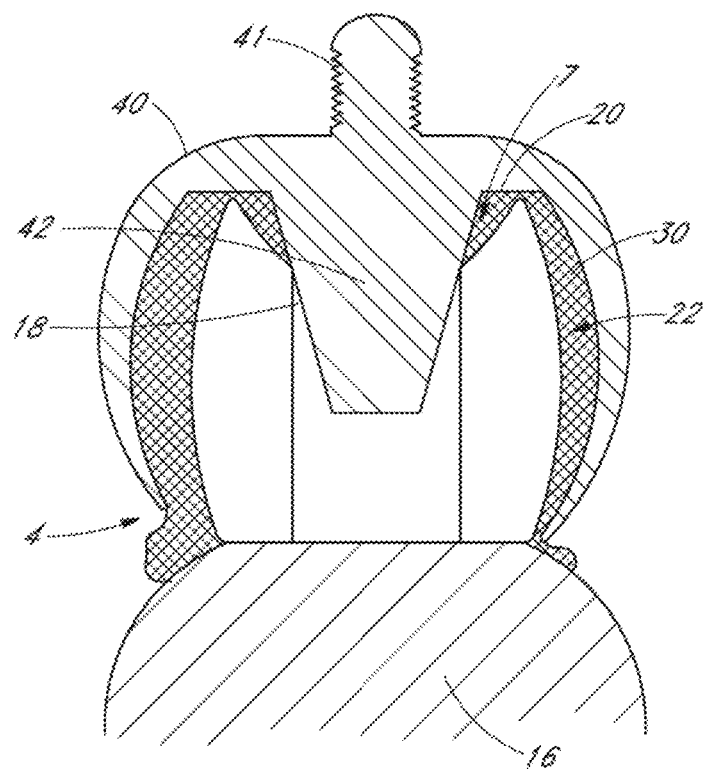
FIG. 18 is a side cross-sectional view of the applicator and tooth cap of FIG. 17 after the tooth cap is attached to the tooth.

FIG. 17 is a side cross-sectional view of an applicator 40 configured to attach a tooth cap 4 comprising a coupling material 30 to a tooth 10, in accordance with another embodiment. FIG. 18 is a side cross-sectional view of the applicator 40 and tooth cap 4 of FIG. 17 after the tooth cap 4 is attached to the tooth 10. As shown in FIG. 17, the tooth cap 4 can comprise a coupling material 30 that is pre-formed or attached to the applicator 40. The applicator 40 can comprise a handle 41 configured to be manipulated by the clinician. The applicator 40 can further comprise a plug 42 configured to be inserted into an endodontic access opening 18 to prevent coupling material 30 from entering the tooth 10. As explained above, the coupling material 30 can comprise any suitable soft and/or flowable material.

The clinician can move the applicator 40 towards the treatment tooth 10 and can press the applicator 40 and coupling material 30 over the tooth 10. The clinician can insert the plug 42 into the access opening 18. The soft coupling material 30 can conform to the tooth 10 and can fill small gaps, cracks, or spaces in the tooth 10 and/or gums 16. The coupling material 30 can be hardened or cured, and the applicator 40 can be removed from the tooth 10. Once applied to the tooth 10 and hardened, the tooth cap 4 of FIG. 18 can include a platform 20, an access port 7, and a wall 22 extending from the platform 20. The treatment device can be positioned on the platform 20 and activated to perform a suitable treatment procedure.

Figure 19:
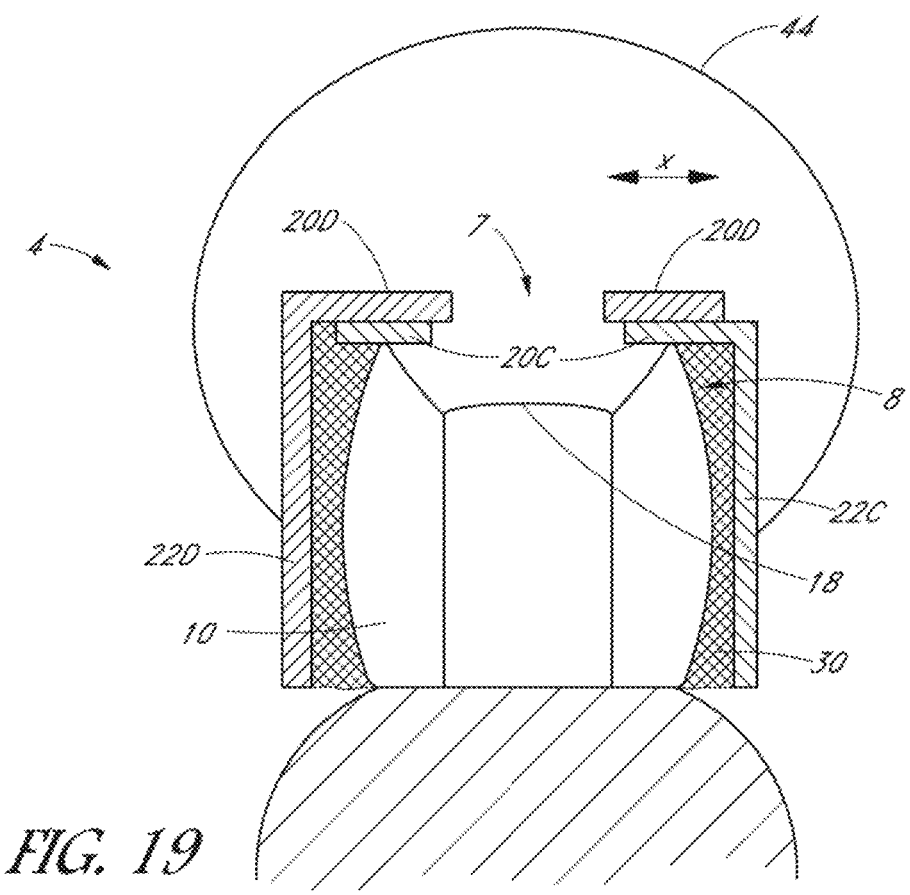
FIG. 19 is a side sectional view of a tooth cap comprising a biased member configured to slide a first portion of the tooth cap relative to a second portion.

FIG. 19 is a side sectional view of a tooth cap 4 comprising a biased member 44 configured to slide a first portion of the tooth cap 4 relative to a second portion. The tooth cap 4 can include a first platform portion 20C and a second platform portion 20D. A first wall portion 22C can extend from the first platform portion 20C, and a second wall portion 22D can extend from the second platform portion 20D. The biased member 44 can couple to the first wall portion 22C and the second wall portion 22D. The biased member 44 can comprise any suitable component configured to press the wall portions 22C, 22D together. For example, the biased member 44 can comprise a spring biased inwardly toward the tooth 10. In some embodiments, the biased member 44 can comprise a clamp configured to press the first wall portion 22C towards the second wall portion 22D.

The first platform portion 20C and the second platform portion 20D can be positioned relative to one another such that the first platform portion 20C can slide relatively to the second platform portion 20D in the x-direction shown in FIG. 19. Thus, when the biased member 44 presses the wall portions 22C, 22D inwardly relative to one another, the first and second platform portions 20C and 20D can slide towards one another to define the access opening 7. The treatment device 6 can be positioned on the second platform portion 20D by the clinician. As shown in FIG. 19, a coupling material 30 can be disposed in the space 8 between the tooth cap 4 and the tooth 10 and/or gums 16. The coupling material 30 can be pre-formed with the tooth cap 4 in some embodiments. In other embodiments, the tooth cap 4 can be applied to the tooth 10, and the coupling material 30 can be injected into the space 8.

Figure 20A:
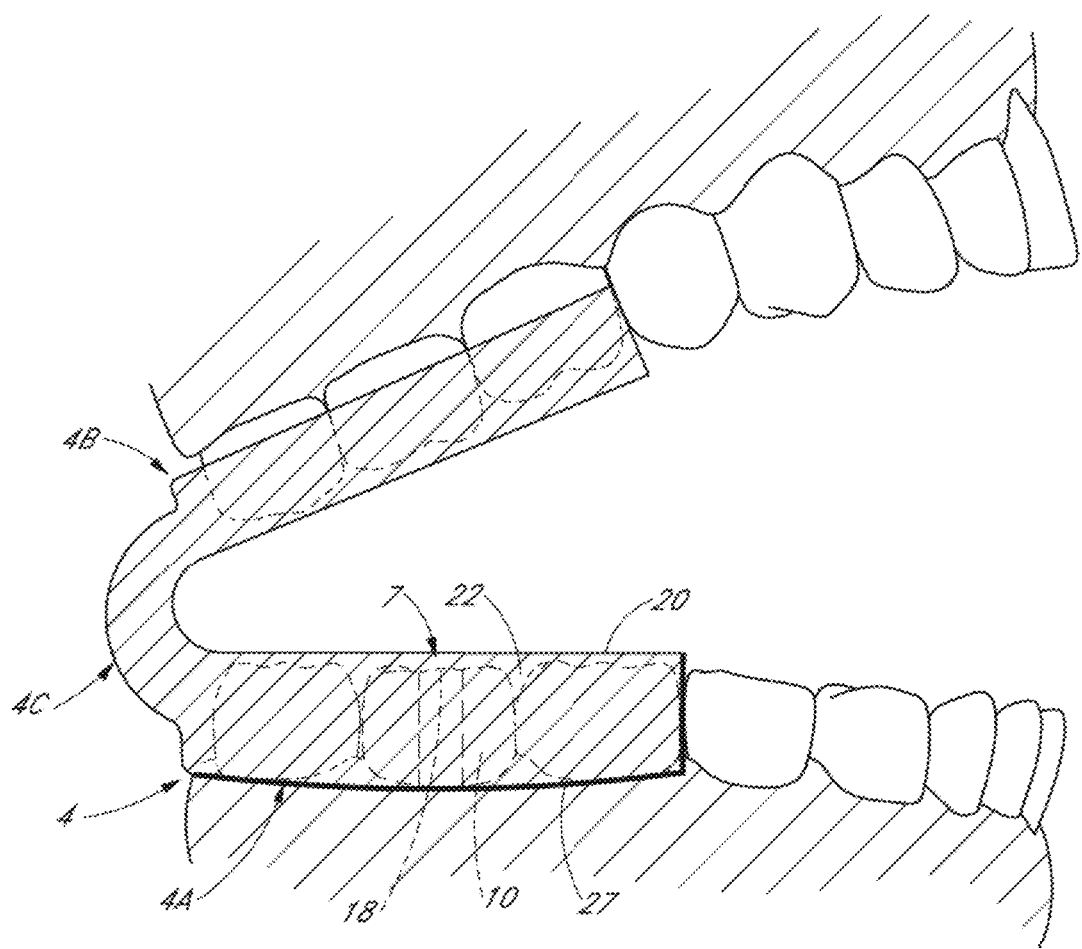
FIGS. 20A-20C illustrate schematic views of a tooth cap configured to cover multiple teeth along a portion of a dental arch.
Figure 20B:
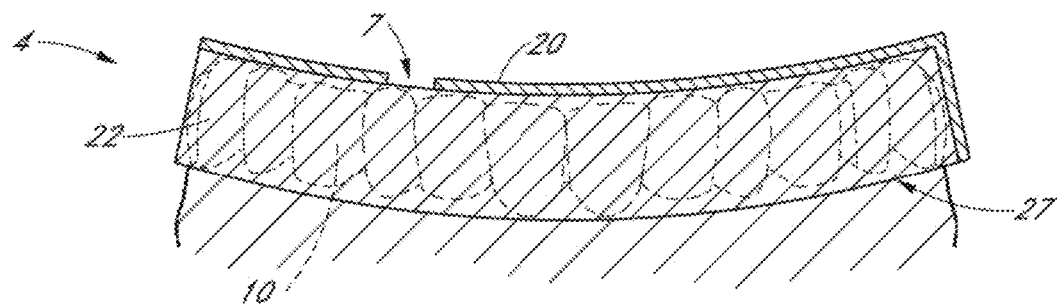
Figure 20C:
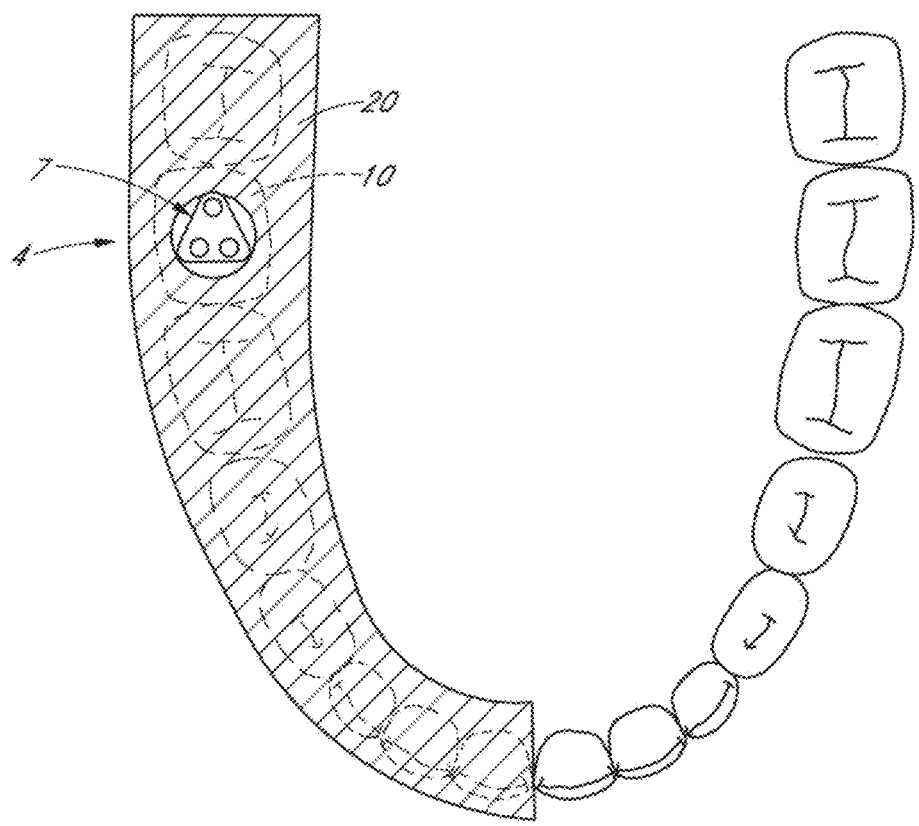

FIGS. 20A-20C illustrate schematic views of a tooth cap 4 configured to cover multiple teeth along a portion of a dental arch. For example, as shown in FIG. 20A, the tooth cap 4 can include a first portion 4A, a second portion 4B, and a third portion 4C between the first and second portions 4A, 4B. The first, second, and third portions 4A-4C can define a mouthpiece sized and shaped to be fitted onto upper and lower dental arches of the patient's mouth. The third portion 4C can flexibly couple the first and second portions 4A, 4B such that the patient can bite down to bring the second portion 4B and first portion 4A together. As shown in FIG. 20A, the first portion 4A can cover the treatment tooth 10, and an access port 7 can be formed through the first portion 4A to provide access to the tooth 10 to be treated. As explained above, the treatment device 6 can be positioned on the platform 20. The wall 22 can extend from the platform to cover portions of the tooth 10 and/or gums 16.

Turning to FIGS. 20B and 20C, a tooth cap 4 can be coupled to about half a dental arch to cover multiple teeth. For example, the tooth cap 4 can include a platform 20 and a wall 22 extending from the platform 20. An access port 7 can be formed through the platform 20 to provide access to the tooth 10 to be treated. A sealant can be applied to attach the wall 22 to the tooth 10 and/or gums. The larger tooth cap 4 of FIGS. 20A-20C can provide a larger sealed environment to provide additional protection against fluid entering the treatment region. Furthermore, the larger tooth cap 4 of FIGS. 20A-20C can provide additional structural support over fragile decayed regions.

Figure 21A:
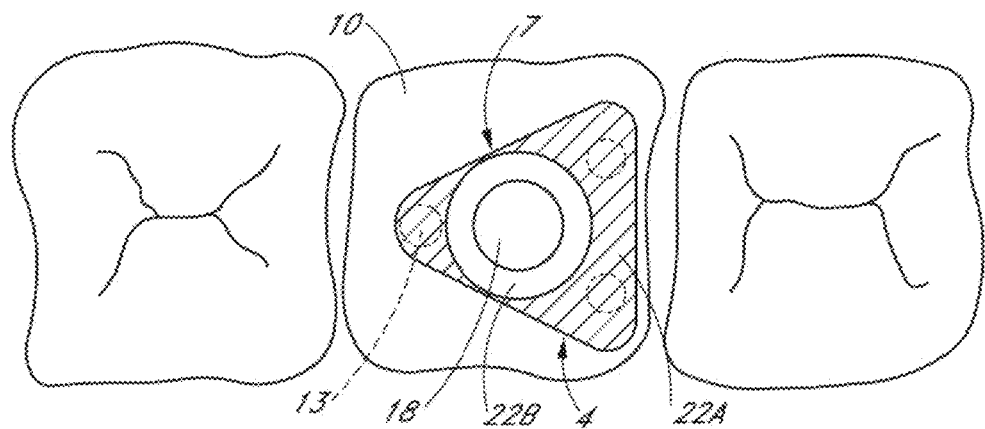
FIG. 21A is a schematic top view of a tooth cap configured to be inserted into an access opening of the tooth, according to one embodiment.
Figure 21B:
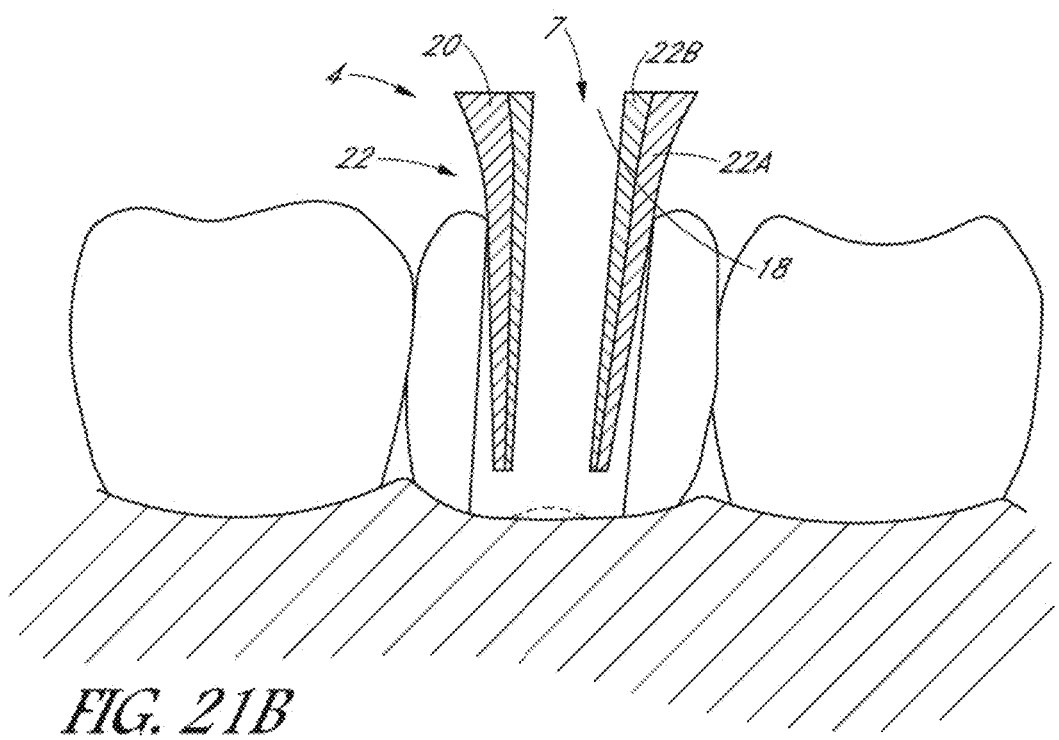
FIG. 21B is a schematic side sectional view of the tooth cap of FIG. 21A.

FIG. 21A is a schematic top view of a tooth cap 4 configured to be inserted into an access opening 18 of the tooth 10, according to one embodiment. FIG. 21B is a schematic side sectional view of the tooth cap 4 of FIG. 21A. The tooth caps 4 disclosed above are illustrated as being positioned about outer surfaces of portions of the tooth 10 to be treated. The tooth cap 4 of FIGS. 21A-21B, however, is configured to be positioned at least partially within an endodontic access opening 18 formed in the tooth 10. For example, the tooth cap 4 can include a platform 20 for supporting a treatment device and an access port 7 through the platform 20. A wall 22 can extend from the platform 20. The wall 22 can have a diameter or major dimension sized and shaped to be inserted into the access opening 18 of the tooth 10. The wall 22 of the tooth cap 4 can comprise an outer layer 22A and an inner layer 22B. The outer layer 22A can comprise a relatively soft material, and the inner layer 22B can comprise a relatively hard material. Thus, the outer layer 22A can be configured to deform against an inner surface of the tooth 10 to press against and/or fill small cracks, gaps, and spaces of the tooth 10. By conforming the outer layer 22A to the tooth 10, the tooth cap 4 can adequately support the tooth 10 and fragile decayed regions, and can provide an adequate fluid seal during treatment. The relatively hard inner layer 22B of the wall 22 can be shaped or tapered to provide access between the treatment device and the treatment region (e.g., the root canals 13). Thus, the tooth cap 4 of FIGS. 21A-21B can seal the treatment region from within the tooth 10, e.g., from within the endodontic access opening 18 and/or tooth chamber.

Figure 22:
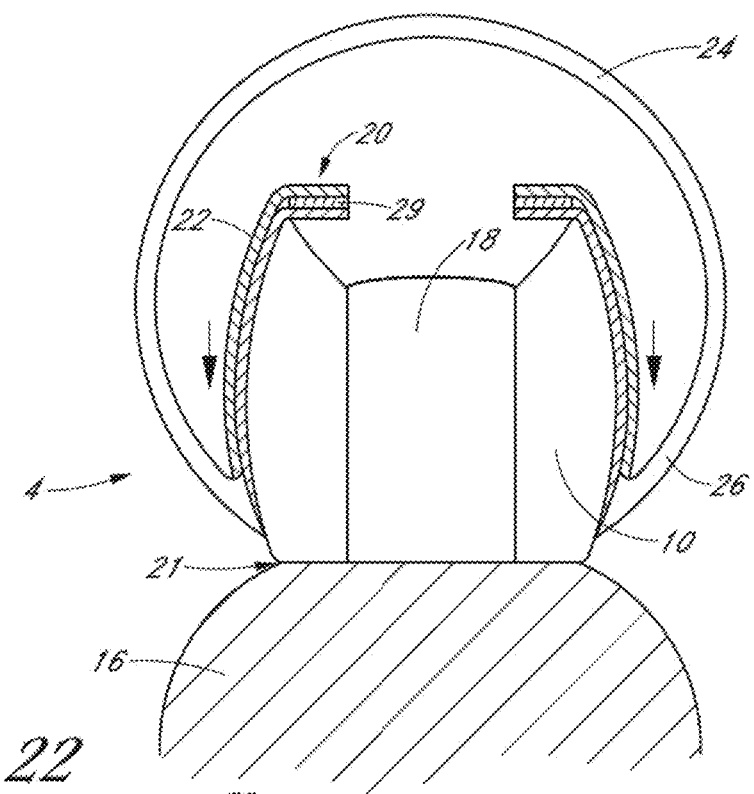
FIG. 22 is a schematic side sectional view of a tooth cap comprising an elastic material configured to be attached to the tooth using a clamp.

FIG. 22 is a schematic side sectional view of a tooth cap 4 comprising an elastic material configured to be attached to the tooth 10 using a clamp 24. The tooth cap 4 can comprise a platform 20 and an access port 7. The platform 20 can comprise a plate 29, which can substantially rigid to provide support to the treatment device 6. The wall 22 can extend from the platform 20 and can comprise an elastic material (e.g., a polymer, rubber, etc.). As shown in FIG. 22, for example, the elastic wall 22 can extend from above the plate 29 to a distal end 21 that can be couple to a clamp arm 26 of a clamp 24. The clinician can position the tooth cap 4 over the tooth 10 and can urge the elastic wall 22 downward such that the distal end 21 of the elastic wall 22 stretches until the distal end 21 reaches a region near the gums 16. The clamp arm 26 can be biased inwardly to secure the distal end 21 of the wall 22 to the tooth 10 and/or gums 16. Stretching the elastic wall 22 downwards along the side surfaces of the tooth 10 can provide a substantial fluid seal while also supporting the tooth 10 and platform 20 during treatment.

Figure 23:
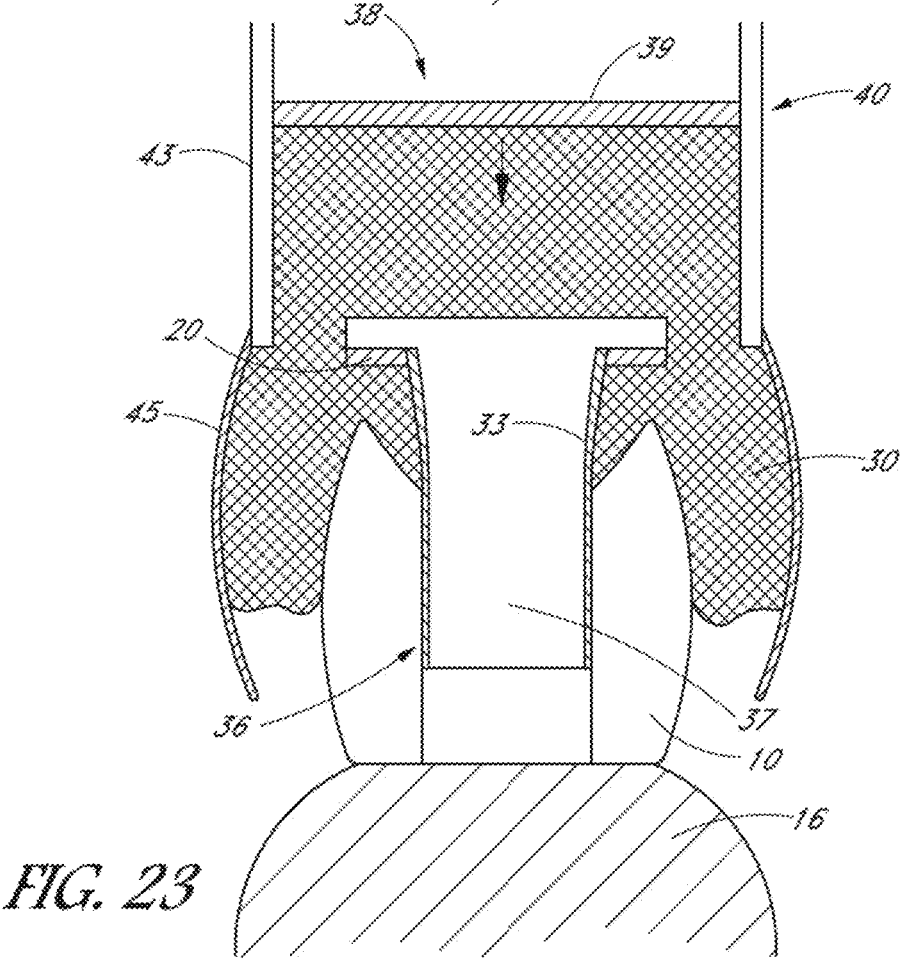
FIG. 23 is a schematic side sectional view of an applicator configured to apply a tooth cap to a tooth, according to another embodiment.

FIG. 23 is a schematic side sectional view of an applicator 40 configured to apply a tooth cap 4 to a tooth 10, according to another embodiment. The applicator 40 can comprise a reservoir 43 and a plunger 38 configured to drive coupling material 30 into the treatment region. The applicator 40 can further include a flap 45 configured to be applied about the tooth 10. The flap 45 can be flexible such that the flap 45 can be deformed to fit about the tooth 10. A plug 36 can be inserted into an endodontic access opening 18 formed in the tooth 10. The plug 36 can comprise a relatively hard inner core 37 and a relatively soft outer layer 33. The core 37 can occlude the access opening 18 to protect the interior of the tooth 10 when coupling material 30 is provided about the tooth 10. The soft layer 33 can press or conform into small gaps, cracks, or spaces of the tooth 10 to seal the treatment region. Furthermore, a platform 20 can be coupled or attached with the plug 36.

To prepare the treatment region for treatment, a plunging surface 39 of the plunger 38 can be advanced through the reservoir 43 to drive flowable coupling material 30 around the plug 36 and the tooth 10 or gums 16. The coupling material 30 can enter the space between the flap 45 and the tooth 10 to fill small gaps, cracks, and spaces in the tooth 10 and/or gums 16. The coupling material 30 can be hardened or cured to form a solid surface against which the treatment device can be supported. When cured or hardened, the applicator 40 and plug 36 can be removed. In some embodiments, the platform 20, initially coupled with the plug 36, can detach from the plug 36 and remain coupled to the hardened coupling material 30. The treatment device can be supported by the platform 20 and/or portions of the top surface of the hardened coupling material 30. The applicator 40 can be removed from the treatment region once the coupling material 30 is attached to the tooth 10. The hardened coupling material 30 can act as a tooth cap to provide a stable support surface for the treatment device and/or to provide a fluid seal about the treatment region.

Figure 24A:
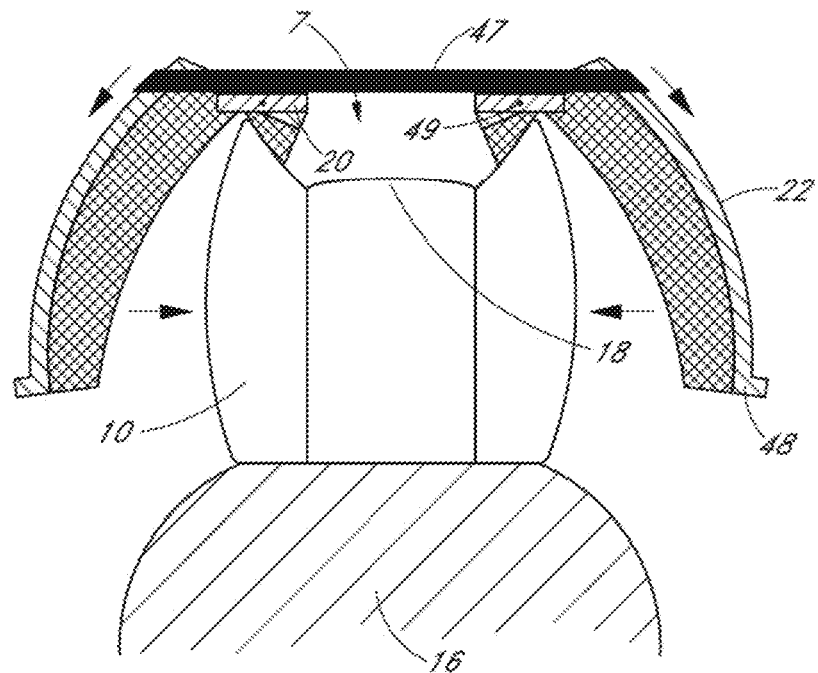
FIGS. 24A and 24B illustrate schematic side sectional views of a tooth cap, according to another embodiment.
Figure 24B:
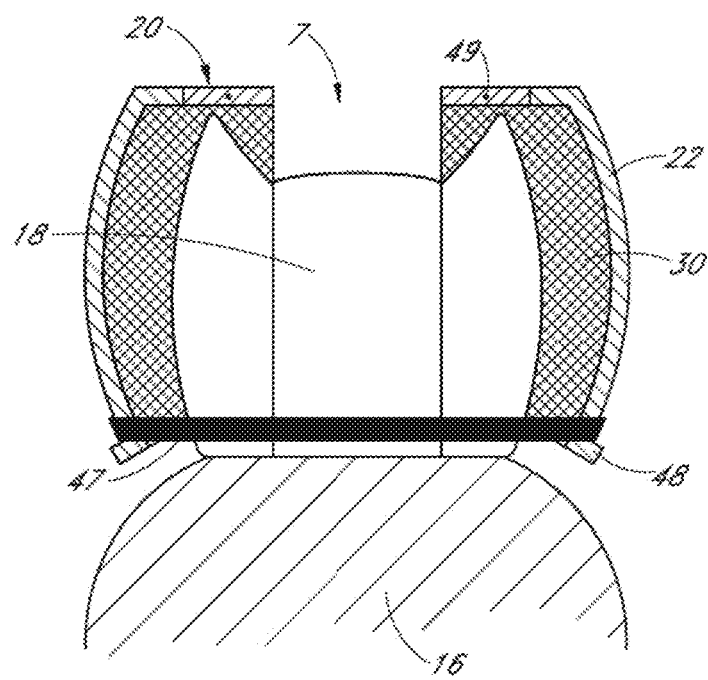

FIGS. 24A and 24B illustrate schematic side sectional views of a tooth cap 4, according to another embodiment. The tooth cap 4 can include a platform 20, an access port 7, and a wall 22 coupled with the platform 20. A coupling material 30 can be formed with or attached to an inner surface of the wall 22. The wall 22 can be rotatably coupled to the platform 20 by way of a hinge 49 or other rotatable coupler. The tooth cap 4 can be positioned near the tooth 10 or treatment region. The wall 22 can be rotated from the configuration shown in FIG. 24A to the configuration shown in FIG. 24B. As the wall 24 pushes the coupling material 30 against the tooth 10, the coupling material 30 can conform to the tooth 10 and/or gums 16 to fill gaps, cracks, and spaces in the tooth 10 and/or gums 16. When the wall 22 and coupling material 30 reach the orientation of FIG. 24B, a securement band 47 can be advanced about the tooth cap 4 to a locking portion 48 at a distal end of the wall 22. The securement band 47 may comprise an elastic band in some arrangements. The securement band 47 can pull the wall 22 inwardly towards the tooth 10 to secure the tooth cap 4 and coupling material 30 to the treatment region. The tooth cap 4 with securement band 47 can support the tooth 10 and treatment device, and can provide a fluid seal between the treatment region and the remainder of the mouth.

Figure 25A:
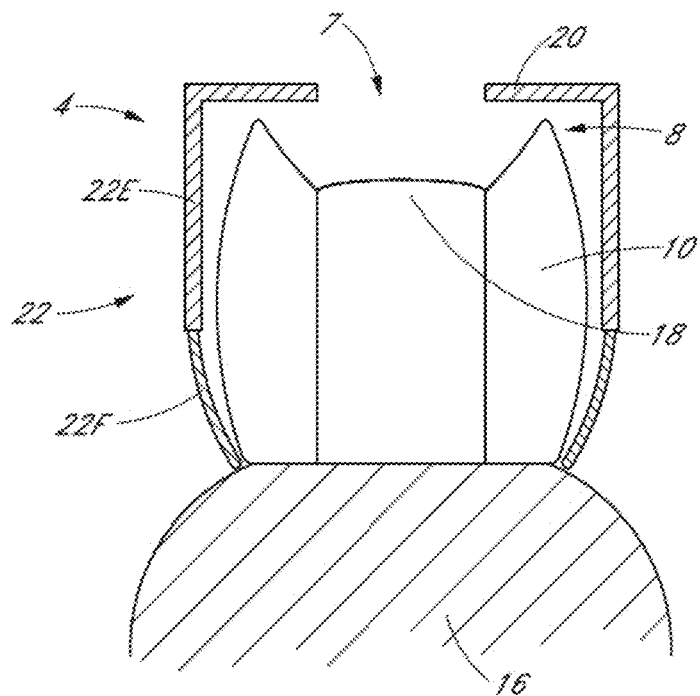
FIGS. 25A and 25B illustrate another embodiment of a tooth cap.
Figure 25B:
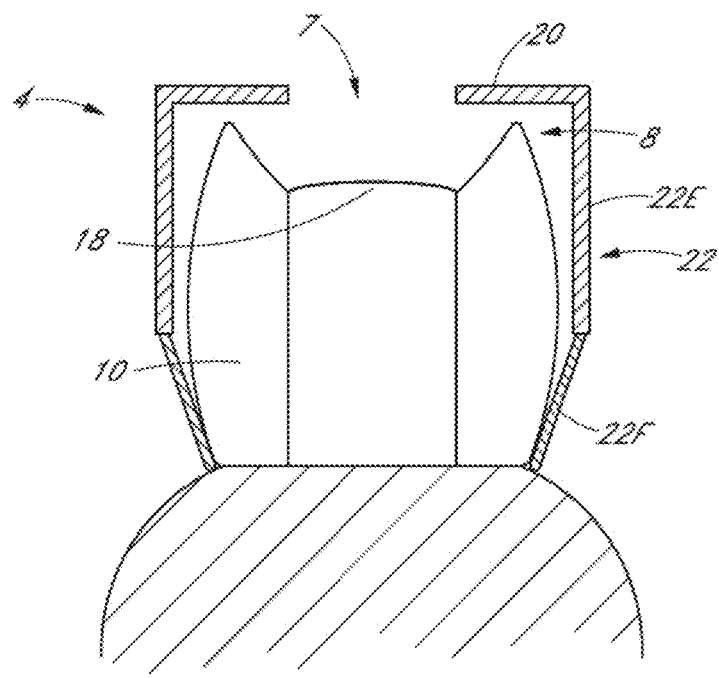

Turning to FIGS. 25A and 25B, yet another embodiment of a tooth cap 4 is disclosed. The tooth cap 4 of FIGS. 25A and 25B can include a platform 20, an access port 7, and a wall 22 extending form the platform 20. The tooth cap 4 can be applied about the tooth 10 such that there is a space 8 between the tooth cap 4 and the tooth 10. The space 8 may remain unfilled, or the space 8 may be filled with a coupling material or fluid. In the embodiment of FIGS. 25A and 25B, however, the wall 22 can include a relatively rigid portion 22E and a shrinkable portion 22F. In FIG. 25A, the shrinkable portion 22F is illustrated in a relaxed or elongated state in which there is slack in the shrinkable portion 22F. The shrinkable portion 22F of the wall can extend along the entire wall 22, e.g., from the platform 22 to the gums 16 in some embodiments. As shown in FIG. 25A, the shrinkable portion 22F may only comprise a portion of the wall 22.

The shrinkable portion 22F can be activated by a suitable activation source and can shrink to a shrunken or shortened state as shown in FIG. 25B. Suitable stimuli or triggers (which may be reversible) for activating the shrinkable portion 22F can comprise heat, light, chemicals, etc. The shrinkable material can comprise any suitable material that is shrinkable when triggered by an external stimulus. Once the shrinkable portion 22F is shortened, the shrinkable portion 22F can act as a seal against the treatment region to inhibit the exchange of fluid between the treatment region and the remainder of the mouth. The activated, shortened shrinkable portion 22F can also provide support to decayed or weakened portions of the tooth 10 during treatment.

Figure 26A:
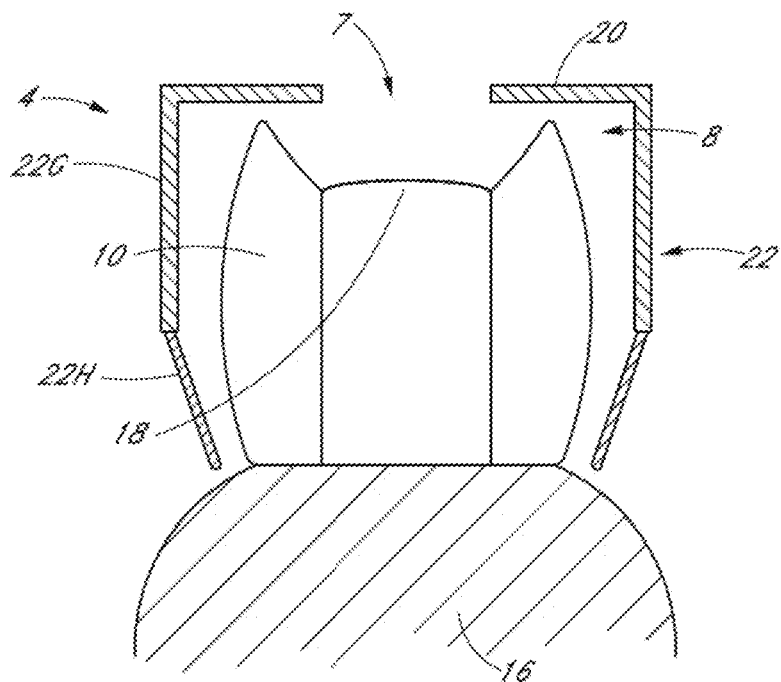
FIGS. 26A and 26B illustrate yet another embodiment of a tooth cap.
Figure 26B:
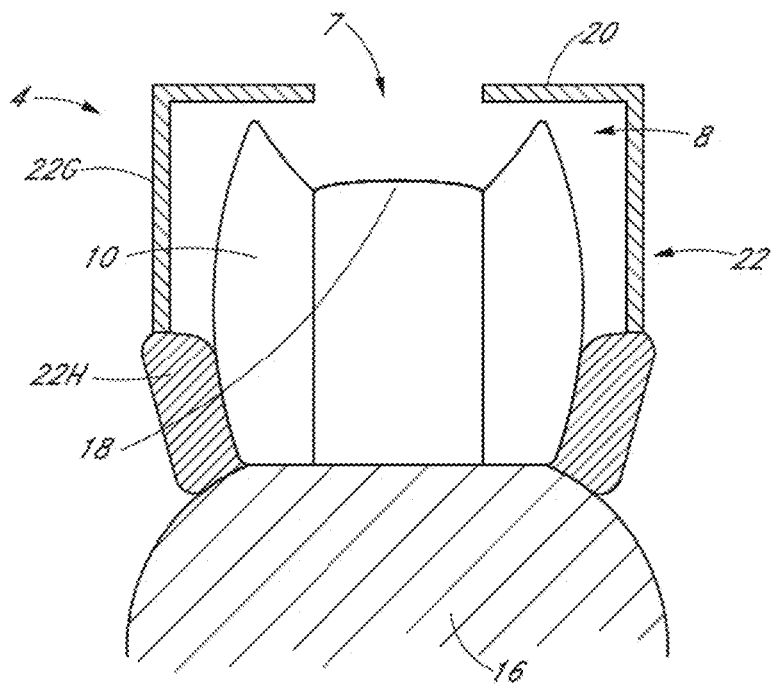

Turning to FIGS. 26A and 26B, yet another embodiment of a tooth cap 4 is disclosed. The tooth cap 4 of FIGS. 26A and 26B can include a platform 20, an access port 7, and a wall 22 extending form the platform 20. The tooth cap 4 can be applied about the tooth 10 such that there is a space 8 between the tooth cap 4 and the tooth 10. The space 8 may remain unfilled, or the space 8 may be filled with a coupling material or fluid. In the embodiment of FIGS. 26A and 26B, however, the wall 22 can include a relatively rigid portion 22G and a swellable portion 22H. In FIG. 26A, the swellable portion 22H is illustrated in an unswollen state in which the swellable portion 22H is spaced from the tooth 10. The swellable portion 22H of the wall 22 can extend along the entire wall 22, e.g., from the platform 22 to the gums 16 in some embodiments. As shown in FIG. 26A, the swellable portion 22H may only comprise a portion of the wall 22.

The swellable portion 22H can be activated by a suitable activation source and can swell to a swollen or expanded state as shown in FIG. 26B. Suitable stimuli or triggers (which may be reversible) for activating the swellable portion 22H can comprise water (or other liquid), heat, light, chemicals, etc. The shrinkable material can comprise any suitable material that is swellable when excited or activated by a trigger. Once the swellable portion 22H is expanded or swollen by activating the trigger, the swellable portion 22H can expand to act as a seal against the treatment region to inhibit the exchange of fluid between the treatment region and the remainder of the mouth. The activated, swollen swellable portion 22H can also provide support to decayed or weakened portions of the tooth 10 during treatment.

Figure 27A:
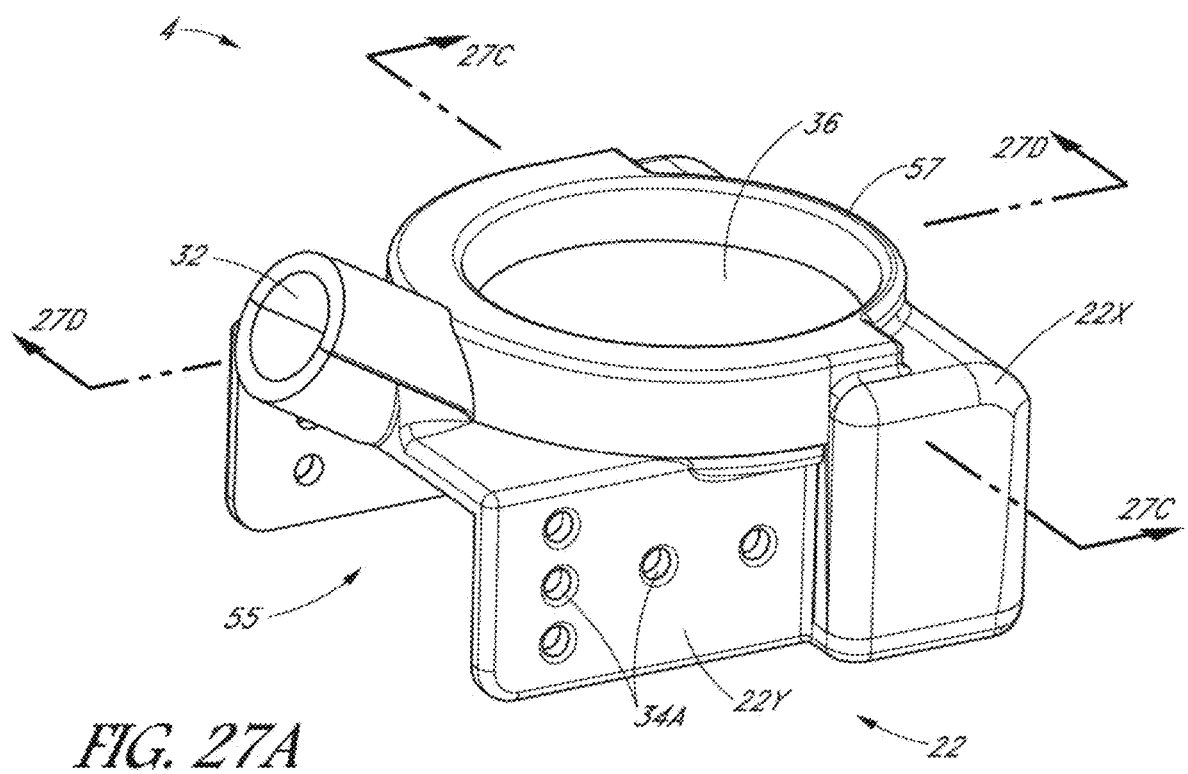
FIGS. 27A-27D are perspective views of a tooth cap, in accordance with one embodiment.
Figure 27B:
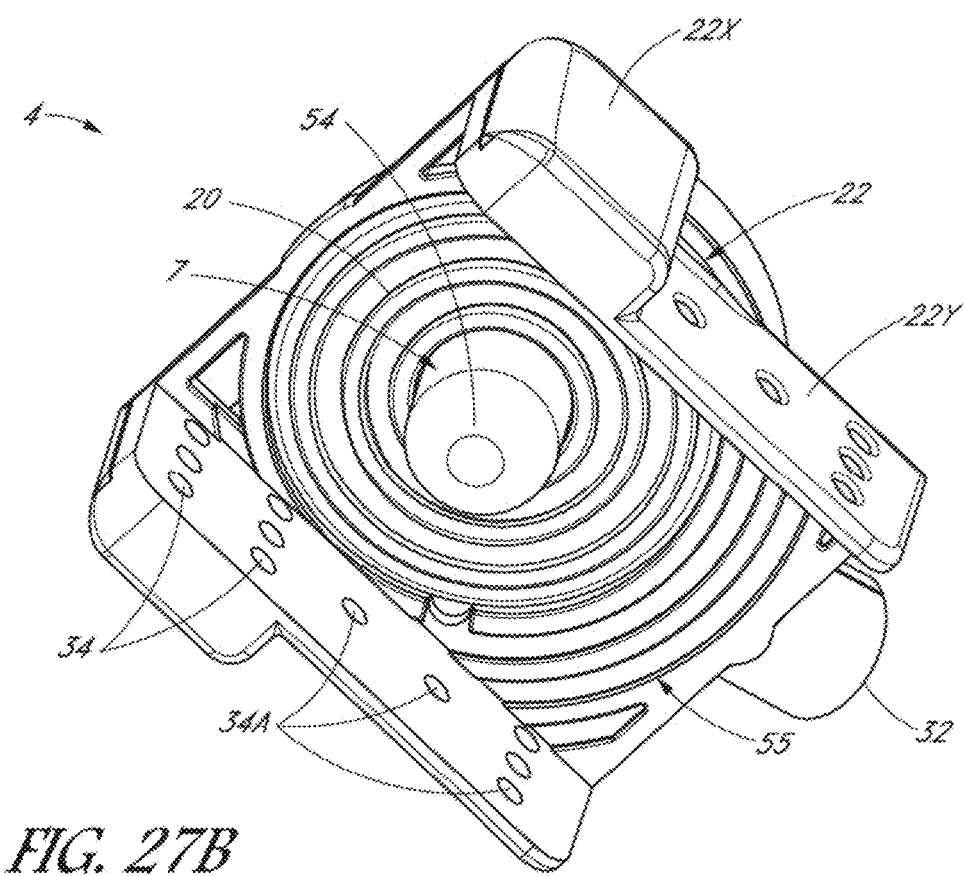
Figure 27C:
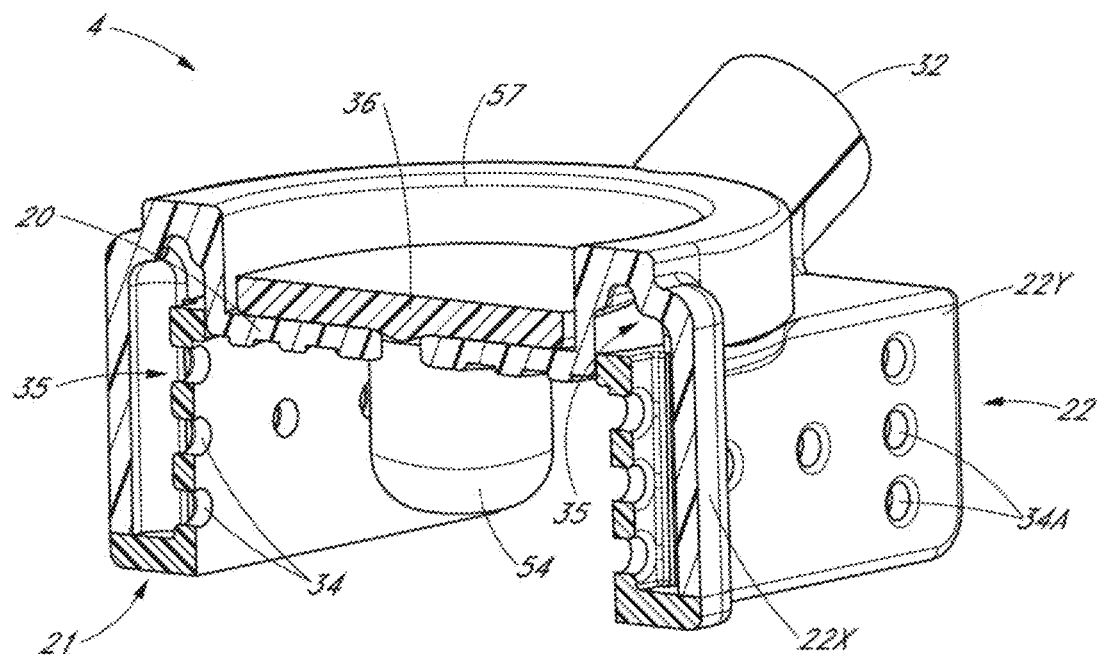
Figure 27D:
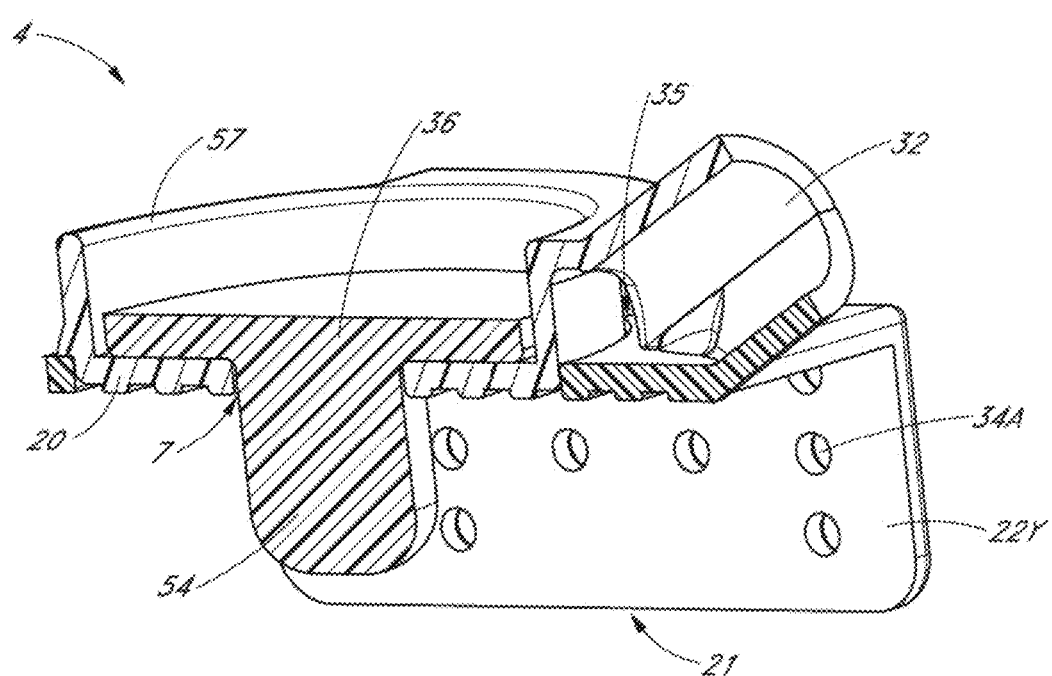

FIGS. 27A-27D are perspective views of a tooth cap 4, in accordance with one embodiment. In particular, FIG. 27A is a front, right, top perspective view of the cap 4. FIG. 27B is a rear, left, bottom perspective view of the cap 4. FIG. 27C is a rear, left cross-sectional view of the cap 4, taken along section lines 27C-27C shown in FIG. 27A. FIG. 27D is a front, left cross-sectional view of the cap 4, taken along section lines 27D-27D shown in FIG. 27A. As with the embodiments disclosed above, the tooth cap 4 in FIGS. 27A-27D can comprise a platform 20 (see FIGS. 27B-27D), an access port 7 (see FIGS. 27B and 27D), and a wall 22 coupled with or extending from the platform 20. In addition, an annular channel 57 can extend upwardly from the platform 20. In some embodiments, the annular channel 57 and the platform 20 can be formed from a single piece of material (e.g., a unitary body). In other embodiments, the annular channel 57 can couple with or connect to the platform 20. As shown in FIGS. 27A-27B, the tooth cap 4 may comprise a saddle-shaped apparatus, in which a gap 55 is provided between two walls 22 of the tooth cap 4. As shown below, the tooth cap 4 can be positioned on a tooth such that the gap 55 straddles adjacent teeth. The tooth cap 4 illustrated in FIGS. 27A-27D is described herein in accordance with an example root canal treatment procedure, e.g., for a molar tooth. However, it should be appreciated that the tooth cap 4 can be used with other types of procedures and teeth. For example, the tooth cap 4 can be used for treating caries, undesirable dental deposits, and/or diseased gum tissue. Furthermore, the tooth cap 4 can be configured for use with other types of teeth in various embodiments, including, e.g., pre-molar teeth, canine teeth, incisors, etc. In addition, as explained above, as used herein, a tooth cap 4 can be used to cap or cover one or more teeth, e.g., a portion of a tooth, an entire tooth, all or part of adjacent teeth, and/or a plurality of teeth.

The wall 22 can comprise a chamber portion 22X and an anchoring portion 22Y. In some embodiments, the chamber portion 22X and anchoring portion 22Y can extend from or be coupled with the annular channel 57. In some arrangements, the chamber portion 22X and anchoring portion 22Y can extend from or be coupled with the platform 22 (e.g., by way of the annular channel 57 or directly with the platform 20). The tooth cap 4 can include a supply port 32 through which a flowable coupling material 30 (see FIGS. 28D-28G) can be supplied to the tooth cap 4. As shown in FIGS. 27C and 27D, the chamber portion 22X of the wall 22 can comprise a chamber 35 in fluid communication with the supply port 32. For example, the chamber 35 can comprise a hollow space or cavity in the wall 22. The chamber 35 can extend from near the annular channel 57 to a distal portion 21 of the wall 22. The chamber 35 can extend circumferentially along the annular channel 57 and laterally down through the chamber portion 22X of the wall 22.

As shown in FIG. 27D, the supply port 32 can be configured to supply a flowable material to the chamber 35 through a portion of the chamber 35 formed in the annular channel 57. As flowable material is supplied through the supply port 32, the flowable material displaces existing flowable material in the tooth cap 4 and pushes the flowable material circumferentially through the annular channel 57 and down through the chamber portion 22X of the wall 22. Thus, a flowable coupling material 30 can be supplied to the tooth cap 4 through the supply port 32, and can fill the chamber 35 that extends through annular channel 57 and the wall 22.

One or more injection ports 34 can be formed in the chamber portion 22X of the wall 22. As shown in FIG. 27B-27C, the injection ports 34 can comprise holes formed in an inner side of the wall 22 that faces the tooth 10 and/or gums 16 when the tooth cap 4 is applied to the treatment region. When coupling material 30 is flowed through the chamber 35 of the chamber portion 22X of the wall 22, the coupling material 30 can be urged out of the chamber 35 and through the injection ports 34. As the coupling material 30 flows in a space between the tooth cap 4 and the tooth 10 and/or gums 16, the coupling material 30 can flow outwardly through anchoring ports 34A formed in the anchoring portion 22Y of the wall 22. The portions of the coupling material 30 that flow outwardly through the anchoring ports 34A can assist in anchoring the tooth cap 4 to the treatment region.

Furthermore, a plug 36 can be used to help prevent coupling material 30 or other materials from entering the tooth 10 when the tooth cap 4 is attached to the treatment region. For example, the plug 36 can comprise a stopper portion 54 sized and shaped to be inserted through the access port 7 of the tooth cap 4 and into an endodontic access opening formed in the tooth 10. The stopper portion 54 can assist in aligning the tooth cap 4 with the treatment region and can inhibit or prevent materials (such as the flowable coupling material) from entering the tooth chamber and canal spaces of the tooth 10. As explained in more detail below, the plug 36 can be removably coupled with the tooth cap 4.

The tooth cap 4 can be formed of any suitable material. For example, in some embodiments, the tooth cap 4 can comprise a polymer or plastic. In some embodiments, the tooth cap 4 can comprise a metal. In some embodiments, the tooth cap 4 can be formed as one piece, e.g., as a unitary body. For example, the tooth cap 4 can be formed by molding, 3D printing, machining, or other suitable procedures. In other embodiments, the tooth cap 4 can comprise multiple discrete pieces coupled or adhered together. Skilled artisans would understand that still other arrangements are possible. In some embodiments, the tooth cap 4 can be manufactured with a custom size and shape designed to fit over a particular tooth in a patient. For example, an impression or image of the patient's tooth can be taken, and a custom tooth cap 4 can be sized according to the impression or image taken of the treatment tooth or treatment region. In other embodiments, the tooth cap 4 can be made with a preselected or predesigned size and shape. For example, in some embodiments, a kit of tooth caps 4 can be provided. The kit can comprise a set of multiple tooth caps 4, each tooth cap 4 having a different size. The different sizes (e.g., the spacing between the walls 22, the depth or height of the walls 22, the width of the walls 22) can advantageously enable the clinician to select an appropriately-sized tooth cap 4 for the particular tooth to be treated.

Figure 28A:
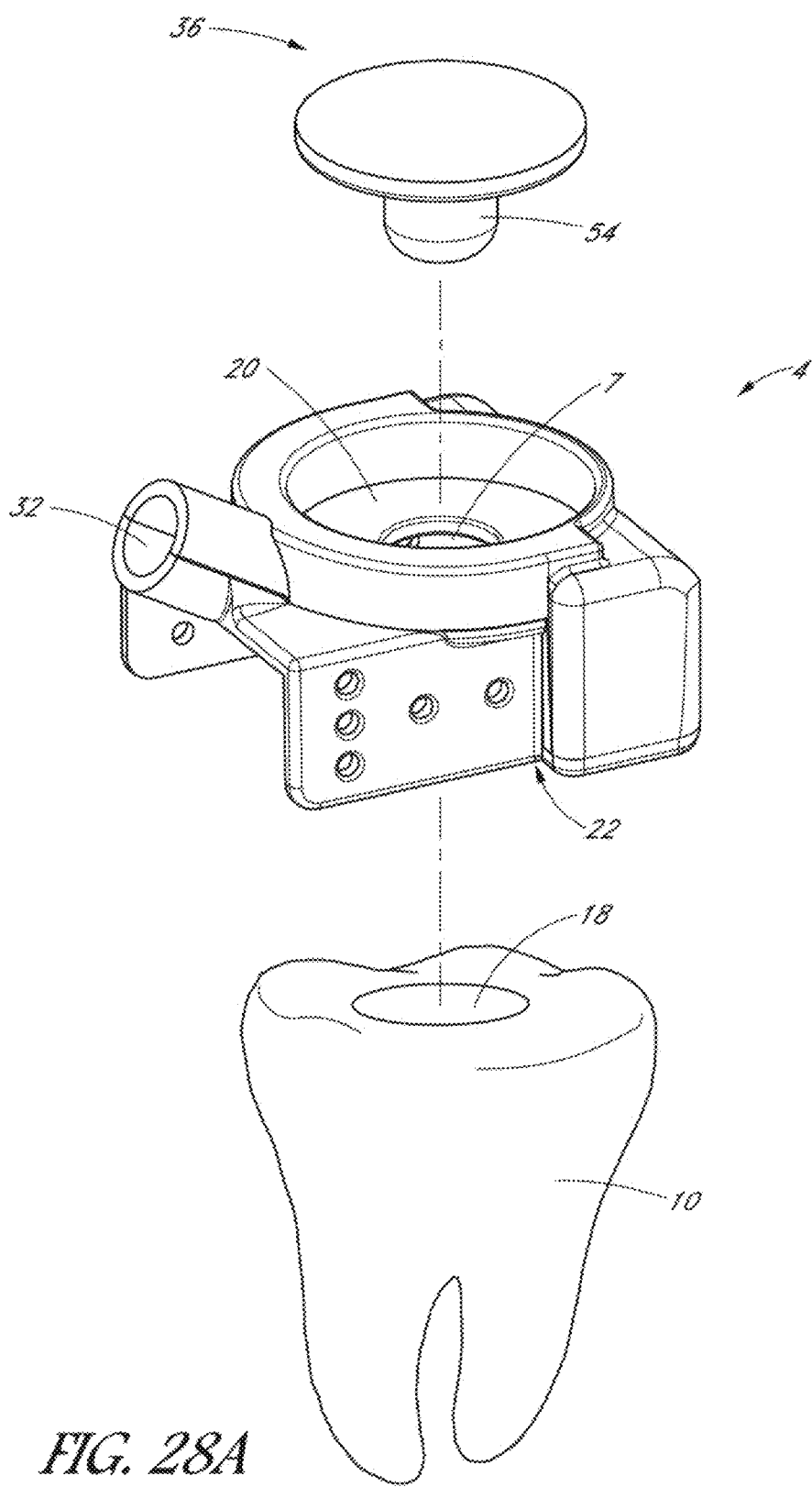
FIGS. 28A-28G illustrate the tooth cap shown in FIGS. 27A-27D at various stages of a treatment procedure.

FIGS. 28A-28G illustrate the tooth cap 4 shown in FIGS. 27A-27D at various stages of a treatment procedure. For example, FIG. 28A is a schematic perspective view of the tooth cap 4 and plug 36 prior to positioning the tooth cap 4 at the treatment region. As shown in FIG. 28A, the clinician can position the tooth cap 4 over the tooth 4 such that the tooth cap 4 straddles adjacent teeth (not shown). The clinician can align the tooth cap 4 such that the access port 7 is near or aligned with an endodontic access opening 18 formed in the tooth 10. The clinician can insert the stopper portion 54 of the plug 36 through the access port 7 and the access opening 18 to inhibit materials from entering the interior of the tooth 10 (e.g., the pulp chamber and/or root canal spaces).

Figure 28B:
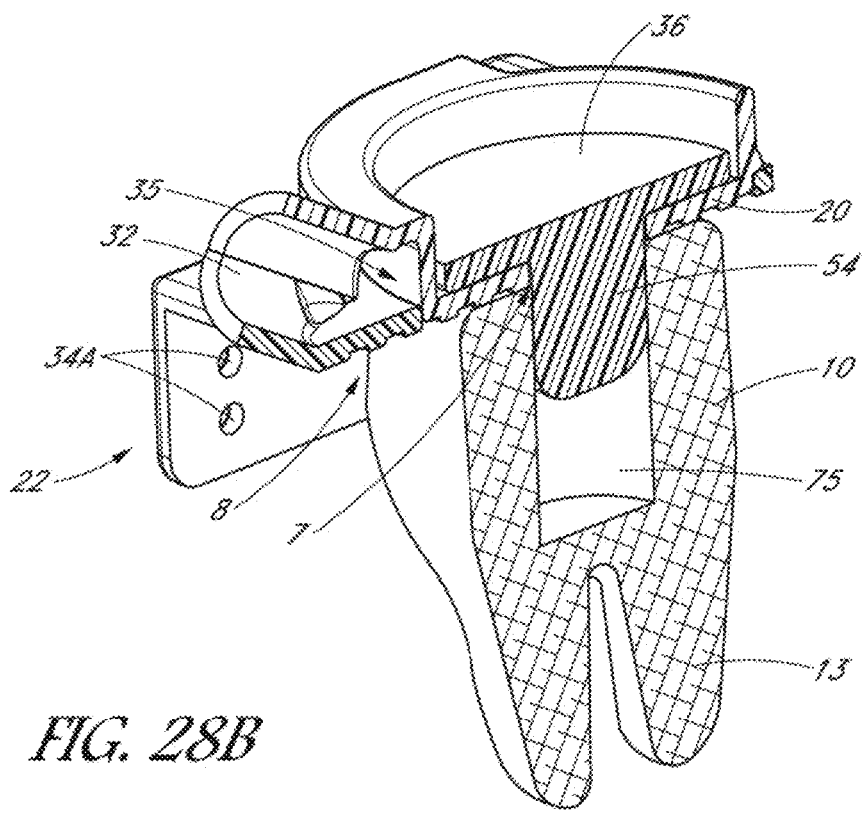

FIG. 28B is a schematic perspective, cross-sectional view of the tooth cap 4, plug 36, and tooth 10 after the tooth cap 4 and plug 36 have been coupled or attached with the tooth 10. As shown in FIG. 28B, the stopper portion 54 can extend at least partially into the tooth chamber 75 and can align and/or seal the opening 18. In addition, in FIG. 28B, when the tooth cap 4 is positioned on the treatment region, a space 8 can be defined or formed between the tooth cap 4 and the tooth 10 and/or gums. For example, the space 8 can comprise a gap between the wall 22 and a portion of the tooth 10. To provide the clinician with access to the supply port 32, the clinician can position the tooth cap 4 such that the supply port 32 faces in a mesial direction or in a direction facing towards the clinician. In some embodiments, a soft material (such as a cotton swab) can be inserted into the tooth chamber 75 prior to inserting the plug 36 into the access opening 18. The walls 22 can extend along a side surface of the tooth, e.g., along a facial surface, a buccal surface, a labial surface, and/or a lingual surface of the tooth. In other embodiments, the walls can extend along a proximal side surface of the tooth, e.g., between adjacent teeth (see FIG. 3A).

Figure 28C:
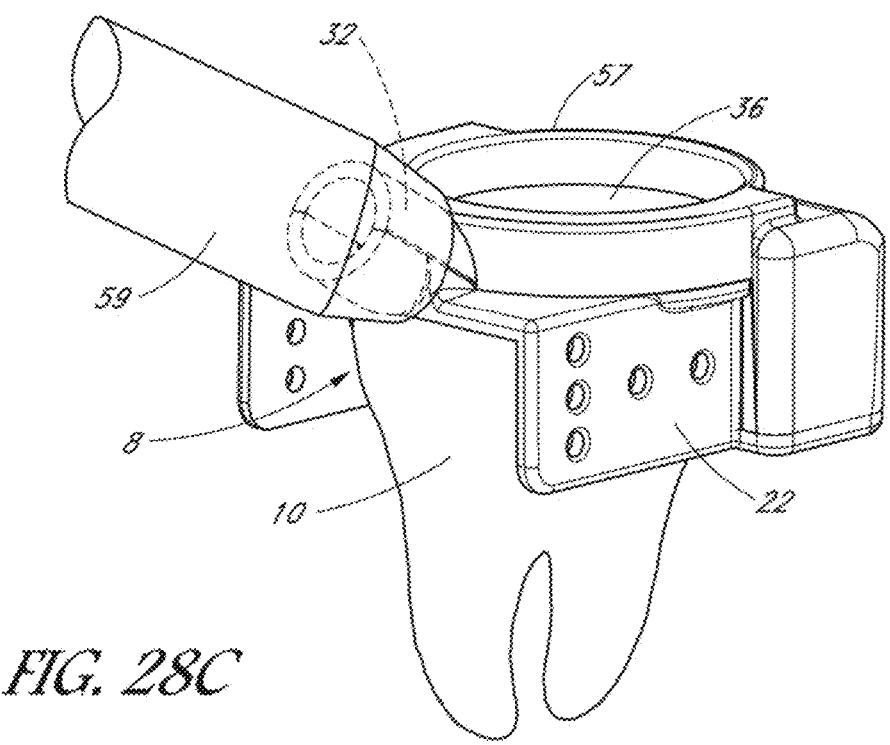

Turning to FIG. 28C, a schematic perspective view of the tooth cap 4 and plug 36 are shown. Once the tooth cap 4 and plug 36 are positioned appropriately, the clinician can connect a supply reservoir 59 (which may comprise a plunger, needle, injection gun, a pressure wave generator, or other injection device) with the supply port 32 of the tooth cap 4. The clinician can load the supply reservoir 59 with a selected coupling material 30 (e.g., impression material, bite registration material, or other flowable and/or curable material). The clinician can purge the supply reservoir 59 prior to use to ensure that the coupling material 30 flows evenly through an exit of the reservoir 59. The clinician can couple a tip or exit of the supply reservoir 59 with the supply port 32 and can begin injecting or supplying coupling material 30 through the supply port 32 of the tooth cap 4.

Figure 28D:
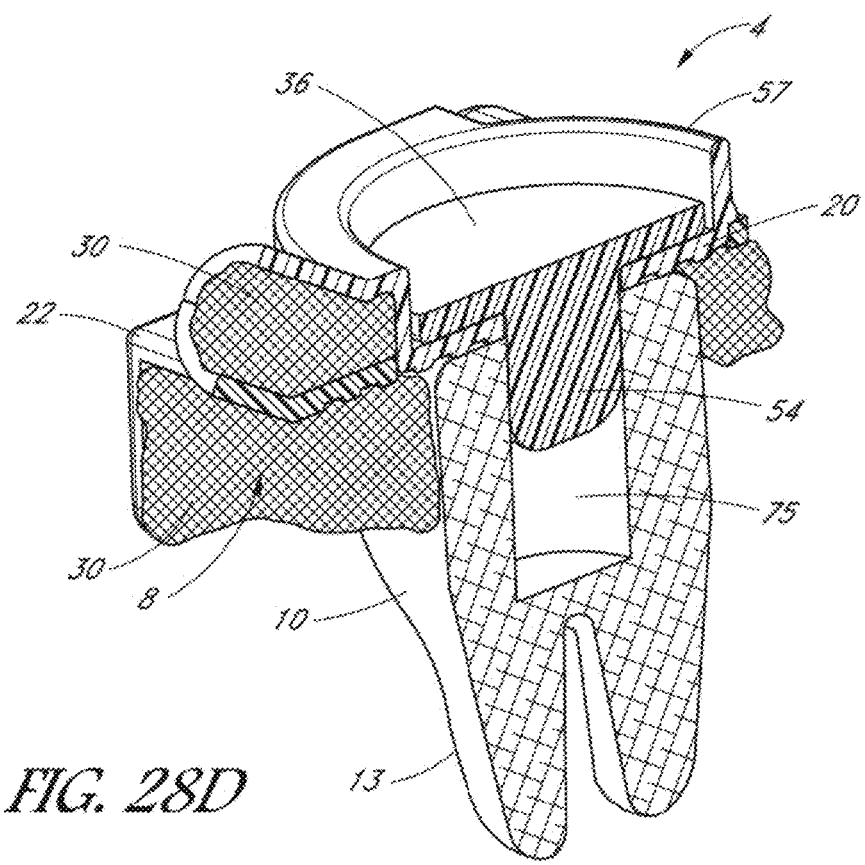
Figure 28E:
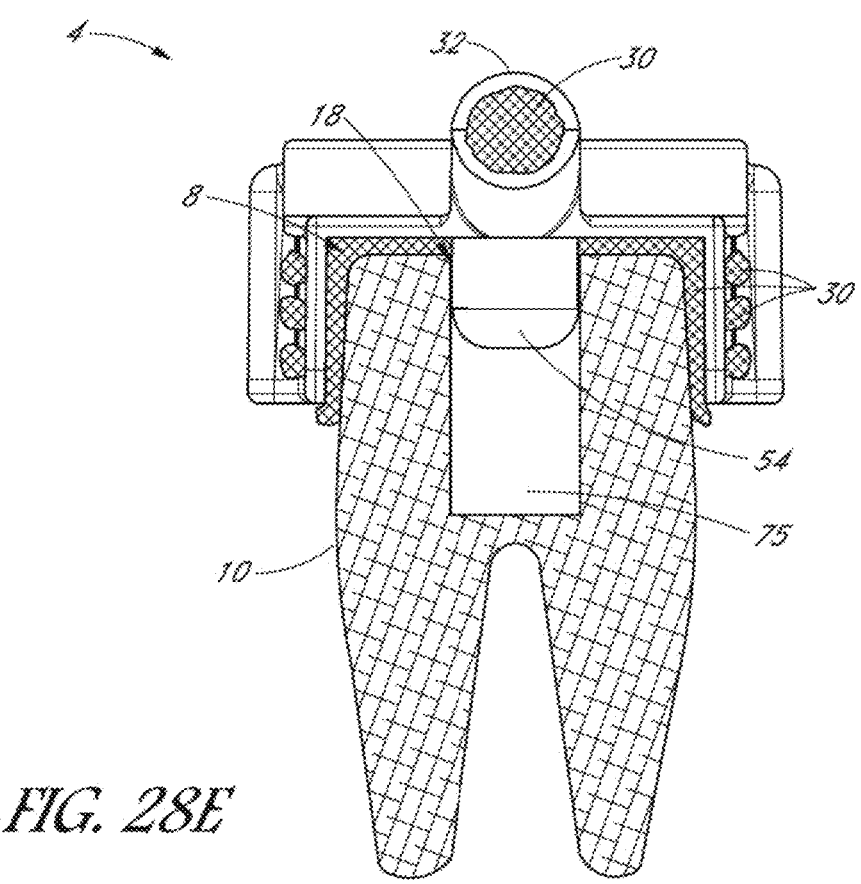

FIG. 28D is a schematic perspective cross-sectional view of the tooth cap 4, plug 36, and tooth 10 after coupling material 30 has been fully injected into the tooth cap 4. FIG. 28E is a front side cross-sectional view of the tooth cap 4, plug 36, and tooth 10 after the coupling material 30 has been fully injected into the tooth cap 4. As shown in FIGS. 28D-28E, the flowable coupling material 30 can flow through the supply port 32 and into the chamber 35 in the annular channel 57 of the tooth cap 4. The coupling material 30 can further flow circumferentially about the annular channel 57 and can flow downwardly through the chamber 35 in the wall 22. The coupling material 30 can be injected into the space 8 between the tooth cap 4 and the tooth 10 and/or gums by way of the injection ports 34 (see FIGS. 27B-27C). The coupling material 30 can substantially fill the space 8 and can fill small gaps, cracks, and spaces in the treatment region (e.g., in the tooth 10). Enabling the coupling material 30 to flow into the small cracks and gaps can provide additional structural support to portions of the tooth (including decayed or diseased portions) during treatment and can further inhibit the exchange of fluid between the treatment region (e.g., the interior of the tooth chamber 18 or other portions of the tooth or gums) and the remainder of the patient's mouth.

The coupling material 30 can also flow outward from the tooth cap 4 through the anchoring ports 34A. As shown in FIG. 28E, portions 30a of the coupling material 30 can pass through the anchoring ports 34A (see FIGS. 27A-27D and 28B). The portions 30a passing through the ports 34A can further anchor the tooth cap 4 to the treatment region. For example, when hardened, the portions 30a can provide a strong mechanical coupling between the wall 22 of the tooth cap 4 and the portions of the tooth 10 contacting the coupling material 30.

When the space 8 between the tooth cap 4 and the tooth 10 or gums is substantially filled, the clinician can cure or harden the coupling material 30 from the flowable state to a hardened or solid state. For example, the clinician may visually inspect the amount of coupling material 30 filling the space 8 and/or the amount that backs up through the supply port 32. The clinician can cure the coupling material using any suitable technique, including, e.g., waiting for the coupling material 30 to harden, heating the coupling material 30, optically curing the coupling material 30 (e.g., with ultraviolet or UV light), chemically curing the coupling material 30, or any other suitable method. As explained herein, the coupling material 30 can be any suitable material, including any material having a flowable and a hardened or solid state. Example materials for the coupling material 30 include, e.g., impression material, bite registration material, etc.

Figures 28F, 28G:
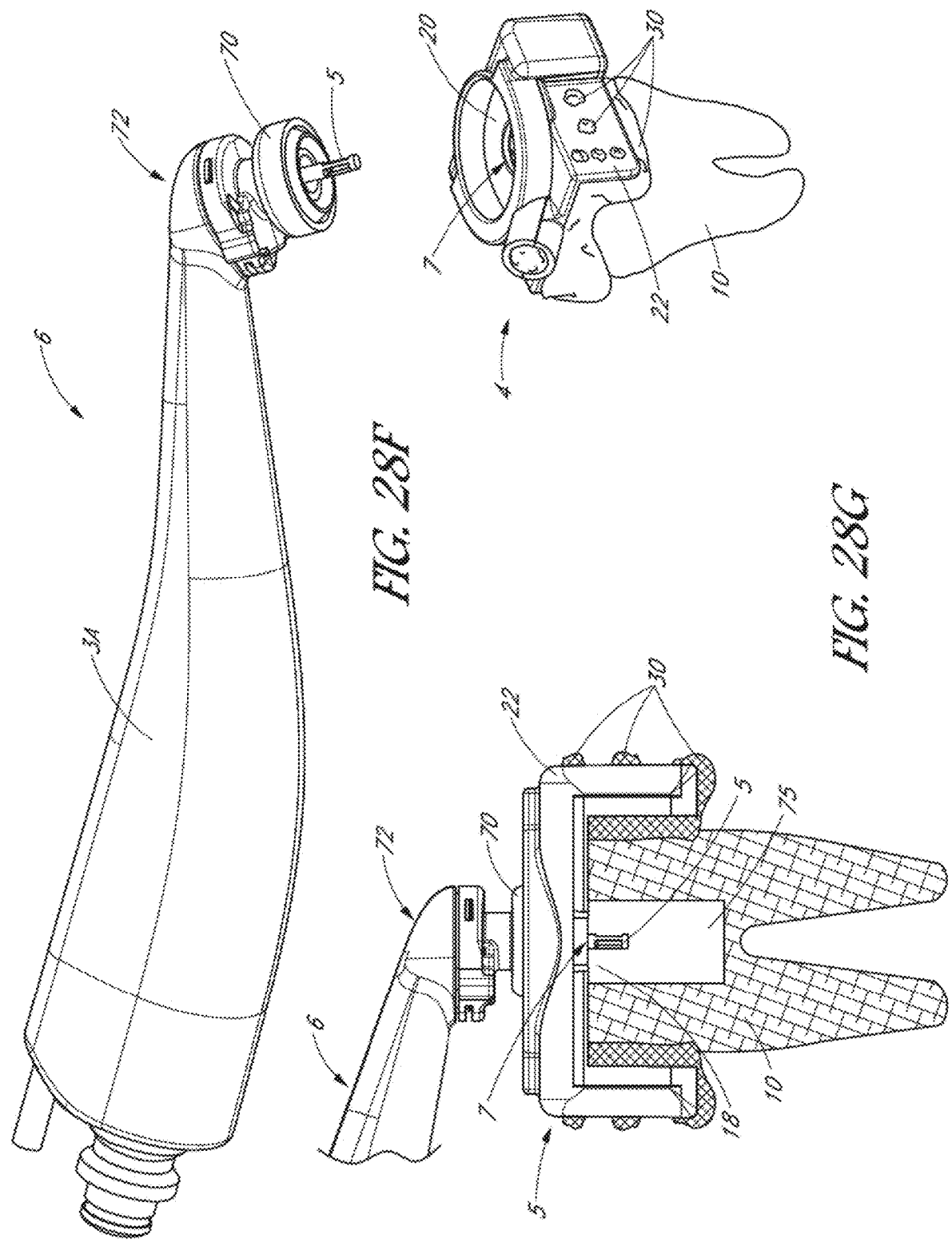

FIG. 28F is a schematic perspective view of a treatment device 6 and the tooth cap 4 of FIGS. 28A-28E prior to positioning the treatment device on the tooth cap 4. Once the coupling material 30 is sufficiently hardened or solidified, the clinician can remove the plug 36 from the tooth cap 4. As shown in FIG. 28F, removing the plug 36 can expose the platform 20 upon which the treatment device 6 is positioned during treatment. The treatment device 6 can comprise a dental handpiece 3A (which may be a type of tooth coupler 3 described above) having a distal portion 72 and a sealing cap 70 coupled or formed therewith. The sealing cap 70 can comprise a flexible material and can be configured such that, when the clinician presses the sealing cap 70 against the platform 20 of the tooth cap 4, a substantially sealed treatment region is formed. For example, the sealing cap 70 can inhibit or reduce the amount of fluid entering and/or leaving the treatment region. The treatment device 6 can comprise a pressure wave generator 5 configured to generate pressure waves having energy sufficient to treat a tooth, e.g., sufficient to clean diseased materials from interior regions of the tooth 10, such as root canal spaces. In some embodiments, the pressure wave generator 5 can comprise a liquid jet device. In other embodiments, the pressure wave generator 5 can comprise a laser, a mechanical stirrer, an ultrasonic transducer, etc. In still other embodiments, the treatment device 6 can comprise any other suitable treatment device, such as a drill, burr, file, obturation apparatus, etc. The clinician can align the pressure wave generator 5 with the access port 7 of the tooth cap 4.

FIG. 28G is a schematic side cross-sectional view of the treatment device 6 positioned on the platform 20 (see FIG. 28F) of the tooth cap 4. The pressure wave generator 5 can be inserted through the access port 7 of the tooth cap 4 and access opening 18 and into the tooth chamber 75. The clinician can press the sealing cap 70 against the platform 20 of the tooth cap 4 to maintain a sealed treatment region. In some embodiments, treatment fluid can be supplied to the tooth chamber 75. The pressure wave generator 5 can be activated to create pressure waves that propagate through the treatment fluid to clean or otherwise treat the interior of the tooth 10. For example, the generated pressure waves can propagate through the tooth chamber 75 and canal spaces to clean diseased material throughout the interior of the tooth 10, including in small cracks and crevices of the tooth 10. As explained above, the pressure wave generator 5 can clean portions of the tooth 10 that are in fluid communication with the pressure wave generator 5, including carious regions and/or undesirable dental deposits (such as plaque, biofilm, calculus, etc.). Although the pressure wave generator 5 of FIG. 28G is shown as being at least partially disposed in the tooth chamber 75 during treatment, in other embodiments, the pressure wave generator 5 may be disposed outside the tooth chamber 75, e.g., opposite the access port 7. Accordingly, the access port 7 can provide the treatment device 6 with access to the treatment region when the treatment device 6 is disposed outside the treatment region and/or when a portion of the treatment device 6 is disposed in or near the treatment region.

Advantageously, the tooth cap 4 of FIGS. 27A-28G can establish a stable support surface (e.g., the platform 20) against which the sealing cap 70 can be positioned. The tooth cap 4 can thereby help the clinician to align the treatment device 6 during the procedure and to create a fluid seal between the tooth chamber 75 and the remainder of the mouth. In addition, the coupling material 30 can be flowed about the tooth 10 to securely attach the tooth cap 4 to the tooth 10. The coupling material 30 can provide a strong mechanical connection between the tooth cap 4 and the tooth 10 to ensure that the tooth cap 4 is not inadvertently removed during treatment. As explained above, the coupling material 30 can also inhibit the flow of fluids between the treatment region and the remainder of the patient's mouth. Moreover, as explained above, the coupling material 30 can fill small cracks and crevices of the tooth 10 and can support decayed or weak regions of the tooth during treatment. The coupling material 30 and tooth cap 4 can therefore enhance the structural integrity of the tooth (including weak or decayed portions) during treatment.

When the treatment procedure is concluded, the clinician can remove the treatment device 6. If the clinician wants to perform another procedure (such as obturation or inspection of the treatment region), the clinician can position another treatment device or tool (such as an obturation material or monitoring tool) on the tooth cap 4 to conduct the other procedure. When the clinician is complete, the clinician can remove the tooth cap 4 and coupling material by applying an outward force against the tooth cap 4. The coupling material 30 can be sufficiently hardened to support the tooth and tooth cap 4 during treatment, but can also be sufficiently pliable so as to be removed manually (or using a tool) by the clinician.

It should be appreciated that, although the sealing cap 70 is described above as being positioned against the tooth cap 4 and held in place by the clinician during treatment, in other embodiments, the clinician can attach or otherwise secure the sealing cap 70 (which may or may not be coupled with a handpiece) to the tooth cap 4 during treatment. Although the treatment device 6 shown in FIGS. 28F and 28G comprises a pressure wave generator 5, it should be appreciated that any suitable treatment device can be used in conjunction with the embodiments disclosed herein. For example, a dental file, burr, drill, syringe, needle, irrigation source, or other devices can be used in conjunction with the tooth cap 4. Additional examples of handpieces and sealing caps may be found in U.S. Patent Publication No. 2012/0237893 and U.S. patent application Ser. No. 14/137,937 (filed Dec. 20, 2013), each of which is incorporated by reference herein in its entirety. Furthermore, examples of pressure wave generators that can be used with the embodiments disclosed herein may be found in U.S. Patent Publication No. 2007/0248932 A1, U.S. Patent Publication No. 2011/0117517, U.S. Patent Publication No. 2012/0237893, International Patent Application No. PCT/US2013/032635 (filed Mar. 15, 2013), U.S. Patent Publication No. 2014/0099597 A1, and U.S. patent application Ser. No. 14/137,937 (filed Dec. 20, 2013), each of which is incorporated by reference herein in its entirety.

Figure 29A:
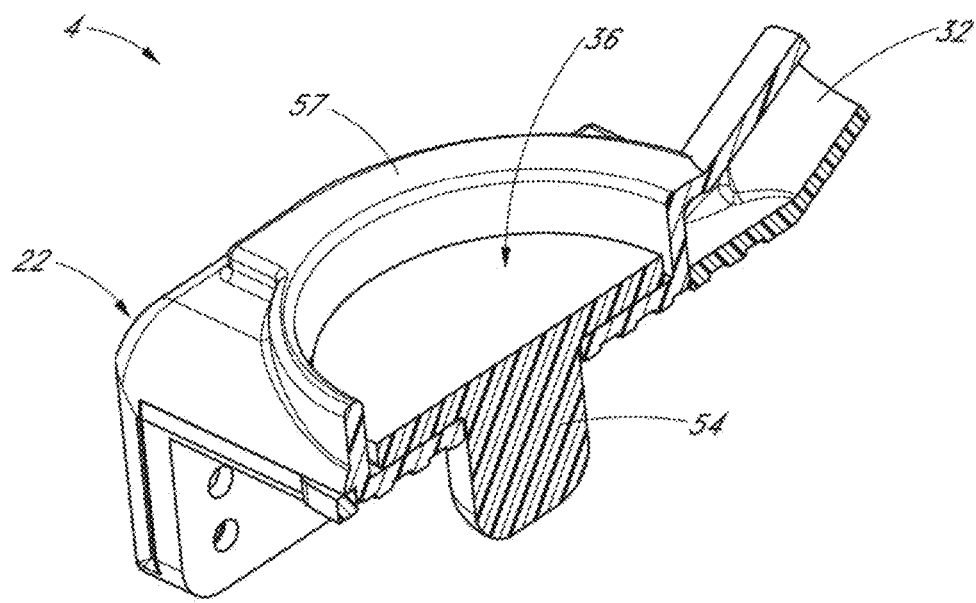
FIGS. 29A-29D are schematic, perspective, cross-sectional views of a tooth cap having various types of plugs.
Figure 29B:
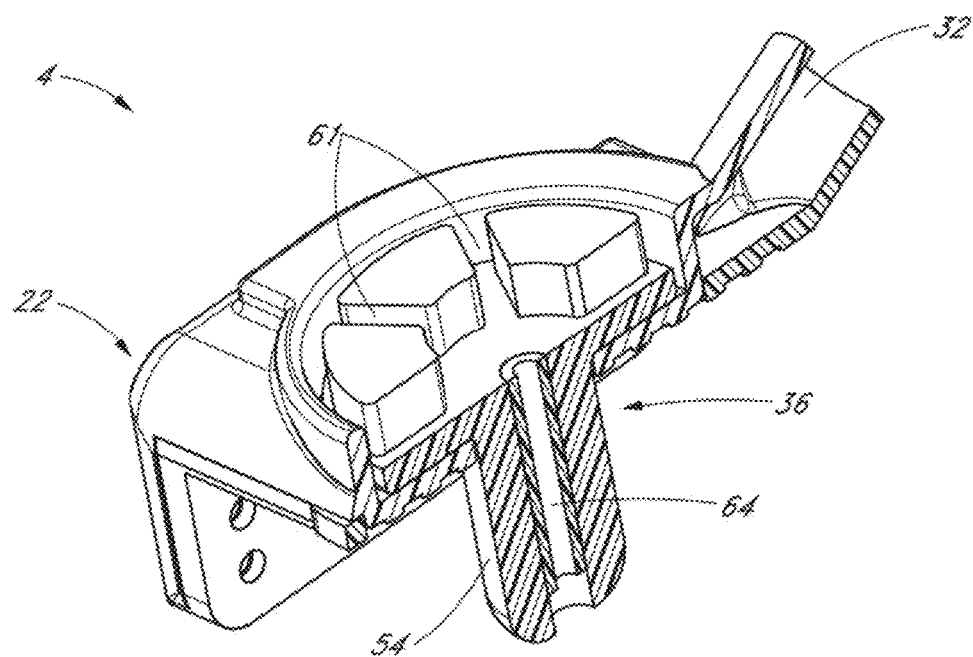

FIGS. 29A-29D are schematic, perspective, cross-sectional views of a tooth cap 4 having various types of plugs 36. As explained above, the plug 36 can comprise a stopper portion 54 to removable engage with an access port 7 of the tooth cap 4. FIG. 29A illustrates the plug 36 shown above with respect to FIGS. 27A-27D. The plug 36 of FIG. 29A can include a substantially cylindrical stopper portion 54. When the plug 36 is inserted into the access port 7 during injection of the coupling material 30, it can be advantageous to provide venting to the tooth chamber 75. For example, pressure may build up in the air within the tooth chamber 75, causing discomfort to the patient. Accordingly, as shown in FIG. 29B, a venting channel 64 can be formed along a length of the stopper portion 54. The venting channel 64 can comprise a lumen formed through the plug 36 to allow air to exit the tooth chamber 75. A top portion of the plug 36 can comprise one or more vent pathways 61 that allow the vented air to pass outwardly across the plug 36. Accordingly, in the embodiment of FIG. 29B, the venting channel 64 and vent pathways 61 can enable improved venting from the tooth 10 or treatment region.

Figure 29C:
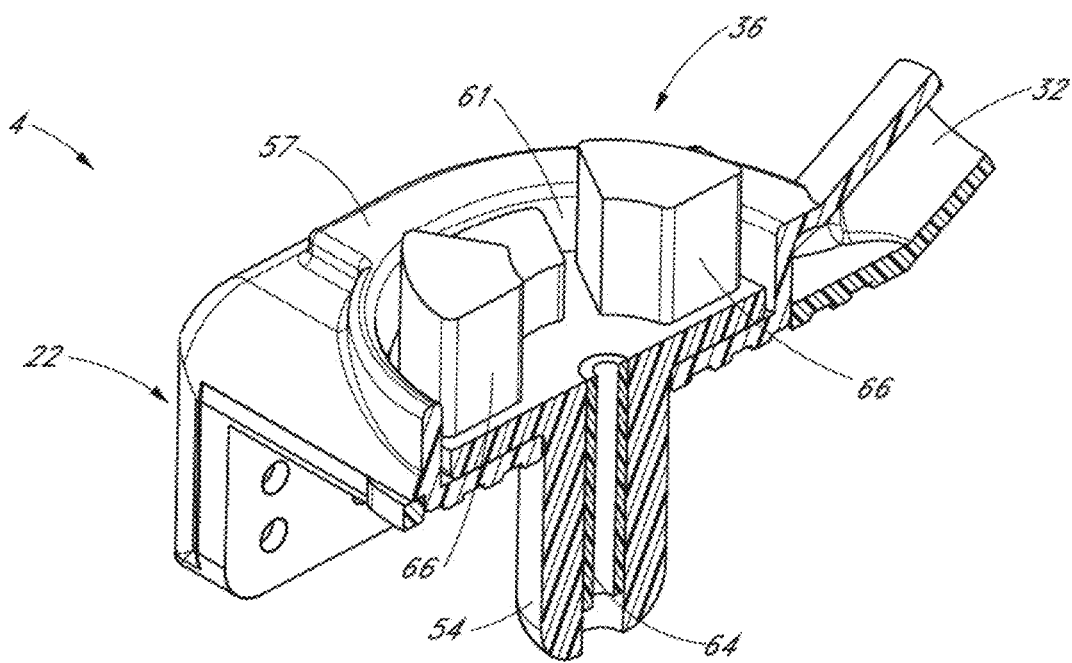

Turning to FIG. 29C, the plug 36 can further include engagement features 66 to assist the clinician in removing the plug 36 from the tooth cap 4. For example, the clinician can use a tool or can manually grasp the engagement features 66 to pull the plug 36 from the access port 7. In some embodiments, a tool can be shaped to correspond to the shape of the engagement features 66 to facilitate removal of the plug 36. As with the embodiment of FIG. 29B, the plug 36 can include a vented channel 64 and one or more vent pathways 61 to improve venting of the treatment region.

Figure 29D:
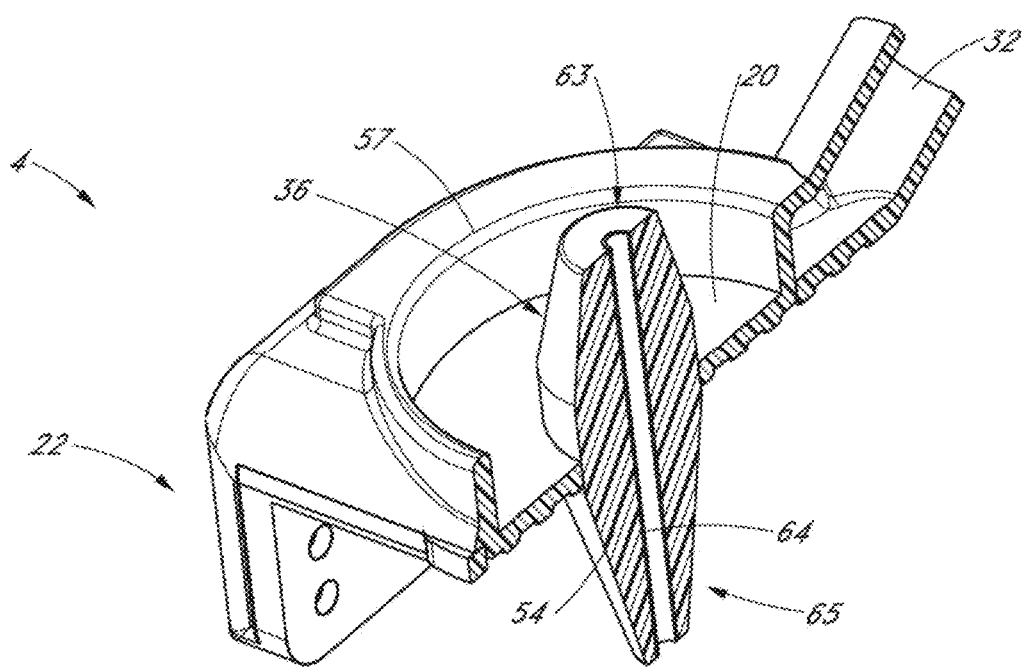

FIG. 29D illustrates another embodiment of a plug 36. The plug 36 can include a vented channel 64 to enable venting of air from the tooth chamber 75. The plug 36 shown in FIG. 29D can have a smaller profile than the plug 36 shown in FIGS. 29A-29C. The smaller profile can improve visibility for the clinician when the clinician aligns the plug 36 with the access port 7 and endodontic access opening 18. Further, the plug 36 of FIG. 29D can include a first tapered portion 63 and a second tapered portion 65. In some embodiments, the tapering angle of the first and second tapered portions 63, 65 can be about the same. In other embodiments, the tapering angle of the first and second tapered portions 63, 65 can be different. For example, differently-tapered portions 63, 65 can enable the plug 36 to engage or occlude differently-sized access openings 18 and teeth. In such arrangements, either the first portion 63 or the second portion 65 can be inserted through the access port 7 and into the treatment region. Furthermore, providing a tapered plug 36 can advantageously allow the plug 36 to fit snugly within the access port 7 by sliding the plug 36 through the access port 7 until the plug 36 is adequately positioned.

III. Examples of Monitoring Systems and Methods

In some embodiments, pressure waves (e.g., acoustic waves) can be used to generate a real-time image of the tooth and root canal system. For example, during a root canal cleaning procedure, various embodiments disclosed herein can enable the clinician to monitor the progression of cleaning the root canals, removing pulp or necrotic pulp (as well as bacteria, biofilms, and other materials), and filling the cleaned canal spaces and tooth chamber with an obturation material. In some embodiments, the systems, methods, and compositions can be used to assist in assessing the health of the tooth (e.g., pulp, dentin, etc.). Further, the systems disclosed herein can be configured to track the progress of the cleaning procedure and to determine an endpoint of treatment for each tooth. Accordingly, monitoring the status of a treatment procedure can assist in preventing incomplete treatment (which may lead to reinfection and potentially the loss of the tooth) and/or overtreating the tooth (which may potentially weaken the tooth). In some embodiments, the sensing elements of the monitoring system can be integrated with or coupled to a tooth cap that is configured to be attached to the tooth or gums during a treatment procedure.

Advantageously, the embodiments disclosed herein can also distinguish between different types of materials in or on the tooth, or associated with the treatment system, to enable the clinician to get an overall assessment of the health of the tooth and treatment region, as well as the status of the treatment procedure. For example, the system can distinguish between healthy and diseased dentin, between healthy and diseased enamel, and between inflamed, necrotic, and healthy pulp. The system can also detect undesirable dental deposits, such as biofilms, bacteria, plaque, etc. Furthermore, it should be appreciated that, although the embodiments disclosed herein are explained in terms of an example root canal cleaning procedure, the monitoring systems disclosed herein may also be used with other types of treatment procedures, such as cleaning carious regions from the tooth, cleaning undesirable dental deposits from the tooth, restoration procedures, obturation procedures, etc.

Figure 30:
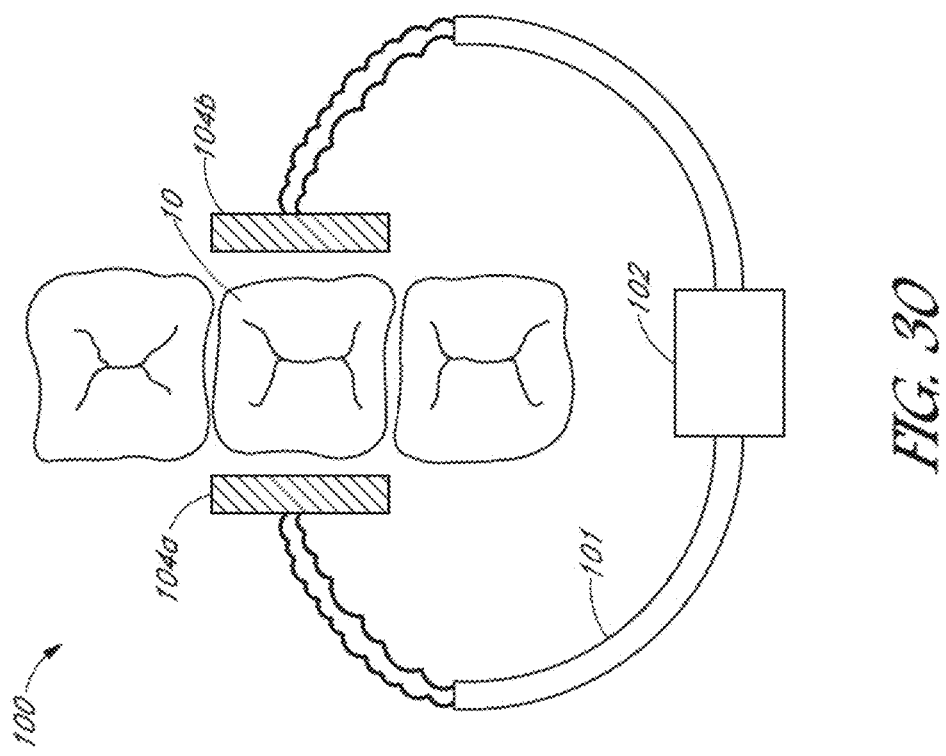
FIG. 30 is a schematic top view of a monitoring system configured to monitor the status of a treatment procedure and to assess the health of a tooth and/or gums, in accordance with one embodiment.

FIG. 30 is a schematic top view of a monitoring system 100 configured to monitor the status of a treatment procedure and to assess the health of a tooth 10 and/or gums, in accordance with one embodiment. The system 100 can include sensing elements 104a and 104b. In some embodiments, the sensing element 104a can comprise an acoustic transmitter that transmits acoustic energy toward the tooth 10 (and/or toward regions near the tooth 10), and the sensing element 104b can comprise an acoustic receiver 104b positioned to receive acoustic energy propagating from the tooth (and/or nearby regions). For example, in some embodiments, electrical energy can be supplied to one or more transmitters (which may comprise the sensing element 104a), which generates and supplies excitation energy. The transmitter can transform the excitation energy into a mechanical movement (e.g., a wave) that propagates throughout the media positioned along the travel path of the waves. The waves can be collected via the sensing element 104b (e.g., which may comprise one or more receivers) and can be transformed back to electrical signals.

The signals can pass through an antialiasing prefilter before being sampled and quantized. The signals can be processed and analyzed to generate an image of the materials being inspected or imaged. Signal attenuation through different structures or materials at the treatment region (e.g., the tooth 10 and/or gums 16) may be analyzed to determine the composition thereof. Each material may also reflect a portion of the acoustic wave, e.g., at or near the boundary between different types of materials. The attenuated and reflected waves can be used for analyzing the varying material compositions. For example, using temporal and spatial sampling methods, the data can be transformed to a representative image of the treatment region. The constructed image can be visually analyzed by the clinician to assess the status of the tooth (e.g., dentin, pulp, etc.) and the treatment procedure. Computed material composition boundaries can be segregated and conveyed using various techniques for clarity of analysis (e.g., color coding, etc.). As one example, undesirable materials (such as diseased pulp, bacteria, debris, etc.) can be coded in red and identified as a material to be removed or cleaned, empty spaces (e.g., cleaned spaces) can be coded in black, healthy/hard tooth structure can be coded in grey, enamel can be coded in white, a needle or other tool can be coded in yellow, an obturation material can be coded in green, and an obturation cone can be coded in orange. It should be appreciated that any other suitable coding or categorization may be used to identify materials or objects in or at the treatment region.

As shown in FIG. 30, the system 100 can include a console 102 (which can include a controller and/or user interface) in electrical communication with the sensing elements 104a, 104b by one or more wires 101. The console 102 can be the same as or similar to the console 2 described herein, and the console 102 can be powered by a suitable power source or unit. The acoustic energy received by the sensing element 104b may include a portion of the transmitted acoustic energy that propagates along an acoustic path from the element 104a to the element 104b. The acoustic path may comprise a substantially straight line path and/or a path from the element 104 to a structure and/or material that redirects the acoustic energy toward the element 104b (e.g., by reflection, refraction, scattering, etc.). In another embodiment, either or both of the acoustic elements 104a, 104b may comprise an acoustic transceiver that can both transmit and receive acoustic energy. For example, in certain embodiments, the acoustic element may comprise a piezoelectric transducer having one or more piezoelectric crystals mounted on a substrate. In some embodiments, one or both of the elements 104a, 104b can comprise an ultrasonic transducer. A skilled artisan will recognize that although FIG. 30 depicts two sensing elements 104a and 104b, a different number of sensing elements (transmitters and/or receivers) can be used in other embodiments. For example, the number of sensing elements may be 1, 2, 3, 4, 5, 6, 10, 20, or more.

In various implementations, the sensing element 104a can generate acoustic energy in a suitable frequency range including, for example, an audible range (e.g., less than about 20 kHz) and/or an ultrasonic range (e.g., above about 20 kHz). In some embodiments, the frequency range can include megasonic frequencies above about 1 MHz such as, for example, a range from about 250 kHz to about 25 MHz. Other frequency ranges are possible, such as frequencies up to about 1 GHz. In various embodiments, the acoustic energy generated by the transmitter element 104a may be continuous-wave, pulsed, or a combination of continuous-wave and pulsed.

In some methods, the transmitter element 104a can be placed adjacent to the tooth 10 under treatment, and the receiver element 104b can be placed on the side of the tooth 10 opposite the transmitter element 104a. For example, the transmitter element 104a and the receiver element 104b may be positioned near the tooth 10 in a manner similar to well-known methods for positioning a dental x-ray slide. In some embodiments, the elements 104a and 104b can be spatially fixed relative to the tooth 10 being treated, for example, by clamping to adjacent teeth or any other suitable fixation technique. The transmitter element 104a may be positioned on the lingual side or the buccal side of the alveolus of the tooth 10, with the receiver element 104b positioned on the opposing buccal or lingual side, respectively. In certain preferred embodiments, the transmitter element 104a can be positioned to transmit acoustic energy through periapical regions of the tooth 10. In other embodiments, the acoustic energy may be transmitted through other portions of the tooth 10 (e.g., the canal spaces, the pulp chamber, etc.) or may be transmitted through substantially all the tooth 10.

In some implementations, the system 100 can operate by generating a transmitted acoustic beam with the transmitter element 104a and detecting a portion of the transmitted beam that propagates to the receiving element 104b. The receiving element 104b produces a signal in response to the detected acoustic energy of the beam. The apparatus 100 may include a general- or special-purpose computer configured to implement one or more known techniques for analyzing signals detected by the receiver element 104b. For example, the techniques may include analysis of phase shift and/or Doppler shift of the frequencies in the beam and/or analysis of spatial shift in the speckle pattern resulting from interference of energy in the acoustic beam. Spectral and/or wavelet analysis methods may be used. For example, the relative amplitude, phase, and amount of attenuation of spectral modes (and/or wavelets) may be detected and analyzed. Acoustic techniques may be used to measure reflection, transmission, impedance, and/or attenuation coefficients for the signal and/or its spectral modes (and/or wavelets). In some implementations, the detected acoustic energy is analyzed for the excitation of resonant frequencies. For example, the acoustic Helmholtz criterion may be used to relate a resonant frequency to properties (e.g., volume, depth, height, width, etc.) of bores, chambers, canals, cracks, and so forth in the tooth. The decay of energy in a resonant acoustic mode (resonant ring-down) may be analyzed to determine attenuation coefficients in the tooth, as well as the presence of cracks and structural irregularities that increase the rate of the ring-down.

In some methods, the transmitter 104a generates a sequence of acoustic beams over a time period, and the receiver 104b produces a corresponding sequence of signals. The computer may process the signals independently or in combination. For example, in some implementations, the computer uses cross-correlation techniques to determine changes between portions of signals received at different times. In other implementations, other signal processing techniques are used. Accordingly, by suitably analyzing the acoustic energy detected by the receiver 104b, the system 100 can image the treatment region to identify and distinguish between different materials in the tooth 10, e.g., diseased or healthy pulp, diseased or healthy dentin, diseased or healthy enamel, etc. In various embodiments, the system 100 can detect movement of material within the tooth 10, and in particular embodiments, movement near the apical foramen.

Figure 31:
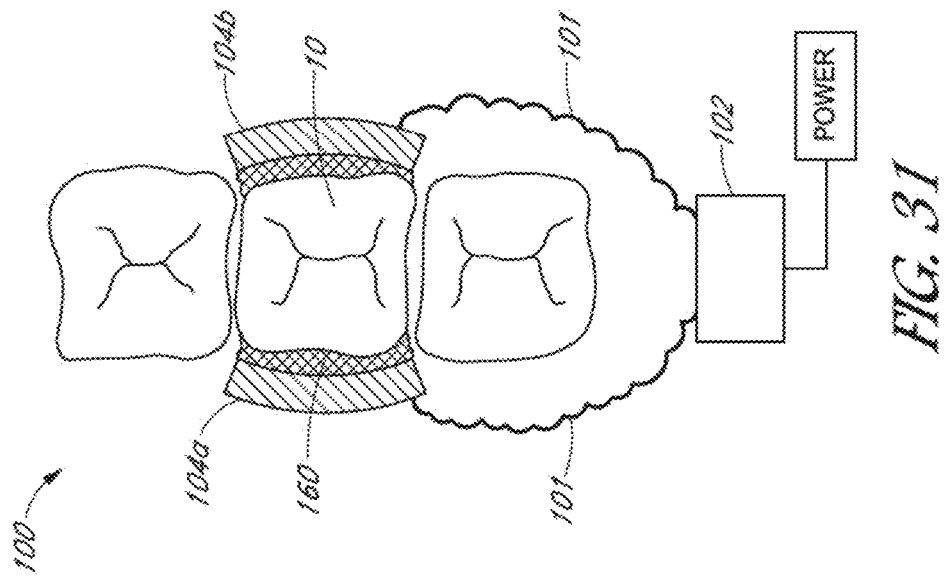
FIG. 31 is a schematic top view of a monitoring system configured to monitor the status of a treatment procedure and to assess the health of a tooth and/or gums.

FIG. 31 is a schematic top view of a monitoring system 100 configured to monitor the status of a treatment procedure and to assess the health of a tooth 10 and/or gums. The system 100 can include a console 102 and one or more wires 101 coupled with the sensing elements 104a, 104b. The sensing element 104a can generate acoustic or pressure waves which travel through a transmission medium 160 towards the tooth. The transmission medium 160 can comprise any suitable medium, such as a material for coupling the generated waves to the tooth 10. For example, the transmission medium 160 can comprise water, an ultrasonic coupling gel, a sealing material, a flowable composite, or other suitable materials. The transmission medium 160 can serve as an impedance matching material to enhance the coupling of the acoustic waves to the tooth 10. The waves can propagate through the tooth 10 and can be received by the sensing element 104b positioned on the other side of the treatment tooth 10 or at another location where the sensing element 104b (e.g., a receiver) can receive the waveforms. Information about the tooth structure as well as presence of soft tissue and its characteristics can be obtained by analyzing the received signals, e.g., a transmission time and/or other characteristics of the received waves.

Figure 32:
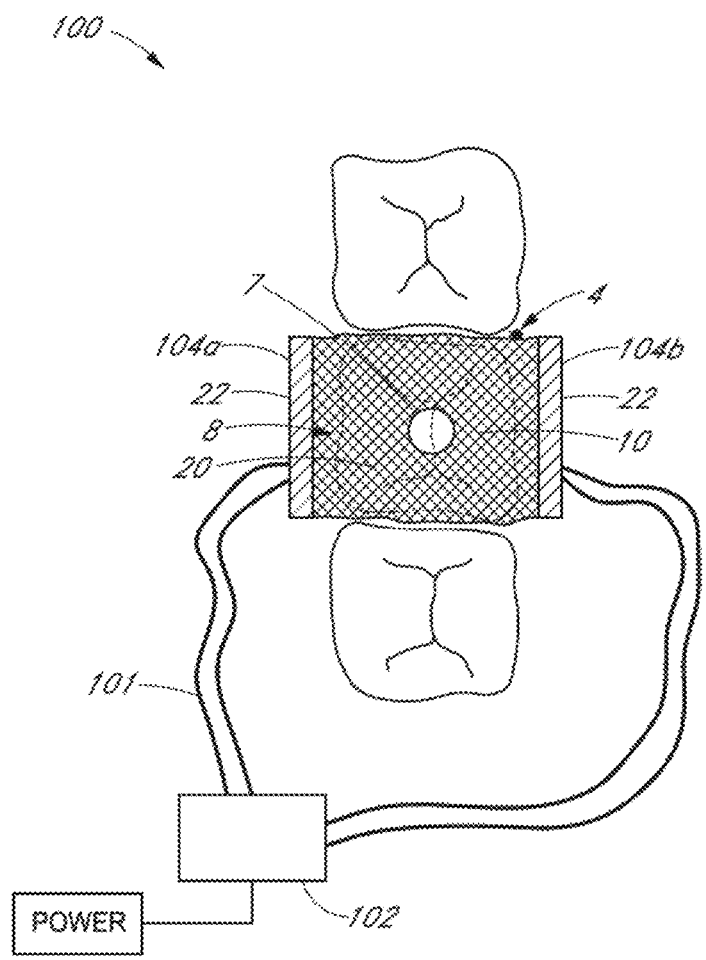
FIG. 32 is a schematic top view of a monitoring system configured to monitor the status of a treatment procedure and to assess the health of a tooth and/or gums, in accordance with another embodiment.

FIG. 32 is a schematic top view of a monitoring system 100 configured to monitor the status of a treatment procedure and to assess the health of a tooth 10 and/or gums, in accordance with another embodiment. The system 100 can include a console 102 and one or more wires 101 coupled with the sensing elements 104a, 104b. Advantageously, in the embodiment of FIG. 32, the sensing elements 104a, 104b can be coupled to or integrally formed with a tooth cap 4 configured to attach to the tooth 10 during a treatment procedure. The tooth cap 4 can be any suitable tooth cap 4, including any of the tooth caps disclosed herein with respect to FIGS. 2A-29D. For example, as with the above embodiments, the tooth cap 4 may include a platform 20, one or more walls 22, and an access port 7. As shown in the embodiment of FIG. 32, the sensing elements 104a, 104b can be coupled to or formed with opposing walls 22 of the tooth cap 4.

Accordingly, in the embodiment of FIG. 32, the tooth cap 4 can be applied to the tooth 10 prior to or at the beginning of a treatment procedure (such as a cleaning procedure). A coupling material (such as the coupling material 30 disclosed herein) may be injected or otherwise provided in a space 8 between the tooth cap 4 and the tooth 10 or treatment region. In other embodiments, no coupling material may be used. As explained above, the tooth cap 4 can be attached to the tooth 10 during the procedure and can support a treatment device during the procedure. Advantageously, the tooth cap 4 with sensing elements 104a, 104b can enable continuous monitoring of the treatment region. For example, as explained above, the tooth cap 4 can provide structural support to the tooth 10 and/or treatment device during treatment (including decayed or weakened regions of the tooth), and can provide a fluid seal.

The tooth cap 4 of FIG. 32 can further provide a structural platform for the monitoring system 100 to position the sensing elements 104a, 104b during the treatment procedure. In some embodiments, the tooth cap 4 can support or couple with only one sensing element; in other embodiments, the tooth cap 4 can support more than two sensing elements. In some embodiments, the tooth cap 4 shown in FIG. 32 may support both the monitoring system 100 (including the sensing elements 104a, 104b) and the treatment device 6 during a procedure. In other embodiments, the tooth cap 4 shown in FIG. 32 may be used only for supporting the monitoring system 100 and may not also support the treatment device 6. It should be appreciated that it can be challenging to provide real-time monitoring of the tooth during a procedure. By supporting the sensing elements 104a, 104b relative to the tooth 10 during the procedure, the tooth cap 4 of FIG. 32 can enable real-time imaging of the tooth 10 during treatment. The sensing elements 104a, 104b can be disposed on outer surfaces or portions of the walls 22. In other embodiments, the sensing elements 104a, 104b can be disposed on inner portions of the wall 22. In still other arrangements, one or more sensing elements can be disposed on or at the platform 20 or another portion of the tooth cap 4. The sensing elements 104a, 104b can be integrally formed with the remainder of the tooth cap 4, e.g., the tooth cap 4 can be molded or otherwise integrally formed about portions of the sensing elements 104a, 104b. In other arrangements, the sensing elements 104a, 104b can be mechanically attached or affixed to the tooth cap 4. Thus, when the tooth cap 4 is attached or secured to the tooth 10 during or before treatment, the tooth cap 4 can maintain the sensing elements 104a, 104b at a desired orientation relative to the tooth 10 or treatment region by integrating the sensing elements 104a, 104b into the tooth cap 4.

Although only two sensing elements 104a, 104b are shown in FIG. 32, it should be appreciated that more than two sensing elements (e.g., receivers or transmitters) may be coupled to or formed with the tooth cap 4. Multiple sensing elements can be positioned at different locations and orientations of the tooth cap 4 to improve the monitoring of the treatment procedure. For example, multiple receivers (and/or multiple transmitters) can be positioned at multiple locations along the wall 22 or platform 20. In some arrangements, as explained herein, a wall can be disposed between teeth, e.g., along proximal surfaces of the tooth. One or more sensing elements may also be coupled to or formed with the walls that extend along the proximal surfaces of the tooth.

Figure 33:
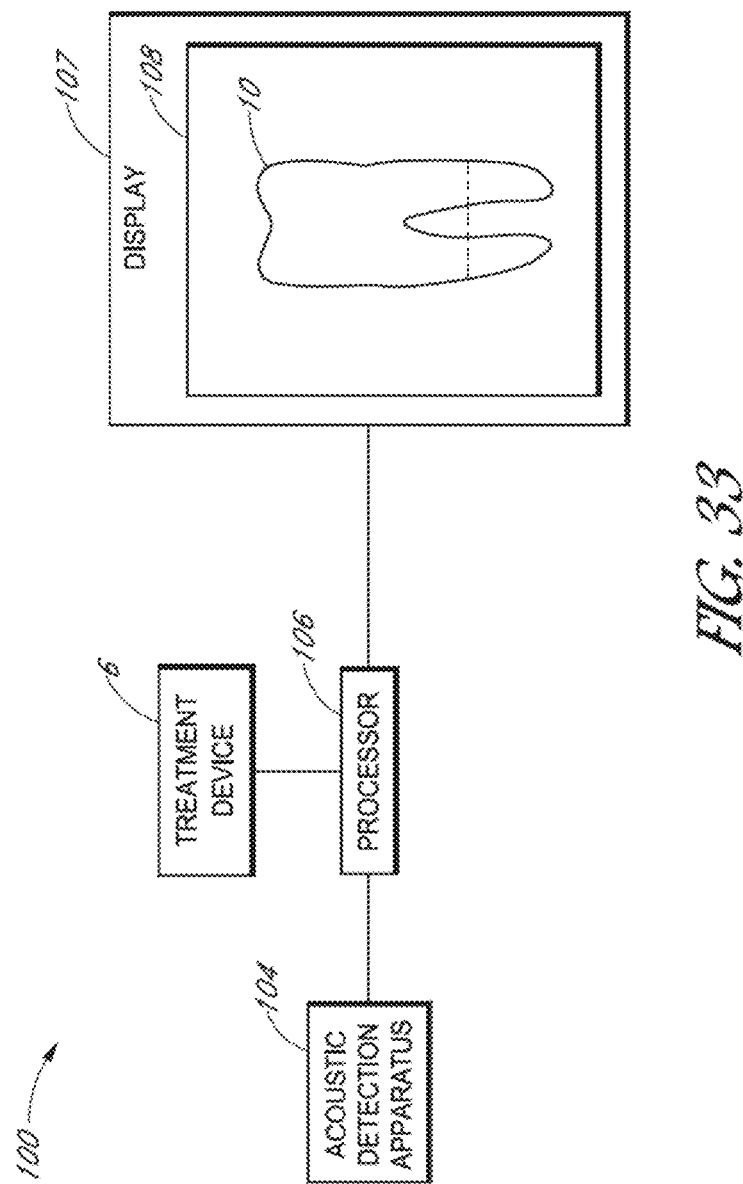
FIG. 33 is a block diagram schematically illustrating an embodiment of a monitoring system for monitoring a dental treatment procedure.

FIG. 33 is a block diagram schematically illustrating an embodiment of a monitoring system 100 for monitoring a dental treatment procedure. The system 100 may include acoustic sensing capability. The system 100 can include an acoustic detection apparatus 104 (which may include the sensing elements 104a, 104b and/or a tooth cap 4), a processor 106, a treatment device 6 (which may be any suitable treatment device as explained here, such as a pressure wave generator), and a display 107. The acoustic detection apparatus 104 may comprise any embodiments of the system 100 described with reference to FIGS. 30-32. The processor 106 may comprise any general- or special-purpose computer for analyzing acoustic energy detected from a tooth (e.g., energy detected by the receiver 104b shown in FIGS. 30-32). The display 107 may comprise any suitable output device such as a cathode ray tube (CRT) monitor, a liquid crystal display (LCD), or any other suitable device. The display 107 may be configured to output an image 108 showing an actual (or schematic) image of the tooth 10 undergoing treatment.

In some embodiments, the acoustic detection apparatus 104 measures acoustic energy that propagates from the tooth under treatment. The apparatus 104 responsively communicates a suitable signal to the processor 106, which monitors the materials of the tooth 10 in real-time. The measured acoustic energy may comprise ultrasonic energy as described above. Embodiments of the apparatus described herein advantageously may be used with a liquid jet cleaning apparatus and methods to measure progress and/or efficacy of the treatment and/or to measure movement of material within the tooth during the treatment.

Some embodiments may be configured to operate in one or more acoustic sensing modes including, for example, a "pulse-echo" mode and/or a "passive listening" mode. In certain embodiments of the pulse echo mode, an acoustic signal (e.g., one or more acoustic pulses) is propagated from an acoustic transmitter into the tooth under treatment. Echoes of the acoustic signal are detected by an acoustic receiver and analyzed by a processor. The acoustic receiver may be the same structure used to transmit the acoustic pulse, for example, a piezoelectric transducer capable of both transmitting and detecting acoustic energy. The echoes typically comprise acoustic energy from the transmitted acoustic pulse that is reflected, refracted, scattered, transmitted, or otherwise propagated to the acoustic receiver. For example, as is well known, a fraction of the acoustic energy incident on an interface between regions with differing acoustic impedances is reflected from the interface. In certain pulse-echo implementations, the transmitted acoustic pulse propagates into the tooth and reflects off such interfaces (e.g., an interface between dentin and pulp). The fraction of the reflected acoustic energy that propagates to the acoustic receiver may be detected and analyzed to provide information about properties of material at (or adjacent to) the interface.

In certain embodiments of the passive listening mode, one or more acoustic receivers are used to detect acoustic energy propagating from the tooth under treatment to the acoustic receivers. For example, the acoustic energy may be caused by cavitation-induced effects in the root canal system during the cleaning process. In certain preferred embodiments of the passive listening mode, acoustic energy (e.g., acoustic pulses) is not transmitted into the tooth from an acoustic transmitter.

Embodiments of the apparatus described herein may operate in a pulse-echo mode or a passive listening mode. In some implementations, the apparatus may be operable in other sensing modes such as, for example, a combined mode in which acoustic energy is transmitted into the tooth under treatment and both reflected echoes and internally generated acoustic energy are detected and analyzed.

Figure 34:
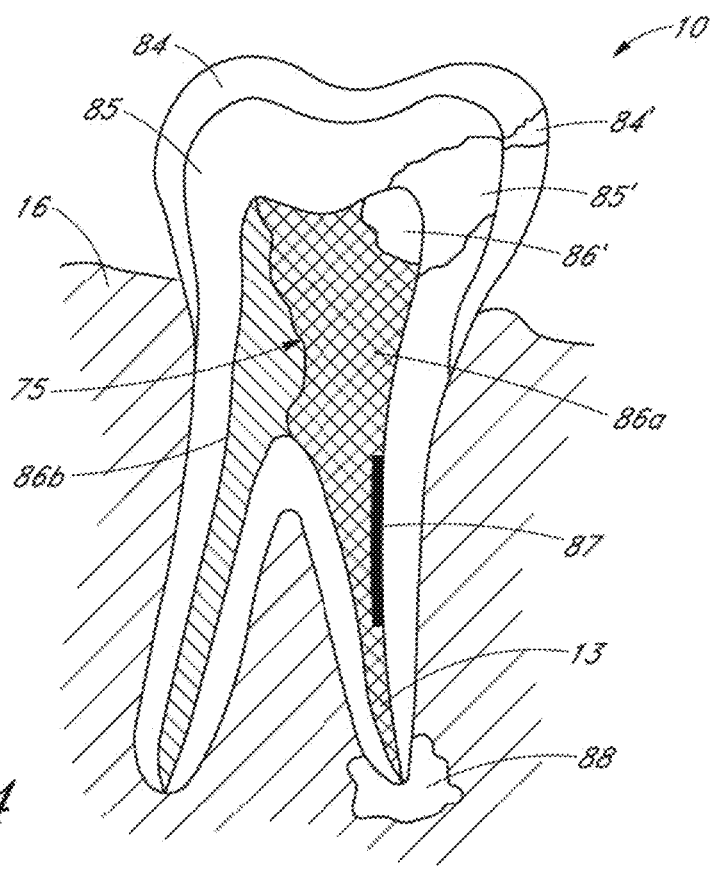
FIG. 34 illustrates a tooth having various types of diseased portions.

With reference to FIG. 34, the embodiments disclosed herein can advantageously enable the clinician to monitor the structure of the tooth 10 and/or treatment region before, during, and/or after a treatment procedure. For example, the tooth 10 shown in FIG. 34 may include regions of healthy enamel 84 and decayed enamel 84', as well as healthy dentin 85 and decayed dentin 85'. The tooth 10 may also have regions of healthy pulp 86, necrotic pulp 86a, and inflamed pulp 86b. A layer of biofilm 87 may form on various portions of the tooth 10. In some embodiments, the apical portions of the root canals may include abscessed regions 88 while other portions may be healthy. Other portions of the tooth may be cracked, decayed, or otherwise structurally weak. Further, portions of the gums 16 may be diseased or healthy. The monitoring system 100 and associated methods disclosed herein can advantageously identify and track the different types of materials at any point during the treatment procedure. For example, the system 100 can distinguish between healthy and diseased portions of the tooth 10 (e.g., between healthy and diseased dentin or pulp tissue, gum tissue, etc.).

The data regarding the type of dental material can be transformed into an image 108 and presented on the display 107 in real-time. The clinician can analyze the displayed tooth 10 to assess the status of dentin, pulp, etc., and how the treatment procedure is progressing. The real-time image of the specimen can be color-coded or otherwise categorized to identify relevant features such as pulp, bacteria, debris (e.g., an unwanted substance that needs to be removed during procedure), empty spaces (e.g., the portion of the root canal that has been cleaned and is free of pulp/bacteria/debris), healthy, hard tooth structure, enamel, a needle (e.g. obturation needle), an obturation material, and the obturation cone. Providing the clinician with images of different types of materials or objects can help the clinician monitor the status of the procedure, improving patient outcomes.

Figure 35A:
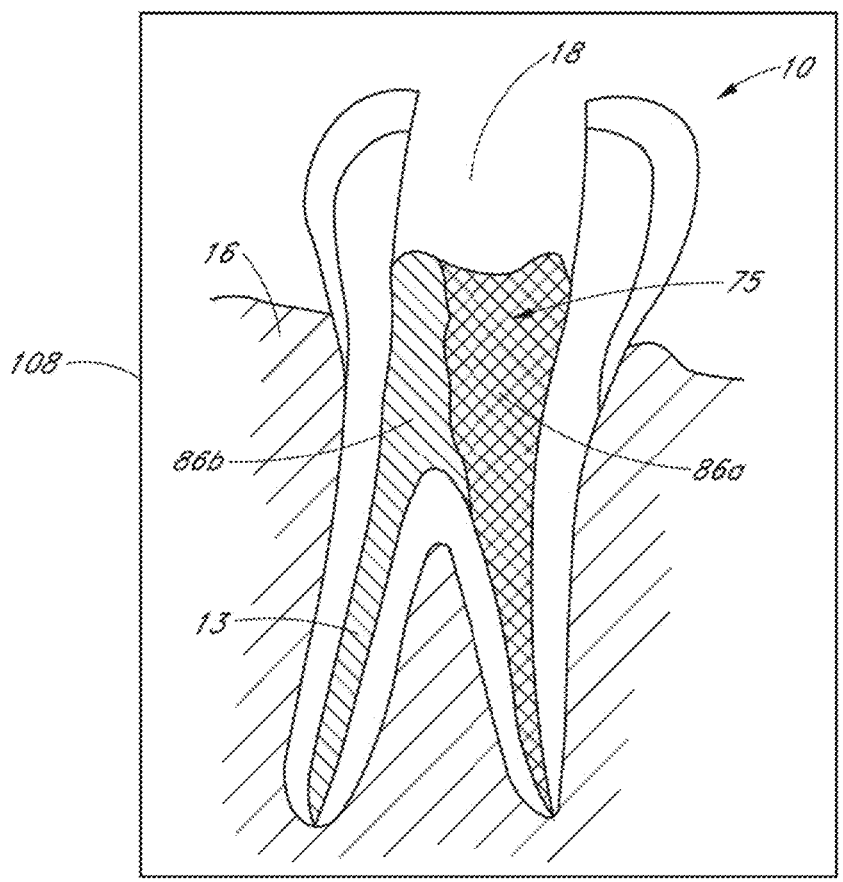
FIGS. 35A-35H are schematic images showing side sectional views of a treatment tooth and gums at various stages of a treatment procedure.
Figure 35B:
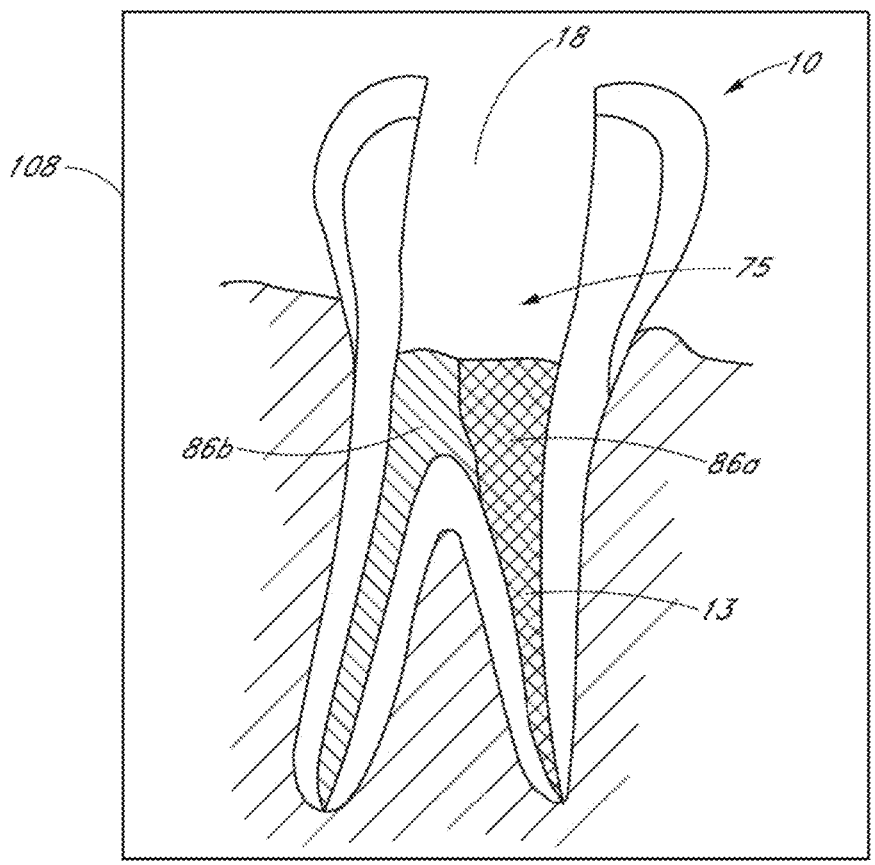
Figure 35C:
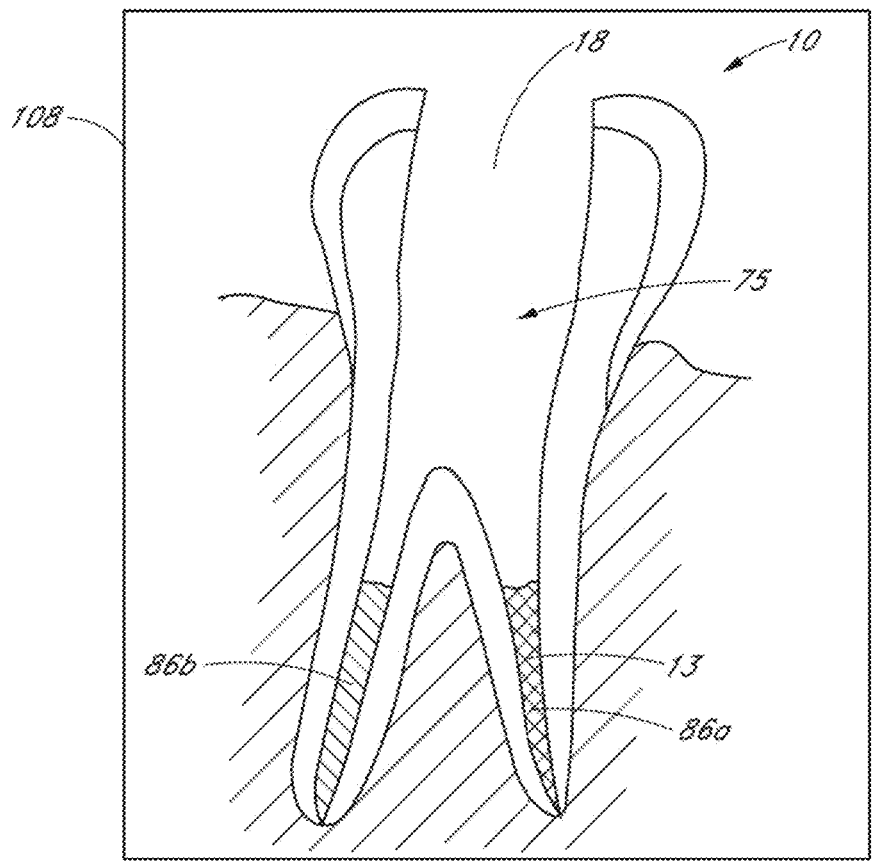
Figure 35D:
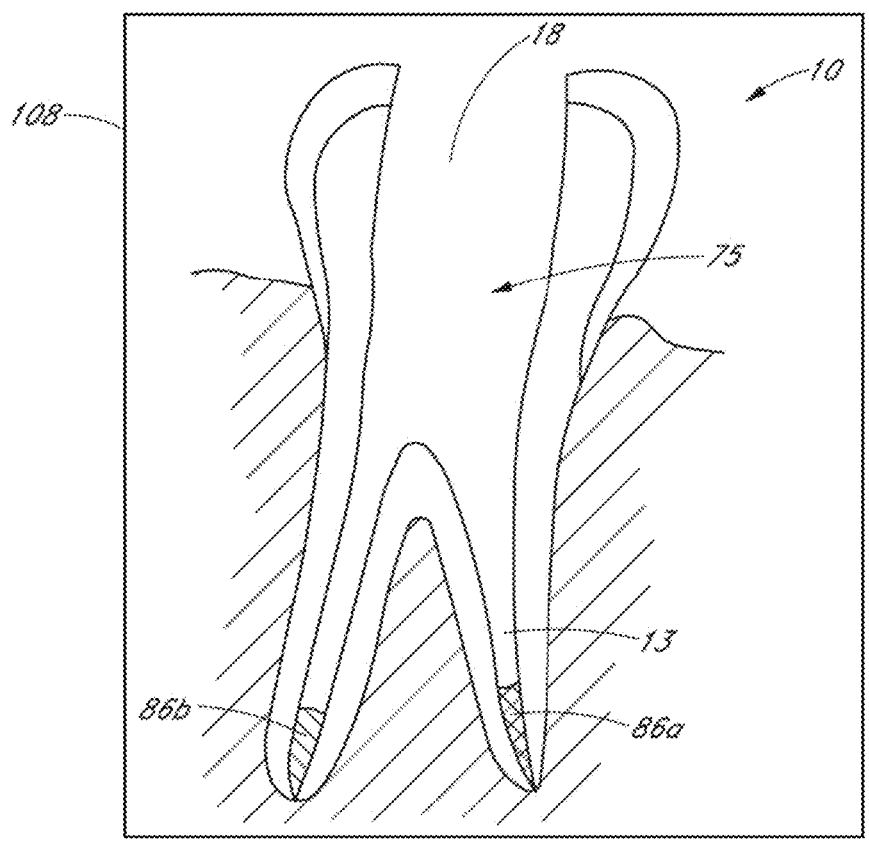
Figure 35E:
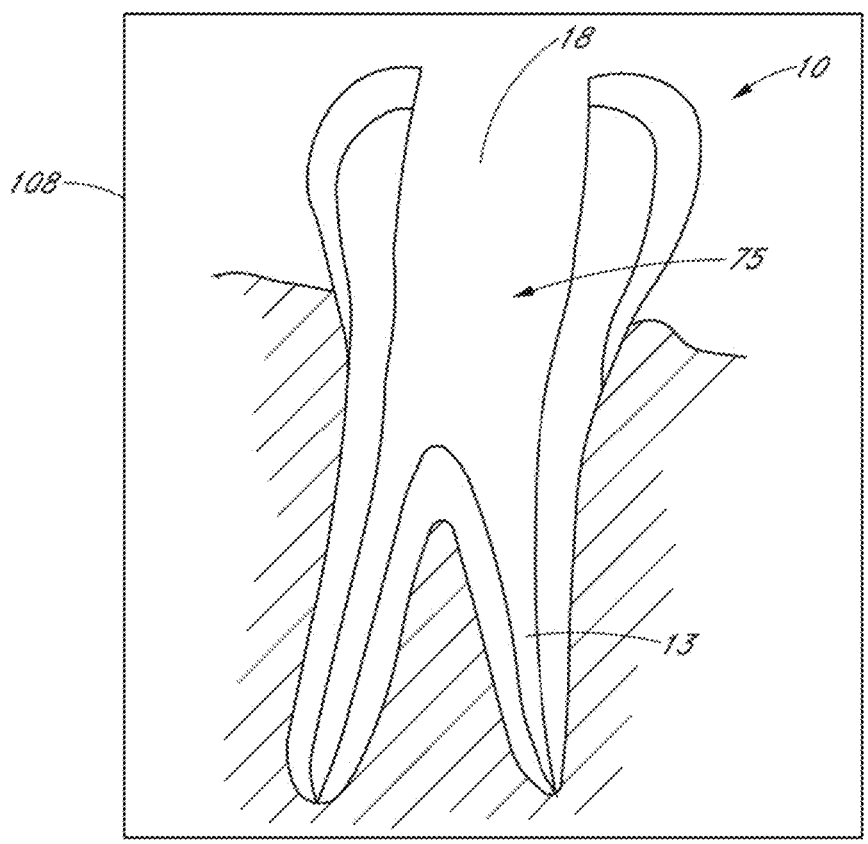

FIGS. 35A-35H are schematic images 108 showing side sectional views of a treatment tooth 10 and gums 16 at various stages of a treatment procedure. For example, FIGS. 35A-35D illustrate the progression of a root canal cleaning procedure, in which necrotic pulp tissue 86a and inflamed pulp tissue 86b are cleaned using a treatment device (e.g., a pressure wave generator or other tool). As the cleaning occurs, a real-time image 108 of the tooth 10 can show removal of bacteria and diseased tissue 86a, 86b (e.g., a reduction of a particular color-coded region as shown on the display 107, such as a red colored region for a particular diseased material) until the image 108 on the screen shows no diseased tissue 86a, 86b in the treatment zone (e.g., root canal space 13). As shown in FIG. 35E, when the image 108 on the display 107 indicates that there is no pulp 86a, 86b remaining in the tooth chamber 75, then the system 100 can indicate that the cleaning procedure is complete and that there is a complete removal of diseased tissues. The image 108 of the display 107 can show all the features of the treatment zone, for instance, lateral canals and isthmuses of root canals and their complete cleaning. Furthermore, although the illustrated images 108 of FIGS. 35A-35E illustrated the removal of various types of diseased pulp tissue 86a, 86b, it should be appreciated that the images 108 can monitor the removal of other types of diseased tissue or debris, including unhealthy dentin or enamel, undesirable dental deposits, carious regions of the tooth, abscessed regions of the tooth, and/or diseased gum tissue. As explained herein, the system 100 can distinguish between the various types of tissue in the tooth 10 or gums 16.

Figure 35F:
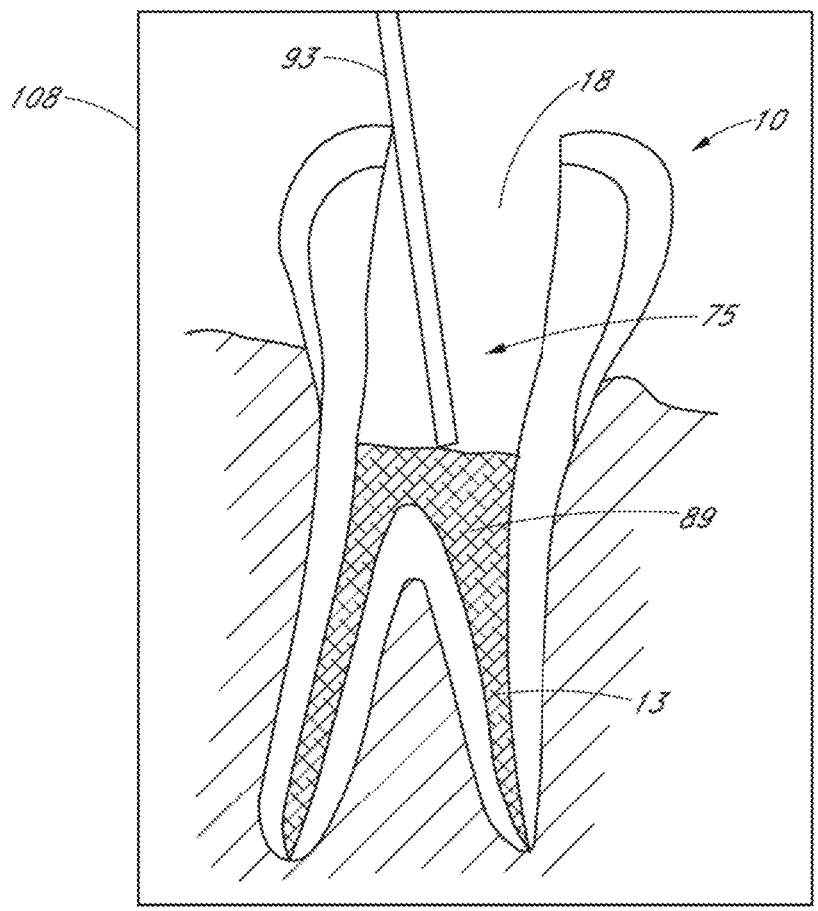
Figure 35G:
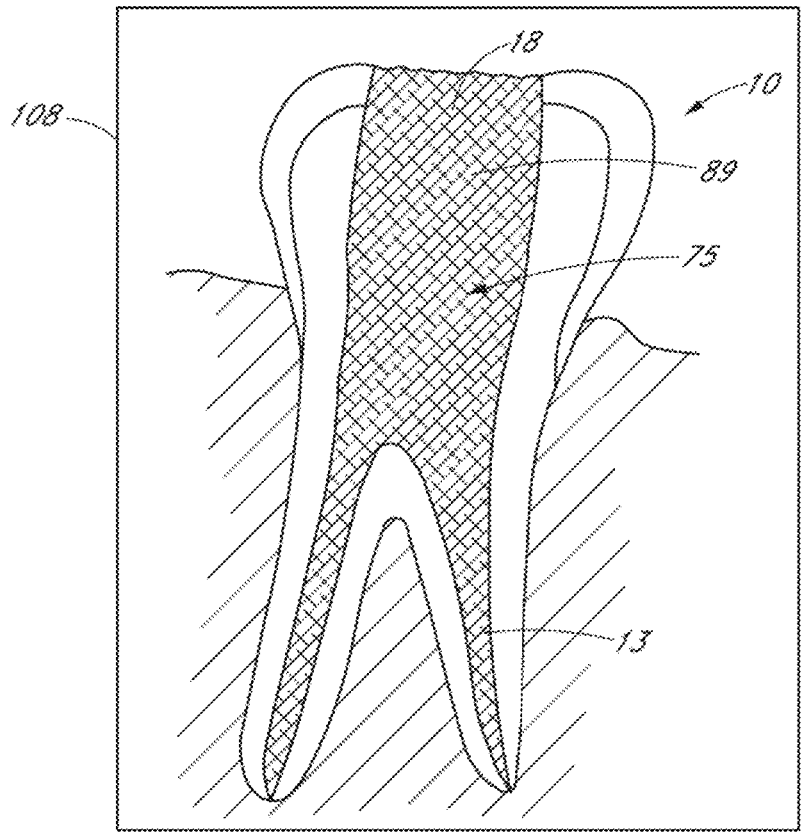
Figure 35H:
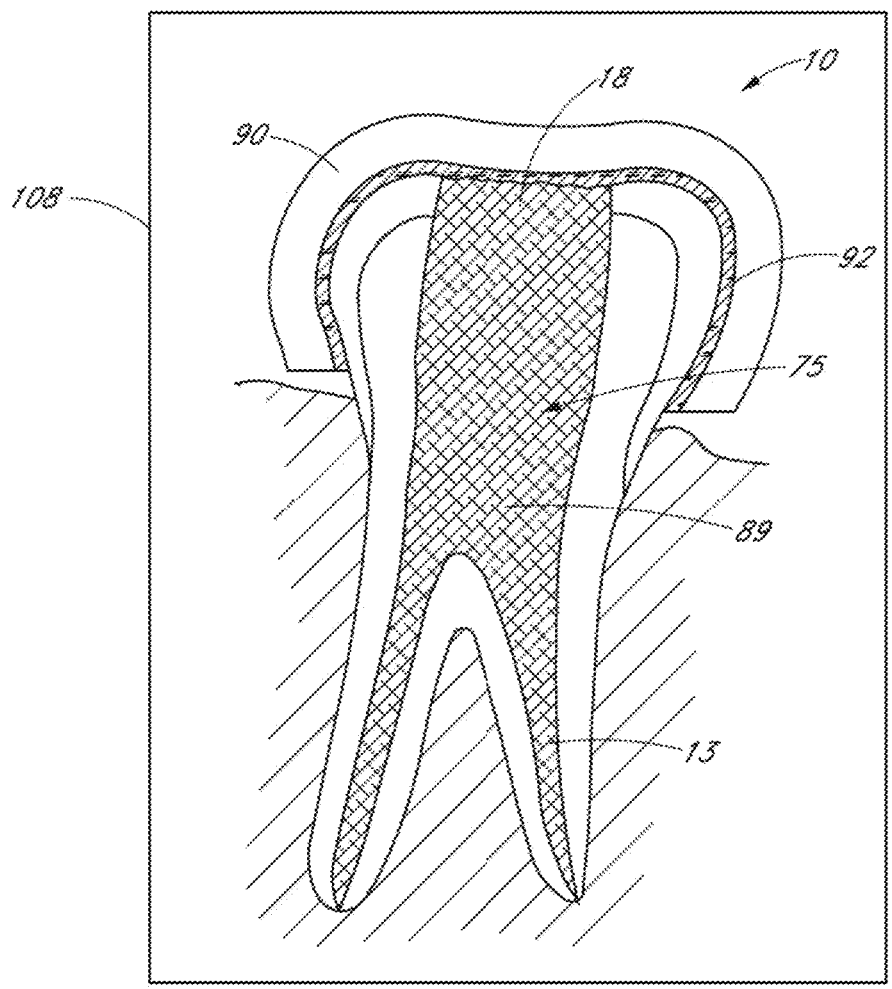

FIGS. 35F-G illustrate images 108 showing a progression of an obturation procedure in which the root canals 13 and tooth chamber 75 are filled with a suitable obturation material 89 (e.g., gutta percha or any suitable flowable material). In the case of a root canal cleaning treatment, as the practitioner inserts a needle 93 or other instrument (e.g., a pressure wave generator) into or near the root canal, the image 108 can show the extent of insertion of the needle 93 and the flow of the obturation material into the root canals. It can also show the extent of insertion of the obturation cone, if any is used. Precise tooth dimensioning and shape measurements may be performed to allow the clinician to assess a thin root sidewall or other malformations that otherwise would be undetectable. These features allow the clinician to monitor the obturation procedure real-time without relying on estimates, inaccurate measurements using radiographs, tactile feedback, etc. Such real-time monitoring can therefore avoid over-filling, which often results in poor prognosis or a poor filling. Further, as shown in FIG. 35H, the monitoring system 100 disclosed herein can image a restoration procedure (which may be performed at some point after the root canal cleaning and obturation procedures), in which a coronal seal 90 is applied over the treatment tooth 10, e.g., by way of an adhesive 92 or other material. As the obturation is completed and restoration is started, the clinician can monitor in real-time the progression, extent and quality of a coronal seal 170, which may be important to ensure that there is no gap or poor bonding of the composite of the restoration material.

Figure 36:
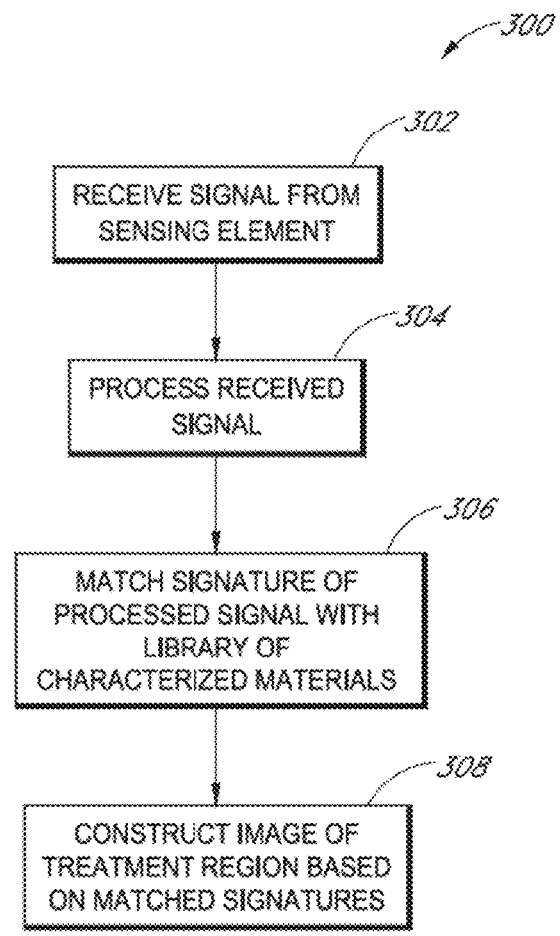
FIG. 36 is a flowchart illustrating a method for monitoring a status of a treatment region during a treatment procedure.

FIG. 36 is a flowchart illustrating a method 300 for monitoring a status of a treatment region during a treatment procedure. The method 300 can differentiate between multiple materials at or near the treatment region, including, e.g., different anatomical materials and different tools used in the procedure. In a block 302, a signal can be received from a sensing element. The signal can comprise information (e.g., an electrical signal) representative of pressure or acoustic waves that are transmitted and/or received by a suitable sensing element (such as the sensing elements 104a, 104b). For example, an acoustic receiver can detect acoustic waves and can convert the acoustic energy to an electrical signal representative of the acoustic wave. One or more wires can electrically connect the sensing element(s) with a controller or hardware control unit that is programmed to process the electrical signals using a processor. In some embodiments, the sensing element(s) can be formed with or coupled to a tooth cap, which can be attached to the tooth to position the sensing element(s) at a desired location. As explained above, multiple receivers and/or transmitters may be provided at known locations or orientations relative to the treatment region. The method 300 can use the known number and locations of the sensing elements to monitor that treatment region.

Turning to a block 304, the received signal can be processed to prepare the signal for further analysis by the hardware control unit. For example, an antialiasing filter can be used to selectively remove a portion of the converted electrical signal. Removing a portion of the signal may allow for a smaller subset of the frequency spectrum to be analyzed. In addition, the signal can be sampled and/or quantized, which can enable the processor to digitally manipulate and/or analyze the acoustic energy received by the sensing element. Additional filtering, sampling, or other pre-processing techniques may be applied to the electrical signal.

In a block 306, a signature of the processed signal can be matched with a library of signatures corresponding to materials that have been previously characterized and/or measured. In various embodiments, signal processing and imaging can be performed by analyzing a sampled radio frequency (RF) signal and using various signal processing methods with a library of RF signatures of various organic and inorganic materials and specimens to identify the material and assign an identifier to the region of the image which accurately maps the specimen. The library of RF signature of materials can include, healthy dentin, diseased dentin, plaque, demineralized dentin, healthy enamel, demineralized enamel, healthy pulp, calcified pulp, live pulp, necrotic pulp, bacteria, biofilm, healthy periradicular tissue, abscess, inflamed tissue (e.g. gum tissue), various obturation materials, needles of various materials (e.g. metal, plastic, etc.), various restoration materials, other types of treatment devices, etc.

As explained above, multiple transmitters and/or receivers may be positioned at known locations relative to the treatment region. For example, as shown in FIG. 32, a transmitter and a receiver can be disposed on opposing walls of a tooth cap. In other embodiments, more than two sensing elements (e.g., transmitters or receivers) can be positioned at other known positions, e.g., along a wall or platform of the tooth cap. The system 100 can use the knowledge of the relative locations of the sensing elements, in conjunction with the measured reflections and attenuations of the pressure wave, to assist in characterizing the material through which the wave passes. As one example, if the system 300 includes one transmitter and two receivers disposed at different orientations relative to the tooth, the system 100 can process the pressure wave detected by each receiver and, based upon each receiver's position relative to the transmitter and tooth, can characterize the material through which the wave was transmitted or reflected.

The spatial and/or temporal information from the acoustic wave (e.g., represented by the processed signal) can be extracted and compared against the spatial and temporal information from the previously-characterized material of the library. For example, a portion of the waveform at a particular time may have characteristics associated with one material, while a portion of the waveform at another time may have characteristics associated with a different material. If the signature of the signal being processed matches a corresponding RF signature in the library (to within a certain tolerance or probability), then the system can identify the particular portion of the signal as corresponding to the identified material in the library.

The library of RF signatures can be established off-line in some arrangements, such that materials or objects that are commonly used in various procedures are characterized digitally. For example, an acoustic wave can be propagated from a known location or orientation towards the known material or object and the modulated wave (e.g., the portion of the transmitted or reflected wave detected by the receiver) can be measured by the sensing element at a known location or orientation. Digitized information related to the modulated wave can be characterized and stored with a unique identifier to specify the material or object associated with that signature. In some embodiments, the stored signature of the previously characterized material or object can include information relative to the speed of the waves propagating through the material, the behavior of waves as the waves interact with material boundaries and interfaces, and other suitable criteria.

For example, a signature of a known obturation material in the library may exhibit certain reflectance or attenuation characteristics based on particulates suspended in the material. When a signature of an unknown material exhibits similar reflectance or transmittance characteristics at a receiver at a known location relative to the transmitter, the system 100 may determine that the unknown material corresponds to the known obturation material. Similarly, the library can contain known signatures of healthy enamel, in which the signature may exhibit a range of reflectance values that is higher than other materials. If a receiver (at a known location) detects a signature of an unknown material that has a reflectance or transmittance in a range similar to that of the known signature of healthy enamel, the system 100 may determine that the unknown material is healthy dentin.

Likewise, the system 100 may distinguish between healthy pulp and diseased pulp based on the system's knowledge of the locations of the transmitter(s) and receiver(s) and on the library of known RF signatures. For example, the reflectance or transmittance of the waves through diseased or inflamed pulp may be different from the reflectance or transmittance of the waves through healthy pulp. If the reflectance or transmittance values fall within a range corresponding to healthy or diseased pulp, then the system may determine that an unknown material is healthy or diseased pulp, respectively. Similar characterizations can be performed for other materials at the treatment region, or for objects (such as treatment devices or materials) commonly used in treatments.

Turning to a block 308, an image of the treatment region can be constructed based on matched signatures. For example, different portions of the signal corresponding to different portions of the acoustic wave can be analyzed to identify the location in the treatment region corresponding to each unique material. Each material or object can be categorized and displayed to the clinician, e.g., by way of a color coding system. In some embodiments, the constructed image can comprise slices or portions of a three-dimensional image of the treatment region. Each constructed image can represent a particular image plane of the treatment region at a particular time during the procedure. Images can be constructed continuously over time to monitor the progression of the treatment procedure. Moreover, in arrangements that include multiple receivers and/or transmitters, the relative locations of the sensing elements can be used to reconstruct a three-dimensional image of the treatment region. As explained herein, the constructed image can be presented to the clinician on a user interface, such as a suitable display device.

It should be appreciated that various steps of the method 300 can be performed by a computer. For example, the instructions for implementing the method 300 can be programmed on a non-transitory computer readable medium (e.g., any suitable type of computer memory). A processor (which may comprise a specially-programmed or a general-purpose processor) may process the computer-implemented instructions to perform the method 300 (and other associated processes).

In another embodiment, the system, methods, and compositions may be used to analyze location and extent of caries and cavities, as well as assisting a practitioner in removing only the diseased portion of enamel or dentin and preventing aggressive removal of healthy dentin or enamel. Aggressive removal of healthy dentin and/or enamel may reduce the life of the tooth and also prevent inadequate removal of diseased enamel/dentin, which can cause recurrence of caries and cavities and require more aggressive treatments and potentially reduced tooth life. In some embodiments, the system, methods and compositions may be used to analyze the topology of the enamel and level of mineralization.

In another embodiment, the system, methods and compositions may be used to detect cracks in the tooth and assist a practitioner in diagnosis and treatment planning. For example, an unknown crack may extend into the root of a tooth, thus making the tooth contraindicated for root canal therapy. The system, methods and compositions can be used to detect the presence of the crack, thus preventing unnecessary treatment which can cause unnecessary pain and additional cost to the patient. In some cases, the system, methods and compositions can be used to assist the practitioner in locating the endpoint of the crack to stop its progression and therefore extending the life of the tooth. In one embodiment, a signature of a cracked region from the library of RF signatures can be used to detect cracks.

In some embodiments, the system, methods and compositions may be used to examine and provide the correct treatment plan for periodontal diseases. In such an embodiment, the image can show the extent and location of the pockets and plaques in gum tissue and can assist the practitioner, via real-time imaging of the periodontal pockets, to remove the plaques, biofilm, and debris completely.

In various embodiments, the system, methods and compositions can utilize transducers and ultrasonic technology for the purpose of real-time imaging and monitoring of the tooth, root canal system, as well as the periodontal pockets and tissues. In such an embodiment, the system, methods and compositions can determine the end-point of the treatment, i.e. complete (or substantially complete) removal of pulp tissue and bacteria (or biofilm) from the tooth, the gingival pockets, or the root canal space. In some embodiments, the system, methods and compositions can be used in combination with a pressure wave-based root canal cleaning apparatus to clean a root canal in a short period of time (e.g., within a few minutes).

In various embodiments, the transducer and the receiver are attached to opposite sides of the tooth via the transfer medium. In some embodiments, the transmitters and receivers (e.g., the sensing elements 104a, 104b) can be located on the same side of the tooth and can use acoustic reflections through the transfer medium to image the treatment region. In yet another embodiment, the transmitters and receivers can be positioned relative to each other at a desired angle. In some embodiments, the transmitter (e.g., sensing element 104a) can remain stationary while the receiver (e.g., sensing element 104b) can be movable and allowed to rotate about the tooth or region of measurement. In various embodiments, the receiver (e.g., sensing element 104b) can be stationary while the transmitter (e.g., sensing element 104a) can be movable and allowed to rotate about the tooth or area of measurement.

In another embodiment, the transmitter and the receiver are held in the proximity of the tooth via a clamp assembly. In another embodiment, the transmitter and the receiver are attached onto or formed with a tooth cap enclosing or attaching to the tooth. The tooth cap may or may not be filled. In some embodiments, the tooth cap 4 may be filled with water, or the tooth cap may be filled with an acoustic transmission medium, e.g. an acoustic gel. In some embodiments, as explained herein, a coupling material (similar to the coupling material 30) may fill a space between the tooth cap 4 and the tooth 10 and/or gums 16. The monitoring system 100 can image the coupling material in addition to the treatment region to confirm that the tooth cap 4 is adequately attached to the tooth 10. The transmitter and the receiver may be a part of, e.g., integrally formed with, the tooth cap 4. In some embodiments, the transmitted waves have a frequency range between 1 MHz to 128 MHz. In some embodiments, the transmitted waves can be at least partially involved in the procedure, e.g. removing diseased material from root canals, removing bacteria, removing caries or debris, etc.

In various embodiments, advanced signal modulation techniques may be employed to monitor the status of a treatment procedure. Such signal modulation techniques may include amplitude modulation, frequency modulation, phase modulation, and/or chirping. In some arrangements, receiver measurements (e.g., those detected by sensing element 104b) may comprise temporal sampling, spatial sampling, bandshifting, and/or filtering.

In various embodiments, the receiver measurements can be used to build a three-dimensional (3D) model of the imaged area to provide a more accurate and complete patient assessment. For example, the monitoring system 100 can be configured to image multiple slices of the treatment region to provide the clinician with information regarding the 3D structure of the tooth and/or gums. The clinician can select a particular slice to be imaged in some arrangements; in other arrangements, the system 100 can be configured to scan through the depth of the treatment region to image three-dimensionally through the tooth and/or gums.

Additional monitoring systems and methods may be suitable with the embodiments disclosed herein, including the systems and methods disclosed in U.S. Patent Publication No. US 2012/0276497, filed Dec. 6, 2011, which is incorporated by reference herein in its entirety and for all purposes.

IV. Overview of Treatment Procedures

The system 1 disclosed herein can be used with various types of treatment procedures and treatment devices 6. Any suitable treatment device 6 can be used in the treatment procedure. For example, conventional dental tools, such as drills, files, burrs, syringes, needles, drills, obturation instruments, and any other suitable tool may be used in the procedures disclosed herein. In addition, in some arrangements, the treatment device 6 can comprise a pressure wave generator 5. For example, some embodiments disclosed herein can advantageously remove undesirable or unhealthy materials from a tooth such that substantially all the unhealthy material is removed while inducing minimal or no discomfort and/or pain in the patient. For example, when activated by the clinician, the pressure wave generator 5 can induce various fluidic effects that interact with the unhealthy material to be removed, even when the pressure wave generator 5 is disposed at a position remote from the treatment region of the tooth, e.g., the region of the tooth that includes the unhealthy or undesirable material to be removed. The pressure wave generator 5 can impart energy to a fluid that induces relatively large-scale or bulk circulation or movement of liquid in a chamber coupled with the tooth and/or tooth 10, and that also generates pressure waves that propagate through the fluid and tooth 10. The generated fluid motion and pressure waves can magnify or enhance the properties of the fluid to enhance cleaning of the tooth 10. In some embodiments, the pressure wave generator 5 can be used to obturate or fill the root canals and/or other treated regions of the tooth, and can also be used to restore or build up a damaged or diseased tooth.

A. Enhancing the Cleaning of Teeth

The system 1 disclosed herein can be used to clean teeth. For example, the system 1 can be configured to clean organic and inorganic material, including diseased pulp, bacteria, etc., from root canals of the tooth 10. In some embodiments, the system 1 can be configured to remove carious regions of the tooth 10, e.g., regions of the tooth 10 that are decayed. The carious regions can be formed on an exterior surface of the tooth 10 in some arrangements. Moreover, the system 1 can be configured to clean undesirable dental deposits from exterior surfaces of the tooth 10, including plaque, calculus, biofilms, bacteria, and other unhealthy deposits. In some arrangements, the system 1 can utilize, alone or in combination, the chemistry of various treatment fluids, pressure waves generated by the pressure wave generator 5, and fluid motion created in a chamber of the tooth coupler 3 and/or in a chamber within the tooth 10.

1. Chemistry of Various Treatment Fluids

In cleaning procedures, the fluid supplied to the chamber and/or to the pulp cavity of the tooth 10 can comprise a treatment fluid that can be introduced into the tooth 10 and the chamber of the tooth coupler 3 to assist in removing unhealthy or undesirable materials from the tooth 10. The treatment fluids can be selected based on the chemical properties of the fluids when reacting with the undesirable or unhealthy material to be removed from the tooth 10. The treatment fluids disclosed herein can include any suitable fluid, including, e.g., water, saline, etc. Various chemicals can be added to treatment fluid for various purposes, including, e.g., tissue dissolving agents (e.g., NaOCl or bleach), disinfectants (e.g., chlorhexidine), anesthesia, fluoride therapy agents, ethylenediaminetetraacetic acid (EDTA), citric acid, and any other suitable chemicals. For example, any other antibacterial, decalcifying, disinfecting, mineralizing, or whitening solutions may be used as well. The clinician can supply the various fluids to the tooth in one or more treatment cycles, and can supply different fluids sequentially or simultaneously.

During some treatment cycles, bleach-based solutions (e.g., solutions including NaOCl) can be used to dissociate diseased tissue (e.g., diseased organic matter in the root canal 13) and/or to remove bacteria, biofilm or endotoxins (Lipopolysaccharide or LPS) from the tooth 10. One example of a treatment solution comprises water or saline with 0.3% to 6% bleach (NaOCl). In some methods, tissue dissolution and dental deposit removal in the presence of bleach may not occur when the bleach concentration is less than 1%. In some treatment methods disclosed herein, tissue dissolution and dental deposit removal can occur at smaller (or much smaller) concentrations.

During other treatment cycles, the clinician can supply an EDTA-based solution to remove undesirable or unhealthy calcified material from the tooth 10. For example, if a portion of the tooth 10 and/or root canal 13 is shaped or otherwise instrumented during the procedure, a smear layer may form on the walls of the canal 13. The smear layer can include a semi-crystalline layer of debris, which may include remnants of pulp, bacteria, dentin, and other materials. Treatment fluids that include EDTA may be used to remove part or all of the smear layer, and/or calcified deposits on the tooth 10. EDTA may also be used to remove dentin packed into isthmuses and lateral canals during the instrumentation process. EDTA may also be used to remove a microscopic layer off enamel and cleaning and staining purposes. Other chemicals such as citric acid may also be used for similar purposes.

During yet other cycles, for example, the clinician may supply a treatment fluid that comprises substantially water. The water can be used to assist in irrigating the tooth before, during, and/or after the treatment. For example, the water can be supplied to remove remnants of other treatment fluids (e.g., bleach or EDTA) between treatment cycles. Because bleach has a pH that tends to be a base and because EDTA is an acid, it can be important to purge the tooth 10 and chamber between bleach and EDTA treatments to avoid potentially damaging chemical reactions. Furthermore, the water can be supplied with a sufficient momentum to help remove detached materials that are disrupted during the treatment. For example, the water can be used to convey waste material from the tooth 10.

Various solutions may be used in combination at the same time or sequentially at suitable concentrations. In some embodiments, chemicals and the concentrations of the chemicals can be varied throughout the procedure by the clinician and/or by the system to improve patient outcomes. For example, during an example treatment procedure, the clinician can alternate between the use of water, bleach, and EDTA, in order to achieve the advantages associated with each of these chemicals. In one example, the clinician may begin with a water cycle to clean out any initial debris, then proceed with a bleach cycle to dissociate diseased tissue and bacteria from the tooth. A water cycle may then be used to remove the bleach and any remaining detached materials from the tooth 10. The clinician may then supply EDTA to the tooth to remove calcified deposits and/or portions of a smear layer from the tooth 10. Water can then be supplied to remove the EDTA and any remaining detached material from the tooth 10 before a subsequent bleach cycle. The clinician can continually shift between cycles of treatment fluid throughout the procedure. The above example is for illustrative purposes only. It should be appreciated that the order of the cycling of treatment liquids may vary in any suitable manner and order.

Thus, the treatment fluids used in the embodiments disclosed herein can react chemically with the undesirable or unhealthy materials to dissociate the unhealthy materials from the healthy portions of the tooth 10. The treatment fluids can also be used to irrigate waste fluid and/or detached or delaminated materials out of the tooth 10. In some embodiments, as explained in more detail herein, the treatment solution (including any suitable composition) can be degassed, which may improve cavitation and/or reduce the presence of gas bubbles in some treatments. In some embodiments, the dissolved gas content can be less than about 1% by volume.

2. Enhancement of Cleaning Using Pressure Waves and Examples of Pressure Wave Generators A pressure wave generator 5 can remove unhealthy materials from a tooth by propagating pressure waves through a propagation medium such as the fluid (e.g., the treatment fluid) to the treatment region, which can include one or more teeth and/or gums. Without being limited by theory, a few potential ways that the pressure waves remove undesirable materials are presented herein. Note that these principles, and the principles described above, may be generally applicable for each embodiment disclosed herein.

In some arrangements, cavitation may be induced by the generated pressure waves. Upon irradiation of a liquid (e.g., water or other treatment fluid) with high intensity pressure or pressure waves, acoustic cavitation may occur. The oscillation or the implosive collapse of small cavitation bubbles can produce localized effects, which may further enhance the cleaning process, e.g., by creating intense, small-scale localized heat, shock waves, and/or microjets and shear flows. Therefore, in some treatment methods, acoustic cavitation may be responsible for or involved in enhancing the chemical reactions, sonochemistry, sonoporation, soft tissue/cell/bacteria dissociation, delamination and breakup of biofilms.

For example, if the treatment liquid contains chemical(s) that act on a particular target material (e.g., diseased organic or inorganic matter, stains, caries, dental calculus, plaque, bacteria, biofilms, etc.), the pressure waves (acoustic field)

and/or the subsequent acoustic cavitation may enhance the chemical reaction via convection, turbulence, agitation and/or sonochemistry. Indeed, the pressure waves can enhance the chemical effects that each composition has on the unhealthy material to be removed from the tooth. For example, with a bleach-based treatment fluid, the generated pressure waves can propagate so as to dissociate tissue throughout the entire tooth 10, including in the dentinal tubules and throughout tiny cracks and crevices of the tooth 10. As another example, with an EDTA-based treatment fluid, the generated pressure waves can propagate so as to remove the smear layer and/or calcified deposits from the tooth 10, including in the tubules and/or in tiny cracks and crevices formed in the tooth 10. With a water-based treatment fluid, the generated pressure waves can propagate so as to flush and/or irrigate undesirable materials from the tooth, including in tubules and tiny cracks and crevices. Accordingly, the generated pressure waves can enhance the removal of undesirable or unhealthy materials from the tooth 10 by magnifying the chemical effects of whatever treatment fluid composition is used during a particular treatment cycle.

Furthermore, sonoporation, which is the process of using pressure waves and/or the subsequent acoustic cavitation to modify the permeability of the bacterial cell plasma membrane, may also expedite the chemical reaction that removes the microorganisms from the tooth. It should also be appreciated that generated pressure waves, and/or the subsequent acoustic cavitation of certain frequencies, may result in cellular and bacterial rupture and death (e.g., lysis) as well as removal of decayed and weakened dentin and enamel. The cellular and bacterial rupture phenomenon may kill bacteria which might otherwise reinfect the gingival pockets and/or the oral cavity.

Generated pressure waves and/or the subsequent acoustic cavitation may also loosen the bond of the structure of the unhealthy material (e.g., diseased tissue, calculus, biofilm, caries, etc.), and/or the pressure waves may dissociate the unhealthy material from the tooth 10. In some cases, pressure waves and/or acoustic cavitation may loosen the bond between the cells and the dentin and/or delaminate the tissue from the tooth. Furthermore, the pressure waves and/or the subsequent acoustic cavitation may act on decayed hard tissue (which may be relatively weak and loosely connected) through vibrations and/or shock waves, and/or the microjets created as a result of cavitation bubble implosion, to remove decayed hard tissue from other healthy portions of the tooth.

A pressure wave generator 5 can be used in various disclosed embodiments to clean a tooth 10, e.g., from interior or exterior portions of the tooth 10 and/or gums. In other embodiments, the pressure wave generator 5 can be used to fill or obturate a cleaned root canal or other treatment region of the tooth 10. In some embodiments, the pressure wave generator 5 can comprise an elongated member having an active distal end portion. The active distal end portion can be activated by a user to apply energy to the treatment tooth 10 to remove unhealthy or undesirable material from the tooth 10.

As explained herein, the disclosed pressure wave generators 5 can be configured to generate pressure waves and fluid motion with energy sufficient to clean undesirable material from a tooth 10. The pressure wave generator 5 can be a device that converts one form of energy into acoustic waves and bulk fluid motion (e.g., rotational motion) within the fluid. The pressure wave generator 5 can induce, among other phenomena, both pressure waves and bulk fluid dynamic motion in the fluid (e.g., in the chamber of the tooth coupler 3), fluid circulation, turbulence, vortices and other conditions that can enable the cleaning of the tooth. The pressure wave generator 5 disclosed in each of the figures described herein may be any suitable type of pressure wave generator.

The pressure wave generator 5 can be used to clean the tooth 10 by creating pressure waves that propagate through the fluid, e.g., through treatment fluid at least partially retained in the chamber. In some implementations, the pressure wave generator 5 may also create cavitation, acoustic streaming, turbulence, etc. The pressure wave generator 5 (e.g., high-speed liquid jet, ultrasonic transducer, a laser fiber, etc.) can be placed at the desired treatment location in or on the tooth 10. The pressure wave generator 5 can create pressure waves and fluid motion within the fluid inside a substantially-enclosed chamber and/or in a tooth chamber of the tooth (e.g., the pulp cavity and/or the root canal 13). In general, the pressure wave generator 5 can be sufficiently strong to remove unhealthy materials such as organic and/or inorganic tissue from teeth 10. In some embodiments, the pressure wave generator 5 can be configured to avoid substantially breaking down or harming natural dentin and/or enamel.

a. Liquid Jet Apparatus

For example, in some embodiments, the pressure wave generator 5 can comprise a liquid jet device. The liquid jet can be created by passing high pressure liquid through an orifice. The liquid jet can create pressure waves within the treatment liquid. In some embodiments, the pressure wave generator 5 comprises a coherent, collimated jet of liquid. The jet of liquid can interact with liquid in a substantially-enclosed volume (e.g., the chamber, the tooth chamber (e.g., pulp cavity and/or root canals 13), and/or the mouth of the user) and/or an impingement member to create the acoustic waves. In addition, the interaction of the jet and the treatment fluid, as well as the interaction of the spray which results from hitting the impingement member and the treatment fluid, may assist in creating cavitation and/or other acoustic and fluid motion effects to clean the tooth.

In various embodiments, the liquid jet device can comprise a positioning member (e.g., a guide tube) having a channel or lumen along which or through which a liquid jet can propagate. The distal end portion of the positioning member can include one or more openings that permit the deflected liquid to exit the positioning member and interact with the surrounding environment in the chamber of the tooth coupler 3 and/or tooth 10. In some treatment methods, the openings disposed at or near the distal end portion of the positioning member can be submerged in liquid that can be at least partially enclosed in the tooth coupler 3 attached to or enclosing a portion of the tooth 10. In some embodiments, the liquid jet can pass through the guide tube and can impact an impingement surface. The passage of the jet through the surrounding treatment fluid and impact of the jet on the impingement surface can generate the acoustic waves in some implementations. The flow of the submerged portion of the liquid jet may generate a cavitation cloud within the treatment fluid. The creation and collapse of the cavitation cloud may, in some cases, generate a substantial hydroacoustic field in or near the tooth. Further cavitation effects may be possible, including growth, oscillation, and collapse of cavitation bubbles. In addition, as explained above, bulk fluid motion, such as rotational flow, may be induced. The induced rotational flow can enhance the cleaning process by removing detached material and replenishing reactants for the cleaning reactions. These (and/or other) effects may lead to efficient cleaning of the tooth. The rotational flow may also create sufficient shear stress onto surface which then leads to dissociation, detachment, and delamination of unhealthy materials. In some embodiments, the rotational flow may include turbulent regions working on small scale regions or small scale unhealthy materials.

Additional details of a pressure wave generator and/or pressure wave generator that includes a liquid jet device may be found at least in ¶¶ [0045]-[0050], [0054]-[0077] and various other portions of U.S. Patent Publication No. US 2011/0117517, published May 19, 2011, and in ¶¶ [0136]-[0142] and various other portions of U.S. Patent Publication No. US 2012/0237893, published Sep. 20, 2012, each of which is incorporated by reference herein in its entirety and for all purposes.

As has been described, a pressure wave generator can be any physical device or phenomenon that converts one form of energy into acoustic waves within the treatment fluid and that induces normal and shear stresses as well as small scale flows near a treatment region in the chamber and/or tooth 10. The pressure wave generator 5 may also convert the energy into rotational fluid motion of various length scales in the chamber and/or tooth 10. Many different types of pressure wave generators (or combinations of pressure wave generators) are usable with embodiments of the systems and methods disclosed herein.

b. Mechanical Energy

Mechanical energy pressure wave generators can also include rotating objects, e.g. miniature propellers, eccentrically-confined rotating cylinders, a perforated rotating disk, etc. These types of pressure wave generators can also include vibrating, oscillating, or pulsating objects such as sonication devices that create pressure waves via piezoelectricity, magnetostriction, etc. In some pressure wave generators, electric energy transferred to a piezoelectric transducer can produce acoustic waves in the treatment fluid. In some cases, the piezoelectric transducer can be used to create acoustic waves having a broad band of frequencies.

c. Electromagnetic Energy

An electromagnetic beam of radiation (e.g., a laser beam) can propagate energy into a chamber, and the electromagnetic beam energy can be transformed into acoustic waves as it enters the treatment fluid. In some embodiments, the laser beam can be directed into the chamber and/or tooth coupler 3 as a collimated and coherent beam of light. The collimated laser beam can be sufficient to generate pressure waves as the laser beam delivers energy to the fluid. Furthermore, in various embodiments, the laser beam can be focused using one or more lenses or other focusing devices to concentrate the optical energy at a location in the treatment fluid. The concentrated energy can be transformed into pressure waves sufficient to clean the undesirable materials. In one embodiment, the wavelength of the laser beam or electromagnetic source can be selected to be highly absorbable by the treatment fluid in the chamber, tooth, and/or mouth (e.g., water) and/or by the additives in the treatment fluid (e.g., nanoparticles, etc.). The electromagnetic energy can be absorbed by at least one component and can turn the electromagnetic energy into either heat, vibration, or pressure waves, for example, through cavitation. For example, at least some of the electromagnetic energy may be absorbed by the fluid (e.g., water) in the chamber, which can generate localized heating and pressure waves that propagate in the fluid. The pressure waves generated by the electromagnetic beam can generate light-induced cavitation effects in the fluid. In some embodiments, the localized heating can induce rotational fluid flow in the chamber and/or tooth 10 that further enhances cleaning of the tooth 10. The electromagnetic radiation from a radiation source (e.g., a laser) can be propagated to the chamber by an optical waveguide (e.g., an optical fiber), and dispersed into the fluid at a distal end of the waveguide (e.g., a shaped tip of the fiber, e.g., a conically-shaped tip). In other implementations, the radiation can be directed to the chamber by a beam scanning system.

The wavelength of the electromagnetic energy may be in a range that is strongly absorbed by water molecules. The wavelength may in a range from about 300 nm to about 3000 nm. In some embodiments, the wavelength is in a range from about 400 nm to about 700 nm, about 700 nm to about 1000 nm (e.g., 790 nm, 810 nm, 940 nm, or 980 nm), in a range from about 1 micron to about 3 microns (e.g., about 2.7 microns or 2.9 microns), or in a range from about 3 microns to about 30 microns (e.g., 9.4 microns or 10.6 microns). The electromagnetic energy can be in the ultraviolet, visible, near-infrared, mid-infrared, microwave, or longer wavelengths.

The electromagnetic energy can be pulsed or modulated (e.g., via a pulsed laser), for example with a repetition rate in a range from about 1 Hz to about 500 kHz. The pulse energy can be in a range from about 1 mJ to about 1000 mJ. The pulse width can be in a range from about 1 µs to about 500 µs, about 1 ms to about 500 ms, or some other range. In some cases, nanosecond pulsed lasers can be used with pulse rates in a range from about 100 ns to about 500 ns. The foregoing are non-limiting examples of radiation parameters, and other repetition rates, pulse widths, pulse energies, etc. can be used in other embodiments.

The laser can include one or more of a diode laser, a solid state laser, a fiber laser, an Er:YAG laser, an Er:YSGG laser, an Er,Cr:YAG laser, an Er,Cr:YSGG laser, a Ho:YAG laser, a Nd:YAG laser, a CTE:YAG laser, a $CO_2$ laser, or a Ti:Sapphire laser. In other embodiments, the source of electromagnetic radiation can include one or more light emitting diodes (LEDs). The electromagnetic radiation can be used to excite nanoparticles (e.g., light-absorbing gold nanorods or nanoshells) inside the treatment fluid, which may increase the efficiency of photo-induced cavitation in the fluid. The treatment fluid can include excitable functional groups (e.g., hydroxyl functional groups) that may be susceptible to excitation by the electromagnetic radiation and which may increase the efficiency of pressure wave generation (e.g., due to increased absorption of radiation). During some treatments, radiation having a first wavelength can be used (e.g., a wavelength strongly absorbed by the liquid, for instance water) followed by radiation having a second wavelength not equal to the first wavelength (e.g., a wavelength less strongly absorbed by water) but strongly absorbed by another element, e.g. dentin, dyes, or nanoparticles added to solution. For example, in some such treatments, the first wavelength may help create bubbles in the fluid, and the second wavelength may help disrupt the tissue.

The electromagnetic energy can be applied to the chamber holding the treatment fluid for a treatment time that can be in a range from about one to a few seconds up to about one minute or longer. A treatment procedure can include one to ten (or more) cycles of applying electromagnetic energy to the tooth. A fluid can circulate or otherwise move in the chamber during the treatment process, which advantageously may inhibit heating of the tooth 10 (which may cause discomfort to the patient). The movement or circulation of treatment fluid (e.g., water with a tissue dissolving agent) in the chamber can bring fresh treatment fluid to tissue and organic matter as well as flush out dissolved material from the treatment site. In some treatments using electromagnetic radiation, movement of the treatment fluid (for example small- or large scale rotational flows or turbulent flow) can increase the effectiveness of the cleaning (as compared to a treatment with little or no fluid circulation).

In some implementations, electromagnetic energy can be added to other fluid motion generation modalities. For example, electromagnetic energy can be delivered to a chamber in which another pressure wave generator (e.g., a liquid jet) is used to generate the acoustic waves.

d. Acoustic Energy

Acoustic energy (e.g., ultrasonic, sonic, audible, and/or lower frequencies) can be generated from electric energy transferred to, e.g., an ultrasound or other transducer or an ultrasonic tip (or file or needle) that creates acoustic waves in the treatment fluid. The ultrasonic or other type of acoustic transducer can comprise a piezoelectric crystal that physically oscillates in response to an electrical signal or a magnetostrictive element that converts electromagnetic energy into mechanical energy. The transducer can be disposed in the treatment fluid, for example, in the fluid inside the chamber. As explained herein, ultrasonic or other acoustic devices used with the embodiments disclosed herein are preferably broadband and/or multi-frequency devices.

e. Further Properties of Some Pressure Wave Generators

A pressure wave generator 5 can be placed at a desired location with respect to the tooth 10. The pressure wave generator 5 creates pressure waves within the fluid inside a chamber of the tooth coupler 3 and/or tooth 10 (the generation of acoustic waves may or may not create or cause cavitation). The acoustic or pressure waves propagate throughout the fluid inside the chamber of the tooth coupler 3 and/or in a tooth chamber of the tooth 10, with the fluid in the chamber or tooth 10 serving as a propagation medium for the pressure waves. The pressure waves can also propagate through tooth material (e.g., dentin). It is believed, although not required, that as a result of application of a sufficiently high-intensity acoustic wave, acoustic cavitation may occur. The collapse of cavitation bubbles may induce, cause, or be involved in a number of processes described herein such as, e.g., sonochemistry, tissue dissociation, tissue delamination, sonoporation, and/or removal of calcified structures. In some embodiments, the pressure wave generator can be configured such that the acoustic waves (and/or cavitation) do not substantially break down natural dentin in the tooth 10. The acoustic wave field by itself or in addition to cavitation may be involved in one or more of the abovementioned processes.

In some implementations, the pressure wave generator 5 generates primary cavitation, which creates acoustic waves, which may in turn lead to secondary cavitation. The secondary cavitation may be weaker than the primary cavitation and may be non-inertial cavitation. In other implementations, the pressure wave generator 5 generates acoustic waves directly, which may lead to secondary cavitation.

Additional details of pressure wave generators (e.g., which may comprise a pressure wave generator) that may be suitable for use with the embodiments disclosed herein may be found, e.g., in ¶¶ [0191]-[0217], and various other portions of U.S. Patent Publication No. US 2012/0237893, published Sep. 20, 2012, which is incorporated by reference herein for all purposes.

3. Enhancement of Cleaning Using Large-Scale Fluid Motion

In some arrangements, bulk fluid motion (e.g., fluid rotation, convection, planar flow, chaotic flow, etc.) can enhance the cleaning of unhealthy material from a diseased tooth. For example, the fluid motion generated in a chamber of the tooth coupler 3 and/or tooth 10 can impart relatively large momentum to the tooth, which can help dissociate and irrigate unhealthy materials from the tooth. Furthermore, the fluid motion can induce vortices and/or swirl in the tooth 10 that can result in negative pressures (or low positive pressures) near the apical opening of the tooth 10. The resulting negative pressures at the apical opening can prevent or reduce an amount of material extruded through the apical opening and into the jaw of the patient. By preventing or reducing the amount of extruded material, the risk of pain and discomfort as well as infection can be lowered or eliminated, and patient outcomes and comfort can be substantially improved.

In addition, due to relatively short time scales of the chemical reaction processes between the fluid and the unhealthy materials as compared to that of diffusion mechanisms, a faster mechanism of reactant delivery such as "macroscopic" liquid circulation may be advantageous in some of the embodiments disclosed herein. For example, liquid circulation with a time scale comparable to (and preferably faster than) that of chemical reaction may help replenish the reactants at the chemical reaction front and/or may help to remove the reaction byproducts from the reaction site. The relatively large convective time scale, which may relate to effectiveness of the convection process, can be adjusted and/or optimized depending on, e.g., the location and characteristics of the source of circulation. Furthermore, it should be appreciated that the introduction of liquid circulation or other fluid motion generally does not eliminate the diffusion process, which may still remain effective within a thin microscopic layer at the chemical reaction front. Liquid circulation can also cause a strong irrigation effect at the treatment site (e.g. removing diseased tissue deep in the canal and/or tubules and small spaces and cracks of the tooth 10) and may therefore result in loosening and/or removing large and small pieces of debris from the treatment site.

In some arrangements, various properties can be adjusted to enhance bulk fluid motion and/or fluid circulation, e.g., fluid motion in the chamber of the tooth coupler 3. For example, the position of the pressure wave generator 5 relative to the location of the treatment site can be adjusted. Furthermore, in some embodiments, the pressure wave generator 5 can be disposed adjacent the access opening formed in the tooth and/or adjacent an access port of the tooth coupler 3. The geometry of the space surrounding the pressure wave generator 5 and treatment site (e.g., the geometry of the tooth coupler 3) can also be varied. It should also be appreciated that circulation may be affected by the viscosity of the fluid and/or the mechanism of action of the pressure wave generator 5. For example, the pressure wave generator 5, such as a jet of liquid ejected through an inlet opening, a stirrer such as a propeller or a vibrating object, etc., can be selected to enhance fluid motion of the treatment fluid. In some aspects, the input power of the source of liquid circulation can also be adjusted, such as the source of a pump that drives a liquid jet in some embodiments.

B. Enhancement of Other Dental and Endodontic Procedures

In some embodiments, the pressure wave generators 5 disclosed herein can enhance other dental and endodontic procedures. For example, after cleaning a tooth (e.g., a root canal inside the tooth, a carious region on or near an exterior surface of the tooth, etc.), the treatment region can be filled with an obturation or filler material. The clinician can also restore damaged or diseased tooth material by building up the tooth using a suitable restoration material. In some embodiments, a filler material can be supplied to the treatment region as a flowable material and can be hardened to fill the treatment region (e.g., the cleaned root canal or carious region, etc.). In some embodiments, a pressure wave generator 5 can be activated to supply the obturation material throughout the treatment region.

For example, after a root canal procedure, the pressure wave generator can supply the flowable obturation material into the tooth and root canal. The large-scale fluid movement generated by the pressure wave generator 5 can assist in propagating the obturation material throughout relatively large spaces, such as the main root canal or canals. For example, the pressure wave generator 5 may introduce sufficient momentum such that the flowable obturation material propagates throughout the canal space without introducing additional instrumentation into the tooth. For example, the bulk fluid motion of the obturation material into the canal may be such that the clinician may not need to or desire to enlarge the canals. By reducing or eliminating canal enlargement, patient outcomes and pain levels can be improved. In some arrangements, the bulk fluid motion of the flowable obturation material can be generated at relatively low frequencies produced by the pressure wave generator.

In addition to generating large-scale or bulk fluid motion of the obturation material throughout the canal, the pressure wave generators 5 disclosed herein can generate higher frequency perturbations to propagate the obturation material into smaller cracks, spaces, and crevices in the tooth. For example, higher-frequency effects, such as acoustic cavitation, can assist in propagating the filler material throughout the tooth.

Accordingly, the pressure wave generators disclosed herein can enhance the filling and/or restoration of a treatment region such as a root canal, carious region of the tooth, etc. For example, the obturation material can be propagated at a distance such that it flows into the treatment region from a remote pressure wave generator 5 (which may be disposed outside the tooth). Large-scale or bulk fluid motion of the obturation material can fill larger canal spaces or other treatment regions without further enlargening the treatment region. Smaller-scale and/or higher frequency agitation by the pressure wave generator 5 can propagate the obturation material into smaller cracks and spaces of the tooth. By filling substantially all the cleaned spaces of the tooth, the disclosed methods can improve patient outcomes relative to other methods by reducing the risk of infection in spaces unfilled by the obturation material.

V. Examples of Magnetic Sealing Assemblies

In some embodiments, the tooth coupler 3 (e.g., handpiece 3A) can be coupled to and/or fluidly sealed with the tooth 10 by way of a magnetic sealing assembly 200. The use of the magnetic seal assembly 200 can provide a mechanical engagement between the tooth 10 and tooth coupler 3, and can provide a seal such that fluids do not leak through the assembly 200. In addition, the magnetic seal assembly 200 can act as a safety mechanism. For example, if the clinician makes an abrupt movement relative to the tooth 10, the magnetic forces may be arranged such that the tooth coupler 3 breaks away from the tooth 10 without damaging the tooth 10. Moreover, the use of the magnetic sealing assembly 200 can act to align the distal portion of the handpiece 3A to the tooth 10. Advantageously, the magnetic sealing assembly 200 can substantially align and/or center the pressure wave generator or other treatment device with respect to the access opening 18 and tooth 10. In some embodiments, the magnetic sealing assembly 200 can be used with a tooth cap 4 (such as any of the tooth caps 4 disclosed herein). In other embodiments, the magnetic sealing assembly can be used without a tooth cap and can couple with a tooth seal region 175 applied to the tooth 10.

Accordingly, the magnetic forces provided by the magnetic seal assembly 200 may be sufficiently strong so as to provide secure mechanical engagement and a substantially sealed fluid connection. For example, the magnetic forces normal to the major surfaces of the magnets (e.g., the forces acting generally along a direction extending from the distal portion of the handpiece 3A towards the tooth 10) may be relatively strong so as to provide a fluid seal and to resist forces that tend to pull the magnets upwardly away from the tooth 10. However, the magnetic forces parallel to the major surfaces of the magnets (e.g., forces acting generally parallel to the tooth seal 175 and/or transverse to the pressure wave generator 5) may be sufficiently weak such that, if the clinician inadvertently moves the handpiece transversely, the magnets can break away to avoid harming the patient.

In some embodiments, the magnetic sealing assembly 200 may include a handpiece magnet 210 and an occlusal magnet 220, as shown in FIGS. 37A-37D. In some embodiments, a magnetic sealing assembly 200 may also include a plurality of spacer magnets 230 (alternatively referred to herein as magnetic spacers), as shown in FIGS. 38A-38C and 39. The spacer magnets 230 can be arranged to provide the desired spacing between the distal end of a pressure wave generator 5 and a floor of the tooth chamber. Although the handpiece 3A is shown in FIGS. 37A-39, it should be appreciated that any other tooth coupler 3 may be used.

A. Examples of Magnetic Assemblies with Occlusal and Handpiece Magnets

Figure 37A:
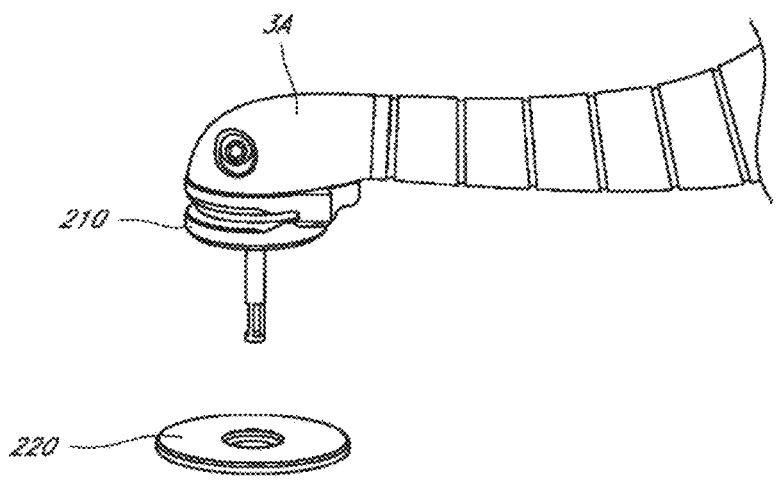
FIG. 37A is a perspective, exploded view of one embodiment of a handpiece configured to couple to a treatment tooth by way of a magnetic seal assembly.
Figure 37A:
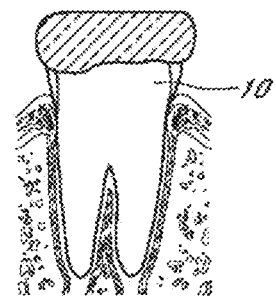
Figure 37B:
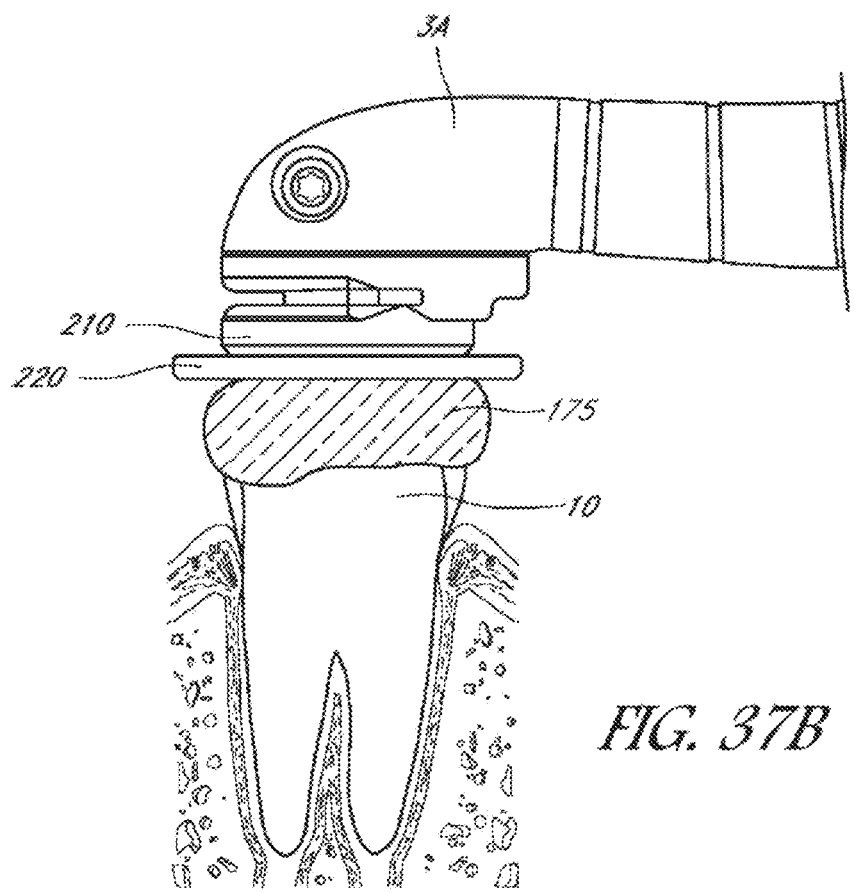
FIG. 37B is a schematic side view of the handpiece coupled to the tooth with the magnetic seal assembly.
Figure 37C:
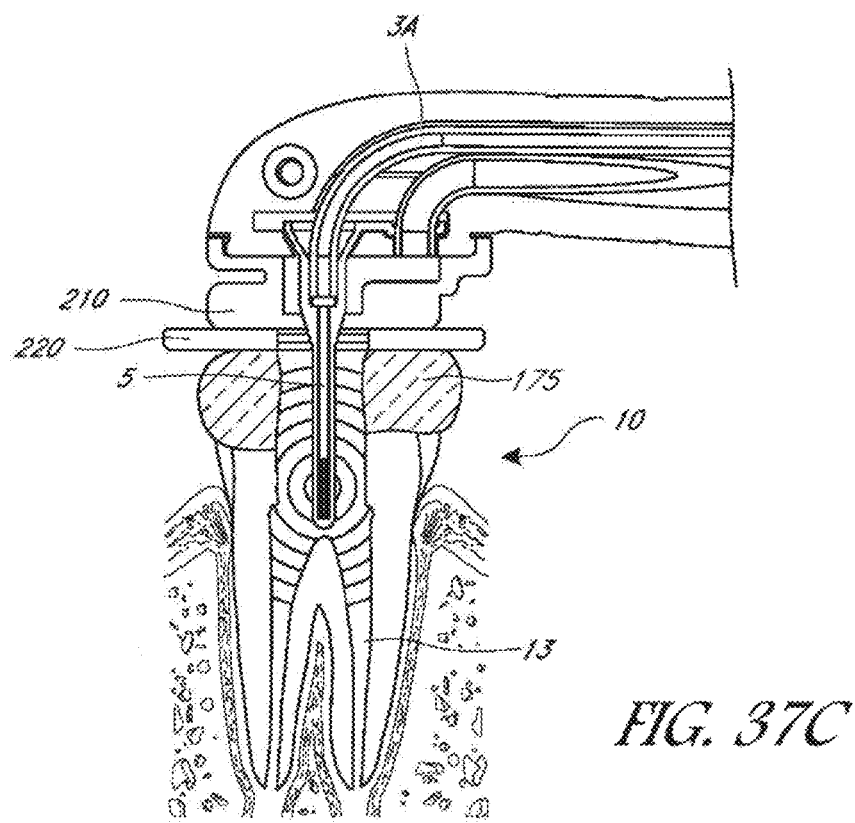
FIG. 37C is a side cross-sectional view of the handpiece and magnetic seal assembly shown in FIG. 37B.

FIG. 37A is a perspective, exploded view of one embodiment of a handpiece 3A configured to couple to a treatment tooth 10 by way of a magnetic seal assembly 200. FIG. 37B is a schematic side view of the handpiece 3A coupled to the tooth 10 with the magnetic seal assembly 200. FIG. 37C is a side cross-sectional view of the handpiece 3A and magnetic seal assembly 200 shown in FIG. 37B. The magnetic assembly 200 may be used to provide a seal on the occlusal surface of the tooth 10. The magnetic assembly may also be configured to adjust the position of the handpiece tip (e.g. pressure wave generator 5) with respect to the pulp chamber floor. As shown in FIGS. 37A-C, for example, the magnetic assembly 200 can include a handpiece magnet 210 coupled to or formed with the handpiece 3A. An occlusal magnet 220 can be attached or coupled to the tooth 10 by way of, e.g., various types of attachment media, such as the tooth seal 175. The disclosed assembly can seal and/or attach the handpiece 3A to the tooth 10 and can enable the user to adjust the handpiece tip relative to a chamber in the tooth or another position on the tooth 10. For example, the handpiece magnet 210 and occlusal magnets 220 can have opposite polarities such that the occlusal magnet 210 is attracted to the occlusal magnet 220. In some embodiments, the occlusal magnet 220 may not be a magnet; rather, the occlusal magnet 220 may comprise a ferrous material that is attracted to the handpiece magnet 210. Alternatively, the handpiece magnet 210 may comprise a ferrous metal attracted to the occlusal magnet 220. In some embodiments, a user can rotate the handpiece 3A to a desired location, and the magnetic assembly can rotate with the handpiece 3A while maintaining a fluidic and/or mechanical seal between the handpiece 3A and the tooth 10. In addition, the handpiece magnet 210 and occlusal magnet 220 can cooperate to substantially align and/or center the pressure wave generator 5 with respect to the access opening 18 and tooth 10.

Figure 37D:
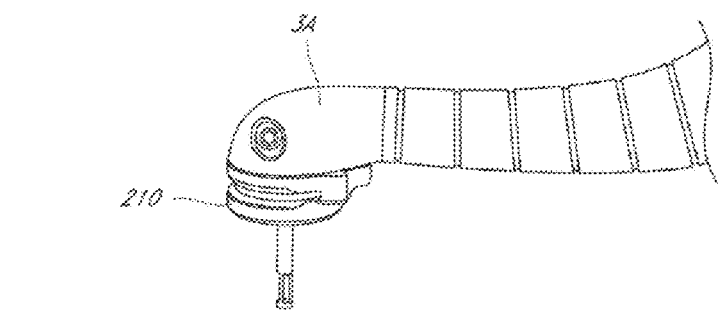
FIG. 37D is a schematic side cross-sectional view of the handpiece and magnetic seal assembly shown in FIGS. 37A-C, except the magnetic seal assembly is used to couple the handpiece to a tooth cap.
Figure 37D:
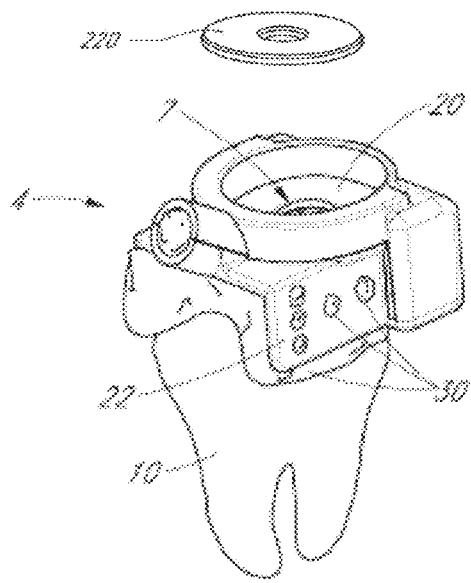

FIG. 37D is a schematic side cross-sectional view of the handpiece 3A and magnetic seal assembly 200 shown in FIGS. 37A-C, except the magnetic seal assembly 200 is used to couple the handpiece 3A to a tooth cap 4. The tooth cap 4 can be any suitable tooth cap disclosed herein. For example, the tooth cap 4 shown in FIG. 37D is similar to the tooth cap 4 shown in FIGS. 27A-27D. In the embodiment of FIG. 37D, the tooth seal 175 may not be used. Instead, the tooth cap 4 can be applied to the tooth 10, and a coupling material can be provided between the tooth cap 4 and the tooth 10. The occlusal magnet 220 can be coupled to or formed with the tooth cap 4. For example, in some embodiments, the occlusal magnet 220 can be attached (e.g., glued, adhered, etc.) to the platform 20 of the tooth cap 4. In such embodiments, the clinician can attach the occlusal magnet 220 to the tooth cap 4 before or after applying the tooth cap 4 to the tooth 10. In other embodiments, the occlusal magnet 220 can be integrally formed within or on the platform 20.

Handpiece Magnet

The handpiece 3A may include a fixed ring magnet on the face of the handpiece 3A. The handpiece magnet 210 may be integrally formed with the handpiece 3A, may be mechanically coupled to the handpiece 3A, and/or may be removable engaged with the handpiece 3A. In some arrangements, the handpiece magnet 210 may be separate from the handpiece 3A and can be attached to the handpiece 3A by the user. In other arrangements, the handpiece 3A can be manufactured to include the handpiece magnet 210. The handpiece magnet 210 can act as a magnetic interface for the handpiece 3A. For example, the handpiece magnet 210 can be configured to interact with other magnets to orient the handpiece 3A relative to the anatomy (and/or components) associated with the other magnets, e.g., the tooth 10. In some embodiments, different polarities can be used for handpiece magnets 210 used in different types of tooth couplers 3. For example, in some embodiments, a positive polarity can be used with a handpiece magnet 210 for a molar handpiece 3A, and a negative polarity can be used with a handpiece magnet 210 for a pre-molar handpiece 3A, or vice versa. Having different polarities in different types of tooth couplers 3 can act as a safety measure such that the correct tooth couplers 3 couple to the appropriate types of teeth and occlusal magnets 220.

Occlusal Magnet

The occlusal magnet 220 may be adhered to the occlusal surface of a built-up tooth 10 with, e.g., a UV-cure adhesive, a tooth seal material, a bite-registration material, etc. In other embodiments, the occlusal magnet 220 can be coupled or formed with a tooth cap 4. The occlusal magnet 220 can act as a base magnet to which other magnets can be coupled. For example, the occlusal magnet 220 can be secured to the tooth 10 (by way of, e.g., a tooth seal 175 or a tooth cap 4), and any suitable number or type of magnets can be coupled to the occlusal magnet 220. The inner diameter of the occlusal magnet 220 may be the same as or substantially the same as the inner diameter of the spacer magnet(s) 230. The outer diameter of the occlusal magnet 220 may be in a range of between about 10 mm and about 17 mm. The outer diameter of the occlusal magnet 220 may be larger than the magnetic spacers 230. The upper limit of the outer diameter may be constrained by interference with adjacent teeth. The thickness of the occlusal magnet 220 may be approximately 1 mm thick depending on durability of the magnet, e.g., in a range of about 0.5 mm thick and about 1.5 mm thick.

Figure 38A:
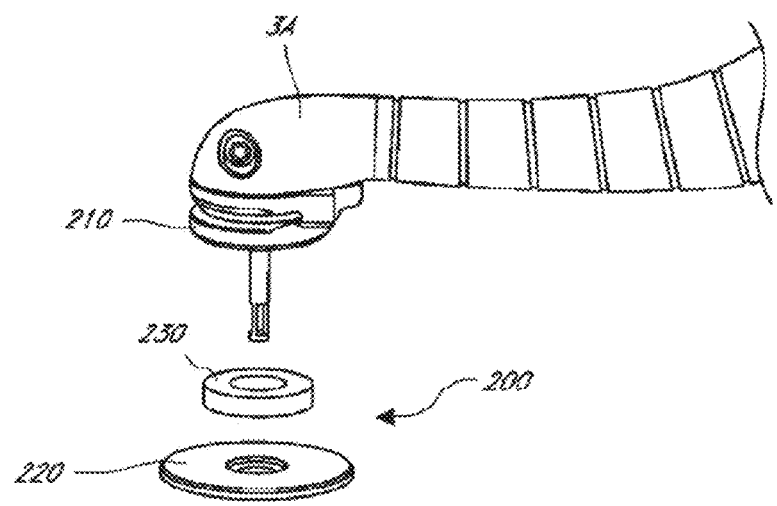
FIG. 38A is a perspective, exploded view of one embodiment of a handpiece configured to couple to a treatment tooth by way of a magnetic seal assembly.
Figure 38A:
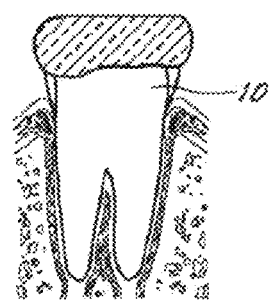
Figure 38B:
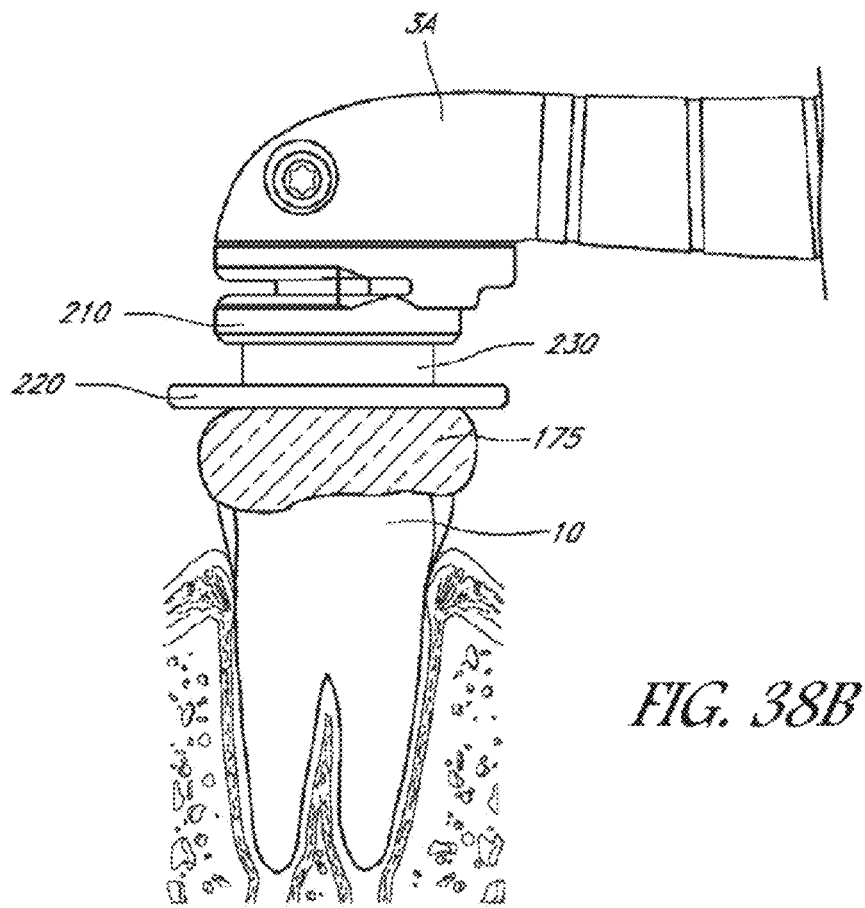
FIG. 38B is a schematic side view of the handpiece coupled to the tooth with the magnetic seal assembly.
Figure 38C:
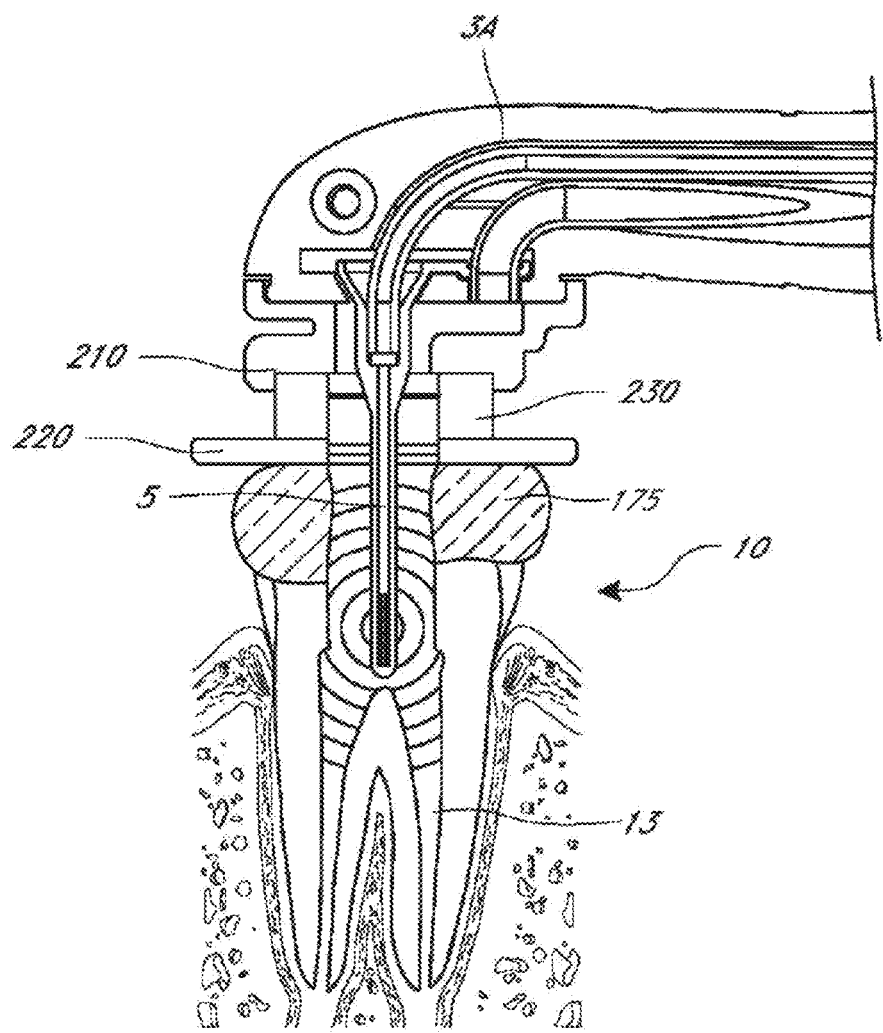
FIG. 38C is a side cross-sectional view of the magnetic sealing assembly disclosed in FIG. 38B.

B. Examples of a Handpiece and Magnetic Assembly Applied to a Tooth Seal with Spacer Magnets FIGS. 38A-38C illustrate many of the components shown in FIGS. 37A-C. However, in the embodiment illustrated in FIGS. 38A-C, a magnetic spacer 230 is included. FIG. 38A is a perspective, exploded view of one embodiment of a handpiece 3A configured to couple to a treatment tooth 10 by way of a magnetic seal assembly 200. FIG. 38B is a schematic side view of the handpiece 3A coupled to the tooth 10 with the magnetic seal assembly 200. FIG. 38C is a side cross-sectional view of the magnetic sealing assembly 200 disclosed in FIG. 38B. For example, a magnetic assembly 200 may be used to seal and/or couple the handpiece 3A to the tooth 10. As shown in FIGS. 38A-C, for example, the magnetic assembly can include a handpiece magnet 210 coupled to or formed with the handpiece 3A. In various procedures, such as a root canal procedure, an access opening can be formed in the tooth 10. A sealing and adhesion material (e.g., tooth seal 175) can be applied to the tooth 10 around the access opening. In some arrangements, the sealing and adhesion material can be planarized or otherwise shaped to support a portion of the magnetic seal assembly 200. For example, the magnetic seal assembly 200 can include an occlusal magnet 220. The occlusal magnet 220 can be attached or coupled to the sealing and adhesion material (e.g., attachment media). Although the seal 175 is used in the embodiment illustrated with respect to FIGS. 38-38C, it should be appreciated that a tooth cap 4 could be used instead (see FIG. 37D). One or more magnetic spacers (or spacer magnets) 230 can couple the handpiece magnet 210 to the occlusal magnet 220. The magnetic spacers 230 can be configured to provide a separation distance between the handpiece 3A (and/or pressure wave generator 5) and a portion of the tooth 10 (e.g., a floor or bottom surface of the pulp chamber).

For example, the clinician can use a set of sizers to determine a suitable separation distance between the floor of the tooth chamber and the distal end portion of the pressure wave generator 5. Once the clinician determines the desired separation distance, a suitable spacer magnet 230 can be selected. In the embodiment of FIGS. 38A-38C, the system can include a kit of spacer magnets 230, each spacer magnet 230 having a different size, e.g., a different thickness corresponding to a desired separation distance. For example, if the clinician determines that the separation distance is about X, then the clinician can select one or more spacer magnets 230 that corresponds approximately to the separation distance X. The clinician can insert the selected spacer magnet(s) 230 between the occlusal magnet 220 and the handpiece magnet 210 to provide the desired spacing between the distal portion of the pressure wave generator 5 and the floor of the tooth chamber.

Figure 39:
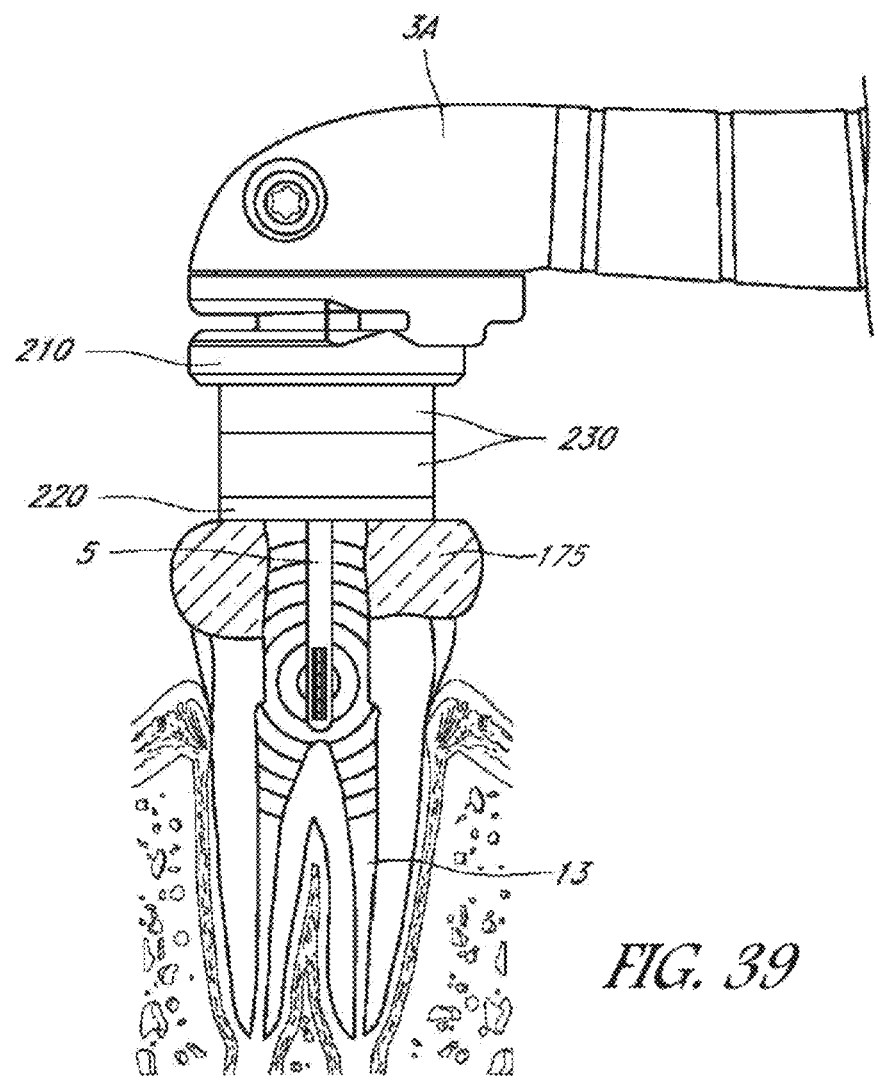
FIG. 39 is a schematic side view of a handpiece coupled to a treatment tooth.

FIG. 39 is a schematic side view of a handpiece 3A coupled to a treatment tooth 10. FIG. 39 illustrates many of the components shown in FIGS. 38A-C. In FIG. 39, the handpiece 3A can be applied to the tooth 10 and substantially sealed onto the tooth 10 with the magnetic seal assembly 200. A pressure wave generator 5 can be coupled to or formed with the handpiece 3A and can be disposed in a prescribed location in the tooth 10 by way of a combination of magnets. However, in the embodiment illustrated in FIG. 39, a plurality of magnetic spacers 230 is coupled between the handpiece magnet 210 and the occlusal magnet 220. In particular, FIG. 39 illustrates two magnetic spacers 230 between a handpiece magnet 210 and an occlusal magnet 220. Although two magnetic spacers are shown, it should be appreciated that any suitable number of magnetic spacers may be used. For example, a kit of magnetic spacers 230 can be provided to the clinician. The kit of spacers 230 can include a plurality of spacer magnets 230. Each of the plurality of spacer magnets 230 may have substantially the same size or thickness in some embodiments. In other embodiments, each of the plurality of spacer magnets 230 may have a different size or thickness. The handpiece magnet 210, the spacer magnets 230 and the occlusal magnet 220 can act to seal and/or mechanically couple the handpiece 3A to the tooth 10 (e.g., to provide a substantially sealed liquid pathway between the handpiece 3A and the tooth 10). Although the seal 175 is used in the embodiment illustrated with respect to FIG. 39, it should be appreciated that a tooth cap 4 could be used instead (see FIG. 37D).

Accordingly, as explained herein with respect to FIGS. 38A-38C, the clinician may determine a desired separation distance X between the distal portion of the pressure wave generator 5 and the floor of the tooth chamber. The clinician can select from the kit of spacer magnets 230 a set of magnets that will provide the desired separation distance X, and can couple the selected set of magnets 230 between the occlusal magnet 220 and the handpiece magnet 210.

As shown in FIG. 39, a pressure wave generator 5 (such as a liquid jet device) can be activated. Pressure waves can propagate in a tooth chamber (e.g., in treatment fluid in the tooth chamber in some embodiments) to clean the tooth 10. For example, the pressure waves can propagate through the tooth chamber or tooth 10 and can have energy sufficient to substantially remove organic material and unhealthy tissue from the tooth 10 and/or root canals. In FIG. 39, for example, the pressure wave generator 5 can include a proximal portion coupled to or formed with the handpiece 3A and a distal portion configured to be disposed in the tooth chamber. As shown in the exploded view in FIG. 38A, for example, the distal portion of the pressure wave generator 5 can pass through an opening or aperture formed through the handpiece magnet 210, the spacer magnet(s) 230, and the occlusal magnet 220.

Thus, each of the handpiece magnet 210, the spacer magnet(s) 230, and the occlusal magnet 220 can include or define an inner diameter (defined by the opening or aperture) and an outer diameter. In some embodiments, the inner diameters of the occlusal magnet 220 and an adjacent spacer magnet 230 can be the same or substantially the same. By having the same or substantially the same inner diameters, the occlusal magnet 220 and the adjacent spacer magnet 230 can be accurately aligned by the attractive magnetic forces. In some embodiments, the inner diameters of all the magnets (e.g., the handpiece magnet 210, the spacer magnet(s) 230, and the occlusal magnet 220) can be the same or substantially the same to improve alignment.

In various embodiments, the magnetic strength (e.g., the attractive force) between the occlusal magnet 220 and one or more spacer magnets 230 can be less than the magnetic strength between the one or more spacer magnets 230 and the handpiece magnet 210, and/or can be less than the magnetic strength between adjacent spacer magnets 230. In such embodiments, for example, the clinician can break the seal between the one or more spacer magnet(s) 230 and the occlusal magnet 220 by applying a force to the handpiece 3A in a direction opposite to or away from the occlusal magnet 220 with a magnitude that exceeds the attractive force between the occlusal magnet 220 and the one or more spacer magnet(s) 230, e.g., the attractive magnetic force between the occlusal magnet 220 and an adjacent spacer magnet 230. The clinician can thereby remove the handpiece 3A, handpiece magnet 210, and the spacer magnet(s) 230 from the treatment site while leaving the occlusal magnet 220 coupled to the tooth 10 (for later removal).

In other embodiments, the magnetic interfaces (e.g., the interfaces between the magnets in the magnetic assembly) can be designed to have attractive magnetic forces such that the clinician can separate the handpiece 3A from the occlusal magnet 220 at any other suitable interface. For example, in some embodiments, the handpiece 3A can be separated from the occlusal magnet 220 at an interface between two adjacent spacer magnets 230, and/or between a spacer magnet 230 and the handpiece magnet 210. In such embodiments, the magnetic strength at the separation interface (e.g., the interface at which the magnetic assembly is to be separated) is less than the magnetic strength at other magnetic interfaces.

Figure 40:
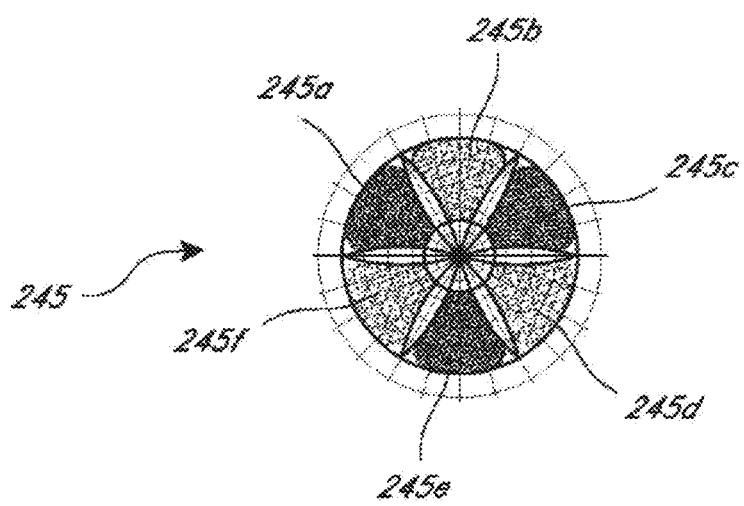
FIG. 40 is a schematic illustration of a multipoled magnet configured for use in various magnets of the disclosed magnetic assemblies.

FIG. 40 is a schematic illustration of a multipoled magnet 245 configured for use in various magnets of the disclosed magnetic assemblies. For example, the multipoled magnet 245 can be configured for use in a handpiece magnet 210, an occlusal magnet 220, and a magnetic spacer 230. As shown in FIG. 40, for example, the multipoled magnet 245 can included alternating polarities (e.g., north and south) at different circumferential positions of the magnet. For example, a multipoled magnet 245 can include north regions 245*a*, 245*c* and 245*e*, and south regions 245*b*, 245*d* and 245*f*. As shown in FIG. 40, the north and south regions can alternate such that one half of the magnet (e.g., the top half) includes two north regions 245*a* and 245*c* and one south region 245*b* and such that the other half of the magnet (e.g., the bottom half) includes two south regions 245*d* and 245*f* and one north region 245*e*. Although six polarities are shown, it should be appreciated that any suitable number of north and south regions may be used. For example, in some embodiments, four alternating polarities (e.g., north and south) can be used at different circumferential positions of the magnet. In other embodiments, eight alternating polarities (e.g., north and south) can be used at different circumferential positions of the magnet. Any suitable number of poles can be used.

In various embodiments of the magnetic assemblies disclosed herein, the use of a multi-poled magnet 245 magnetized through its thickness can be used to allow for separation of the magnets by rotation of the handpiece 3A. For example, to secure two adjacent magnets, the two magnets can be aligned such that regions of opposite polarity (e.g., a north region and a south region) are proximate one another, which results in an attractive force between the two adjacent magnets. In some embodiments, the clinician can separate two adjacent, coupled magnets (e.g., a spacer magnet 230 and the occlusal magnet 220, two adjacent spacer magnets 230, and/or a spacer magnet 230 and the handpiece magnet 210) by applying a torque to the handpiece 3A sufficient to cause the polarities to become aligned, e.g., sufficient to cause a north region of one magnet to align with a north region of the other magnet and/or to cause a south region of one magnet to align with a south region of the other magnet. Thus, in some embodiments, two adjacent magnets can be separated by rotating the handpiece 3A at a sufficient applied torque.

Spacer Magnets

A plurality of spacer magnets 230 with various thicknesses may also be provided, e.g., between the handpiece magnet 210 and the occlusal magnet 220. In the disclosed embodiment, there are 3 magnetic spacers 230 having approximate thicknesses of about 1 mm, 2 mm, and 3 mm, respectively. These three spacers can be connected to the handpiece magnet 210 to offset the handpiece 3A from the tooth 10 by a separation distance in a range of about 0 mm to about 5 mm. The spacer magnets 230 may have about the same inner diameters and outer diameters to maintain alignment and strength while stacking. The spacer magnets 230 may have an inner diameter in a range of between about 0.01 mm to about 10 mm and may have an outer diameter in a range of between about 1 mm and about 17 mm. The surface area and strength of the magnet may be important factors in determining the magnets' ability to maintain a fluid seal between the inner and outer diameter of the magnets.

General Properties

In some embodiments, the magnets described herein may be made from neodymium. The grade of each magnet can be selected for the magnetic strength desired. Each magnet may be coated to protect against chemicals. Each magnet may also be coated to be biocompatible. The coating may also provide mechanical strength and durability to counteract the brittleness of neodymium. The coatings and magnets may be sterilizable, for example, with gamma radiation. The coating and magnets may also be able to withstand manufacturing and operating temperatures.

The inner diameter of the disclosed magnets may be in the range of about 0.5 mm to about 10 mm. In some arrangements, the inner diameter of each of the magnets is about the same. For example, the magnetic spacer(s) 230 and the occlusal magnet 220 may have the same or substantially the same inner diameter. Advantageously, the magnetic spacer(s) 230 can be accurately aligned with the occlusal magnet 220 by designing the spacer magnet(s) 230 and the occlusal magnets 220 to have the same or about the same inner diameter. In some embodiments, all the magnets of the magnetic assembly (including, e.g., the handpiece magnet 210, the spacer magnet(s) 230 and the occlusal magnet 220) may have the same or substantially the same inner diameters. In other embodiments, the inner diameters of each magnet may differ.

The outer diameters of the magnets may be in a range of about 1 mm to about 17 mm. The outer diameters for each magnet may be dissimilar between the three magnetic sections. The thickness of the magnetic plates may range from about 0.01 mm to about 10 mm. The outer diameter of the occlusal magnet 220 may be larger than the magnetic spacers 230.

Any of the magnets disclosed herein (e.g., the occlusal 220, spacer 230, and/or handpiece magnets 210) may be ferromagnetic, paramagnetic, diamagnetic, etc. The magnets disclosed herein can include magnetic metallic elements, composites, rare-earth magnets (e.g. samarium-cobalt, neodymium-iron-boron), single-molecule magnets, single-chain magnets, nano-structured magnets, or electromagnets. In embodiments using electromagnets, for example, a power supply may be provided in the console 2, and power lines can couple to the handpiece 3A by way of electrical conduits.

One or more of the magnets may be made from neodymium. One or more of the magnets may be thoroughly or partially coated with another material to, for example, reduce brittleness. This may, therefore, reduce the shattering or chipping of the magnets. The coating can also provide a food-grade or biocompatible interface to allow color-coding, to avoid corrosion, to improve mechanical strength, to improve sealing on the surface of the magnets, etc.

For example, one or more of the disclosed magnets (e.g., the occlusal 220, spacer 230, and/or handpiece magnets 210) may be coated in Parylene C or Parylene N for mechanical strength and durability to counteract the brittleness of neodymium. In one embodiment, for example, a thin conformal coat of silicone may provide the coloration of the magnet, the sealability to fluids in between the magnets (e.g., to provide a liquid seal between the various magnets), and the spacing between the magnets to reduce magnetic strength when stacked. In some embodiments, the coating can be applied between adjacent magnets to reduce the magnetic strength between the adjacent magnets.

The magnets can be color-coded to assist the operator with identification of a suitable spacer magnet 230 to use and/or to guide the operator to use the proper combination of the spacers. For example, in some embodiments, it can be important to space the distal portion of the pressure wave generator 5 from the floor of the pulp chamber (or other surface of the tooth 10) by a desired amount, such that the pressure wave generator 5 is sufficiently spaced from the tooth 10. To assist the clinician or operator in providing sufficient separation between the pressure wave generator 5 and the tooth 10, thicknesses of the spacer magnets 230 can be selected to provide adequate separation.

The spacer magnets 230 can be color-coded such that the colors correspond to a measure of the tooth 10. In some embodiments, the measure of the tooth 10 can be a depth of the pulp chamber. Further, in some embodiments, for example, a kit can be provided in which each spacer magnet 230 corresponds to a corresponding measuring tool (and that may have the same color as the corresponding spacer magnet 230). The measuring tool can be used to measure or estimate a depth of the pulp chamber, or any other appropriate dimension of the tooth 10. When the clinician determines that a particular measuring tool corresponds to a suitable separation distance between the tooth 10 (e.g., floor of pulp chamber) and pressure wave generator 5 (and/or handpiece 3A), the clinician can select one or more spacer magnets 230 that corresponds to the particular selected measuring tool and that will provide the suitable separation distance. Thus, in some embodiments, a particular spacer magnet 230 may correspond to a corresponding measuring tool, and may be color-coded or otherwise identified with the corresponding measuring tool. Although color-coding is one way to identify a spacer magnet 230 with a corresponding measuring tool, it should be appreciated that any other suitable way to identify a particular spacer with a corresponding measuring tool may be used.

In various embodiments, spacers may be sized, for example, to have a thickness in a range of about 1 mm to about 6 mm, in increments of about 1 mm. A corresponding measuring tool (e.g., a gauge with the same color) may also be provided for each spacer. In another embodiment, the spacers can have thicknesses of about 1 mm, 2 mm, and 3 mm, and other separation distance values can be provided by combining these 3 spacers. For example, a 4 mm spacer can be made by attaching a 1 mm spacer and a 3 mm spacer. The measuring tool (gauge) for this 4 mm spacer, for example, may have the colors of the respective 1 mm and 3 mm spacers. Such a color coding (or other way of identifying the combination of spacers) would tell the operator to combine a 1 mm spacer and a 3 mm spacer to make a 4 mm spacer.

The spacers may be color-coded only on one side to avoid an attempt to attach them together on same-polarity surfaces, which would make them repel each other. The spacer magnets 230 can thus be color-coded to guide the operator as to what surfaces should be attached together (e.g., opposite polarities). Colors may be chosen to be easily identified even by users who have impaired vision or color-blindness.

The coatings on the various magnets may be soft to improve sealing. The coatings and magnets may be sterilizable with gamma radiation, steam-autoclave, chemical sterilization, or other methods. The magnets and their coatings may be made in such a way to withstand one or various methods of sterilization. In addition, the magnets and their coatings may be made to withstand manufacturing and operating temperatures. The coating may also be made in such a way to tolerate exposure to various chemicals; in particular, those chemicals that may be used during the procedure, e.g. NaOCl, EDTA, etc.

The inner diameter of all the magnets in the magnetic assembly (e.g., the handpiece magnet 210, the spacer magnet(s) 230, and the occlusal magnet 220) can vary or can be the same. In one embodiment, the inner diameter of each of the magnets is the same, or substantially the same, to enhance the automatic alignment of the magnets. The outer diameters of all the magnets also may or may not be the same, or substantially the same. In one embodiment for instance, the outer diameters are substantially the same, e.g., about 10 mm in some arrangements. Each magnet and item in the kit may be configured to be multiple-use (e.g., reusable) or one-use only (e.g., disposable).

The magnetic forces and strength of the spacers may be chosen to allow the assembly to detach from a preferred location, e.g., from a desired magnetic interface. For instance, in one embodiment, the strength of the magnets are chosen such that the magnetic sealing assembly 200 detaches at the surface of the occlusal magnet 220, e.g., such that the magnetic strength between the occlusal magnet 220 and the spacer magnet(s) 230 is less than the magnet strength between the other magnets.

For example, the magnets may be designed with different grades and coating thicknesses to ensure that the separation force between the stack of magnets applied to the handpiece 3A acts at the occlusal-to-spacer magnet interface. Thus, the force that causes the handpiece 3A to separate from the treatment site may cause separation between the occlusal magnet 220 and the spacer magnet 230 (e.g., the spacer magnet 230 adjacent to the occlusal magnet 220 in some embodiments). The magnets may also be designed to have the same separation force of about 2.4 lbs at the occlusal-to-spacer magnet interface in each stacking configuration. The force required to separate the magnets can vary between about 0.1 lbf to about 50 lbf depending on the design. In some embodiments, the required force to separate the magnets can be in a range of about 1 lbf to about 10 lbf. For example, in various embodiments, the separation force between two magnets can be in a range of about 1 lbf to about 5 lbf.

In some embodiment, the magnetic assembly is designed to not interfere with implants, body piercings, or electronic/medical, dental devices and tools. Many dental tools are of the 3xx series and, thus, are mildly magnetic. In most cases of the 3xx series stainless steel, the magnetism is not strong enough to affect dental tools in an unpredictable way.

In certain configurations, magnets can be used as a binary switch to alert the dentist or console of a partial separation of two magnets. This configuration can also be used to alert the dentist or console of correct alignment and placement of the handpiece 3A.

In some embodiments, an oval-shaped occlusal magnet 220 can be used. An oval shaped occlusal magnet 220 can reduce the separation force between the spacer and occlusal magnet 220 due to an indirect force between them. An oval shaped occlusal magnet 220 also can be oriented to accommodate different diameters of teeth.

In some embodiments, the handpiece magnet 210 can orient itself in a position that would prevent the dentist from using the handpiece 3A more than once for single-use handpieces.

1. Example Handpiece Magnets

The following specifications represent one non-limiting example of a handpiece magnet 210. In this example embodiment, the handpiece magnet 210 includes a fixed N52 Neodymium ring magnet on the face of the handpiece 3A. The handpiece magnet 210 can be attached (e.g. glued) to the handpiece 3A using, e.g., a medical grade cyanoacrylate. The handpiece magnet 210 can be incorporated into the handpiece 3A in such a way that the handpiece shell or body holds the handpiece magnet 210 permanently. In some embodiments, the inner diameter of the handpiece magnet 210 can be in a range of about 1 mm to about 10 mm, and the outer diameter can be in a range of about 5 mm to about 17 mm. In this example embodiment, the inner diameter of the handpiece magnet 210 is about 5 mm and the outer diameter is about 10 mm. The overall thickness of the handpiece magnet 210 in this example embodiment is about 2 mm. The handpiece magnet 210 can be silicone-dipped to a thickness of 0.05 mm. Thus, accounting for the coating, the actual magnet material thickness can be about 1.9 mm. The silicone on this magnet can be colored (e.g. white) and can have a shore A hardness of 70. The white color can correspond to a specific height of the chamber, or prescribed location of the pressure wave generator 5 with respect to the tooth 10, or both, or can correspond to another measured value which would assist in locating and placing the handpiece 3A properly. In one example, the handpiece magnet 210 can be formed of Neodymium (N52 (52 MGOe)). The handpiece magnet 210 can have an outer diameter of about 0.394"+/−0.001" (10 mm, +/−0.025 mm). The handpiece magnet 210 of this example can have an inner diameter of about 0.197"+/−0.001" (5 mm, +/−0.025 mm). The thickness of the Neodymium, including the Parylene coating, can be about 0.075"+/−0.001" (1.9 mm+/−0.025 mm). The thickness of the silicone coating can be about 0.002" (0.05 mm).

2. Examples of Magnetic Spacers

The following specifications represent one non-limiting example of a set of magnetic spacers 230. In this example embodiment, there can be three N32 Neodymium (32 MGOe) ring spacers of overall thicknesses of 1 mm, 2 mm, and 3 mm, respectively. Of course, the dimensions disclosed above are merely examples; any suitably dimensioned spacer magnets 230 may be appropriate. The 1 mm, 2 mm, 3 mm magnets can contain a neodymium core having thicknesses of roughly 0.9 mm (e.g., 0.035"+/−0.001", or about 0.9 mm+/−0.25 mm), 1.9 mm (e.g., 0.075"+/−0.001", or about 1.9 mm+/−0.25 mm), and 2.9 mm (e.g., 0.114"+/−0.001", or about 2.9 mm+/−0.25 mm), respectively. Each side of the spacer magnets 230 can be coated with silicone to a thickness of, for example, about 0.05 mm (e.g., 0.002"). As one non-limiting example, the silicone on the 1 mm, 2 mm, and 3 mm spacer can be colored, for example, Yellow, Red, and Blue, respectively. The silicone can have a shore A hardness of 70. The spacer magnets 230 can have the same or substantially the same inner diameters and outer diameters to maintain alignment and strength while stacking. The spacer magnets 230 can have an inner diameter in a range of between about 0.01 mm to about 10 mm, or more particularly, in a range of about 1 mm to about 10 mm, and can have an outer diameter in a range of between about 5 mm and about 17 mm. For example, in this example, the spacer magnets 230 can have an inner diameter of about 5 mm (e.g., 0.197"+/−0.001", or about 5 mm, +/−0.025 mm) and can have an outer diameter of about 10 mm (e.g., 0.394"+/−0.001", or about 10 mm, +/−0.025 mm). The surface area, the coating, and strength of the magnet, among other parameters, can determine the magnets' ability to maintain a fluid seal between the inner and outer diameter of the magnet.

The three different spacers (e.g., Blue—3 mm, Red—2 mm, Yellow—1 mm) can be coupled to the handpiece magnet 210 to offset the handpiece 3A from the tooth 10 and occlusal magnet 220 by a suitable separation distance, e.g., about 0 mm to about 5 mm. A summary of the specifications for the non-limiting example embodiment is provided below.

As explained herein, various combinations of spacer magnets 230 can be used to provide the appropriate separation between the tooth 10 and the handpiece 3A or pressure wave generator 5. Table 1 lists various example combinations of spacers for particular tooth depths. In the non-limiting example of Table 1, for example, it may be desirable to provide a total separation between the tooth chamber floor and the handpiece magnet of about 10 mm. It should be appreciated that in other arrangements, other separations may be suitable. Accordingly, if the tooth depth is 5 mm in this example, then the clinician may apply spacer magnets 230 in a combination suitable to provide an additional 5 mm spacing, for a total of 10 mm separation. Similarly, if the tooth depth is 6 mm, spacers 230 can provided in a combination to provide an additional 4 mm, and so on.

TABLE 1

Example spacer magnet combinations based on tooth depth

| Tooth Depth | Spacers Used | Sizer Colors | Spacer Colors |
|---|---|---|---|
| 5 mm | 3 mm + 2 mm | Blue + Red | Blue + Red |
| 6 mm | 3 mm + 1 mm | Blue + Yellow | Blue + Yellow |
| 7 mm | 3 mm | Blue | Blue |
| 8 mm | 2 mm | Red | Red |
| 9 mm | 1 mm | Yellow | Yellow |
| 10 mm | None | White | None (White Handpiece Magnet) |

3. Examples of Occlusal Magnets

The following specifications represent one non-limiting example of an occlusal magnet 220. In this example embodiment, the occlusal magnet 220 can include a Neodymium N32 (32 MGOe) magnet placed onto a tooth 10. The occlusal magnet 220 can contain a neodymium core having a thickness of about 0.9 mm (e,g., 0.035"+/−0.001", or about 0.9 mm+/−0.25 mm), which can include a Parylene coating. Each side of the magnet 220 can be coated with silicone to a thickness of 0.05 mm (e.g., about 0.002"). The occlusal magnet 220 can have an inner diameter in a range of between about 0.01 mm to about 10 mm, or more particularly, in a range of about 1 mm to about 10 mm, and can have an outer diameter in a range of between about 5 mm and about 17 mm. In this example, the outer diameter of the occlusal magnet 220 can be about 10 mm (e.g., 0.394"+/−0.001", or about 10 mm+/−0.025 mm). The dimension of the outer diameter may be constrained by interference with adjacent teeth, e.g., such that the outer diameter may be small enough such that it does not interfere with or contact adjacent teeth. The inner diameter of the occlusal magnet 220 can be about 5 mm (e.g., 0.197"+/−0.001", or about 5 mm+/−0.025 mm) in this example. The silicone on the occlusal magnet 220 can be colored grey and can have a shore A hardness of 70. The occlusal magnet 220 can be adhered to the occlusal surface of a built-up tooth 10 with Light-cure GC TION Gingival Protectant. An occlusal magnet tool can be used to ensure that the dentist places the occlusal magnet 220 on the tooth 10 in the correct orientation and centered on the tooth 10. The occlusal magnet 220 can be attached to a tooth seal 175 in some arrangements. In other arrangements, the occlusal magnet 220 can be attached to or formed with a tooth cap 4. The occlusal magnet tool can also serve as a light-post to direct the light from a light-cure gun to the light-curing GC TION.

Although the tooth schematically depicted in some of the figures is a pre-molar, the procedures can be performed on any type of tooth such as an incisor, a canine, a bicuspid, a pre-molar, or a molar. Further, although the tooth may be depicted as a lower (mandibular) tooth in the figures, this is for purposes of illustration, and is not limiting. The systems, methods, and compositions can be applied to lower (mandibular) teeth or upper (maxillary) teeth. Also, the disclosed apparatus and methods are capable of any portions of a tooth, including interior spaces such as root canals, pulp cavity, etc., and/or exterior surfaces of the tooth. Moreover, the disclosed apparatus, methods, and compositions can be applied to human teeth (including juvenile teeth) and/or to animal teeth.

Reference throughout this specification to "some embodiments" or "an embodiment" means that a particular feature, structure, element, act, or characteristic described in connection with the embodiment is included in at least one embodiment. Thus, appearances of the phrases "in some embodiments" or "in an embodiment" in various places throughout this specification are not necessarily all referring to the same embodiment and may refer to one or more of the same or different embodiments. Furthermore, the particular features, structures, elements, acts, or characteristics may be combined in any suitable manner (including differently than shown or described) in other embodiments. Further, in various embodiments, features, structures, elements, acts, or characteristics can be combined, merged, rearranged, reordered, or left out altogether. Thus, no single feature, structure, element, act, or characteristic or group of features, structures, elements, acts, or characteristics is necessary or required for each embodiment. All possible combinations and subcombinations are intended to fall within the scope of this disclosure.

As used in this application, the terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Similarly, it should be appreciated that in the above description of embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Rather, inventive aspects lie in a combination of fewer than all features of any single foregoing disclosed embodiment.

The foregoing description sets forth various example embodiments and other illustrative, but non-limiting, embodiments of the inventions disclosed herein. The description provides details regarding combinations, modes, and uses of the disclosed inventions. Other variations, combinations, modifications, equivalents, modes, uses, implementations, and/or applications of the disclosed features and aspects of the embodiments are also within the scope of this disclosure, including those that become apparent to those of skill in the art upon reading this specification. Additionally, certain objects and advantages of the inventions are described herein. It is to be understood that not necessarily all such objects or advantages may be achieved in any particular embodiment. Thus, for example, those skilled in the art will recognize that the inventions may be embodied or carried out in a manner that achieves or optimizes one advantage or group of advantages as taught herein without necessarily achieving other objects or advantages as may be taught or suggested herein. Also, in any method or process disclosed herein, the acts or operations making up the method or process may be performed in any suitable sequence and are not necessarily limited to any particular disclosed sequence.

What is claimed is:

1. An apparatus for treating a tooth, the apparatus comprising:
    a tooth cap having a wall configured to be attached to the tooth such that a space is defined by the tooth cap and the tooth, the tooth cap including a support surface to support a portion of the apparatus, the tooth cap comprising an access port to provide the portion of the apparatus with access to a treatment region of the tooth within said space; and
    a treatment device comprising a pressure wave generator in communication with a chamber of a tooth coupler, the tooth coupler to be positioned against the support surface such that the chamber of the tooth coupler is in fluid communication with the access port and external to the tooth cap, the pressure wave generator positioned entirely within the tooth coupler and configured to generate pressure waves in the tooth coupler that propagate through the access port, through the space in the tooth cap, and to said tooth, the pressure wave generator configured to be in fluid communication with said tooth.

2. The apparatus of claim 1, wherein the wall of the tooth cap is adapted to extend at least partially along a height of the tooth such that a distal end of the wall is positioned between an occlusal surface and gums for treating a decay on the occlusal surface and/or on one or more side surfaces of the tooth and/or one or more interior regions of the tooth via an endodontic access opening.

3. The apparatus of claim 2, wherein the wall of the tooth cap is adapted to extend along the height of the tooth such that a distal end of the wall is positioned adjacent the gums for treating the decay on the occlusal surface and/or on the one or more side surfaces of the tooth and/or the one or more interior regions of the tooth via the endodontic access opening.

4. The apparatus of claim 1, wherein the tooth cap is adapted to be disposed on a side surface of the tooth for enclosing a portion of the tooth including a decay on the side surface of the tooth to be treated.

5. The apparatus of claim 1, wherein the space of the tooth cap is adapted to be filled with treatment fluid.

6. The apparatus of claim 1, wherein the support surface is angled inwardly relative to the wall.

7. The apparatus of claim 1, wherein the wall has a rigid portion and a flexible portion adjacent to the rigid portion.

* * * * *